United States Patent
Tanigawa

[19]

[11] Patent Number: 6,118,442
[45] Date of Patent: Sep. 12, 2000

[54] GRAPHICAL-INTERACTIVE-SCREEN DISPLAY APPARATUS AND PERIPHERAL UNITS

[75] Inventor: Hidekazu Tanigawa, Hirakata, Japan

[73] Assignee: Matsushita Electric Industrial Co., Ltd., Japan

[21] Appl. No.: 08/829,357

[22] Filed: Apr. 2, 1997

Related U.S. Application Data

[62] Division of application No. 08/326,758, Oct. 20, 1994, Pat. No. 5,648,813.

[30] Foreign Application Priority Data

| Oct. 20, 1993 | [JP] | Japan | 5-262348 |
| Nov. 10, 1993 | [JP] | Japan | 5-281016 |
| May 26, 1994 | [JP] | Japan | 6-112718 |

[51] Int. Cl.[7] ............................................ H04N 5/445
[52] U.S. Cl. ..................... 345/327; 348/12; 348/563
[58] Field of Search .................................. 345/326, 327, 345/328, 333, 334, 353, 352, 354, 356, 357; 348/6, 7, 8, 10, 12, 13, 552, 553, 554, 563, 564, 569; 455/6.3

[56] References Cited

U.S. PATENT DOCUMENTS

| 5,373,324 | 12/1994 | Kuroda et al. |
| 5,404,393 | 4/1995 | Remillard. |
| 5,905,497 | 5/1999 | Vaughan et al. ................... 345/327 X |

FOREIGN PATENT DOCUMENTS

| 2180497 | 7/1990 | Japan. |
| 3172086 | 7/1991 | Japan. |
| 3233660 | 10/1991 | Japan. |
| 4189098 | 7/1992 | Japan. |
| 5341950 | 12/1994 | Japan. |

*Primary Examiner*—Nathan Flynn
*Attorney, Agent, or Firm*—Price, Gess & Ubell

[57] ABSTRACT

A program receiver for displaying a graphical interactive picture by receiving a program transmitted from a program transmitter, the program receiver comprising: a storage unit for storing a plurality of basic picture elements in advance, the plurality of basic picture elements being figures composing the graphical interactive picture manipulated by a user; a signal receipt unit for receiving a signal transmitted from the program transmitter, the signal being a multiplex signal including a program and data specifying a structure of the graphical interactive picture; a signal separation unit for separating the signal received by the signal receipt unit into a program signal and a graphical-interactive-picture-structure specification data signal; a first graphical interactive picture generation unit for generating the graphical interactive picture by combining the basic picture elements stored in the storage unit based on the graphical-interactive-picture-structure specification data signal from the signal separation unit; and a display unit for displaying the graphical interactive picture generated by the first graphical interactive picture generation unit.

8 Claims, 169 Drawing Sheets

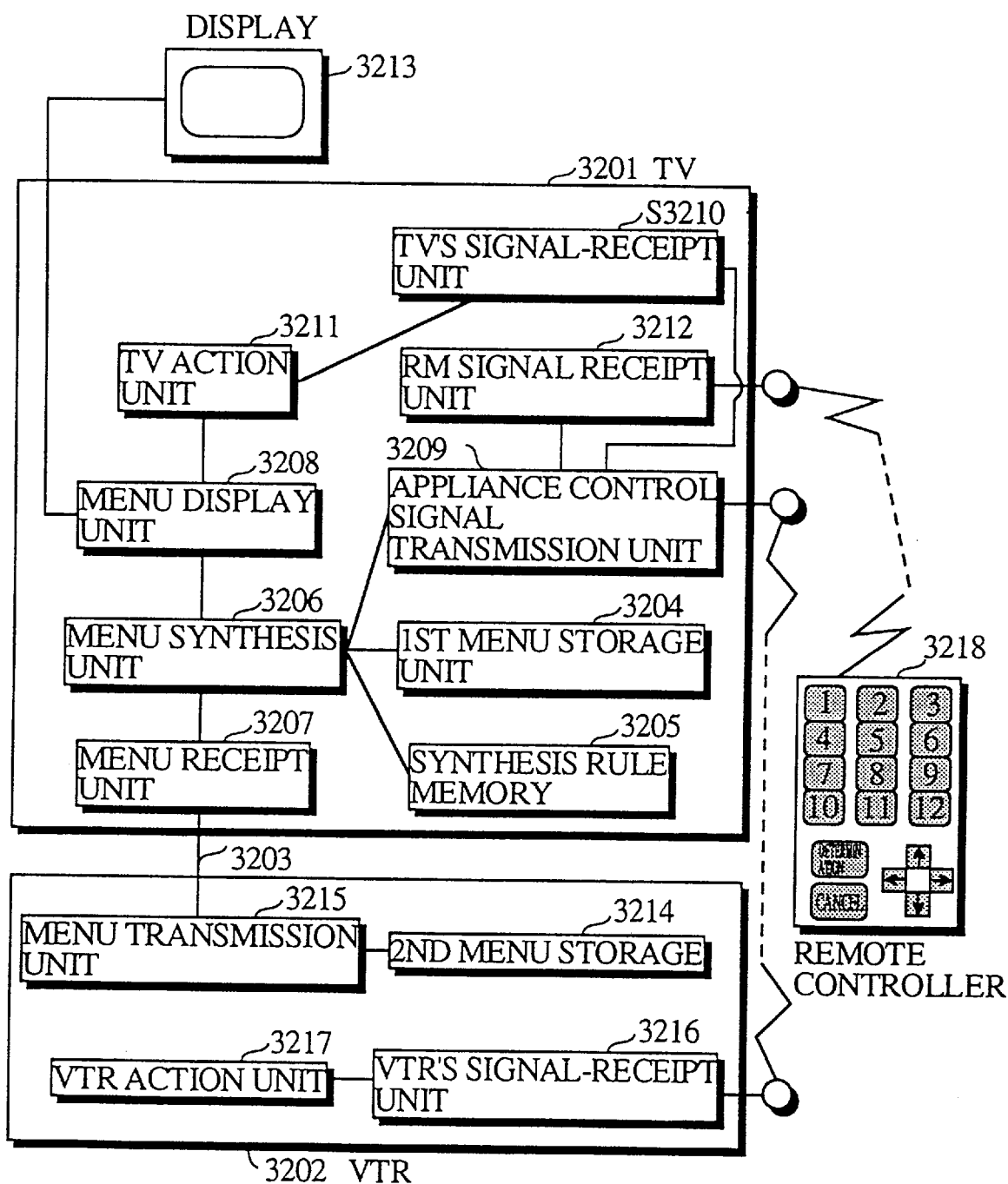

FIG. 33A

```
<MENU>TV
    <SUB-MENU>BASIC_MANIPULATION
        <PANEL>BASIC_MANIPULATION_PANEL
    <SUB-MENU>SUB-SCREEN
        <PANEL>SUB-SCREEN_MANIPULATION_PANEL
    <SUB-MENU>ADJUSTMENT
        <PANEL>ADJUSTMENT_PANEL
</MENU>

<PANEL>BASIC_MANIPULATION_PANEL
    <BUTTON>CHANNEL_UP_BUTTON
    <BUTTON>CHANNEL_DOWN_BUTTON
    <BUTTON>VOLUME_UP_BUTTON
    <BUTTON>VOLUME_DOWN_BUTTON
    <BUTTON>MUTE_BUTTON
    <BUTTON>POWER_ON/OFF_BUTTON
</PANEL>
<PANEL>SUB-SCREEN_MANIPULATION_PANEL
    <BUTTON>CHANNEL_UP_BUTTON
    <BUTTON>VOLUME_UP_BUTTON
    <BUTTON>VOLUME_DOWN_BUTTON
    <BUTTON>PICTURE_CHANGE_BUTTON
    <BUTTON>POSITION_CHANGE_BUTTON
</PANEL>
<PANEL>ADJUSTMENT_PANEL
    <BUTTON>IMAGE_SWITCH_BUTTON
    <BUTTON>SPEECH_MENU_BUTTON
    <BUTTON>IMAGE_MENU_BUTTON
    <BUTTON>IMAGE_NR_SWITCH_BUTTON
</PANEL>
```

FIG. 33B

```
<BUTTON>CHANNEL_UP_BUTTON
        <EVENT>CHANNEL_UP
</BUTTON>
<BUTTON>CHANNEL_DOWN_BUTTON
        <EVENT>CHANNEL_DOWN
</BUTTON>
<BUTTON>VOLUME_UP_BUTTON
        <EVENT>VOLUME_UP
</BUTTON>
<BUTTON>VOLUME_DOWN_BUTTON
        <EVENT>VOLUME_DOWN
</BUTTON>
<BUTTON>MUTE_BUTTON
        <EVENT>MUTE
</BUTTON>
<BUTTON>POWER_ON/OFF_BUTTON
        <EVENT>POWER_SWITCH
</BUTTON>
<BUTTON>PICTURE_CHANGE_BUTTON
        <EVENT>CHANGE_PICTURE
</BUTTON>
<BUTTON>POSITION_CHANGE_BUTTON
        <EVENT>CHANGE_POSITION
</BUTTON>
<BUTTON>IMAGE_SWITCH_BUTTON
        <EVENT>SWITCH_IMAGE
</BUTTON>
<BUTTON>SPEECH_MENU_SWITCH_BUTTON
        <EVENT>CHANGE_SPEECH
</BUTTON>
<BUTTON>IMAGE_MENU_SWITCH_BUTTON
        <EVENT>CHANGE_IMAGE
</BUTTON>
<BUTTON>IMAGE_NR_SWITCH_BUTTON
        <EVENT>SWITCH_NR
</BUTTON>
```

FIG. 35

S3501
IF (ANY VALUE OF THE <MENU> TAG IN THE SYNTHESIZING MENU
    INFORMATION DOES NOT MATCH WITH THE VALUE OF THE <MENU>
    TAG IN THE SYNTHESIZED MENU INFORMATION){
    IF (THERE EXISTS A VALUE FOR THE <MENU> TAG AT THE
        HIGHEST POSITION IN A HIERARCHY IN THE SYNTHESIZING MENU
S3502 INFORMATION){
        GENERATE THE HIGHEST POSITION <MENU> TAG WITH NO VALUE,
        AND REGISTER THE <MENU> TAG AT THE HIGHEST POSITION IN A
        HIERARCHY IN THE SYNTHESIZING MENU INFORMATION
        AND THE <MENU>AT THE TAG HIGHEST POSITION IN A HIERARCHY
        IN THE SYNTHESIZED MENU INFORMATION AS THE VALUE OF
        THE GENERATED HIGHEST POSITION <SUB-MENU> TAG AT THE
        HIGHEST POSITION}·······(1)
S3503
    ELSE {/*THE VALUE OF <MENU>TAG AT THE HIGHEST POSITION IN A
        HIERARCHYIS EMPTY*/ADD THE <MENU> OF THE SYNTHESIZED
        MENU INFORMATION TO THE 1ST LEVEL SUB-MENU IN THE
        SYNTHESIZING INFORMATION.
    }
}
    ELSE {
        IF (ANY VALUE OF THE <SUB-MENU> IN THE SYNTHESIZING MENU
S3504 INFORMATION DOES NOT MATCH WITH THE VALUE OF THE <SUB-
        MENU> IN THE SYNTHESIZED MENU INFORMATION){
S3505   3502){
            ADD THE <SUB-MENU> AND SUBSEQUENT IN
            SYNTHESIZED MENU INFORMATION TO THE 2ND LEVEL SUB-
            MENU IN THE SYNTHESIZING MENU INFORMATION}··(2)
        ELSE {
S3506       ADD THE <BUTTON> TAG IN THE SYNTHESIZED MENU
            INFORMATION TO THE PANEL IDENTIFIED BY THE VALUE OF THE
            <PANEL>TAG IN THE SYNTHESIZED MENU INFORMATION
        }
    }

FIG. 36

```
<MENU>VTR
    <SUB-MENU>PLAY BACK
        <PANEL>PLAY BACK_PANEL
    <SUB-MENU>RECORD
        <PANEL>RECORD_PANEL
</MENU>

<PANEL>PLAY BACK_PANEL
    <BUTTON>POWER_ON/OFF_BUTTON
    <BUTTON>PLAY BACK_BUTTON
    <BUTTON>FAST-FORWARD_BUTTON
    <BUTTON>REWIND_BUTTON
    <BUTTON>STOP_BUTTON
</PANEL>
<PANEL>RECORD_PANEL
    <BUTTON>POWER_ON/OFF_BUTTON
    <BUTTON>CHANNEL_SET_BUTTON
    <BUTTON>START_TIME SET_BUTTON
    <BUTTON>END_TIME_SET_BUTTON
</PANEL>

<BUTTON>PLAY BACK_BUTTON
    <EVENT>PLAY
</BUTTON>
<BUTTON>FAST-FORWARD_BUTTON
    <EVENT>NEXT
</BUTTON>
<BUTTON>REWIND_BUTTON
    <EVENT>PREVIOUS
</BUTTON>
<BUTTON>STOP_BUTTON
    <EVENT>STOP
</BUTTON>
<BUTTON>CHANNEL_SET_BUTTON
    <EVENT>CHANNEL_SWITCH
</BUTTON>
<BUTTON>START_TIME_SET_BUTTON
    <EVENT>TIME_SWITCH
            _TO_START TIME
</BUTTON>
<BUTTON>END_TIME_SET_BUTTON
    <EVENT>TIME_SWITCH
            _TO_END TIME
</BUTTON>
```

FIG. 37A

```
<MENU>
     <SUB-MENU>TV
          <MENU>TV
     <SUB-MENU>VTR
          <MENU>VTR
</MENU>

<MENU>TV
     <SUB-MENU>BASIC_MANIPULATION
          <PANEL>BASIC_MANIPULATION_PANEL
     <SUB-MENU>SUB-SCREEN
          <PANEL>SUB-SCREEN_MANIPULATION_PANNEL
     <SUB-MENU>ADJUSMENT
          <PANEL>ADJUSMENT_PANEL
</MENU>

<MENU>VTR
     <SUB-MENU>PLAY BACK
          <PANEL>PLAY BACK_PANEL
     <SUB-MENU>RECORD
          <PANEL>RECORD_PANEL
</MENU>

<PANEL>BASIC_MANIPULATION_PANEL
     <BUTTON>CHANNEL_UP_BUTTON
     <BUTTON>CHANNEL_DOWN_BUTTON
     <BUTTON>VOLUME_UP_BUTTON
     <BUTTON>VOLUME_DOWN_BUTTON
     <BUTTON>MUTE_BUTTON
     <BUTTON>POWER_ON/OFF_BUTTON
</PANEL>
<PANEL>SUB-SCREEN_MANIPULATION_PANEL
     <BUTTON>CHANNEL_UP_BUTTON
     <BUTTON>VOLUME_UP_BUTTON
     <BUTTON>VOLUME_DOWN_BUTTON
     <BUTTON>PICTURE_CHANGE_BUTTON
     <BUTTON>POSITION_CHANGE_BUTTON
</PANEL>
<PANEL>ADJUSTMENT_PANEL
     <BUTTON>IMAGE_SWITCH_BUTTON
     <BUTTON>SPEECH_MENU_BUTTON
     <BUTTON>IMAGE_MENU_BUTTON
     <BUTTON>IMAGE_NR_SWITCH_BUTTON
</PANEL>
```

FIG. 37B

```
<BUTTON>CHANNEL_UP_BUTTON
        <EVENT>CHANNEL_UP
</BUTTON>
<BUTTON>CHANNEL_DOWN_BUTTON
        <EVENT>CHANNEL_DOWN
</BUTTON>
<BUTTON>VOLUME_UP_BUTTON
        <EVENT>VOLUME_UP
</BUTTON>
<BUTTON>VOLUME_DOWN_BUTTON
        <EVENT>VOLUME_DOWN
</BUTTON>
<BUTTON>MUTE_BUTTON
        <EVENT>MUTE
</BUTTON>
<BUTTON>POWER_ON/OFF_BUTTON
        <EVENT>POWER_SWITCH
</BUTTON>
<BUTTON>PICTURE_CHANGE_BUTTON
        <EVENT>CHANGE_PICTURE
</BUTTON>
<BUTTON>POSITION_CHANGE_BUTTON
        <EVENT>CHANGE_POSITION
</BUTTON>
<BUTTON>IMAGE_SWITCH_BUTTON
        <EVENT>SWITCH_IMAGE
</BUTTON>
<BUTTON>SPEECH_MENU_SWITCH_BUTTON
        <EVENT>CHANGE_SPEECH
</BUTTON>
<BUTTON>IMAGE_MENU_SWITCH_BUTTON
        <EVENT>CHANNEL_IMAGE
</BUTTON>
<BUTTON>IMAGE_NR_SWITCH_BUTTON
        <EVENT>SWITCH_NR
</BUTTON>

<PANEL>PLAY BACK_PANEL
        <BUTTON>POWER_ON/OFF_BUTTON
        <BUTTON>PLAY BACK_BUTTON
        <BUTTON>FAST-FORWARD_BUTTON
        <BUTTON>REWIND_BUTTON
        <BUTTON>STOP_BUTTON
</PANEL>
<PANEL>RECORD_PANEL
        <BUTTON>POWER_ON/OFF_BUTTON
        <BUTTON>CHANNEL_SET_BUTTON
        <BUTTON>START_TIME_SET_BUTTON
        <BUTTON>END_TIME_SET_BUTTON
</PANEL>
```

FIG. 37C

```
<BUTTON>PLAY BACK_BUTTON
        <EVENT>SAISEI
</BUTTON>
<BUTTON>FAST-FORWARD_BUTTON
        <EVENT>NEXT
</BUTTON>
<BUTTON>REWIND_BUTTON
        <EVENT>PREV
</BUTTON>
<BUTTON>STOP_BUTTON
        <EVENT>STOP
</BUTTON>
<BUTTON>CHANNEL_SET_BUTTON
        <EVENT>CHANNEL_SWITCH
</BUTTON>
<BUTTON>START_TIME_SET_BUTTON
        <EVENT>TIME_SWITCH
                    _TO_START TIME
</BUTTON>
<BUTTON>END_TIME_SET_BUTTON
        <EVENT>TIME_SWITCH
                    _TO_END TIME
</BUTTON>
```

FIG. 40

```
<MENU>VTR
    <SUB-MENU>MAKE_TABLE_OF_CONTENTS
        <PANEL>MAKE_TABLE_OF_CONTENTS_PANEL
    <SUB-MENU>RECORD
        <PANEL>RECORD PANEL
</MENU>

<PANEL>MAKE_TABLE_OF_CONTENTS_PANEL
    <BUTTON>TYPE_SELECT_BUTTON
    <BUTTON>TITLE_MAKE_BUTTON
    <BUTTON>SUBJECT_IMAGE_START_DIRECTION_BUTTON
    <BUTTON>SUBJECT_IMAGE_END_DIRECTION_BUTTON
</PANEL>

<BUTTON>TYPE_SELECT_BUTTON
    <EVENT>SELECT_TYPE
</BUTTON>
<BUTTON>TITLE_MAKE_BUTTON
    <EVENT>MAKE_TITLE
</BUTTON>
<BUTTON>SUBJECT_IMAGE_START_DIRECTION_BUTTON
    <EVENT>START_IMAGE
</BUTTON>
<BUTTON>SUBJECT_IMAGE_END_DIRECTION_BUTTON
    <EVENT>END_IMAGE
</BUTTON>
```

FIG. 41A

```
<MENU>
        <SUB-MENU>TV
                <MENU>TV
        <SUB-MENU>VTR
                <MENU>VTR
</MENU>

<MENU>TV
        <SUB-MENU>BASIC_MANIPULATION
                <PANEL>BASIC_MANIPULATION_PANEL
        <SUB-MENU>SUB-SCREEN
                <PANEL>SUB-SCREEN_MANIPULATION_PANEL
        <SUB-MENU>ADJUSTMENT
                <PANEL>ADJUSTMENT_PANEL
</MENU>

<MENU>VTR
        <BUTTON>POWER_ON/OFF_BUTTON
        <SUB-MENU>PLAYBACK
                <PANEL>PLAYBACK_PANEL
        <SUB-MENU>RECORD
                <PANEL>RECORD_PANEL
        <SUB-MENU>MAKE_TABLE_OF_CONTENT
                <PANEL>MAKE_TABLE_OF_CONTENT_PANEL
</MENU>

<PANEL>BASIC_MANIPULATION_PANEL
        <BUTTON>CHANNEL_UP_BUTTON
        <BUTTON>CHANNEL_DOWN_BUTTON
        <BUTTON>VOLUME_UP_BUTTON
        <BUTTON>VOLUME_DOWN_BUTTON
        <BUTTON>MUTE_BUTTON
        <BUTTON>POWER_ON/OFF_BUTTON
</PANEL>
<PANEL>SUB-SCREEN_MANIPULATION_PANEL
        <BUTTON>CHANNEL_UP_BUTTON
        <BUTTON>VOLUME_UP_BUTTON
        <BUTTON>VOLUME_DOWN_BUTTON
        <BUTTON>PICTURE_CHANGE_BUTTON
        <BUTTON>POSITION_CHANGE_BUTTON
</PANEL>
<PANEL>ADJUSTMENT_PANEL
        <BUTTON>IMAGE_SWITCH_BUTTON
        <BUTTON>SPEECH_MENU_BUTTON
        <BUTTON>IMAGE_MENU_BUTTON
        <BUTTON>IMAGE_NR_SWITCH_BUTTON
</PANEL>
```

FIG. 41B

```
<BUTTON>CHANNEL_UP_BUTTON
        <EVENT>CHANNEL_UP
</BUTTON>
<BUTTON>CHANNEL_DOWN_BUTTON
        <EVENT>CHANNEL_DOWN
</BUTTON>
<BUTTON>VOLUME_UP_BUTTON
        <EVENT>VOLUME_UP
</BUTTON>
<BUTTON>VOLUME_DOWN_BUTTON
        <EVENT>VOLUME_DOWN
</BUTTON>
<BUTTON>MUTE_BUTTON
        <EVENT>MUTE
</BUTTON>
<BUTTON>POWER_ON/OFF_BUTTON
        <EVENT>POWER_SWITCH
</BUTTON>
<BUTTON>PICTURE_CHANGE_BUTTON
        <EVENT>CHANGE_PICTURE
</BUTTON>
<BUTTON>POSITION_CHANGE_BUTTON
        <EVENT>CHANGE_POSITION
</BUTTON>
<BUTTON>IMAGE_SWITCH_BUTTON
        <EVENT>SWITCH_IMAGE
</BUTTON>
<BUTTON>SPEECH_MENU_SWITCH_BUTTON
        <EVENT>CHANGE_SPEECH
</BUTTON>
<BUTTON>IMAGE_MENU_SWITCH_BUTTON
        <EVENT>CHANGE_IMAGE
</BUTTON>
<BUTTON>IMAGE_NR_SWITCH_BUTTON
        <EVENT>SWITCH_NR
</BUTTON>

<PANEL>PLAY BACK_PANEL
        <BUTTON>PLAY BACK_BUTTON
        <BUTTON>FAST-FORWARD_BUTTON
        <BUTTON>REWIND_BUTTON
        <BUTTON>STOP_BUTTON
</PANEL>
<PANEL>RECORD_PANEL
        <BUTTON>CHANNEL_SET_BUTTON
        <BUTTON>START_TIME_SET_BUTTON
        <BUTTON>END_TIME_SET_BUTTON
</PANEL>
```

FIG. 41C

```
<BUTTON>PLAY BACK_BUTTON
        <EVENT>PLAY
</BUTTON>
<BUTTON>FAST-FORWARD_BUTTON
        <EVENT>NEXT
</BUTTON>
<BUTTON>REWIND_BUTTON
        <EVENT>PREVIOUS
</BUTTON>
<BUTTON>STOP_BUTTON
        <EVENT>STOP
</BUTTON>
<BUTTON>CHANNEL_SET_BUTTON
        <EVENT>CHANNEL_SWITCH
</BUTTON>
<BUTTON>START_TIME_SET_BUTTON
        <EVENT>TIME_SWITCH
                    _TO_START TIME
</BUTTON>
<BUTTON>END_TIME_SET_BUTTON
        <EVENT>TIME_SWITCH
                    _TO_END TIME
</BUTTON>

<PANEL>MAKE_TABLE_OF_CONTENTS_PANEL
        </BUTTON>
        <BUTTON>TYPE_SELECT_BUTTON
        <BUTTON>TITLE_MAKE_BUTTON
        <BUTTON>SUBJECT_IMAGE_START_DIRECTION_BUTTON
        <BUTTON>SUBJECT_IMAGE_END_DIRECTION_BUTTON
</PANEL>

<BUTTON>TYPE_SELECT_BUTTON
        <EVENT>SELECT_JANRU
</BUTTON>
<BUTTON>TITLE_MAKE_BUTTON
        <EVENT>MAKE_TITLE
</BUTTON>
<BUTTON>SUBJECT_IMAGE_START_DIRECTION_BUTTON
        <EVENT>START_IMAGE
</BUTTON>
<BUTTON>SUBJECT_IMAGE_END_DIRECTION_BUTTON
        <EVENT>END_IMAGE
</BUTTON>
```

FIG. 45

```
<MENU>AIR_CONDITIONER
    <PANEL>SET_PANEL
</MENU>

<PANEL>SET_PANEL
    <BUTTON>POWER_ON/OFF_BUTTON
    <BUTTON>TEMPERATURE_UP_BUTTON
    <BUTTON>TEMPERATURE_DOWN_BUTTON
    <BUTTON>ACTION_SET_BUTTON
</PANEL>

<BUTTON>POWER_ON/OFF_BUTTON
    <EVENT>POWER_SWITCH
</BUTTON>
<BUTTON>TEMPERATURE_UP_BUTTON
    <EVENT>TEMPERATURE_UP
</BUTTON>
<BUTTON>TEMPERATURE_DOWN_BUTTON
    <EVENT>TEMPERATURE_DOWN
</BUTTON>
<BUTTON>ACTION_SET_BUTTON
    <EVENT>ACTION_SWITCH
</BUTTON>
```

FIG. 46A

```
<MENU>
    <SUB-MENU>TV
        <PANEL>TV
    <SUB-MENU>VTR
        <PANEL>VTR
    <SUB-MENU>AIR_CONDITIONER
        <PANEL>AIR_CONDITIONER
</MENU>

<MENU>AIR_CONDITIONER
    <PANEL>SET_PANEL
</MENU>

<MENU>TV
    <SUB-MENU>BASIC_MANIPULATION
        <PANEL>BASIC_MANIPULATION_PANNEL
    <SUB-MENU>SUB-SCREEN
        <PANEL>SUB-SCREEN_MANIPULATION_PANNEL
    <SUB-MENU>ADJUSMENT
        <PANEL>ADJUSMENT_PANEL
</MENU>

<MENU>VTR
    <SUB-MENU>PLAY BACK
        <PANEL>PLAY BACK_PANEL
    <SUB-MENU>RECORD
        <PANEL>RECORD_PANEL
</MENU>

<PANEL>PLAY BACK_PANEL
    <BUTTON>POWER_ON/OFF_BUTTON
    <BUTTON>PLAY BACK_BUTTON
    <BUTTON>FAST-FORWARD_BUTTON
    <BUTTON>REWIND_BUTTON
    <BUTTON>STOP_BUTTON
</PANEL>

<PANEL>RECORD_PANEL
    <BUTTON>POWER_ON/OFF_BUTTON
    <BUTTON>CHANNEL_SET_BUTTON
    <BUTTON>START_TIME_SET_BUTTON
    <BUTTON>END_TIME_SET_BUTTON
</PANEL>
```

FIG. 46B

```
<BUTTON>PLAY BACK_BUTTON
        <EVENT>PLAY
</BUTTON>
<BUTTON>FAST-FORWARD_BUTTON
        <EVENT>NEXT
</BUTTON>
<BUTTON>REWIND_BUTTON
        <EVENT>PREVIOUS
</BUTTON>
<BUTTON>STOP_BUTTON
        <EVENT>STOP
</BUTTON>
<BUTTON>CHANNEL_SET_BUTTON
        <EVENT>CHANNEL_SWITCH
</BUTTON>
<BUTTON>START_TIME_SET_BUTTON
        <EVENT>TIME_SWITCH
                _TO_START TIME
</BUTTON>
<BUTTON>END_TIME_SET_BUTTON
        <EVENT>TIME_SWITCH
                _TO_END TIME
</BUTTON>

<PANEL>SET_PANEL
        <BUTTON>POWER_ON/OFF_BUTTON
        <BUTTON>TEMPERATURE_UP_BUTTON
        <BUTTON>TEMPERATURE_DOWN_BUTTON
        <BUTTON>ACTION_SET_BUTTON
</PANEL>
<PANEL>BASIC_MANIPULATION_PANEL
        <BUTTON>CHANNEL_UP_BUTTON
        <BUTTON>CHANNEL_DOWN_BUTTON
        <BUTTON>VOLUME_UP_BUTTON
        <BUTTON>VOLUME_DOWN_BUTTON
        <BUTTON>MUTE_BUTTON
        <BUTTON>POWER_ON/OFF_BUTTON
</PANEL>
<PANEL>SUB-SCREEN_MANIPULATION_PANEL
        <BUTTON>CHANNEL_UP_BUTTON
        <BUTTON>VOLUME_UP_BUTTON
        <BUTTON>VOLUME_DOWN_BUTTON
        <BUTTON>PICTURE_CHANGE_BUTTON
        <BUTTON>POSITION_CHANGE_BUTTON
</PANEL>
<PANEL>ADJUSTMENT_PANEL
        <BUTTON>IMAGE_SWITCH_BUTTON
        <BUTTON>SPEECH_MENU_SWITCH_BUTTON
        <BUTTON>IMAGE_MENU_SWITCH_BUTTON
        <BUTTON>IMAGE_NR_SWITCH_BUTTON
</PANEL>
```

FIG. 46C

```
<BUTTON>CHANNEL_UP_BUTTON
        <EVENT>CHANNEL_UP
</BUTTON>
<BUTTON>CHANNEL_DOWN_BUTTON
        <EVENT>CHANNEL_DOWN
</BUTTON>
<BUTTON>VOLUME_UP_BUTTON
        <EVENT>VOLUME_UP
</BUTTON>
<BUTTON>VOLUME_DOWN_BUTTON
        <EVENT>VOLUME_DOWN
</BUTTON>
<BUTTON>MUTE_BUTTON
        <EVENT>MUTE
</BUTTON>
<BUTTON>POWER_ON/OFF_BUTTON
        <EVENT>POWER_SWITCH
</BUTTON>
<BUTTON>PICTURE_CHANGE_BUTTON
        <EVENT>CHANGE_PICTURE
</BUTTON>
<BUTTON>POSITION_CHANGE_BUTTON
        <EVENT>CHANGE_POSITION
</BUTTON>
<BUTTON>IMAGE_SWITCH_BUTTON
        <EVENT>SWITCH_IMAGE
</BUTTON>
<BUTTON>SPEECH_MENU_SWITCH_BUTTON
        <EVENT>CHANGE_SPEECH
</BUTTON>
<BUTTON>IMAGE_MENU_SWITCH_BUTTON
        <EVENT>CHANGE_IMAGE
</BUTTON>
<BUTTON>IMAGE_NR_SWITCH_BUTTON
        <EVENT>SWITCH_NR
</BUTTON>
<BUTTON>POWER_ON/OFF_BUTTON
        <EVENT>POWER_SWITCH
</BUTTON>
<BUTTON>TEMPERATURE_UP_BUTTON
        <EVENT>TEMPERATURE_UP
</BUTTON>
<BUTTON>TEMPERATURE_DOWN_BUTTON
        <EVENT>TEMPERATURE_DOWN
</BUTTON>
<BUTTON>ACTION_SET_BUTTON
        <EVENT>ACTION_SWITCH
</BUTTON>
```

5101

5201   5202   5203

FIG. 53
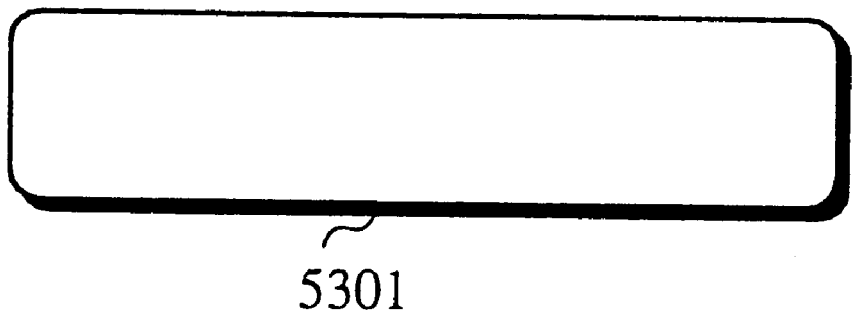
5301
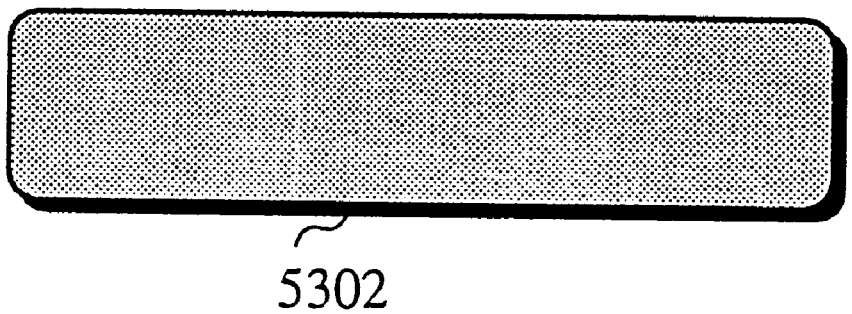
5302
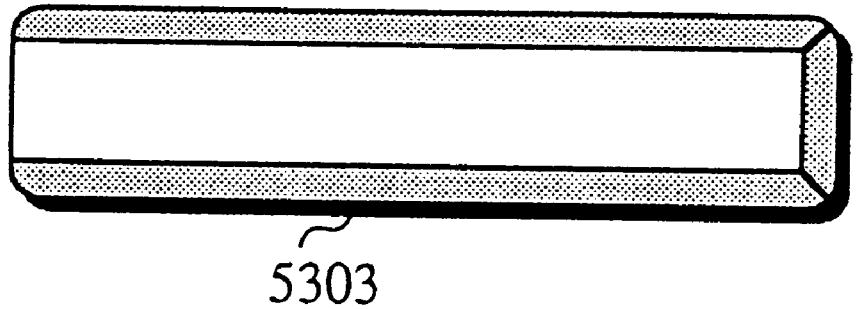
5303

FIG. 54

```
<! ELEMENT BOX ( CHARACTER_STRING & SHAPE & ACTION & SELECTION_STATE &
    FOCUS_STATE & STATE_CANDIDATE ) >

<! ELEMENT BUTTON ( CHARACTER_STRING & SHAPE & ACTION & SELECTION_STATE &
    FOCUS_STATE ) >

<! ELEMENT PANEL ( SHAPE ) >
```

FIG. 55

```
<PANEL SHAPE=PANEL SHAPE>QUIZ 1
    <v>
        <h>
            <BOX>AMERICA__BOX
            <BOX>FRANCE__BOX
        </h>
        <h>
            <BOX>ENGLAND__BOX
            <BOX>GERMANY__BOX
        </h>
        <BUTTON>TRANSMISSION__BUTTON
    </v>
</PANEL>
```

FIG. 56

<BOX CHARACTER_STRING=AMERICA SHAPE=BOX_SHAPE ACTION=AMERICA_BOX_ACTION
SELECTION_STATE=OFF FOCUS_STATE=ON
STATE_CANDIDATE=ON_OFF_CANDIDATE>AMERICA_BOX

<BOX CHARACTER_STRING=FRANCE SHAPE=BOX_SHAPE ACTION=FRANCE_BOX_ACTION
SELECTION_STATE=OFF FOCUS_STATE=OFF
STATE_CANDIDATE=ON_OFFC_ANDIDATE>FRANCE_BOX

<BOX CHARACTER_STRING=ENGLAND SHAPE=BOX_SHAPE ACTION=ENGLAND_BOX_ACTION
SELECTION_STATE=OFF FOCUS_STATE=OFF
STATE_CANDIDATE=ON_OFF_CANDIDATE>ENGLAND_BOX

<BOX CHARACTER_STRING=GERMANY SHAPE=BOX_SHAPE ACTION=GERMANY_BOX_ACTION
SELECTION_STATE=OFF FOCUS_STATE=OFF
STATE_CANDIDATE=ON_OFF_CANDIDATE>GERMANY_BOX

FIG. 57

```
<BUTTON  CHARACTER_STRING=TRANSMISSION    SHAPE=BUTTON_SHAPE
ACTION=TRANSMISSION_BUTTON_ACTION
FOCUS_STATE =OFF>TRANSMISSION_BUTTON
```

FIG. 58

```
<ACTION>AMERICA__BOX__ACTION
    <EVENT>RIGHT  <COMMAND>SHIFT__FOCUS  <ARGUMENT>FRANCE__BOX
    <EVENT>DOWN  <COMMAND>SHIFT__FOCUS  <ARGUMENT>ENGLAND__BOX
    <EVENT>SELECTION  <COMMAND>SWITCH__STATE
</ACTION>
<ACTION>FRANCE__BOX__ACTION
    <EVENT>LEFT  <COMMAND>SHIFT__FOCUS<ARGUMENT>AMERICA__BOX
    <EVENT>DOWN  <COMMAND>SHIFT__FOCUS  <ARGUMENT>GERMANY__BOX
    <EVENT>SELECTION  <COMMAND>SWITCH__STATE
</ACTION>
<ACTION>ENGLAND__BOX__ACTION
    <EVENT>RIGHT  <COMMAND>SHIFT__FOCUS  <ARGUMENT>GERMANY__BOX
    <EVENT>UP  <COMMAND>SHIFT__FOCUS<ARGUMENT>AMERICA__BOX
    <EVENT>DOWN  <COMMAND>SHIFT__FOCUS  <ARGUMENT>TRANSMISSION__BUTTON
    <EVENT>SELECTION  <COMMAND>SWITCH__STATE
</ACTION>
<ACTION>GERMANY__BOX__ACTION
    <EVENT>LEFT  <COMMAND>SHIFT__FOCUS  <ARGUMENT>ENGLAND__BOX
    <EVENT>UP  <COMMAND>SHIFT__FOCUS  <ARGUMENT>FRANCE__BOX
    <EVENT>DOWN  <COMMAND>SHIFT__FOCUS  <ARGUMENT>TRANSMISSION__BUTTON
    <EVENT>SELECTION  <COMMAND>SWITCH__STATE
</ACTION>
<ACTION>TRANSMISSION__BUTTON__ACTION
    <EVENT>UP  <COMMAND>SHIFT__FOCUS
    <EVENT>DOWN  <COMMAND>SHIFT__FOCUS
    <EVENT>DETERMINATION  <COMMAND>TRANSMIT__ATTRIBUTE__VALUE
                <ARGUMENT>AMERICA__BOX
                <ARGUMENT>FRANCE__BOX
                <ARGUMENT>ENGLAND__BOX
                <ARGUMENT>GERMANY__BOX
```

FIG. 59

```
<CANDIDATE_DATA>ON_OFF_CANDIDATE
    <CANDIDATE_VALUE>ON  <CANDIDATE_VALUE>OFF
</CANDIDATE_DATA>
```

FIG. 60

```
<SHAPE>PANEL_SHAPE
        <FIGURE>PANEL_SHAPE1
</SHAPE>

<SHAPE>BOX_SHAPE
    <CONDITION  FOCUS_STATE=OFF & SELECTION_STATE=OFF>
        <FIGURE>BOX_SHAPE1
    </CONDITION>
    <CONDITION  FOCUS_STATE=ON & SELECTION_STATE=OFF>
        <FIGURE>BOX_SHAPE2
    </CONDITION>
    <CONDITION  SELECTION_STATE=ON>
        <FIGURE>BOX_SHAPE3
    </CONDITION>
</SHAPE>

<SHAPE>BUTTON_SHAPE
    <CONDITION  FOCUS_STATE=OFF>
        <FIGURE>BUTTON_SHAPE1
    </CONDITION>
    <CONDITION  FOCUS_STATE=ON>
        <FIGURE>BUTTON_SHAPE2
    </CONDITION>
</SHAPE>
```

FIG. 77

```
<SYNTHESIS_DIRECTION>
        <SYNTHESIS_COMMAND>ADD
                <PANEL    TIME OUT =60_SEC.>QUIZ 1
        </SYNTHESIS_COMMAND>
</SYNTHESIS_DIRECTION>
```

FIG. 78

```
<SYNTHESIS_DIRECTION>
  <SYNTHESIS_COMMAND>ADD
    <ACTION>AMERICA_BOX_ACTION
      <EVENT>HELP <COMMAND> OPEN_PANEL
        <ARGUMENT>HELP_PANEL
  <SYNTHESIS_COMMAND>
</SYNTHESIS_DIRECTION>
```

FIG. 79

```
<SYNTHESIS_DIRECTION>
 <SYNTHESIS_COMMAND>ADD
  <SHAPE>BUTTON_SHAPE
   <CONDITION SELECTION_STATE=ON >
    <FIGURE>BUTTON_SHAPE 3
   </CONDITION>
 </SYNTHESIS_COMMAND>
</SYNTHESIS_DIRECTION>
```

FIG. 80

```
<SYNTHESIS_DIRECTION>
  <SYNTHESIS_COMMAND>ADD
    <CANDIDATE_DATA>)ON_OFF_CANDIDATE
      <CANDIDATE_VALUE>NULL
      <CONDITION>
      </CONDITION>
  </SYNTHESIS_COMMAND>
</SYNTHESIS_DIRECTION>
```

FIG. 81

```
<PANEL  SHAPE=PANEL_SHAPE  TIME OUT =60_SEC.>QUIZ 1
    <v>
        <h>
            <BOX>AMERICA_BOX
            <BOX>FRANCE_BOX
        </h>
        <h>
            <BOX>ENGLAND_BOX
            <BOX>GERMANY_BOX
        </h>
        <BUTTON >TRANSMISSION_BUTTON
    </v>
</PANEL>
```

```
<ACTION>AMERICA_BOX_ACTION
    <EVENT>RIGHT    <COMMAND>SHIFT_FOCUS    <ARGUMENT>FRANCE_BOX
    <EVENT>DOWN     <COMMAND>SHIFT_FOCUS    <ARGUMENT>ENGLAND_BOX
    <EVENT>SELECTION <COMMAND>SWITCH_STATE
    <EVENT>HELP     <COMMAND>OPEN_PANEL     <ARGUMENT>HELP_PANEL
</ACTION>
```

```
<ACTION>AMERICA_BOX_ACTION
    <EVENT>RIGHT      <COMMAND>SHIFT_FOCUS    <ARGUMENT>FRANCE_BOX
    <EVENT>DOWN       <COMMAND>SHIFT_FOCUS    <ARGUMENT>ENGLAND_BOX
    <EVENT>SELECTION  <COMMAND>SWITCH_STATE
    <EVENT>HELP       <COMMAND>DISPLAY_GUIDANCE
</ACTION>
```

FIG. 84

```
<ACTION>AMERICA_BOX_ACTION
    <EVENT>RIGHT    <COMMAND>SHIFT_FOCUS    <ARGUMENT>FRANCE_BOX
    <EVENT>DOWN     <COMMAND>SHIFT_FOCUS    <ARGUMENT>ENGLAND_BOX
    <EVENT>SELECTION <COMMAND> SWITCH_STATE
    <EVENT>HELP     <COMMAND> DISPLAY_GUIDANCE
        <COMMAND> OPEN_PANEL  <ARGUMENT>HELP_PANEL
</ACTION>
```

FIG. 85

```
<SHAPE>BUTTON_SHAPE
    <CONDITION  FOCUS_STATE=OFF>
        <FIGURE>BUTTON_SHAPE 1
    </CONDITION>
    <CONDITION  FOCUS_STATE=ON>
        <FIGURE>BUTTON_SHAPE 2
    </CONDITION>
    <CONDITION  SELECTION_STATE=ON>
        <FIGURE>BUTTON_SHAPE 3
    </CONDITION>
</SHAPE>
```

FIG. 86

```
<CANDIDATE_DATA>ON_OFF_CANDIDATE
    <CANDIDATE_VALUE>ON  <CANDIDATE_VALUE>OFF  <CANDIDATE_VALUE>NULL
</CANDIDATE_DATA>
```

FIG. 87

<!ELEMENT BOX (CHARACTER_STRING & SHAPE & ACTION & SELECTION_STATE & FOCUS_STATE & STATE_CANDIDATE)>

<!ELEMENT BUTTON (CHARACTER_STRING & SHAPE & ACTION & FOCUS_STATE)>

<!ELEMENT PANEL (SHAPE)>

<!ELEMENT TEXT (CHARACTER_STRING)>

FIG. 88

```
<PANEL   SHAPE=PANEL_SHAPE>USER_PANEL 1
      <v>
                  <TEXT>ADDRESS 1
                  <TEXT>TEL.No. 1
                  <TEXT>HOT_SPRING 1
                  <BUTTON>PRINT_BUTTON
      </v>
</PANEL>
```

FIG. 89

\<TEXT CHARACTER_STRING=SHIRAHAMA-CHO_WAKAYAMA_PREF.\>ADDRESS 1
\<TEXT CHARACTER_STRING=059352-1-201\>TEL.No. 1
\<TEXT CHARACTER_STRING=SHIRAHAMA_HOT_SPRING\>HOT_SPRING 1

FIG. 90

`<BUTTON CHARACTER_STRING=PRINT SHAPE=BUTTON_SHAPE ACTION=PRINT_BUTTON_ACTION FOCUS_STATE=ON>PRINT_BUTTON`

FIG. 91

```
<ACTION>PRINT_BUTTON_ACTION
    <EVENT>DETERMINATION  <COMMAND>PRINT  <ARGUMENT>ADDRESS
                                          <ARGUMENT>TEL.No.
                                          <ARGUMENT>HOT_SPRING
</ACTION>
```

```
<SHAPE>PANEL_SHAPE
        <FIGURE>PANEL_SHAPE 1
</SHAPE>
<SHAPE>BUTTON_SHAPE
    <CONDITION  FOCUS_STATE=OFF>
        <FIGURE>BUTTON_SHAPE 1
    </CONDITION>
    <CONDITION  FOCUS_STATE=ON>
        <FIGURE>BUTTON_SHAPE 2
    </CONDITION>
</SHAPE>
```

FIG. 94

```
<SYNTHESIS_DIRECTION>
  <SYNTHESIS_COMMAND>DISPLAY
    <v>
      <PANEL>USER_PANEL1
      <PANEL>USER_PANEL2
    </v>
  </SYNTHESIS_COMMAND>
  <SYNTHESIS_COMMAND>ADD
    <ACTION>PRINT_BUTTON_ACTION
      <EVENT>DOWN  <COMMAND>SHIFT_FOCUS  <ARGUMENT>PRINT_BUTTON2
  </SYNTHESIS_COMMAND>
</SYNTHESIS_DIRECTION>
```

FIG. 95

```
<PANEL  SHAPE=PANEL_SHAPE>USER_PANEL 2
      <v>
                <TEXT>ADDRESS 2
                <TEXT>TEL.No. 2
                <TEXT>HOT_SPRING 2
                <BUTTON >PRINT_BUTTON 2
      </v>
</PANEL >
```

FIG. 96

<TEXT CHARACTER_STRING=ARIMA-CHO_HYOGO_PREF.>ADDRESS 2
<TEXT CHARACTER_STRING=07234-1-101>TEL.No. 2
<TEXT CHARACTER_STRING=ARIMA_HOT_SPRING>HOT_SPRING 2

FIG. 97

```
<BUTTON CHARACTER_STRING=PRINT SHAPE=BUTTON_SHAPE ACTION=PRINT_BUTTON_ACTION2
FOCUS_STATE=OFF>PRINT_BUTTON2
```

FIG. 98

```
<ACTION>PRINT_BUTTON_ACTION 2
    <EVENT>DETERMINATION <COMMAND>PRINT <ARGUMENT>ADDRESS 2
                                         <ARGUMENT>TEL.No. 2
                                         <ARGUMENT>HOT_SPRING 2
</ACTION>
```

FIG. 99

```
<SHAPE>PANEL__SHAPE
        <FIGURE>PANEL__SHAPE1
</SHAPE>

<SHAPE>BUTTON__SHAPE
    <CONDITION  FOCUS__STATE =OFF>
        <FIGURE>BUTTON__SHAPE1
    </CONDITION>
    <CONDITION  FOCUS__STATE =ON>
        <FIGURE>BUTTON__SHAPE2
    </CONDITION>
</SHAPE>
```

FIG. 100

```
<ACTION>PRINT_BUTTON_ACTION
    <EVENT>DETERMINATION  <COMMAND>PRINT   <ARGUMENT>ADDRESS
                                           <ARGUMENT>TEL.No.
                                           <ARGUMENT>HOT_SPRING
                          <COMMAND>FOCUS_SHIFT
                                           <ARGUMENT>PRINT_BUTTON 2
    <EVENT>DOWN

</ACTION>
```

FIG. 101

SHIRAHAMA-CHO
WAKAYAMA PREF.

0 5 9 3 5 2 - 1 - 2 0 1

SHIRAHAMA HOT SPRING

PRINT

ARIMA-CHO HYOGO PREF.

0 7 2 3 4 - 1 - 1 0 1

ARIMA HOT SPRING

PRINT

FIG. 102

SHIRAHAMA-CHO
WAKAYAMA PREF.

0 5 9 3 5 2 - 1 - 2 0 1

SHIRAHAMA HOT SPRING

PRINT

ARIMA-CHO HYOGO PREF.

0 7 2 3 4 - 1 - 1 0 1

ARIMA HOT SPRING

PRINT

FIG. 108

10801   <CLASS>ENTITY_CLASS
10802   <CLASS PARENT_CLASS=ENTITY_CLASS ACTION=PANEL_ACTION SHAPE=PANEL_SHAPE FOCUS_STATE=ON>PANEL
10803   <CLASS PARENT_CLASS=ENTITY_CLASS ACTION=BUTTON_ACTION SHAPE=BUTTON_SHAPE CHARACTER_STRING=" " FOCUS_STATE=OFFSET_BOX=" ">BUTTON
10804   <CLASS PARENT_CLASS=ENTITY_CLASS SHAPE=BOX_SHAPE>BOX
      <CLASS PARENT_CLASS=BOX DISPLAY_CANDIDATE=CHANNEL_CANDIDATE ACTION=SET_BOX_ACTION SET_VALUE=" ">SET_BOX

FIG. 109

```
<ACTION>PANEL_ACTION
    <ENENT>TUNER_SET
        <COMMAND>DISPLAY_PANEL
    <ENENT>DELETE
        <COMMAND>DELETE_PANEL
</ACTION>
<ACTION>BUTTON_ACTION
    <ENENT>FOCUS_ON
        <COMMAND>FOCUS_ON
    <ENENT>FOCUS_OFF
        <COMMAND>FOCUS_OFF
    <ENENT>RIGHT
        <MESSAGE>SWITCH_CANDIDATE_IN_PLUS_DIRECTION <TRANSMISSION_DESTINATION>$SET_BOX
    <ENENT>LEFT
        <MESSAGE>SWITCH_CANDIDATE_IN_MINUS_DIRECTION <TRANSMISSION_DESTINATION>$SET_BOX
</ACTION>
<ACTION>SET_1_BUTTON_ACTION
    <ENENT>UP
        <COMMAND>FOCUS_OFF
        <MESSAGE>FOCUS_ON <TRANSMISSION_DESTINATION>END_BUTTON
    <ENENT>DOWN
        <COMMAND>FOCUS_OFF
        <MESSAGE>FOCUS_ON <TRANSMISSION_DESTINATION>SET_2_BUTTON
</ACTION>
<ACTION>SET_2_BUTTON_ACTION
    <ENENT>UP
        <COMMAND>FOCUS_OFF
        <MESSAGE>FOCUS_ON <TRANSMISSION_DESTINATION>SET_1_BUTTON
    <ENENT>DOWN
        <COMMAND>FOCUS_OFF
        <MESSAGE>FOCUS_ON <TRANSMISSION_DESTINATION>SET_3_BUTTON
</ACTION>
<ACTION>SET_3_BUTTON_ACTION
    <ENENT>UP
        <COMMAND>FOCUS_OFF
        <MESSAGE>FOCUS_ON <TRANSMISSION_DESTINATION>SET_2_BUTTON
    <ENENT>DOWN
        <COMMAND>FOCUS_OFF
        <MESSAGE>FOCUS_ON <TRANSMISSION_DESTINATION>SET_4_BUTTON
</ACTION>
```

FIG. 110

```
<ACTION>SET_4_BUTTON_ACTION
        <ENENT>UP
           <COMMAND>FOCUS_OFF
           <MESSAGE>FOCUS_ON <TRANSMISSION_DESTINATION>SET_3_BUTTON
        <ENENT>DOWN
           <COMMAND>FOCUS_OFF
           <MESSAGE>FOCUS_ON <TRANSMISSION_DESTINATION>SET_5_BUTTON
</ACTION>
<ACTION>SET_5_BUTTON_ACTION
        <ENENT>UP
           <COMMAND>FOCUS_OFF
           <MESSAGE>FOCUS_ON <TRANSMISSION_DESTINATION>SET_4_BUTTON
        <ENENT>DOWN
           <COMMAND>FOCUS_OFF
           <MESSAGE>FOCUS_ON <TRANSMISSION_DESTINATION>SET_6_BUTTON
</ACTION>
<ACTION>SET_6_BUTTON_ACTION
        <ENENT>UP
           <COMMAND>FOCUS_OFF
           <MESSAGE>FOCUS_ON <TRANSMISSION_DESTINATION>SET_5_BUTTON
        <ENENT>DOWN
           <COMMAND>FOCUS_OFF
           <MESSAGE>FOCUS_ON <TRANSMISSION_DESTINATION>SET_7_BUTTON
</ACTION>
<ACTION>SET_7_BUTTON_ACTION
        <ENENT>UP
           <COMMAND>FOCUS_OFF
           <MESSAGE>FOCUS_ON <TRANSMISSION_DESTINATION>SET_6_BUTTON
        <ENENT>DOWN
           <COMMAND>FOCUS_OFF
           <MESSAGE>FOCUS_ON <TRANSMISSION_DESTINATION>SET_8_BUTTON
</ACTION>
<ACTION>SET_8_BUTTON_ACTION
        <ENENT>UP
           <COMMAND>FOCUS_OFF
           <MESSAGE>FOCUS_ON <TRANSMISSION_DESTINATION>SET_7_BUTTON
        <ENENT>DOWN
           <COMMAND>FOCUS_OFF
           <MESSAGE>FOCUS_ON <TRANSMISSION_DESTINATION>SET_9_BUTTON
</ACTION>
```

(CONTENUED)

FIG. 111

```
<ACTION>SET_9_BUTTON_ACTION
        <ENENT>UP
          <COMMAND>FOCUS_OFF
          <MESSAGE>FOCUS_ON  <TRANSMISSION_DESTINATION>SET_8_BUTTON
        <ENENT>DOWN
          <COMMAND>FOCUS_OFF
          <MESSAGE>FOCUS_ON  <TRANSMISSION_DESTINATION>SET_10_BUTTON
</ACTION>
<ACTION>SET_10_BUTTON_ACTION
        <ENENT>UP
          <COMMAND>FOCUS_OFF
          <MESSAGE>FOCUS_ON  <TRANSMISSION_DESTINATION>SET_9_BUTTON
        <ENENT>DOWN
          <COMMAND>FOCUS_OFF
          <MESSAGE>FOCUS_ON  <TRANSMISSION_DESTINATION>SET_11_BUTTON
</ACTION>
<ACTION>SET_11_BUTTON_ACTION
        <ENENT>UP
          <COMMAND>FOCUS_OFF
          <MESSAGE>FOCUS_ON  <TRANSMISSION_DESTINATION>SET_10_BUTTON
        <ENENT>DOWN
          <COMMAND>FOCUS_OFF
          <MESSAGE>FOCUS_ON  <TRANSMISSION_DESTINATION>SET_12_BUTTON
</ACTION>
<ACTION>SET_12_BUTTON_ACTION
        <ENENT>UP
          <COMMAND>FOCUS_OFF
          <MESSAGE>FOCUS_ON  <TRANSMISSION_DESTINATION>SET_11_BUTTON
        <ENENT>DOWN
          <COMMAND>FOCUS_OFF
          <MESSAGE>FOCUS_ON  <TRANSMISSION_DESTINATION>SET_13_BUTTON
</ACTION>
<ACTION>SET_13_BUTTON_ACTION
        <ENENT>UP
          <COMMAND>FOCUS_OFF
          <MESSAGE>FOCUS_ON  <TRANSMISSION_DESTINATION>SET_12_BUTTON
        <ENENT>DOWN
          <COMMAND>FOCUS_OFF
          <MESSAGE>FOCUS_ON  <TRANSMISSION_DESTINATION>SET_14_BUTTON
</ACTION>
```

(CONTENUED)

FIG. 112

```
<ACTION>SET 14 BUTTON ACTION
        <ENENT>UP
            <COMMAND>FOCUS OFF
            <MESSAGE>FOCUS ON   <TRANSMISSION DESTINATION>SET 13 BUTTON
        <ENENT>DOWN
            <COMMAND>FOCUS OFF
            <MESSAGE>FOCUS ON   <TRANSMISSION DESTINATION>SET 15 BUTTON
</ACTION>
<ACTION>SET 15 BUTTON ACTION
        <ENENT>UP
            <COMMAND>FOCUS OFF
            <MESSAGE>FOCUS ON   <TRANSMISSION DESTINATION>SET 14 BUTTON
        <ENENT>DOWN
            <COMMAND>FOCUS OFF
            <MESSAGE>FOCUS ON   <TRANSMISSION DESTINATION>END BUTTON
</ACTION>
<ACTION>END BUTTON ACTION
        <ENENT>UP
            <COMMAND>FOCUS OFF
            <MESSAGE>FOCUS ON   <TRANSMISSION DESTINATION>SET 15 BUTTON
        <ENENT>DOWN
            <COMMAND>FOCUS OFF
            <MESSAGE>FOCUS ON   <TRANSMISSION DESTINATION>SET 1 BUTTON
        <ENENT>DITERMINATION
            <MESSAGE>DELETE   <TRANSMISSION DESTINATION>TUNER SET PANEL
</ACTION>
<ACTION>SET BOX ACTION
        <ENENT>SWITCH CANDIDATE IN PLUS DIPECTION
            <COMMAND>SWITCH CANDIDATE          <    > '+'
        <ENENT>SWITCHCANDIDATE IN MINUS DIPECTION
            <COMMAND>SWITCH CANDIDATE          <    > '-'
        <ENENT>SET
            <COMMAND>SET
</ACTION>
```

FIG. 113

```
<SHAPE>PANEL SHAPE
            <FIGURE>PANEL SHAPE A
</SHAPE>
<SHAPE>BUTTON SHAPE
      <CONDITION  FOCUS STATE=OFF>
            <FIGURE>BUTTON SHAPE A
      </CONDITION  FOCUS STATE=ON>
      <CONDITION  FOCUS STATE=ON>
            <FIGURE>BUTTON SHAPE B
      </CONDITION>
<SHAPE>BOX SHAPE
            <FIGURE>BOX SHAPE A
</SHAPE>
```

FIG. 114

```
<BUTTON  ACTION=SET_1_BUTTON_ACTION  CHARACTER_STRING=1 FOCUS_STATE=ON
         SET_BOX=SET_1_BOX>SET_1_BUTTON
<BUTTON  ACTION=SET_2_BUTTON_ACTION  CHARACTER_STRING=2
         SET_BOX=SET_2_BOX>SET_2_BUTTON
<BUTTON  ACTION=SET_3_BUTTON_ACTION  CHARACTER_STRING=3
         SET_BOX=SET_3_BOX>SET_3_BUTTON
<BUTTON  ACTION=SET_4_BUTTON_ACTION  CHARACTER_STRING=4
         SET_BOX=SET_4_BOX>SET_4_BUTTON
<BUTTON  ACTION=SET_5_BUTTON_ACTION  CHARACTER_STRING=5
         SET_BOX=SET_5_BOX>SET_5_BUTTON
<BUTTON  ACTION=SET_6_BUTTON_ACTION  CHARACTER_STRING=6
         SET_BOX=SET_6_BOX>SET_6_BUTTON
<BUTTON  ACTION=SET_7_BUTTON_ACTION  CHARACTER_STRING=7
         SET_BOX=SET_7_BOX>SET_7_BUTTON
<BUTTON  ACTION=SET_8_BUTTON_ACTION  CHARACTER_STRING=8
         SET_BOX=SET_8_BOX>SET_8_BUTTON
<BUTTON  ACTION=SET_9_BUTTON_ACTION  CHARACTER_STRING=9
         SET_BOX=SET_9_BOX>SET_9_BUTTON
<BUTTON  ACTION=SET_10_BUTTON_ACTION  CHARACTER_STRING=10
         SET_BOX=SET_10_BOX>SET_10_BUTTON
<BUTTON  ACTION=SET_11_BUTTON_ACTION  CHARACTER_STRING=11
         SET_BOX=SET_11_BOX>SET_11_BUTTON
<BUTTON  ACTION=SET_12_BUTTON_ACTION  CHARACTER_STRING=12
         SET_BOX=SET_12_BOX>SET_12_BUTTON
<BUTTON  ACTION=SET_13_BUTTON_ACTION  CHARACTER_STRING=13
         SET_BOX=SET_13_BOX>SET_13_BUTTON
<BUTTON  ACTION=SET_14_BUTTON_ACTION  CHARACTER_STRING=14
         SET_BOX=SET_14_BOX>SET_14_BUTTON
<BUTTON  ACTION=SET_15_BUTTON_ACTION  CHARACTER_STRING=15
         SET_BOX=SET_15_BOX>SET_15_BUTTON
<BUTTON  ACTION=END_BUTTON_ACTION  CHARACTER_STRING=END>END_BUTTON
```

FIG. 115

```
<DISPLAY_CANDIDATE>CHANNEL_CANDIDATE
            <CANDIDATE_VALUE>1
            <CANDIDATE_VALUE>2
            <CANDIDATE_VALUE>3
            <CANDIDATE_VALUE>4
            <CANDIDATE_VALUE>5
            <CANDIDATE_VALUE>6
            <CANDIDATE_VALUE>7
            <CANDIDATE_VALUE>8
            <CANDIDATE_VALUE>9
            <CANDIDATE_VALUE>10
            <CANDIDATE_VALUE>11
            <CANDIDATE_VALUE>12
            <CANDIDATE_VALUE>BS1
            <CANDIDATE_VALUE>BS3
            <CANDIDATE_VALUE>BS5
            <CANDIDATE_VALUE>BS7
            <CANDIDATE_VALUE>BS9
            <CANDIDATE_VALUE>BS11
            <CANDIDATE_VALUE>BS13
            <CANDIDATE_VALUE>BS15
</DISPLAY_CANDIDATE>
```

FIG. 116

```
<SET_BOX  SET_VALUE=1>SET_1_BOX
<SET_BOX  SET_VALUE=2>SET_2_BOX
<SET_BOX  SET_VALUE=3>SET_3_BOX
<SET_BOX  SET_VALUE=4>SET_4_BOX
<SET_BOX  SET_VALUE=5>SET_5_BOX
<SET_BOX  SET_VALUE=6>SET_6_BOX
<SET_BOX  SET_VALUE=7>SET_7_BOX
<SET_BOX  SET_VALUE=8>SET_8_BOX
<SET_BOX  SET_VALUE=9>SET_9_BOX
<SET_BOX  SET_VALUE=10>SET_10_BOX
<SET_BOX  SET_VALUE=11>SET_11_BOX
<SET_BOX  SET_VALUE=12>SET_12_BOX
<SET_BOX  SET_VALUE=BS5>SET_13_BOX
<SET_BOX  SET_VALUE=BS7>SET_14_BOX
<SET_BOX  SET_VALUE=BS11>SET_15_BOX
```

FIG. 117

```
<PANEL ACTION=PANEL_ACTION SHAPE=PANEL_SHAPE>TUNER_SET_ PANEL
    <v>
            <h>  <BUTTON>SET_1_BUTTON
                 <BOX>SET_1_BOX  </h>
            <h>  <BUTTON>SET_2_BUTTON
                 <BOX>SET_2_BOX  </h>
            <h>  <BUTTON>SET_3_BUTTON
                 <BOX>SET_3_BOX  </h>
            <h>  <BUTTON>SET_4_BUTTON
                 <BOX>SET_4_BOX  </h>
            <h>  <BUTTON>SET_5_BUTTON
                 <BOX>SET_5_BOX  </h>
            <h>  <BUTTON>SET_6_BUTTON
                 <BOX>SET_6_BOX  </h>
            <h>  <BUTTON>SET_7_BUTTON
                 <BOX>SET_7_BOX  </h>
            <h>  <BUTTON>SET_8_BUTTON
                 <BOX>SET_8_BOX  </h>
            <h>  <BUTTON>SET_9_BUTTON
                 <BOX>SET_9_BOX  </h>
            <h>  <BUTTON>SET_10_BUTTON
                 <BOX>SET_10_BOX  </h>
            <h>  <BUTTON>SET_11_BUTTON
                 <BOX>SET_11_BOX  </h>
            <h>  <BUTTON>SET_12_BUTTON
                 <BOX>SET_12_BOX  </h>
            <h>  <BUTTON>SET_13_BUTTON
                 <BOX>SET_13_BOX  </h>
            <h>  <BUTTON>SET_14_BUTTON
                 <BOX>SET_14_BOX  </h>
            <h>  <BUTTON>SET_15_BUTTON
                 <BOX>SET_15_BOX  </h>
            <BUTTON>END_BUTTON
    </v>
</PANEL>
```

FIG. 118
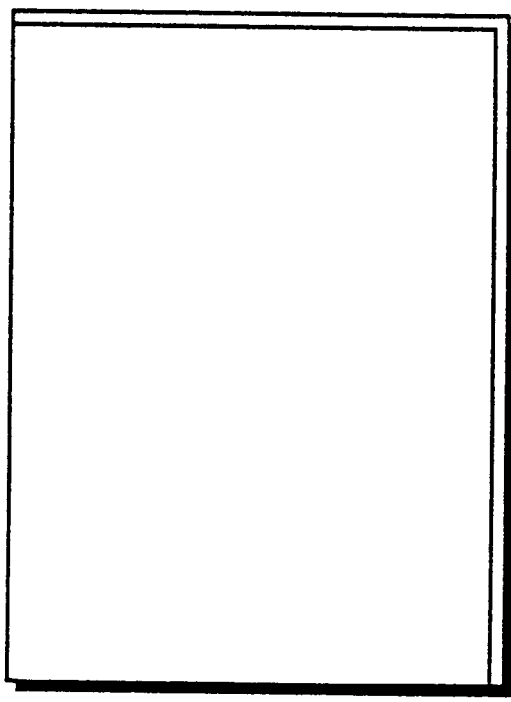
PANEL SHAPE A
11801
BUTTON SHAPE A
11802
BUTTON SHAPE B
11803
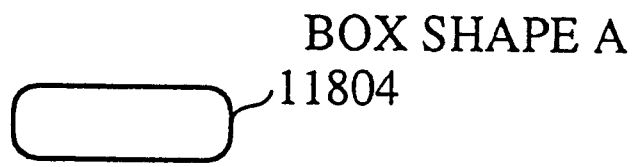
BOX SHAPE A
11804

FIG. 126

```
<PANEL ACTION=ADJUSTMENT_PANEL_ACTION>ADJUSTMENT_PANEL
 <v>
  <h>  <BUTTON>SPEECH_SWITCH_BUTTON
       <BOX>SPEECH_SWITCH_BOX </h>
  <h>  <BUTTON>IMAGE_MENU_BUTTON
       <BOX>IMAGE_MENU_BOX </h>
  <h>  <BUTTON>SPEECH_MENU_BUTTON
       <BOX>SPEECH_MENU_BOX </h>
       <BUTTON>END_BUTTON
 </v>
</PANEL>
```

```
<BUTTON ACTION=SPEECH_SWITCH_BUTTON_ACTION CHARACTER_STRING=SPEECH_SWITCH FOCUS_STATE=ON
 SET_BOX=SPEECH_SWITCH_BOX>SPEECH_SWITCH_BUTTON
<BUTTON ACTION=IMAGE_MENU_BUTTON_ACTION CHARACTER_STRING=IMAGE_MENU
 FOCUS_STATE=OFF
 SET_BOX=IMAGE_MENU_BOX >IMAGE_MENU_BUTTON
<BUTTON ACTION=SPEECH_MENU_BUTTON_ACTION CHARACTER_STRING=SPEECH_MENU
 FOCUS_STATE=OFF
 SET_BOX=SPEECH_MENU_BOX>SPEECH_MENU_BUTTON
<BUTTON ACTION=END_BUTTON_ACTION CHARACTER_STRING=END_BUTTON

<SET_BOX DISPLAY_CANDIDATE= " >SPEECH_SWITCH_BOX
<SET_BOX DISPLAY_CANDIDATE=IMAGE_CANDIDATE>IMAGE_MENU_BOX
<SET_BOX DISPLAY_CANDIDATE=SPEECH_CANDIDATE>SPEECH MENU_BOX
```

FIG. 128

```
<ACTION>ADJUSTMENT_PANEL
        <EVENT>PARAMETER_ADJUSTMENT
            <COMMAND>DISPLAY_PANEL
        <EVENT>DELETE
            <COMMAND>DELETE_PANEL
</ACTION>
<ACTION>SPEECH_SWITCH_BUTTON_ACTION
        <EVENT>UP
           <COMMAND>FOCUS_OFF
           <MESSAGE>FOCUS_ON    <TRANSMISSION_DESTINATION>END_BUTTON
        <EVENT>DOWN
           <COMMAND>FOCUS_OFF
           <MESSAGE>FOCUS_ON    <TRANSMISSION_DESTINATION>IMAGE_MENU_BUTTON
</ACTION>
<ACTION>IMAGE_MENU_BUTTON_ACTION
        <EVENT>UP
           <COMMAND>FOCUS_OFF
           <MESSAGE>FOCUS_ON    <TRANSMISSION_DESTINATION>SPEECH_SWITCH_BUTTON
        <EVENT>DOWN
           <COMMAND>FOCUS_OFF
           <MESSAGE>FOCUS_ON    <TRANSMISSION_DESTINATION>SPEECH_MENU_BUTTON
</ACTION>
<ACTION>SPEECH_MENU_BUTTON_ACTION
        <EVENT>UP
           <COMMAND>FOCUS_OFF
           <MESSAGE>FOCUS_ON    <TRANSMISSION_DESTINATION>IMAGE_MENU_BUTTON
        <EVENT>DOWN
           <COMMAND>FOCUS_OFF
           <MESSAGE>FOCUS_ON    <TRANSMISSION_DESTINATION>END_BUTTON
</ACTION>
<ACTION>END_BUTTON_ACTION
        <EVENT>UP
           <COMMAND>FOCUS_OFF
           <MESSAGE>FOCUS_ON    <TRANSMISSION_DESTINATION>SPEECH_MENU_BUTTON
        <EVENT>DOWN
           <COMMAND>FOCUS_OFF
           <MESSAGE>FOCUS_ON    <TRANSMISSION_DESTINATION>END_BUTTON
        <EVENT>DETERMINATION
           <MESSAGE>DELETE      <TRANSMISSION_DESTINATION>ADJUSTMENT_PANEL
</ACTION>
```

```
<DISPLAY_CANDIDATE>BILINGUAL_BROADCAST
            <CANDIDATE_VALUE>MAIN
            <CANDIDATE_VALUE>SUB
            <CANDIDATE_VALUE>MAIN+SUB
</DISPLAY_CANDIDATE>
<DISPLAY_CANDIDATE>STEREO_BROADCAST
            <CANDIDATE_VALUE>STEREO
            <CANDIDATE_VALUE>MONAURAL
</DISPLAY_CANDIDATE>
<DISPLAY_CANDIDATE>MONAURAL_BROADCAST
            <CANDIDATE_VALUE>MONAURAL
</DISPLAY_CANDIDATE>
<DISPLAY_CANDIDATE>VIDEO_CANDIDATE
            <CANDIDATE_VALUE>STANDARD
            <CANDIDATE_VALUE>DYNAMIC
            <CANDIDATE_VALUE>CHIC
</DISPLAY_CANDIDATE>
<DISPLAY_CANDIDATE>SOUND_CANDIDATE
            <CANDIDATE_VALUE>STANDARD
            <CANDIDATE_VALUE>MOVIE
            <CANDIDATE_VALUE>MUSIC
            <CANDIDATE_VALUE>SPEECH
</DISPLAY_CANDIDATE>
```

FIG. 130

```
<SUBSIDIARY_DATA>
        <SET_BOX DISPLAY_CANDIDATE=BILINGUAL_BROADCAST
        >SOUND_SWITCH_BOX
</SUBSIDIARY_DATA>
```

FIG. 135
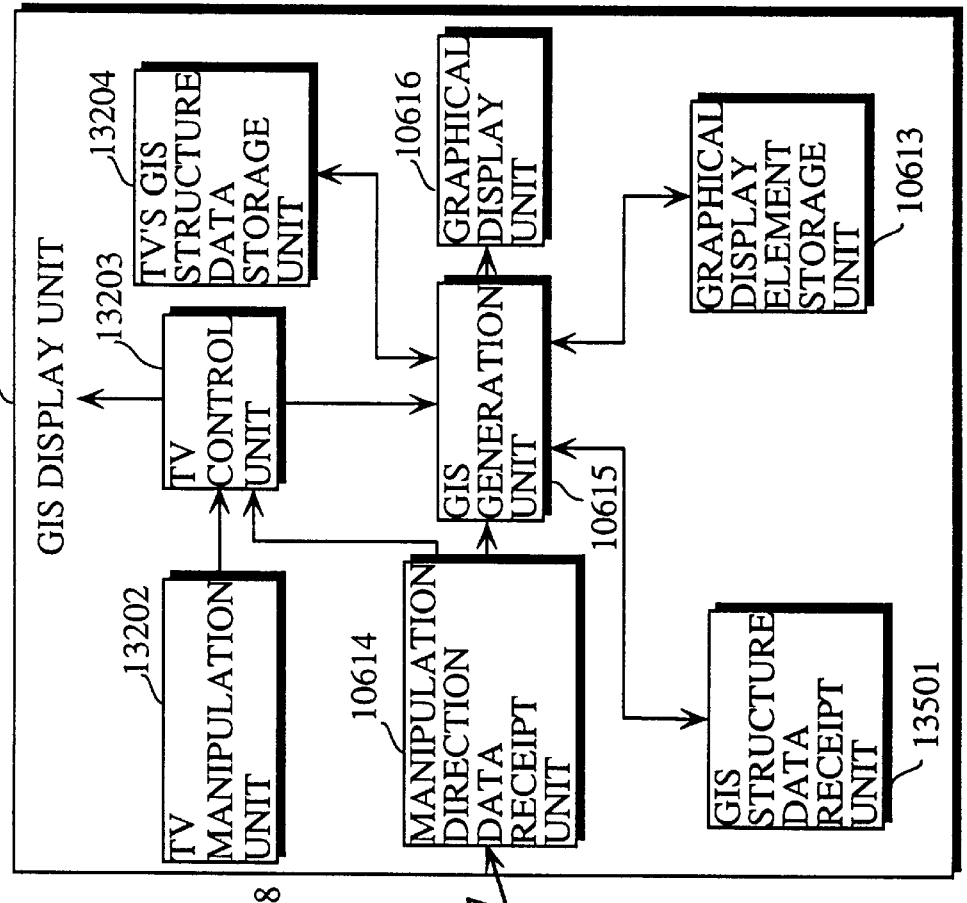
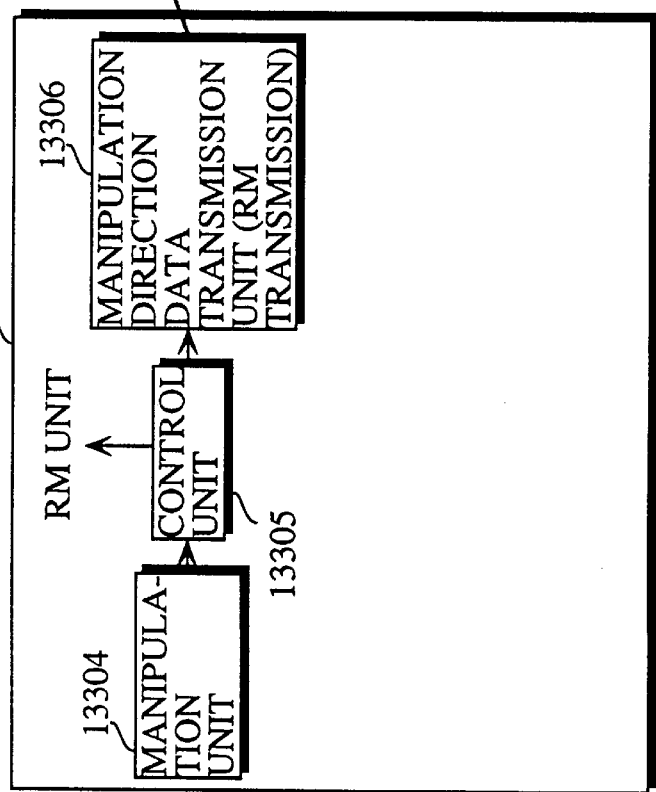

FIG. 140

```
<CLASS>ENTITY_CLASS
<CLASS PARENT_CLASS=ENTITY CLASS_SHAPE=PANEL_SHAPE CHARACTER_STRING=MENU SCREEN>PANEL_CLASS
<CLASS PARENT_CLASS=ENTITY_CLASS ACTION=BUTTON_ACTION SHAPE=BUTTON_SHAPE>BUTTON_CLASS
<CLASS PARENT_CLASS=BUTTON CLASS_ACTION=PAGE_BUTTON_ACTION SHAPE=PAGE_BUTTON_SHAPE>PAGE_BUTTON_CLASS
```

FIG. 141

```
<PANEL_CHARACTER_STRING=TV_MANIPULATION_MENU>TOP_PANEL
    <v>
        <BUTTON>BASIC_MANIPULATION_BUTTON
        <BUTTON>SET_BUTTON
        <BUTTON>SUB-SCREEN_BUTTON
    </v>
</PANEL>

<PANEL>BASIC_MANIPULATION_PANEL
        :
        :
</PANEL>
<PANEL>SET_PANEL
    <v>
        <BUTTON>IMAGE_ADJUSTMENT_BUTTON
        <BUTTON>SPEECH_ADJUSTMENT_BUTTON
        <BUTTON>BS_INPUT_LEVEL_SET_BUTTON
        <BUTTON>RECEIVER_CHANNEL_SET_BUTTON
        <h>
            <BUTTON>PREVIOUS_BUTTON
            <BUTTON>NEXT_BUTTON
        </h>
    </v>
</PANEL>
<PANEL>SUB-SCREEN_MANIPULATION_PANEL
        :
        :
</PANEL>
        :
        :
```

FIG. 142

<BUTTON CLASS=BUTTON_CLASS CHARACTER_STRING=BASIC_ACTION=BASIC_MANIPULATION_BUTTON_ACTION>BASIC_MANIPULATION_BUTTON
<BUTTON CLASS=BUTTON_CLASS CHARACTER_STRING=SET ACTION=SET_BUTTON_ACTION>SET BUTTON
<BUTTON CLASS=BUTTON_CLASS CHARACTER_STRING=SUB-SCREEN ACTION=SUB-SCREEN_BUTTON_ACTION>SUB-SCREEN_BUTTON
<BUTTON CLASS=BUTTON_CLASS CHARACTER_STRING=IMAGE_ADJUSTMENT ACTION=IMAGE_ADJUSTMENT_BUTTON_ACTION>IMAGE_ADJUSTMENT_BUTTON
<BUTTON CLASS=BUTTON_CLASS CHARACTER_STRING=SPEECH_ADJUSTMENT ACTION=SPEECH_ADJUSTMENT_BUTTON_ACTION>SPEECH_ADJUSTMENT_BUTTON
<BUTTON CLASS=BUTTON_CLASS CHARACTER_STRING=BS_INPUT_LEVEL_SET ACTION=BS_INPUT_LEVEL_SET_BUTTON_ACTION>BS_INPUT_LEVEL_SET_BUTTON
<BUTTON CLASS=BUTTON_CLASS CHARACTER_STRING=RECEIVER_CHANNEL_SET ACTION=RECEIVER_CHANNEL_SET_BUTTON_ACTION>RECEIVER_CHANNEL_SET_BUTTON
<BUTTON CLASS=PAGE_BUTTON_CLASS CHARACTER_STRING=PREVIOUS_PAGE ACTION=PREVIOUS_PAGE_BUTTON_ACTION>PREVIOUS_PAGE_BUTTON
<BUTTON CLASS=PAGE_BUTTON_CLASS CHARACTER_STRING=NEXT_PAGE ACTION=NEXT_PAGE_BUTTON_ACTION>NEXT_PAGE_BUTTON

FIG. 143

```
<SHAPE>PANEL_SHAPE
        <FIGURE>TV_PANEL_SHAPE A
</SHAPE>
<SHAPE>BUTTON_SHAPE
        <CONDITION SELECTION_STATE=ON>
                <FIGURE>BUTTON_SHAPE A
        </CONDITION>
        <CONDITION SELECTION S_TATE=OFF>
                <FIGURE>BUTTON_SHAPE B
        </CONDITION>
</SHAPE>

<SHAPE>PAGE_BUTTON_SHAPE
        <CONDITION SELECTION_STATE=ON>
                <FIGURE>PAGE_BUTTON_SHAPE A
        </CONDITION>
        <CONDITION SELECTION_STATE=OFF>
                <FIGURE>PAGE_BUTTON_SHAPE B
        </CONDITION>
</SHAPE>
```

FIG. 144

```
<ACTION>BASIC_MANIPULATION_BUTTON_ACTION
    <MESSAGE>OPEN_PANEL    <CORRESPONDENCE>BASIC_MANIPULATION_PANEL
</ACTION>
<ACTION>SET_BUTTON_ACTION
    <MESSAGE>OPEN_PANEL    <CORRESPONDENCE>SET_PANEL
</ACTION>
<ACTION>SUB-SCREEN_BUTTON_ACTION
    <MESSAGE>OPEN_PANEL    <CORRESPONDENCE>SUB-SCREEN_PANEL
</ACTION>
<ACTION>IMAGE_ADJUSTMENT_BUTTON_ACTION
    <MESSAGE>OPEN_PANEL    <CORRESPONDENCE>IMAGE_ADJUSTMENT_PANEL
</ACTION>
<ACTION>SPEECH_ADJUSTMENT_BUTTON_ACTION
    <MESSAGE>OPEN_PANEL    <CORRESPONDENCE>SPEECH_ADJUSTMENT_PANEL
</ACTION>
<ACTION>BS_INPUT_LEVEL_SET_BUTTON_ACTION
    <MESSAGE>OPEN_PANEL    <CORRESPONDENCE>BS_INPUT_LEVEL_SET_PANEL
</ACTION>
<ACTION>RECEIVER_CHANNEL_SET_BUTTON_ACTION
    <MESSAGE>OPEN_PANEL    <CORRESPONDENCE>RECEIVER_CHANNEL_SET_PANEL
</ACTION>
<ACTION>PREVIOUS_PAGE_BUTTON_ACTION
    <MESSAGE>OPEN_PANEL    <CORRESPONDENCE>BASIC_MANIPULATION_PANEL
</ACTION>
<ACTION>NEXT_PAGE_BUTTON_ACTION
    <MESSAGE>OPEN_PANEL    <CORRESPONDENCE>SUB-SCREEN_PANEL
</ACTION>
```

FIG. 145
BUTTON SHAPE B  BUTTON SHAPE A
 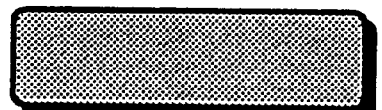
14502  14501
PAGE BUTTON SHAPE B   PAGE BUTTON SHAPE A
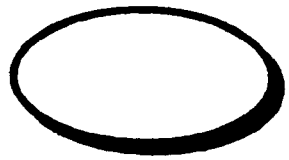 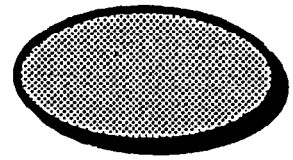
TV PANEL SHAPE
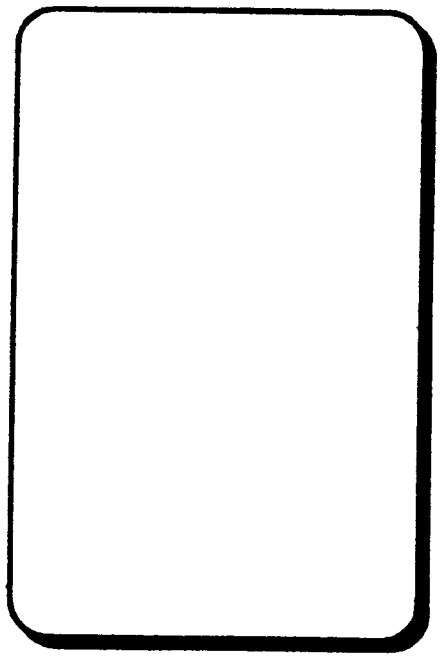

FIG. 146

```
<SYNTHESIS_DIRECTION COMPUTE=TOP_SYNTHESIS COMBINE_METHOD=
    UNIQ_COMBINE>
</SYNTHESIS_DIRECTION>

<SYNTHESIS_DIRECTION COMPUTE=PANEL_SYNTHESIS COMBINE_METHOD=
    UNIQ_COMBINE>
</SYNTHESIS_DIRECTION>

<SYNTHESIS_DIRECTION COMPUTE=PRIORITY APPLIANCE=TV
    <SHAPE>BUTTON_SHAPE
    <SHAPE>PAGE_BUTTON_SHAPE
</SYNTHESIS_DIRECTION>
```

FIG. 148

```
<PANEL_CHARACTER_STRING=VTR_MANIPULATION_MENU>TOP_PANEL
    <v>
        <BUTTON>RECORD_BUTTON
        <BUTTON>PLAY BACK_BUTTON
        <BUTTON>EDIT_BUTTON
        <BUTTON>SET_BUTTON
    </v>
</PANEL>
<PANEL>SET_PANEL
    <v>
        <BUTTON>TIME_SET_BUTTON
        <BUTTON>BS_INPUT_LEVEL_SET_BUTTON
        <BUTTON>RECEIVER_CANNEL_SET_BUTTON
        <h>
            <BUTTON>PREVIOUS_PAGE_BUTTON
            <BUTTON>NEXT_PAGE_BUTTON
        </h>
    </v>
</PANEL>
<PANEL>EDIT_PANEL       .....   ....
</PANEL>
```

FIG. 149

```
<BUTTON CLASS=BUTTON_ CLASS CHARACTER_STRING=RECORD ACTION=RECORD_BUTTON_
       ACTION>RECORD_BUTTON
<BUTTON CLASS=BUTTON_ CLASS CHARACTER_STRING=PLAY BACK_ACTION=PLAY BACK_
       BUTTON_ACTION>PLAY BACK_BUTTON
<BUTTON CLASS=BUTTON_ CLASS CHARACTER_STRING=EDIT ACTION=EDIT_BUTTON_ACTION
       >EDIT_BUTTON
<BUTTON CLASS=BUTTON_ CLASS CHARACTER_STRING=SET ACTION=SET_BUTTON_ACTION>
       SET_BUTTON
<BUTTON CLASS=BUTTON_ CLASS CHARACTER_STRING=TIME_SET
       ACTION=TIME_SET_BUTTON_ACTION>TIME_SET_BUTTON
<BUTTON CLASS=BUTTON_ CLASS CHARACTER_STRING=BS_INPUT_LEVEL_SET
       ACTION=BS_INPUT_LEVEL_SET_BUTTON_ACTION>BS_INPUT_LEVEL_SET_BUTTON
<BUTTON CLASS=BUTTON_ CLASS CHARACTER_STRING=RECEIVER_CHANNEL_SET
       ACTION=RECEIVER_CHANNEL_SET_BUTTON_ACTION>RECEIVER_CHANNEL_SET_BUTTON
```

FIG. 150

```
<SHAPE>PANEL_SHAPE
    <FIGURE>VIDEO_PANEL_SHAPE
</SHAPE>
<SHAPE>BUTTON_SHAPE
    <CONDITION SELECTION_STATE=ON>
        <FIGURE>BUTTON_SHAPE C
    </CONDITION>
    <CONDITION SELECTION_STATE=OFF>
        <FIGURE>BUTTON_SHAPE D
    </CONDITION>
</SHAPE>
<SHAPE>PAGE_BUTTON_SHAPE
    <CONDITION SELECTION_STATE=ON>
        <FIGURE>PAGE_BUTTON_SHAPE C
    </CONDITION>
    <CONDITION SELECTION_STATE=OFF>
        <FIGURE>PAGE_BUTTON_SHAPE D
    </CONDITION>
</SHAPE>
```

FIG. 151

```
<ACTION>RECORD_BUTTON_ACTION
    <MESSAGE>RECORD    <CORRESPONDENCE>VTR_CONTROL
</ACTION>
<ACTION>PLAY BACK_BUTTON_ACTION
    <MESSAGE>PLAY BACK    <CORRESPONDENCE>VTR_CONTROL
</ACTION>
<ACTION>EDIT_BUTTON_ACTION
    <MESSAGE>OPEN_PANEL    <CORRESPONDENCE>EDIT_PANEL
</ACTION>
<ACTION>SET_BUTTON_ACTION
    <MESSAGE>OPEN_PANEL    <CORRESPONDENCE>SET_PANEL
</ACTION>
<ACTION>TIME_SET_BUTTON_ACTION
    <MESSAGE>OPEN_PANEL    <CORRESPONDENCE>TIME_SET_PANEL
</ACTION>
<ACTION>BS_INPUT_LEVEL_SET_BUTTON_ACTION
    <MESSAGE>OPEN_PANEL    <CORRESPONDENCE>BS_INPUT_LEVEL_SET_PANEL
</ACTION>
<ACTION>RECEIVER_CHANNEL_SET_BUTTON_ACTION
    <MESSAGE>OPEN_PANEL    <CORRESPONDENCE>RECEIVER_CHANNEL_SET_PANEL
</ACTION>
```

FIG. 152
BUTTON SHAPE D       BUTTON SHAPE C
   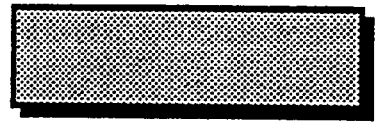
PAGE BUTTON          PAGE BUTTON
SHAPE D              SHAPE C
   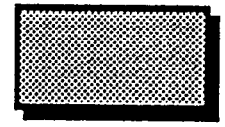
VTR PANEL SHAPE
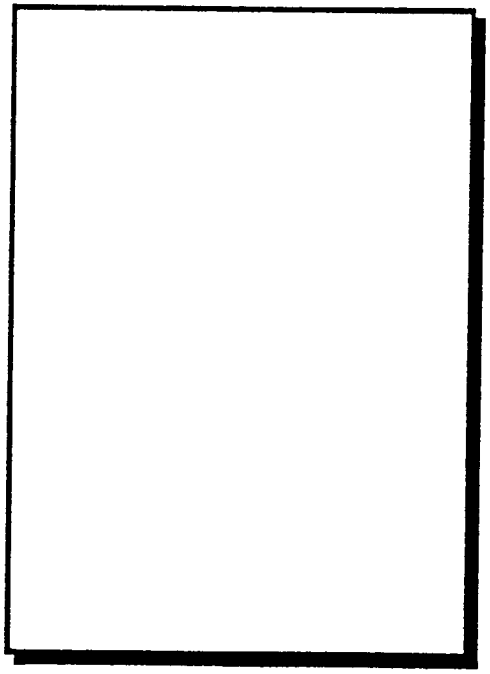

FIG. 153

```
<SYNTHESIS_DIRECTION COMPUTE=PRIORITY APPLIANCE=VTR>
  <SHAPE>PANEL_SHAPE
</SYNTHESIS_DIRECTION>

<SYNTHESIS_DIRECTION COMPUTE=ADD>
  <SUBJECT_CORRESPONDENCE=VTR_CONTROL>MESSAGE_TRANSMISSION
  <ADD_DESTINATION>BEFORE
  <ADDITION_INFORMATION MESSAGE=SWITCH_VTR CORRESPONDENCE
    =TV_CONTROL>MESSAGE_TRANSMISSION
</SYNTHESIS_DIRECTION>
```

FIG. 154

```
<PANEL CHARACTER_STRING=TV_MANIPULATION_MENU CHARACTER_STRING=VTR_MANIPULATION_MENU>TOP_PANEL
    <v>
        <BUTTON>BASIC_MANIPULATION_BUTTON
        <BUTTON>SET_BUTTON
        <BUTTON>SUB-SCREEN_BUTTON
    <v>
        <BUTTON>RECORD_BUTTON
        <BUTTON>PLAY BACK_BUTTON
        <BUTTON>EDIT_BUTTON
        <BUTTON>SET_BUTTON
    </v>
    </v>
<PANEL>
```

FIG. 155

```
<PANEL CHARACTER_STRING=TV_MANIPULATION_MENU>TOP_PANEL
  <v>
    <BUTTON>BASIC_MANIPULATION_BUTTON
    <BUTTON>SET_BUTTON
    <BUTTON>SUB-SCREEN_BUTTON
  <v>
    <BUTTON>RECORD_BUTTON
    <BUTTON>PLAY BACK_BUTTON
    <BUTTON>EDIT_BUTTON
    <BUTTON>SET_BUTTON
  </v>
  </v>
</PANEL>
```

FIG. 156

```
<PANEL CHARACTER_STRING=TV_MANIPULATION_MENU>TOP_PANEL
    <v>
        <BUTTON>BASIC_MANIPULATION_BUTTON
        <BUTTON>SET_BUTTON
        <BUTTON>SUB-SCREEN_BUTTON
    <v>
        <BUTTON>RECORD_BUTTON
        <BUTTON>PLAY BACK_BUTTON
        <BUTTON>EDIT_BUTTON
    </v>
    </v>
</PANEL>
```

FIG. 157

```
<PANEL CHARACTER_STRING=TV_MANIPULATION_MENU>TOP_PANEL
  <v>
    <BUTTON>BASIC_MANIPULATION_BUTTON
    <BUTTON>SET_BUTTON
    <BUTTON>SUB-SCREEN_BUTTON
    <BUTTON>RECORD_BUTTON
    <BUTTON>PLAY BACK_BUTTON
    <BUTTON>EDIT_BUTTON
  </v>
</PANEL>
```

FIG. 158

```
<PANEL>SET_PANEL
        <v>
                <BUTTON>IMAGE_ADJUSTMENT_BUTTON
                <BUTTON>SPEECH_ADJUSTMENT_BUTTON
                <BUTTON>BS_INPUT_LEVEL_SET_BUTTON
                <BUTTON>RECEIVER_CANNEL_SET_BUTTON
                <h>
                        <BUTTON>PREVIOUS_PAGE_BUTTON
                        <BUTTON>NEXT_PAGE_BUTTON
                </h>
        <v>
                <BUTTON>TIME_SET_BUTTON
                <BUTTON>BS_INPUT_LEVEL_SET_BUTTON
                <BUTTON>RECEIVER_CHANNEL_SET_BUTTON
                <h>
                        <BUTTON>PREVIOUS_PAGE_BUTTON
                        <BUTTON>NEXT_PAGE_BUTTON
                </h>
        </v>
        </v>
</PANEL>
```

FIG. 159

```
<PANEL>SET_PANEL
        <v>
                <BUTTON>IMAGE_ADJUSTMENT_BUTTON
                <BUTTON>SPEECH_ADJUSTMENT_BUTTON
                <BUTTON>BS_INPUT_LEVEL_SET_BUTTON
                <BUTTON>RECEIVER_CHANNEL_SET_BUTTON
                <h>
                        <BUTTON>PREVIOUS_PAGE_BUTTON
                        <BUTTON>NEXT_PAGE_BUTTON
                </h>
        <v>
                <BUTTON>TIME_SET_BUTTON
                <h>
                </h>
        </v>
        </v>
</PANEL>
```

FIG. 160

```
<PANEL>SET_PANEL
        <v>
                    <BUTTON>IMAGE_ADJUSTMENT_BUTTON
                    <BUTTON>SPEECH_ADJUSTMENT_BUTTON
                    <BUTTON>BS_INPUT_LEVEL_SET_BUTTON
                    <BUTTON>RECEIVER_CHANNEL_SET_BUTTON
                    <h>
                            <BUTTON>PREVIOUS_PAGE_BUTTON
                            <BUTTON>NEXT_PAGE_BUTTON
                    </h>
                    <BUTTON>TIME_SET_BUTTON
        </v>
</PANEL>
```

FIG. 161
BUTTON SHAPE B 
BUTTON SHAPE A 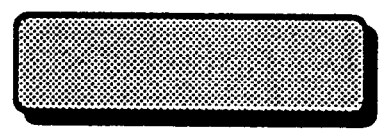
PAGE BUTTON SHAPE B 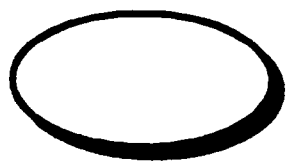
PAGE BUTTON SHAPE A 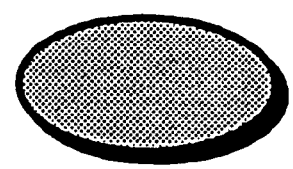
PANEL SHAPE 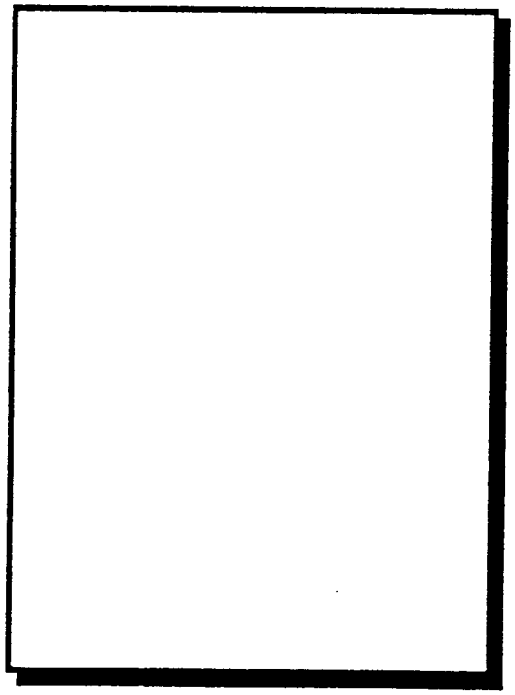

GRAPHICAL-INTERACTIVE-SCREEN DISPLAY APPARATUS AND PERIPHERAL UNITS

This is a division of prior application Ser. No. 08/326,758, filed on Oct. 20, 1994 now U.S. Pat. No. 5,648,813.

BACKGROUND OF THE INVENTION (1) Field of the Invention

The present invention relates to a display apparatus showing graphical interactive screens for remote control, and to the peripheral units.

(2) Description of the Prior Art

The use of remote controllers has spread to facilitate the manipulation of today's household appliances such as audio-visual apparatuses, and one remote controller is furnished for one appliance in general. However, it is quite cumbersome to manage a plurality of remote controllers.

In addition, a remote controller in a broad sense, or a display on the screen that enables the users to make a variety of selections, was developed and has been in practical use for the interactive TV (television) system and TV game players. However, this type of remote controller also faces problems such as facilitating manipulation and saving manufacturing cost.

To eliminate the above problems, a multi-remote controller, or otherwise known as a system remote controller, was developed and has been commercially available. The multi-remote controller includes a transmitter that controls a plurality of appliances of various types in one kind (for example, TVs made by a plurality of makers), or various kinds of appliances (for example, TV and VTR (video tape recorder)), so that the user can control a plurality of appliances with one multi-remote controller by selecting the appliance he wishes to control. Alternately, the multi-remote controller may include the buttons necessary for the manipulation of all the appliances. However, in either case, the user must select a desired appliance first, meaning that the multi-remote controller must include the selection button.

To compensate the drawback of the multi-remote controller, Japanese Laid-Open Patent Application No. 2-180497 discloses a remote controller comprising a remote control unit for transmitting remote control signals for a plurality of appliances to be controlled, and receiver units furnished with each appliance for receiving the remote controller signals for their respective appliances. Note that each receiver unit transmits a unique signal to the remote controller unit, so that the receiver unit stores data as to which control signal should be transmitted to which appliance, eliminating the appliance selection process and hence the selection button.

However, this remote controller is available only to the predetermined appliances and functions, and it must include a ultra red ray signal transmitter and buttons for each predetermined function. Thus, although the selection button can be omitted, the remote controller still includes a large number of buttons if it controls more than one kind of appliance (for example, TV and VTR), because the buttons for channel selection and volume adjustment for the TV receiver, and those for playback and record functions for the VTR must be furnished separately. Further, the design of the remote controller can not be changed flexibly, and unnecessary buttons under a particular situation are still furnished and the control signals for such buttons are stored in the memory as well. Thus, neither the design is adequate nor the memory is utilized efficiently, complicating the manipulation of the remote controller more than necessary.

Also, a TV-VTR compound apparatus, which is controlled by menu information defined in advance, has been developed However, it is impossible to control a plurality of appliances as an integral system; for the menu information varies depending on the state of each appliance, such as interconnection and power ON/OFF.

Further, a menu processing method, disclosed in Japanese Laid-Open Patent Application No. 3-233660, was developed. This method enables the retrieval of a desired application program by switching the menu displays regardless of which terminal or host computer stores the application program in a computer environment where a plurality of terminals are interconnected via a network.

However, the information as to which terminal or host computer stores the secondary and subsequent order menus must be written into each item in the menu in advance. Thus, it is impossible to control a plurality of appliances as an integral system; for the menu information varies depending on the state of each appliance, such as interconnection and power ON/OFF.

In addition, Japanese Laid-Open Patent Application No. 3-172086 discloses a program receiver which can display texts and graphics for the operation manual or guidance of the CATV (Cable TV) system, either related or unrelated to the program being broadcasted, on the screen. This will be explained more in detail while referring to FIG. 1 depicting the structure of the program receiver. A terminal 101 includes a character generator 103 for generating texts and graphics displayed on a screen 102, a memory 104 storing all the patterns for the texts and graphics transmitted from a head-end of the CATV station in advance, a switcher 107 for inputting signals from the character generator 103 or memory 104 into a TV receiver 106 instead of or together with the outputs from a tuner 105. The text and graphical information, or namely the operation manual or guidance and the information either related or unrelated to the program being broadcasted, is transmitted from the head end in advance to upgrade the utility of the CATV system.

In this system, program distributors supply the interactive screen generation information for each program to the CATV station in advance, so that the information is transmitted from the head-end to the memory 104 each time a program is switched, supplying an adequate interactive screen for each program. However, this complicates the retransmission of the program. As well, each time the user switches a channel, the head-end detects the switching and transmits the interactive screen generation information for the switched program to the memory 104, making the process at the head-end cumbersome.

In addition, a technique such that enables the user to set the functions of the VTR and TV game players by using the display on the TV receiver was developed. The household appliances of this type include a circuit for generating a user interface screen, and a terminal for outputting image signals generated by the circuit to an external appliances. The external output terminal is connected to an external image signal input terminal of the TV receiver via an image signal cable to switch TV receiver's signal input to the external image signal input terminal. Thus, the TV receiver displays the input image signal from the external image signal input terminal, supplying the user interface screen to the user.

The graphical display apparatus used for CAD (Computer Aided Design) also employs the user interface screen. Here, the host computer transmits figure definition instructions:

combination and display position of basic elements (segments, arcs, characters, etc.), and attribution specification such as display allowance or disallowance. The graphical display apparatus interprets the figure definition instructions and then displays figures as per instructions on the screen. The definition of a figure composed of the same basic elements can be given only by copying the definition of the element and changing the display position attribute. Thus, the figure definition instructions for one element is transmitted from the host computer only once, saving the information transmission time for the host computer. However, in case of a multi-layer structure such as a menu manipulation screen to switch a layer as per user's instruction, the screen is cleared (the defined figure data are deleted) each time a layer is switched, and all the figure definition instructions are transmitted again for the switched layer. Alternately, the figure data for all the layers may be defined in advance, and an instruction is sent each time a layer is switched to disallow the display of the attribute of the figure data in the currently displayed layer, and another instruction is sent to allow the display of the figure data for the switched layer.

However, using the user interface screen with the household appliances such as the VTR causes the following problems:

(1) the user-interface-screen generation circuit must be furnished for each appliance, causing the manufacturing cost to increase. Thus, this technique is applied only to limited appliances.

(2) the image input for the TV receiver must be switched to the external image signal input. This is not a drawback for the VTR or TV game players activated by switching the image input to the external image signal input. However, it is quite inconvenient if functions for an air conditioner or the like are set in this manner. Although such inconvenience can be eliminated by furnishing the user interface screen to the air conditioner, it costs more than furnishing the user-interface-screen generation circuit.

(3) the appliances and TV receiver must be connected via the image signal cable. Since the image signal cable is an essential component for the VTR and TV game player, this is not crucial for such appliances. However, this is quite inconvenient if the appliances, which can be used independently of the image signal cable, are controlled in this manner. Although such inconvenience can be eliminated by furnishing the user interface screen, it costs more than furnishing the user-interface-screen generation circuit as was with the secondly mentioned problem.

(4) the graphical display apparatus is connected to the host computer in the level of the basic elements to realize a variety of displays, thus many a figure definition instruction is received from the host computer when switching the display. This causes to increase the load in the host computer, and makes the real time transmission impossible if a high-transmission rate communication route is employed. More precisely, micro computers for the household appliances are less efficient compared with the one for host computer, and the transmission rate is set relatively low to save the transmission cost. Thus, it is not easy to display the graphical interactive screens on the graphical display apparatus using the display information.

SUMMARY OF THE INVENTION

Accordingly, the present invention has a first object to provide a remote controller which is easy to manipulate and does not hold the information of the appliances under the control thereof in advance, and thus uses resources such as a memory efficiently.

The present invention has a second object to provide a remote controller whose design can be changed flexibly depending on the state of the appliances under the control thereof.

The present invention has a third object to provide a remote controller which can synthesize the control menus for a plurality of appliances under the control thereof.

The present invention has a fourth object to provide a program receiver which can supply an adequate interactive screen for each program to the user.

The present invention has a fifth object to provide a graphical-interactive-screen display apparatus and the peripheral units which can display the user interface screens without using expensive user-interface-screen generation circuit, so that the user sets the functions for a desired appliance using such inexpensive user interface screens.

The first object can be fulfilled by a remote controller comprising a structure information supply unit for holding structure information for various types of appliances in advance, and a portable remote control unit for controlling the appliances, (1) the structure information supply unit including: a transmitter's structure information storage unit for storing the structure information, the structure information including control information for each appliance and object information, the control information being used by the remote control unit in controlling the appliances, the object information representing manipulation objects forming a manipulation unit of the remote control unit; and a structure information transmission unit for retrieving the control information and the object information from the transmitter's structure information storage unit to send the retrieved information to the remote control unit, (2) the remote control unit including: a structure information receipt unit for receiving the control information and the object information from the structure information transmission unit; a receiver's structure information storage unit for storing the control information and the object information received by the structure information receipt unit, a display unit for displaying a picture having a manipulation area used far manipulating the appliances; and a first display control unit for controlling the display unit to place the manipulation objects on the manipulation area based on the object information stored in the receiver's structure information storage unit.

The remote control unit may further include: a manipulation detection unit for detecting which manipulation object is manipulated on the manipulation area; a first control signal transmission unit for transmitting a control signal assigned for the manipulation object detected by the manipulation detection unit to the appliances based on the control information stored in the receiver's structure information storage unit, whereby the appliances operate in accordance with the control signal from the remote control unit.

The structure information supply unit may be installed in each appliance controlled by the control signal from the remote control unit.

To fulfill the second object, in the remote controller, the structure information supply unit may further include: a structure information generation unit for generating state-based control information depending on an action state of each appliance, the state-based control information being transmitted to the remote control unit by the structure information transmission unit; an object information generation unit for generating the object information depending on the action state of each appliance, the object information being transmitted to the remote control unit by the structure information transmission unit, and the remote control unit may further include: a generated information receipt unit for receiving the state-based control information from the structure information transmission unit; a generated information update unit for updating the control information and the object information in the receiver's structure information storage unit in accordance with the state-based control information received by the generated information receipt unit; a second control signal transmission unit for transmitting a control signal assigned to the manipulated object detected by the manipulation detection unit to the appliances based on updated control information stored in the receiver's structure information storage unit; a generated object information receipt unit for receiving updated object information from the structure information transmission unit; and a second display control unit for controlling the display unit to place updated manipulation objects on the manipulation area based on the updated object information received by the generated object information receipt unit.

The third object can be fulfilled by a synthesis apparatus including a plurality of appliances for synthesizing menu information withheld by each appliance, the menu information being hierarchical information enabling a user to control the appliances interactively, (1) one of the plurality of appliances including: a first menu storage unit for storing first menu information, the first menu information being hierarchical information to be used to control the one appliance; a menu information receipt unit for receiving the menu information from the other appliances; a menu information synthesis unit for synthesizing the menu information received by the menu information receipt unit and first menu information stored in the first menu information storage unit, resulting synthesized menu information being used as a menu-information selection menu at a highest position in a hierarchy; and a menu display unit for displaying the menu-information selection menu generated by the menu information synthesis unit, (2) each of the other appliances including: a menu storage unit for storing the menu information unique to each appliance, the menu information being hierarchical information to be used to control each appliance; and a menu transmission unit for transmitting the unique menu information in the menu storage unit to the one appliance.

The one appliance may further include a synthesis rule storage unit for storing rules regulating menu-information synthesis by the menu information synthesis unit, whereby the menu information synthesis unit synthesizes the menu information from the other appliances and the first menu information in accordance with the synthesis rules.

The menu transmission unit may include: a menu information retrieval direction unit for detecting a connection with the one appliance and for giving a direction to retrieve the menu information; a menu information retrieval unit for retrieving the menu information from the menu storage unit upon receipt of the direction from the menu information retrieval direction unit; and a menu transmission unit for transmitting the menu information retrieved by the menu information retrieval unit to the menu information receipt unit.

The menu information synthesis unit may include: a menu selection acceptance unit for accepting a selection of an appliance subject to control manipulation using the menu-information selection menu displayed by the menu display unit; a menu information retrieval unit for retrieving the menu information of the appliance accepted by the menu selection acceptance unit from the menu information synthesis unit; and a menu switch control unit for changing a display on the menu display unit in accordance with the menu information retrieved by the menu information retrieval unit.

The menu information synthesis unit may further include: a menu information temporarily storage unit for temporarily storing the menu information received by the menu information receipt unit; a first menu information retrieval unit for retrieving the first menu information from the first menu storage unit; a synthesis rule retrieval unit for retrieving the synthesis rules from the synthesis rule storage unit, the synthesis rules including a synthesis rule for a hierarchial structure, a selection rule for a displayed shape, a synthesis rule for a panel object, and a synthesis rule for control of the appliances; and a hierarchial structure synthesis unit for synthesizing the menu information stored in the menu information temporarily storage unit and the first menu information retrieved by the first menu information retrieval unit in accordance with the hierarchical synthesis rule retrieved by the synthesis rule retrieval unit.

The menu information synthesis unit may further include: a menu information temporarily storage unit for temporarily storing the menu information received by the menu information receipt unit; a first menu information retrieval unit for retrieving the first menu information from the first menu storage unit; a synthesis rule retrieval unit for retrieving the synthesis rules from the synthesis rule storage unit, the synthesis rules including a synthesis rule for a hierarchial Structure, a selection rule for a displayed shape, a synthesis rule for a panel object, and a synthesis rule for control of the appliances; and a hierarchial structure synthesis unit for synthesizing the menu information stored in the menu information temporarily storage unit and the first menu information retrieved by the first menu information retrieval unit in accordance with the hierarchical synthesis rule retrieved by the synthesis rule retrieval unit.

The third object also can be fulfilled by in a remote control system comprising a plurality of appliances and a remote controller for transmitting control signals to the plurality of appliances, (1) the remote controller including: a menu information request transmission unit for transmitting a menu information request to each appliance, the menu information being hierarchial information unique to each appliance for enabling a user to control each appliance interactively; a menu receipt unit for receiving the menu information transmitted from each appliance; a menu information synthesis unit for synthesizing the menu information received by the menu receipt unit; a menu display unit for visually displaying synthesized menu information generated by the menu information synthesis unit; an input manipulation unit for accepting a user's input manipulation to control the appliances; and a control signal transmission unit for transmitting the control signals to the appliances based on the input manipulation accepted by the input manipulation unit, (2) each appliance including: a menu information request receipt unit for receiving the menu information request from the menu information request transmission unit; a menu information transmission unit for transmitting the menu information to the menu receipt unit when the menu information request receipt unit receives the menu information request; a control signal receipt unit for receiving the control signals from the control signal transmission unit; and a control unit for controlling the appliances as per control signals received by the control signal receipt unit.

The menu information synthesis unit may include: a menu information storage unit for storing the menu information of each appliance received by the menu receipt unit, the menu information being hierarchical information including a panel object name and shape information; a synthesis rule storage unit for storing synthesis rules regulating menu-information synthesis, the synthesis rules including a synthesis rule for a hierarchial structure, a synthesis rule for a panel object, a selection rule for a displayed shape, and a synthesis rule for control of the appliances; a menu synthesis unit for synthesizing the menu information of the appliances stored in the menu information storage unit into one hierarchical structure in accordance with the hierarchical synthesis rules in the synthesis rule storage unit; a panel object synthesis unit for synthesizing the menu information of the appliances in the menu information storage unit into one panel object in accordance with the synthesis rule for the panel object stored in the synthesis rule storage unit, the synthesis rule for the panel object being to synthesize the menu information identified by an identical panel object name; a shape synthesis unit for making the shape information uniform for each appliance for the menu information in the menu information storage unit in accordance with the selection rule for the displayed shape in the synthesis rule storage unit, the selection rule being to select the shape information of a specified appliance and apply the same to the shape information for each appliance for the menu information in the menu information storage unit; and an action append unit for inserting data as to an control action in accordance with the synthesis rule for the control of the appliances, the synthesis rule for the control being to insert the data as to the control action described by the synthesis rule for the control at a position specified by the synthesis rule for the control.

The menu display unit may include: a bit map data conversion unit for converting the menu information synthesized by the menu synthesis unit, panel synthesis unit, shape synthesis unit, and action append unit into bit map data for a visual display; a display unit for displaying the menu information converted into the bit map data by the bit map data conversion unit; a first manipulation acceptance unit for accepting a user's selection of menu displayed by the display unit; and a selected menu notice unit for notifying a menu selected and accepted by the first manipulation acceptance unit to the menu information synthesis unit.

The menu information synthesis unit may further include a menu information retrieval unit for retrieving the menu information from the menu storage unit for the appliance corresponding to the menu notified by the selected menu notice unit, retrieved menu information including information as to manipulation objects displayed by the display unit, and the menu display unit may further include: a menu information conversion unit for converting the menu information retrieved by the menu information retrieval unit into the bit map data, the menu information retrieved by the menu information retrieval unit including information as to a display of manipulation objects displayed by the display unit; a change-menu display control unit for controlling the display unit to display the menu information converted into the bit map data by the menu information conversion unit; a second manipulation acceptance unit for accepting a user's control manipulation related to a control over the appliance using the manipulation objects displayed by the display unit; and a manipulation notice unit for notifying the control manipulation accepted by the second manipulation acceptance unit to the control sinal transmission unit.

The fourth object can be fulfilled by a program receiver for displaying a graphical interactive picture by receiving a program transmitted from a program transmitter, the program receiver comprising: a storage unit for storing a plurality of basic picture elements in advance, the plurality of basic picture elements being figures composing the graphical interactive picture manipulated by a user; a signal receipt unit for receiving a signal transmitted from the program transmitter, the signal being a multiplex signal including a program and data specifying a structure of the graphical interactive picture; a signal separation unit for separating the signal received by the signal receipt unit into a program signal and a graphical-interactive-picture-structure specification data signal; a first graphical interactive picture generation unit for generating the graphical interactive picture by combining the basic picture elements stored in the storage unit based on the graphical-interactive-picture-structure specification data signal from the signal separation unit; and a display unit for displaying the graphical interactive picture generated by the first graphical interactive picture generation unit.

The program receiver may further comprise: an interactive manipulation unit for inputting manipulation to the graphical interactive picture displayed by the display unit; a basic action storage unit for storing a content of an action for updating the graphical-interactive-picture-structure specification data; and a second graphical interactive picture generation unit for retrieving the content of the action from the basic action storage unit based on action information directing an update of the graphical interactive picture upon receipt of the input manipulation from the interactive manipulation unit to update the graphical-interactive-picture-structure specification data to generate an updated graphical interactive picture.

The basic picture elements in the storage unit may be composed of file names identifying each basic picture element and the bit map data for each basic picture element, and the first graphical interactive picture generation unit may include: a receipt decode unit for receiving the graphical-interactive-picture-structure specification data signal from the signal separation unit to decode the same; a storage unit for storing decoded graphical-interactive-picture-structure specification data from the receipt decode unit, the graphical interactive-picture-structure specification data being composed of a class definition including a plurality pieces of class attribute information, a panel object definition including a plurality pieces of panel object information, an action definition including a plurality pieces of action information, and a shape definition including a plurality pieces of shape information; a first process unit for retrieving the graphical-interactive-picture-structure specification data from the storage unit, extracting the basic picture elements corresponding to the file names by referring to the shape information from the storage unit in accordance with the retrieved graphical-interactive-picture-structure specification data, and for placing the extracted basic picture elements by referring to the panel object information; and a first display control unit for controlling the display unit to display the basic picture elements placed by the first process unit as the graphical interactive picture.

The interactive manipulation unit may include: an input manipulation acceptance unit for accepting a user's input manipulation to the graphical interactive picture; and an interactive signal transmission unit for transmitting the input manipulation accepted by the manipulation acceptance unit to the second graphical interactive picture generation unit as an interactive signal, and the second graphical interactive picture generation unit may include: an interactive signal receipt unit for receiving the interactive signal from the interactive signal transmission unit; an interactive signal interpretation unit for interpreting the interactive signal received by the interactive signal receipt unit; a graphical-interactive-picture-structure specification data update unit for retrieving a content of an action from the basic action storage unit in accordance with the interactive signal interpreted by the interactive signal interpretation unit to update the graphical-interactive-picture-structure specification data in the storage unit; a second process unit for retrieving updated graphical-interactive-picture-structure specification data from the storage unit, and for extracting the basic picture elements corresponding to the file names from the storage unit to place the extracted display elements; and a second display control unit for controlling the display unit to display the basic picture elements placed by the second process unit as an updated graphical interactive picture.

The program receiver may further comprise an information transmission unit for transmitting the data of the graphical interactive picture updated by the interactive manipulation unit to the program transmitter.

The basic picture elements in the storage unit may be composed of file names identifying each basic picture element and the bit map data for each basic picture element, and the first graphical interactive picture generation unit may include: a receipt decode unit for receiving the graphical-interactive-picture-structure specification data signal from the signal separation unit to decode the same; a data division unit for dividing the decoded graphical-interactive-picture-structure specification data from the receipt decode unit into a first graphical-interactive-picture-structure specification data and a second graphical-interactive-picture-structure specification data, the first graphical-interactive-picture-structure specification data excluding a synthesis instruction, the second graphical-interactive-picture-structure specification data including the synthesis instruction, the graphical-interactive-picture-structure specification data being composed of a panel object definition including a plurality pieces of panel object information, an action definition including a plurality pieces of action information, a shape definition including a plurality pieces of shape information, and synthesis direction data including a synthesis command in case of the second graphical-interactive-picture-structure specification data; a first graphical-interactive-picture-structure specification data storage unit for storing the first graphical-interactive-picture-structure specification data; a second graphical-interactive-picture-structure specification data storage unit for storing the second graphical-interactive-picture-structure specification data; a graphical interactive picture synthesis unit for synthesizing the first graphical-interactive-picture-structure specification data in the first graphical-interactive-picture-structure specification data storage unit and the second graphical-interactive-picture-structure specification data in the second graphical-interactive-picture-structure specification data storage unit in accordance with the synthesis command of the synthesis direction data stored in the second graphical-interactive-picture-structure specification data storage unit; a graphical-interactive-picture-structure specification data update unit for updating the first graphical-interactive-picture-structure specification data in the first graphical-interactive-picture-structure specification data storage unit with the synthesized graphical-interactive-picture-structure specification data from the graphical interactive picture synthesis unit; a first process unit for retrieving updated graphical-interactive-picture-structure specification data from the first graphical-interactive-picture-structure specification data storage unit, and for extracting the basic picture elements corresponding to the file names by referring to the shape information in the storage unit to place the extracted basic picture elements by referring to the panel object information; and a first display control unit for controlling the display unit to display the basic picture elements placed by the first process unit as an updated graphical interactive picture.

The program receiver may further comprise an information record unit for outputting data related to the graphical interactive picture as per manipulation form the interactive manipulation unit to make a record thereof.

The fifth object can be fulfilled by a system including peripheral appliances holding graphical interactive picture structure data and a display unit for displaying a graphical interactive picture for the peripheral appliances by receiving a unique manipulation direction signal from each peripheral appliance, the display unit including: a graphical interactive picture structure data receipt unit for receiving the graphical interactive picture structure data from the peripheral appliances to generate the graphical interactive picture; a display's graphical interactive picture structure data storage unit for storing the graphical interactive picture structure data received by the graphical interactive picture structure data receipt unit; a graphical display element storage unit for storing a plurality of graphical display elements to generate the graphical interactive picture; a manipulation direction signal receipt unit for receiving the manipulation direction signal from the peripheral appliances; a graphical interactive picture generation unit for receiving the manipulation direction signal received by the manipulation direction signal receipt unit, and for retrieving the graphical interactive picture structure data from the display's graphical interactive picture structure data storage unit to generate the graphical interactive picture by combining the graphical display elements stored in the graphical display element storage unit; and a display unit for displaying the graphical interactive picture generated by the graphical interactive picture generation unit.

The graphical interactive picture generation unit may include: a temporarily storage unit for temporarily storing the manipulation direction signal received by the manipulation direction signal receipt unit; a retrieval unit for retrieving the manipulation direction signal from the temporarily storage unit; a graphical interactive picture structure data extract unit for extracting the graphical interactive structure data from the display's graphical interactive picture structure data storage unit in accordance with the manipulation direction signal retrieved by the retrieval unit to generate the graphical interactive picture, the graphical interactive picture structure data including object information defining objects that form the graphical interactive picture, shape information defining shapes of the objects, position information defining positions of the objects, action information defining the objects' actions that change the graphical interactive picture based on the manipulation direction signal; a graphical display element extract unit for extracting bit map data from the graphical display element storage unit based on the shape information extracted by the graphical interactive picture structure data extract unit, the bit map data being stored in the graphical display element storage unit in relation with the shape information; a synthesis generation unit for generating a graphical display by synthesizing the bit map data extracted by the graphical display element extract unit and an attribute value of a character string attribute of each object, the attribute value of the character string attribute displayed on the bit map data being included in the object information; a placement unit for placing the graphical display synthesized by the synthesis generation unit based on the position information in the graphical interactive picture structure data.

The graphical interactive picture generation unit may further include a graphical interactive picture structure data update unit for updating a content of the graphical interactive picture structure data in the display's graphical interactive picture structure data storage unit based on the action information extracted by the graphical interactive picture structure data extract unit when the manipulation direction signal retrieved by the retrieval unit is an update direction.

The display unit may further include: a TV receiver unit for converting a received program into an image; a TV manipulation unit for accepting a manual manipulation to the TV receiver unit; a TV's graphical interactive picture structure data storage unit for storing the graphical interactive picture structure data related to the TV receiver unit in advance; and a TV's interactive picture generation unit for retrieving the graphical interactive picture structure data from the TV's graphical interactive picture structure data storage unit when the TV manipulation unit receives the manual manipulation to generate the graphical interactive picture by combining the graphical display elements in the graphical display element storage unit to update the graphical interactive picture each time a manual manipulation is received by the TV manipulation unit.

Each peripheral appliance may include: a manipulation unit for accepting a user's action direction addressed to a self's peripheral appliance; a user's graphical interactive picture structure data storage unit for storing the graphical interactive picture structure data to display the graphical interactive picture as per action direction accepted by the manipulation unit; a control unit for controlling the self's peripheral appliance to set a function by giving a direction to transmit the graphical interactive picture structure data and generating a manipulation direction signal to generate the graphical interactive picture and a manipulation direction signal to updated graphical interactive picture upon acceptance of the action direction from the manipulation unit; a graphical interactive picture structure data transmission unit for retrieving the graphical interactive picture structure data from the user's graphical interactive picture structure data storage unit upon receipt of the transmission direction from the control unit, and for transmitting the retrieved graphical interactive picture structure data to the display unit; and a manipulation direction signal transmission unit for transmitting the manipulation direction signal generated by the control unit to the display unit.

The control unit may include: a first signal generation unit for generating the manipulation direction signal as per action direction from the manipulation unit; and a second signal generation unit for generating a predetermined subsidiary data signal depending on current action state of the self's peripheral appliance, the subsidiary data being a supplement of the graphical interactive picture structure data and constituting an integral part thereof, the subsidiary data signal being generated by the first signal generation unit together with the manipulation direction signal.

The manipulation unit may be portable.

The fifth object also can be fulfilled by a system comprising a remote controller for controlling peripheral appliances and a display unit for displaying a graphical interactive picture as per manipulation direction signal from the remote controller, (1) the remote controller including: a manipulation unit for accepting an action direction addressed to the remote controller; a control unit for controlling the remote controller to set a function upon acceptance of the action direction from the manipulation unit, and for generating a manipulation direction signal to generate the graphical interactive picture and a manipulation direction signal to update the graphical interactive picture; a manipulation direction signal transmission unit for transmitting the manipulation direction signal generated by the control unit to the display unit, (2) the display unit including: an appliance's graphical interactive picture structure data storage unit for storing the graphical interactive picture structure data in advance to generate the graphical interactive picture for the peripheral appliances; a graphical display element storage unit for storing a plurality of graphical display elements to generate the graphical interactive picture; a manipulation direction signal receipt unit for receiving the manipulation direction signal from the remote controller; a graphical interactive picture generation unit for retrieving the graphical interactive picture structure data from the appliance's graphical interactive picture structure data storage unit upon receipt of the manipulation direction signal received by the manipulation direction signal receipt unit to generate the graphical interactive picture by combining the graphical display elements stored in the graphical display element storage unit based on the retrieved graphical interactive picture structure data; a display unit for displaying the graphical interactive picture generated by the graphical interactive picture generation unit; a TV receiver unit for converting a received TV program into an image; a TV manipulation unit for accepting a manual manipulation to the TV receiver unit; a TV's graphical interactive picture structure data storage unit for storing the graphical interactive picture structure data as to the TV receiver unit in advance; a TV's graphical interactive picture generation unit for retrieving the graphical interactive picture structure data from the TV's graphical interactive picture structure data storage unit when the TV manipulation unit receives the manual manipulation to generate the graphical interactive picture by combining the graphical display elements stored in the graphical display element storage unit based on the retrieved graphical interactive picture structure data to update the graphical interactive picture each time the TV manipulation unit receives a manual manipulation.

The fifth object can be fulfilled by a system comprising a relay, a remote controller, and a display unit, the relay being a peripheral appliance for transferring an action direction signal from the remote controller to the display unit, the relay's function being set by the remote controller, the display unit displaying a graphical interactive picture upon receipt of the signal from the relay, (1) the remote controller including: a first manipulation unit for accepting an action of the remote controller; a first graphical interactive picture structure data storage unit for storing graphical interactive picture structure data in advance to generate the graphical interactive picture as per action direction; a first control unit for controlling the remote controller to set a function upon receipt of the action direction from the first manipulation unit by giving a direction to transmit the graphical interactive picture structure data and generating a manipulation direction signal to generate the graphical interactive picture and a manipulation direction signal to update the graphical interactive picture; a first graphical interactive picture structure data transmission unit for retrieving the graphical interactive picture structure data from the first graphical interactive picture structure data storage unit upon receipt of the transmission direction from the first control unit to transmit the same to the relay; and a first manipulation direction signal transmission unit for transmitting the manipulation direction signal generated by the first control unit to the relay, (2) the relay including: a second manipulation unit for accepting an action direction addressed unit to the relay; a user's graphical interactive picture structure data storage unit for storing the graphical interactive picture structure data in advance to generate the graphical interactive picture as per action direction addressed to the relay; a second control unit for controlling the relay to set a function upon receipt of the action direction from the second manipulation unit by giving a direction to transmit the graphical interactive picture structure data and generating a manipulation direction signal to generate the graphical interactive picture and a manipulation direction signal to update the graphical interactive picture; a graphical interactive picture structure data transmission unit for retrieving the graphical interactive picture structure data from the user's graphical interactive picture structure data storage unit upon receipt of the transmission direction from the second control unit to transmit the same to the display unit; a second manipulation direction signal transmission unit for transmitting the manipulation direction signal generated by the second control unit to the display unit; a data relay unit for receiving the graphical interactive picture structure data from the first graphical interactive picture structure data transmission unit to transmit the same to the display unit; and a signal relay unit for receiving the manipulation direction signal from the first manipulation direction signal transmission unit to transmit the same to the display unit, (3) the display unit including: a graphical display element storage unit for storing a plurality of graphical display elements to generate the graphical interactive picture; a graphical interactive picture structure data receipt unit for receiving the graphical interactive picture structure data to generate the graphical interactive picture from the relay; a display's graphical interactive picture structure data storage unit for storing the graphical interactive picture structure data received by the graphical interactive picture structure data receipt unit; a manipulation direction signal receipt unit for receiving the manipulation direction signal from the relay; a graphical interactive picture generation unit for retrieving the graphical interactive picture structure data from the display's graphical interactive picture structure data storage unit upon receipt of the manipulation direction signal received by the manipulation direction signal receipt unit to generate the graphical interactive picture by combining the graphical display elements stored in the graphical display element storage unit based on the retrieved graphical interactive picture structure data, and for updating the graphical interactive picture each time the manipulation direction signal receipt unit receives a manipulation direction signal; and a display unit for displaying the graphical interactive picture generated by the graphical interactive picture generation unit.

The fifth object also can be fulfilled by a system comprising a relay, a remote controller, and a display unit, the relay being a peripheral appliance for transferring an action direction signal from the remote controller to the display unit, the relay's function being set by the remote controller, the display unit displaying a graphical interactive picture upon receipt of the signal from the relay, (1) the remote controller including: a first manipulation unit for accepting an action direction addressed to the remote controller; a first control unit for controlling the remote controller to set a function by giving a direction to transmit graphical interactive picture structure data to the relay and generating a manipulation direction signal to generate a graphical interactive picture and to update the graphical interactive picture; and a first manipulation direction signal transmission unit for transmitting the manipulation direction signal generated by the first control unit to the relay, (2) the relay including: a second manipulation unit for accepting an action direction addressed to the relay; a user's graphical interactive picture structure data storage unit for storing the graphical interactive picture structure data in advance to display the graphical interactive picture as per action direction addressed to the relay; a first graphical interactive picture structure data storage unit for storing in advance the graphical interactive picture structure data to display the graphical interactive picture as per graphical-interactive-picture-structure data transmission direction from the remote controller; a second control unit for controlling the relay to set a function upon receipt of the action direction from the second manipulation unit by giving a direction to transmit the graphical interactive picture structure data and generating a manipulation direction signal to generate the graphical interactive picture and to update the graphical interactive picture; a graphical interactive picture structure data transmission unit for retrieving the graphical interactive picture structure data from the user is graphical interactive picture structure data storage unit and the first graphical interactive picture structure data storage unit upon receipt of the transmission direction from the second control unit and the remote controller respectively to transmit the same to the display unit; a second manipulation direction signal transmission unit for transmitting the manipulation direction signal generated by the second control unit to the display unit; and a signal relay unit for receiving the manipulation direction signal received by the remote control unit to transmit the same to the display unit, (3) the display unit including: a graphical display element storage unit for storing a plurality of graphical display elements to generate the graphical interactive picture; a graphical interactive picture structure data receipt unit for receiving the graphical interactive picture structure data to generate the graphical interactive picture from the relay; a display's graphical interactive picture structure data storage unit for storing the graphical interactive picture structure data received by the graphical interactive picture structure data receipt unit; a manipulation direction signal receipt unit for receiving the manipulation direction signal from the relay; a graphical interactive picture generation unit for retrieving the graphical interactive picture structure data from the display's graphical interactive picture structure data storage unit upon receipt of the manipulation direction signal received by the manipulation direction signal receipt unit to generate the graphical interactive picture by combining the graphical display elements stored in the graphical display elements based on the manipulation direction, and for updating the graphical interactive picture each time the manipulation direction signal receipt unit receives a manipulation direction signal; and a display unit for displaying the graphical interactive picture generated by the graphical interactive picture generation unit.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 32 is a view depicting a structure of a menu synthesis apparatus in accordance with a sixth embodiment of the present invention;

FIGS. 33A and 33B are views showing examples of first menu information stored in a first menu storage unit in the sixth embodiment;

FIG. 35 is a view showing a part of synthesis rules stored in a synthesis rule storage unit in the sixth embodiment;

FIG. 36 is a view showing an example of second menu information stored in a second menu storage unit in the sixth embodiment;

FIGS. 37A through 37C are views showing examples of menu information synthesized by a menu synthesis unit in the sixth embodiment;

FIG. 40 is a view showing an example of menu information for the table of contents of a video stored in the second menu storage unit in the sixth embodiment;

FIGS. 41A through 41C are views showing other examples of the menu information synthesized by the menu synthesis unit in the sixth embodiment;

FIG. 45 is a view showing an example of the menu information for an air conditioner in the seventh embodiment;

FIGS. 46A through 46C are views showing examples of menu information synthesized by a menu synthesis unit in the seventh embodiment;

FIG. 53 is a view explaining button shapes 1, 2, and 3 in the eighth embodiment;

FIG. 54 is a view explaining class attribute information in the eighth embodiment;

FIG. 55 is a view explaining panel information in the eighth embodiment;

FIG. 56 is a view explaining box information in the eighth embodiment;

FIG. 57 is a view explaining button information in the eighth embodiment;

FIG. 58 is a view explaining action information in the eighth embodiment;

FIG. 59 is a view explaining display candidate information in the eighth embodiment;

FIG. 60 is a view explaining shape information in the eighth embodiment;

FIG. 77 is a view explaining object information containing a synthesis instruction in the ninth embodiment;

FIG. 78 is a view explaining actinon information containing a synthesis instruction in the ninth embodiment;

FIG. 79 is a view explaining shape information containing a synthesis instruction in the ninth embodiment;

FIG. 80 is a view explaining display candidate information containing a synthesis instruction in the ninth embodiment;

FIG. 81 is a view explaining synthesized panel information in the ninth embodiment;

FIG. 82 is a view explaining synthesized box information in the ninth embodiment;

FIG. 83 is a view explaining the action information in the ninth embodiment;

FIG. 84 is a view explaining the synthesized action information in the ninth embodiment;

FIG. 85 is a view explaining the synthesized shape information in the ninth embodiment;

FIG. 86 is a view explaining the synthesized display candidate information in the ninth embodiment;

FIG. 87 is a view explaining the class attribute information in the ninth embodiment;

FIG. 88 is a view explaining the panel information in the ninth embodiment;

FIG. 89 is a view explaining the text information in the ninth embodiment;

FIG. 90 is a view explaining the button information in the ninth embodiment;

FIG. 91 is a view explaining the action information in the ninth embodiment;

FIG. 94 is a view exhaling synthesis instruction information in the ninth embodiment;

FIG. 95 is a view explaining the panel information in the ninth embodiment;

FIG. 96 is a view explaining the text information in the ninth embodiment;

FIG. 97 is a view explaining the button information in the ninth embodiment;

FIG. 98 is a view explaining the action information in the ninth embodiment;

FIG. 99 is a view explaining the shape information in the ninth embodiment;

FIG. 100 is a view explaining the action information in the ninth embodiment;

FIG. 101 is view explaining a synthesized interactive screen in the ninth embodiment;

FIG. 102 is a view explaining an interactive screen switched by remote control in the ninth embodiment;

FIG. 108 shows a definition of the class in the tenth embodiment;

FIG. 109 shows a first definition of an action of an object in the tenth embodiment;

FIG. 110 shows a second definition of the action of the object in the tenth embodiment;

FIG. 111 shows a third definition of the action of the object in the tenth embodiment;

FIG. 112 shows a fourth definition of the action of the object in the tenth embodiment;

FIG. 113 shows a definition of a shape in the tenth embodiment;

FIG. 114 shows a definition of a set value for a button in the tenth embodiment;

FIG. 115 shows a definition of a candidate value in a set box in the tenth embodiment;

FIG. 116 shows a definition of a set value in the set box in the tenth embodiment;

FIG. 117 shows a definition of an object belonging to a panel class in the tenth embodiment;

FIG. 118 is a view showing a structure of a graphical display element stored in a graphical display element storage unit in the tenth embodiment;

FIG. 119 is a view showing an example of a tuner setting panel displayed on a graphical display unit in the tenth embodiment;

FIG. 120 is another view showing an example of the tuner setting panel displayed on the graphical display unit in the tenth embodiment;

FIG. 121 is another view showing an example of the tuner setting panel displayed on the graphical display unit in the tenth embodiment;

FIG. 122 is another view showing an example of the tuner setting panel displayed on the graphical display unit in the tenth embodiment;

FIG. 123 is a first flowchart detailing the operation of the graphical interactive instruction display unit in the tenth embodiment;

FIG. 124 is a second flowchart detailing the operation of the graphical interactive instruction display unit in the tenth embodiment;

FIG. 125 is a view depicting a structure of a graphical interactive instruction display unit in accordance with an eleventh embodiment of the present invention;

FIG. 126 shows a first definition of graphical interactive screen structure data in the eleventh embodiment;

FIG. 127 shows a second definition of graphical interactive screen structure data in the eleventh embodiment;

FIG. 128 is a third definition of graphical interactive screen structure data in the eleventh embodiment;

FIG. 129 is a fourth definition of graphical interactive screen structure data in the eleventh embodiment;

Figure 131:
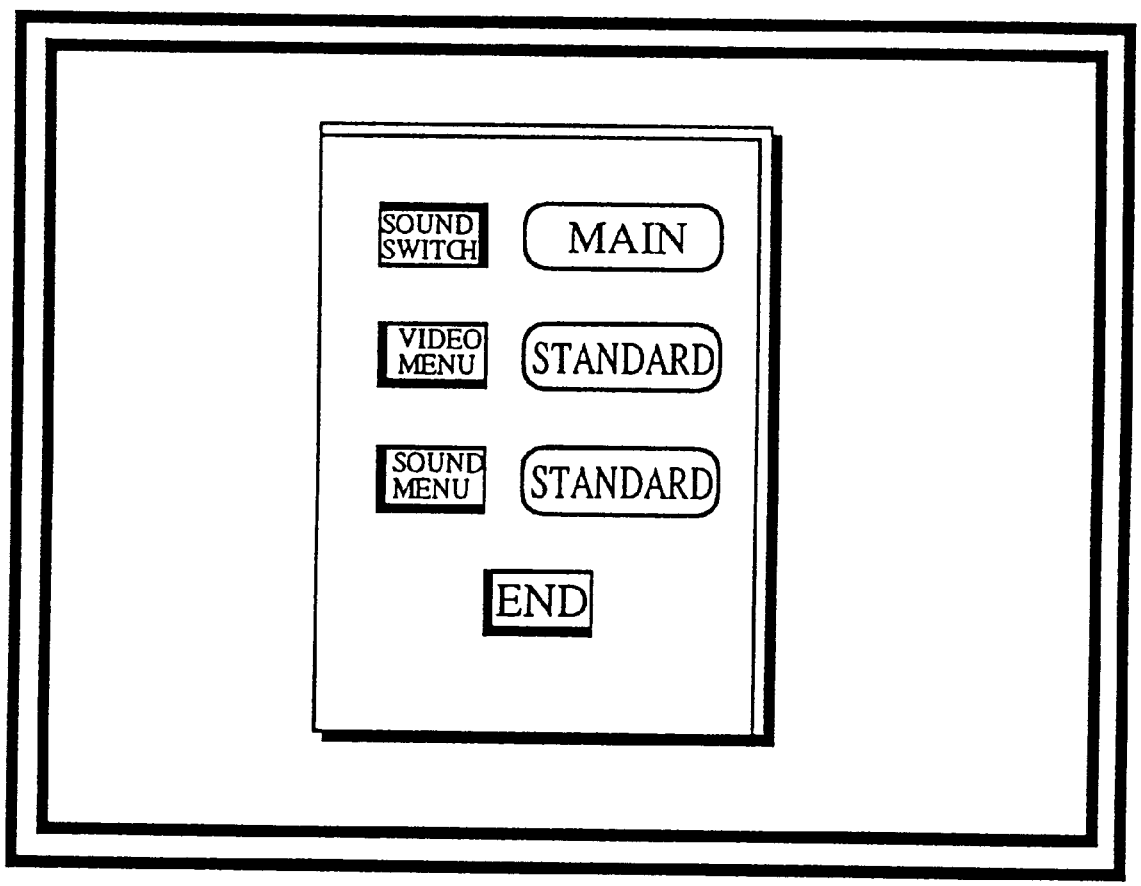
Figure 132:
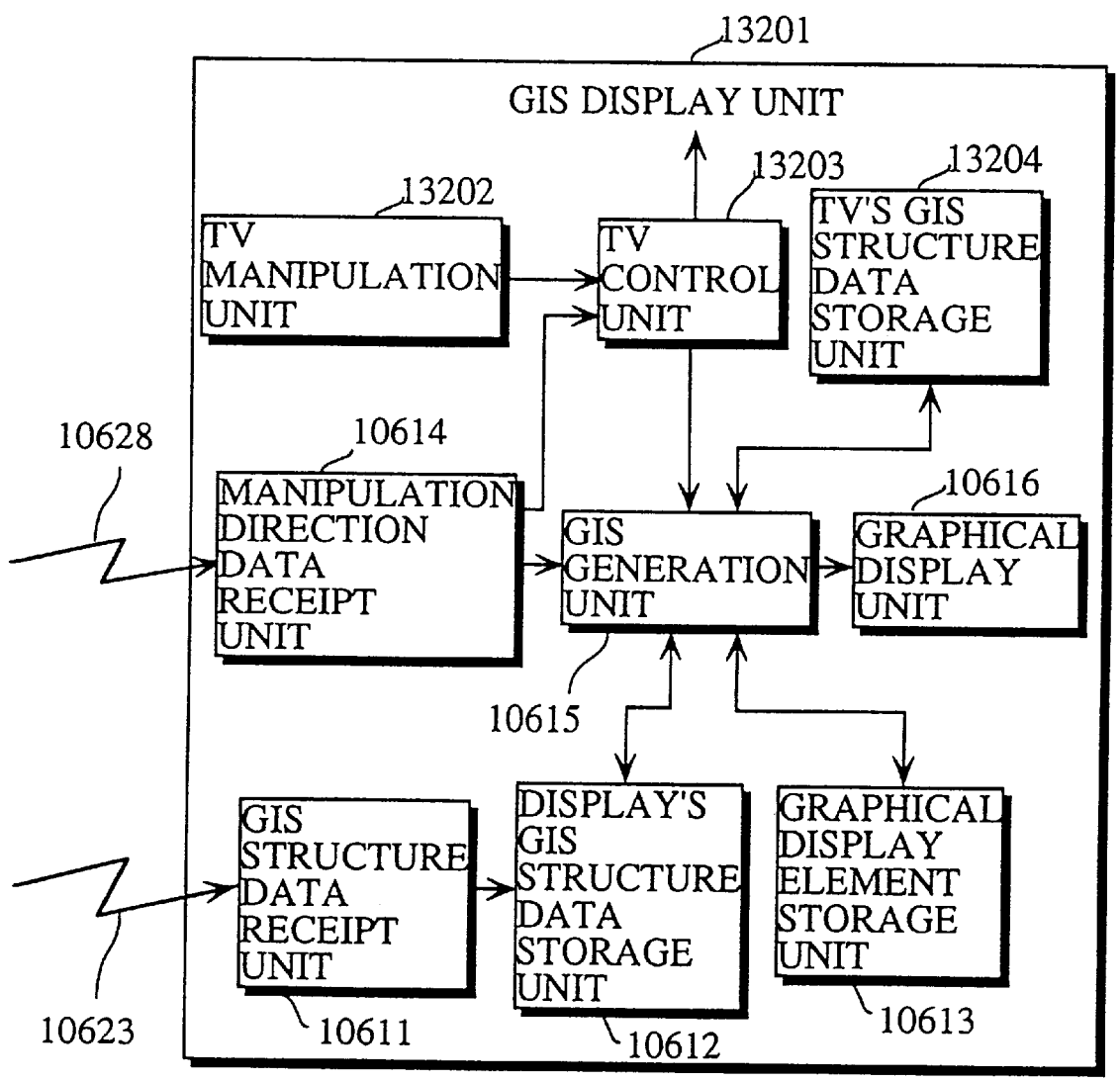
Figure 133:
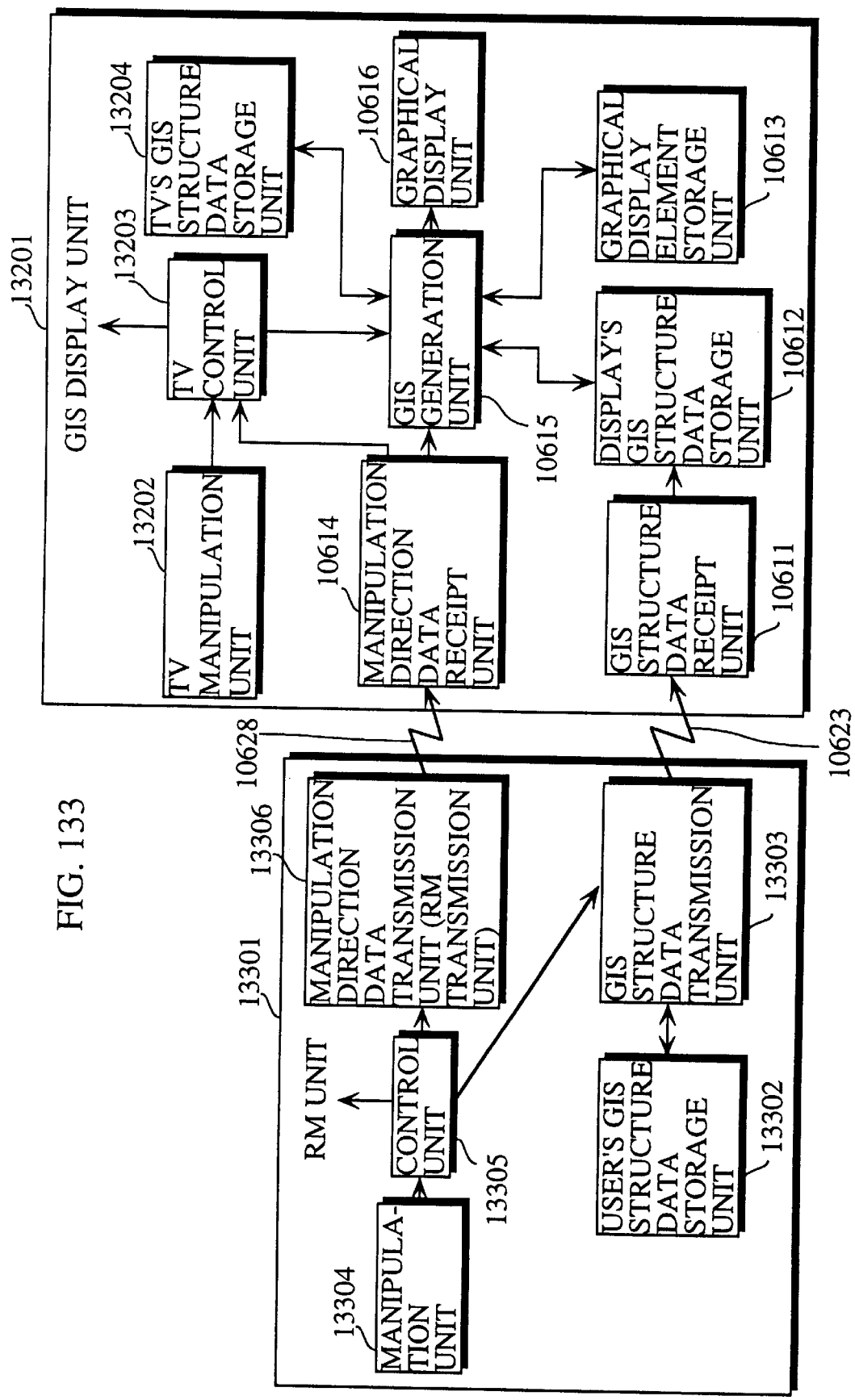
Figure 134:
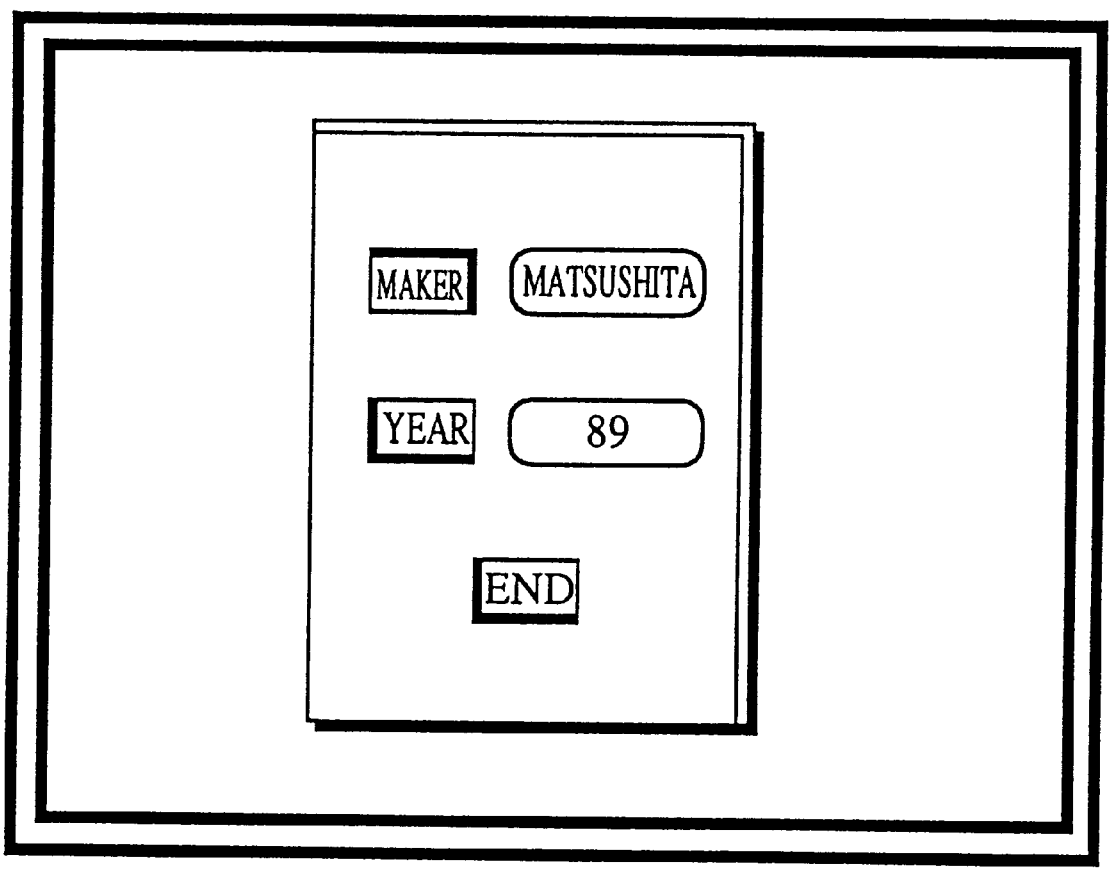
Figure 136:
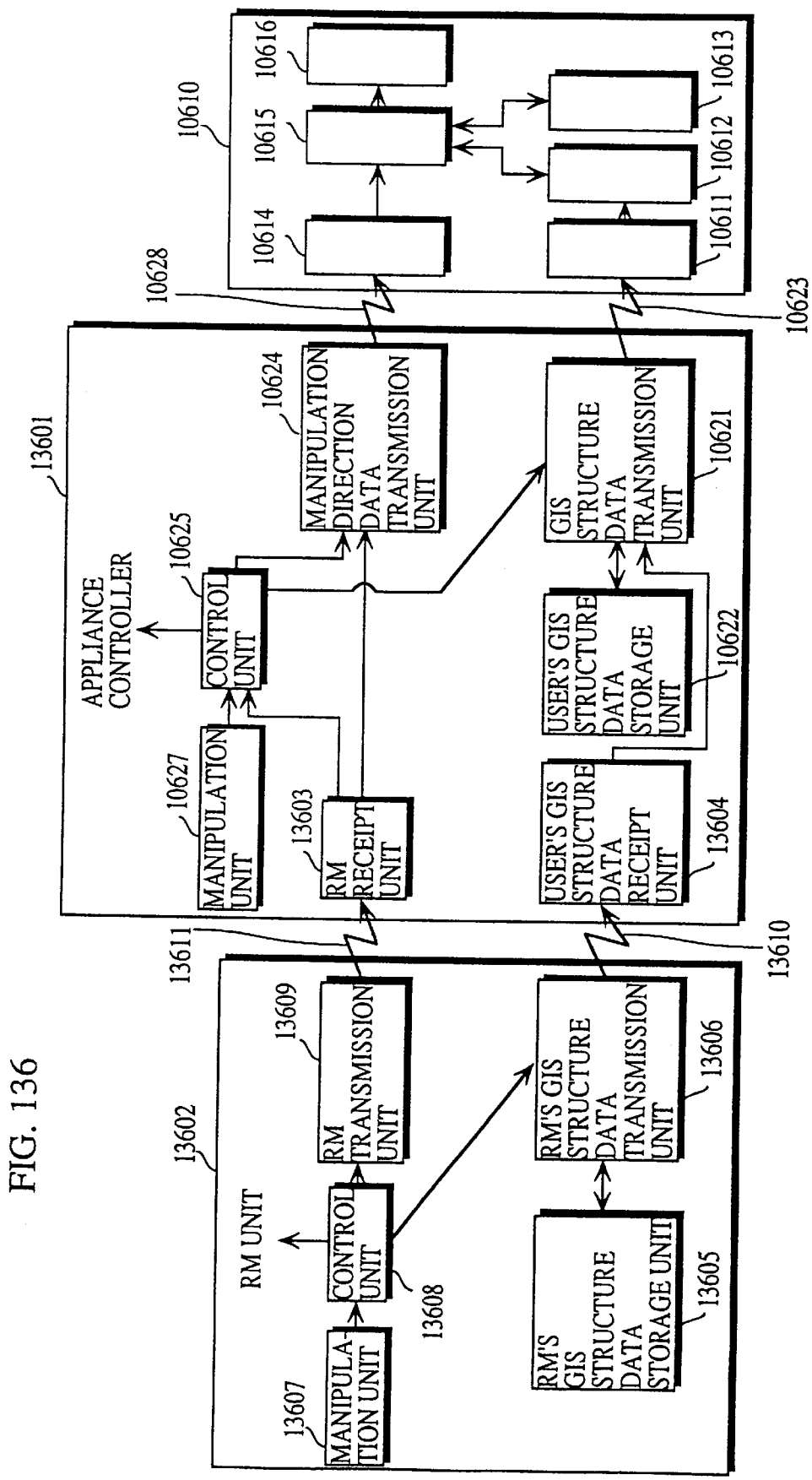
Figure 137:
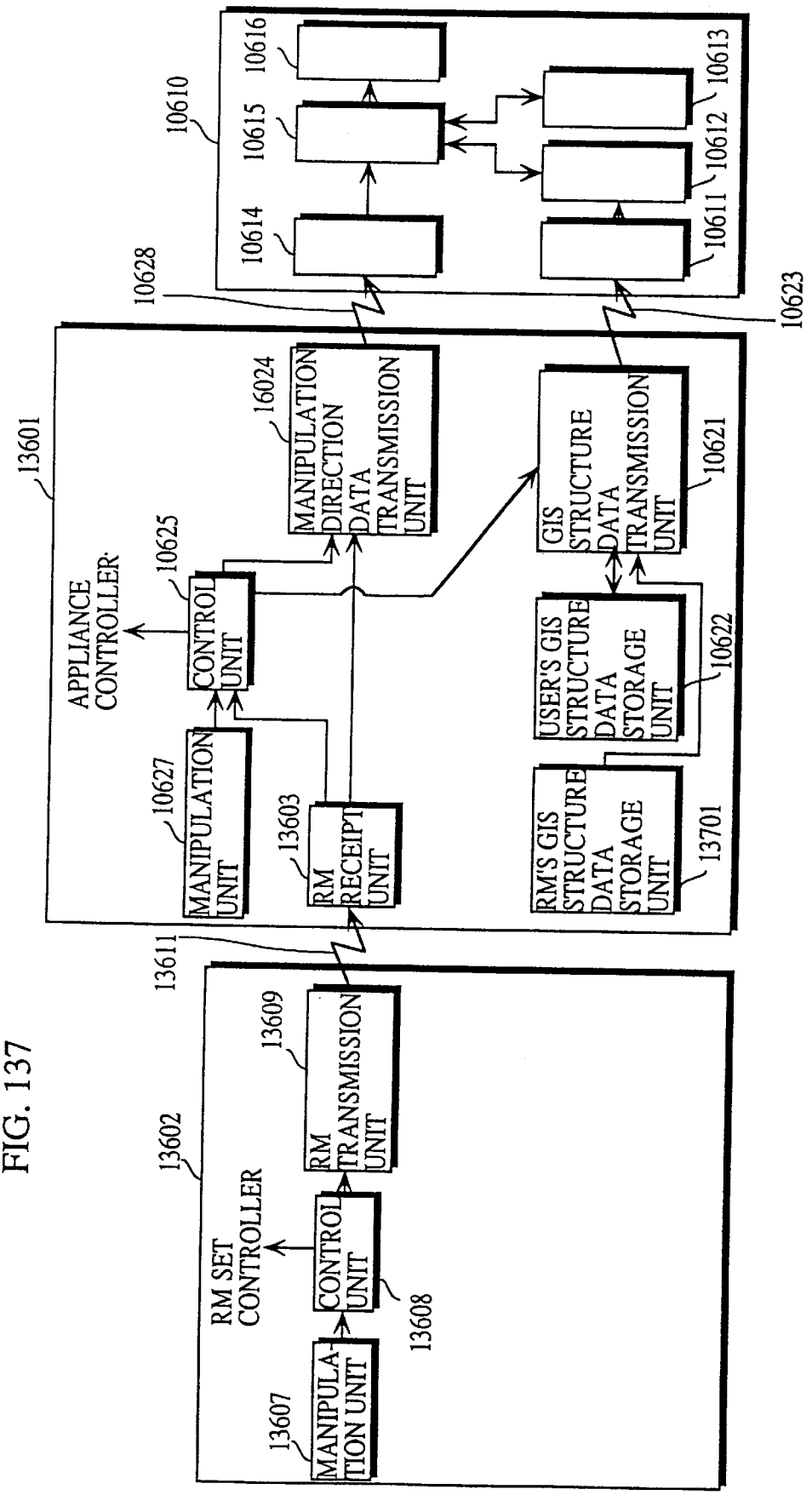
Figure 138:
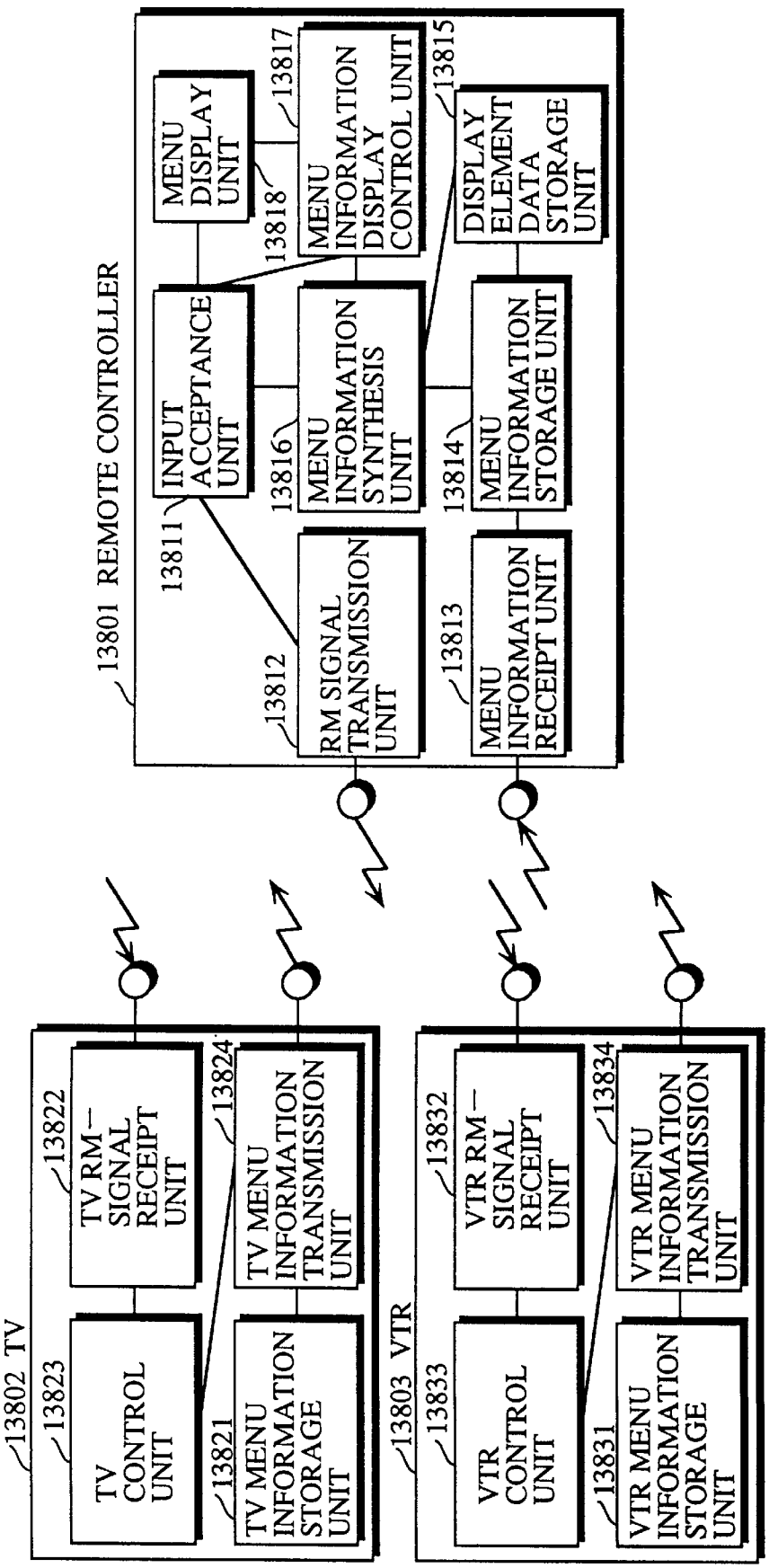
Figure 139:
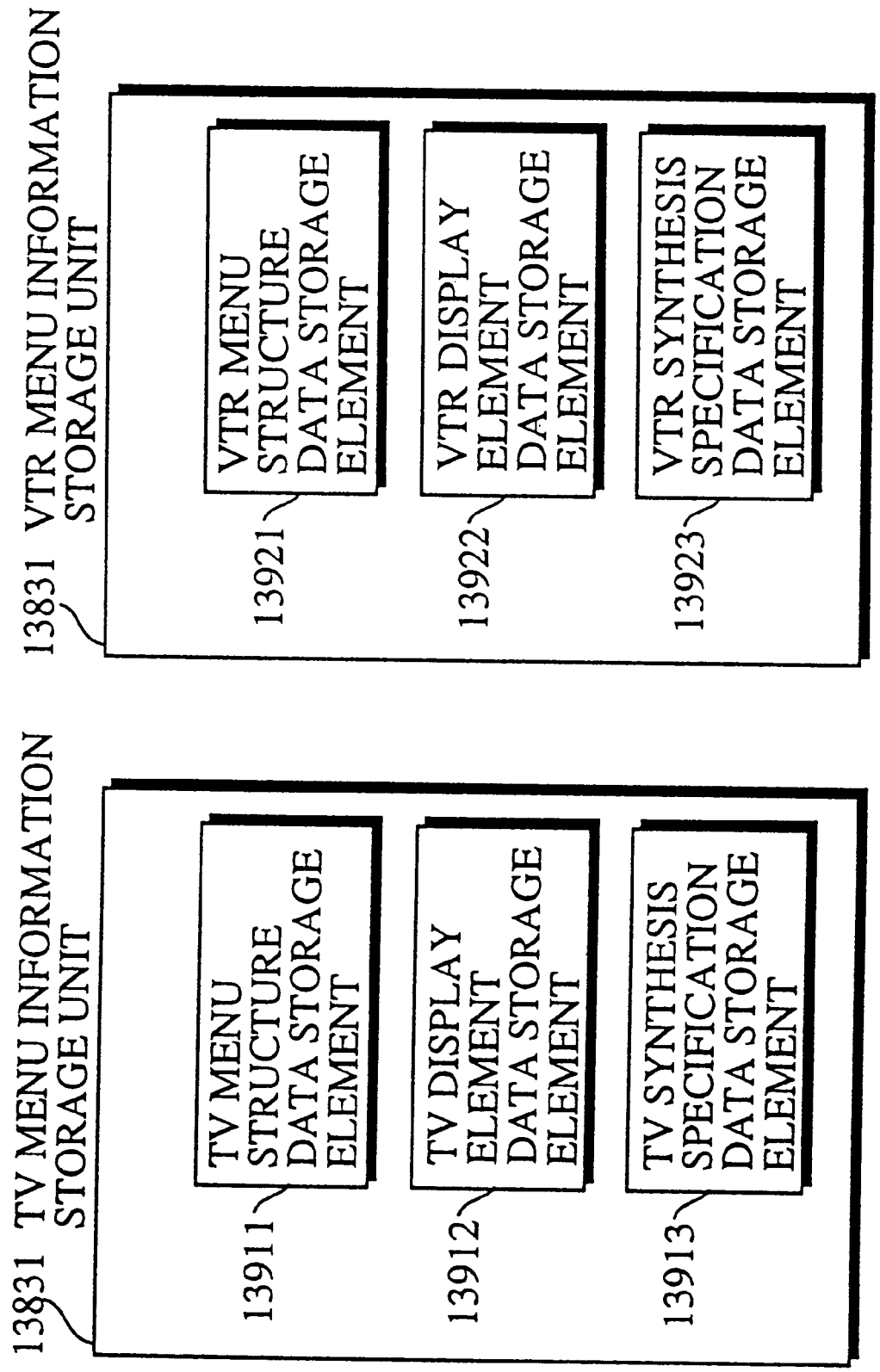
Figure 147:
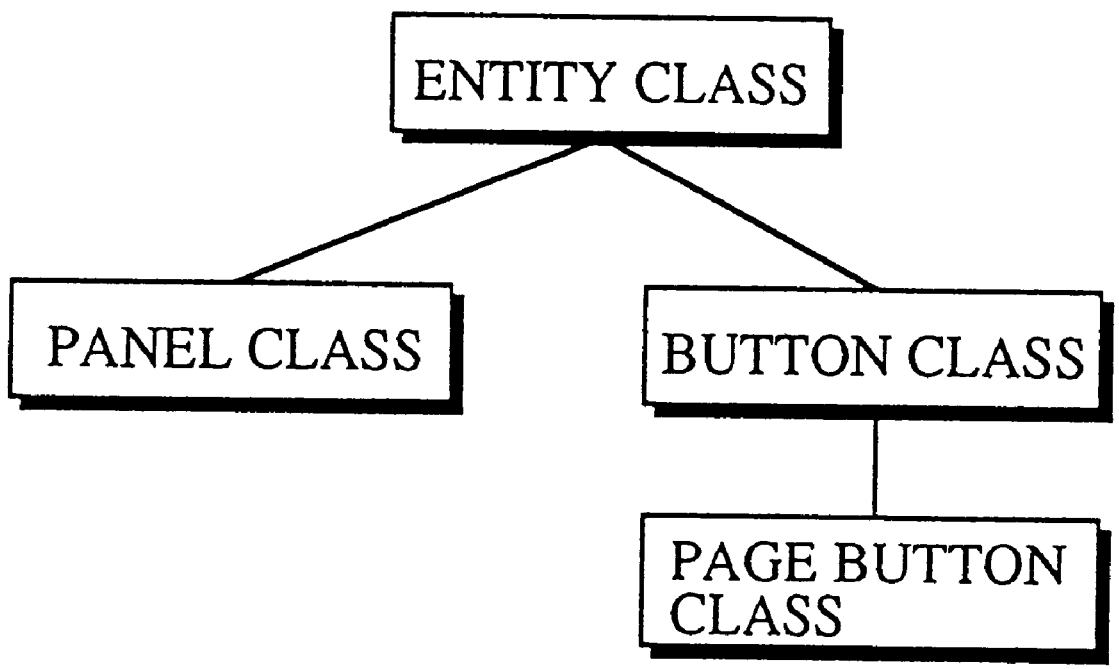
Figure 162:
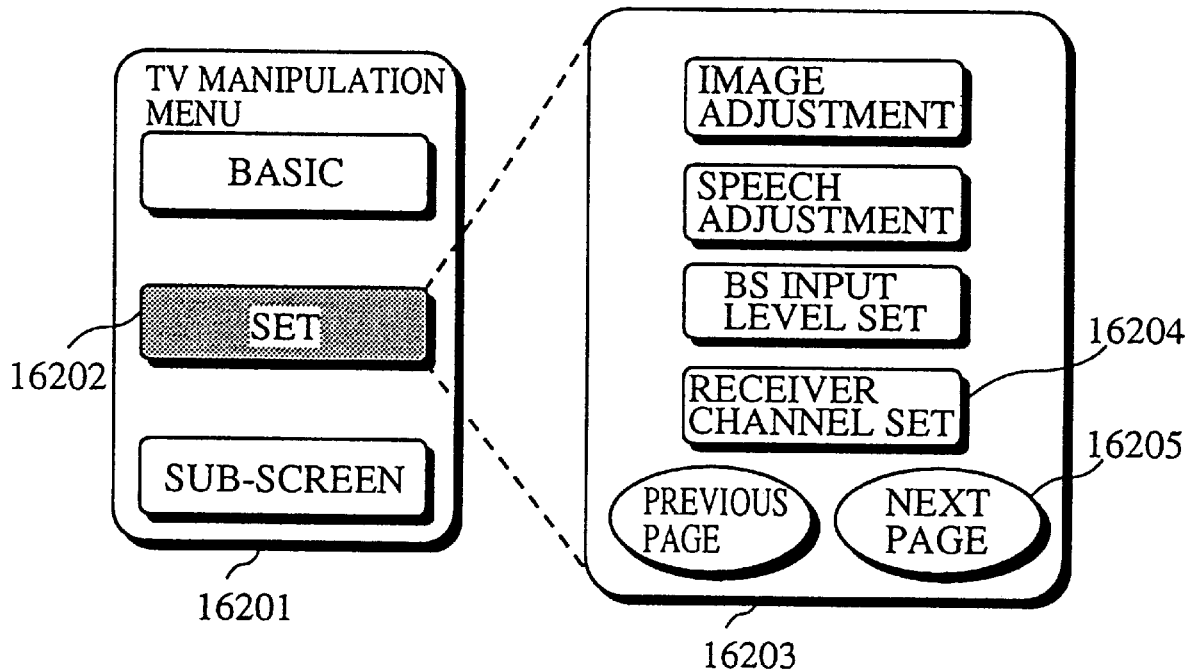
Figure 163:
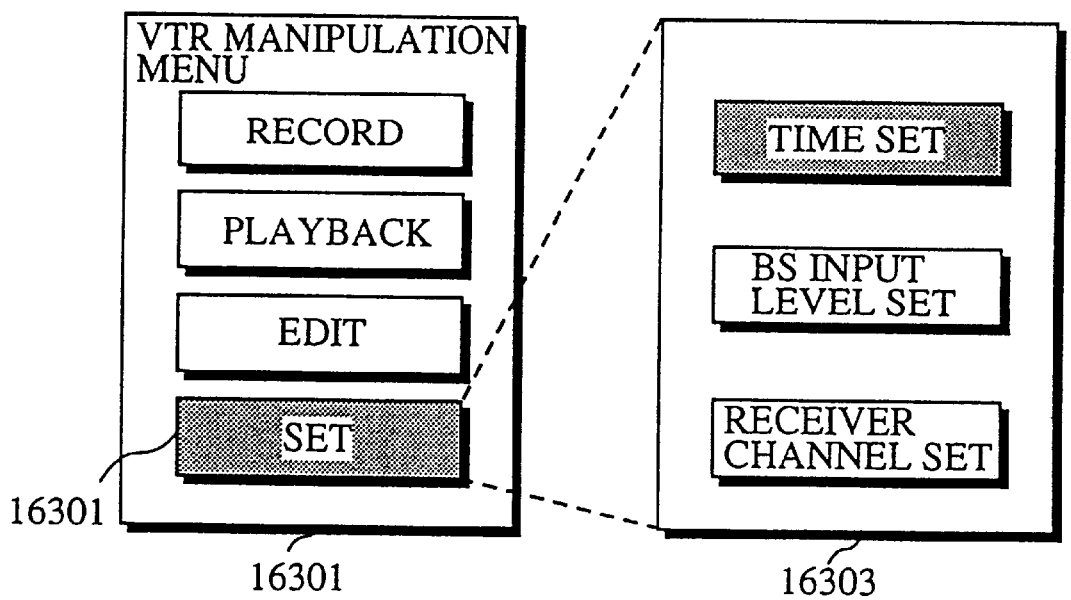
Figure 164:
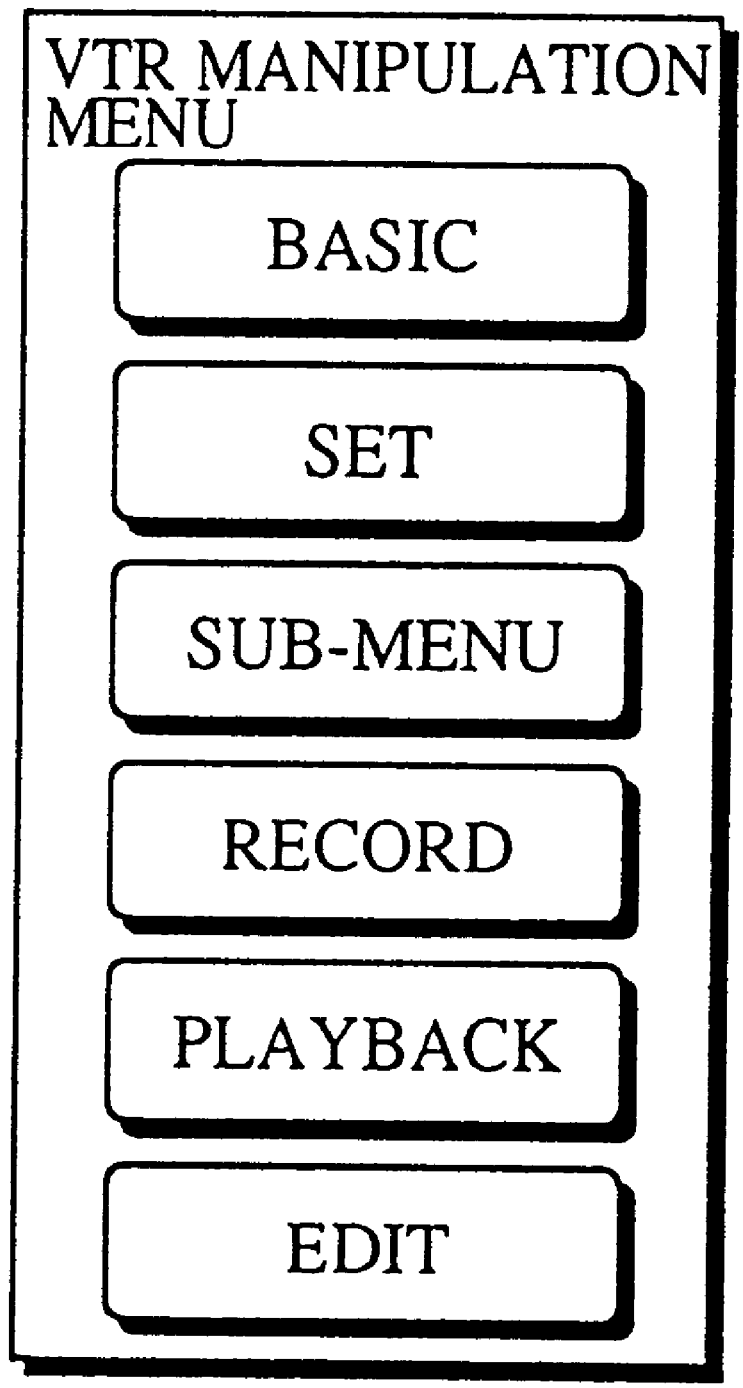
Figure 165:
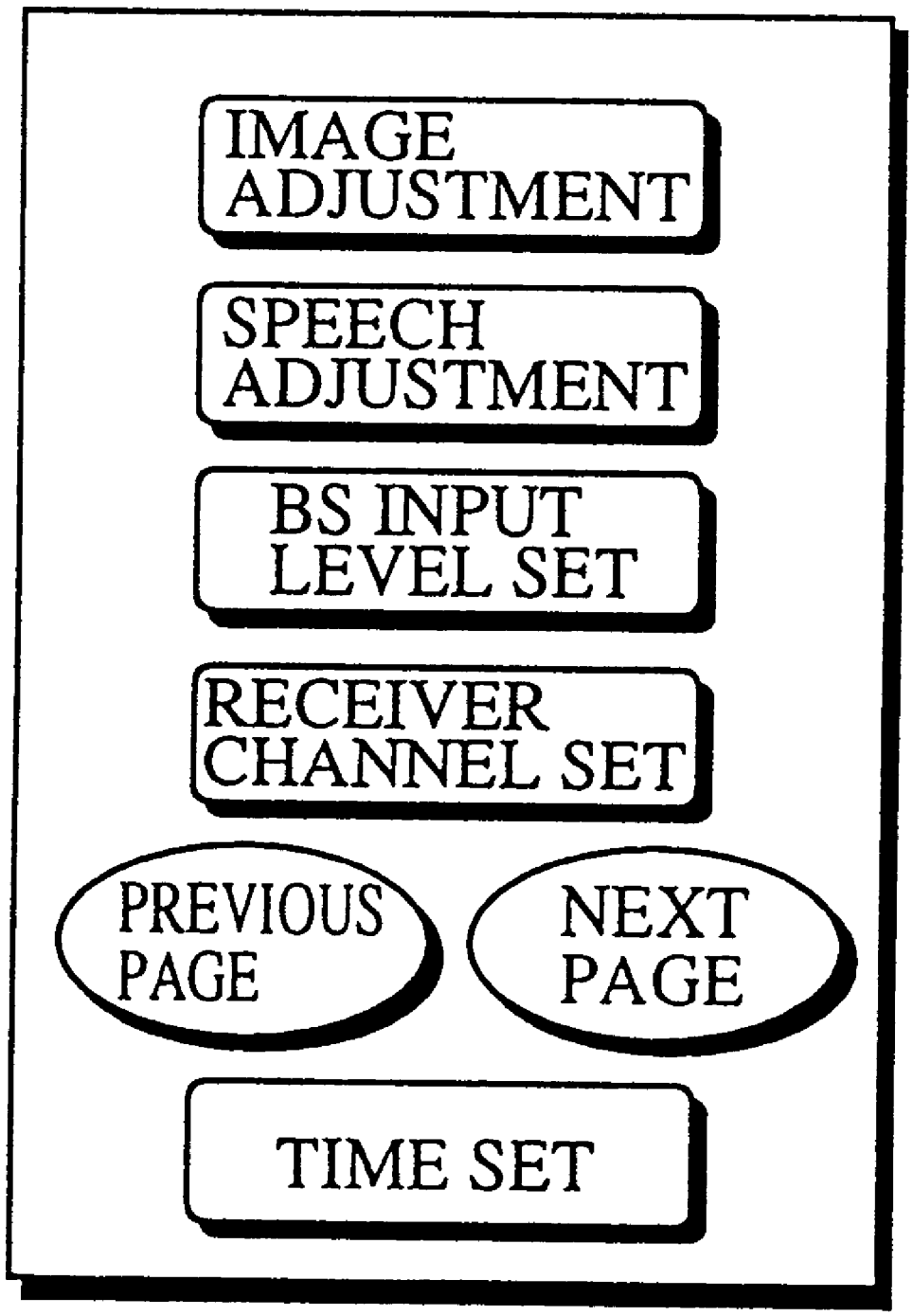
Figure 166:
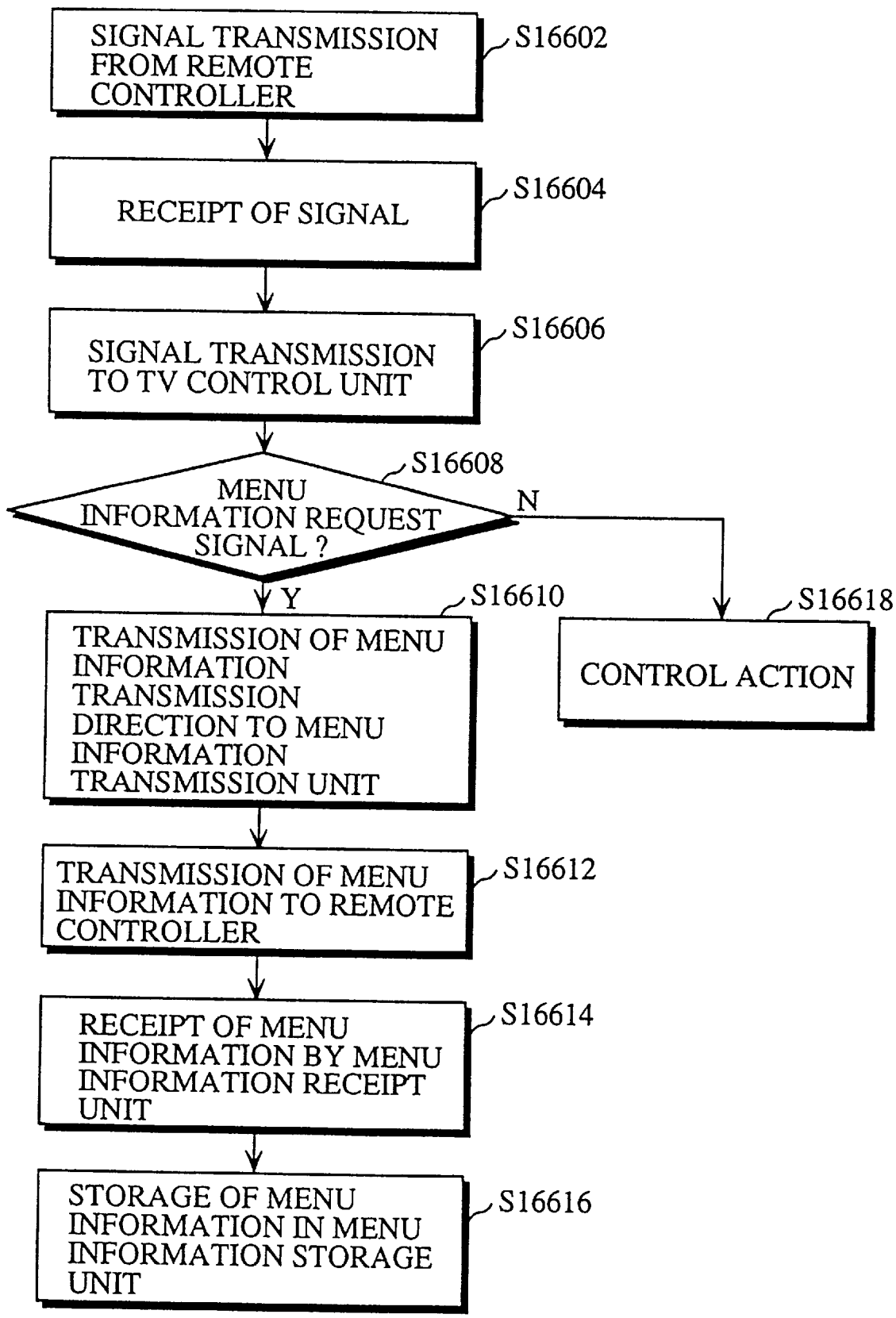
Figure 167:
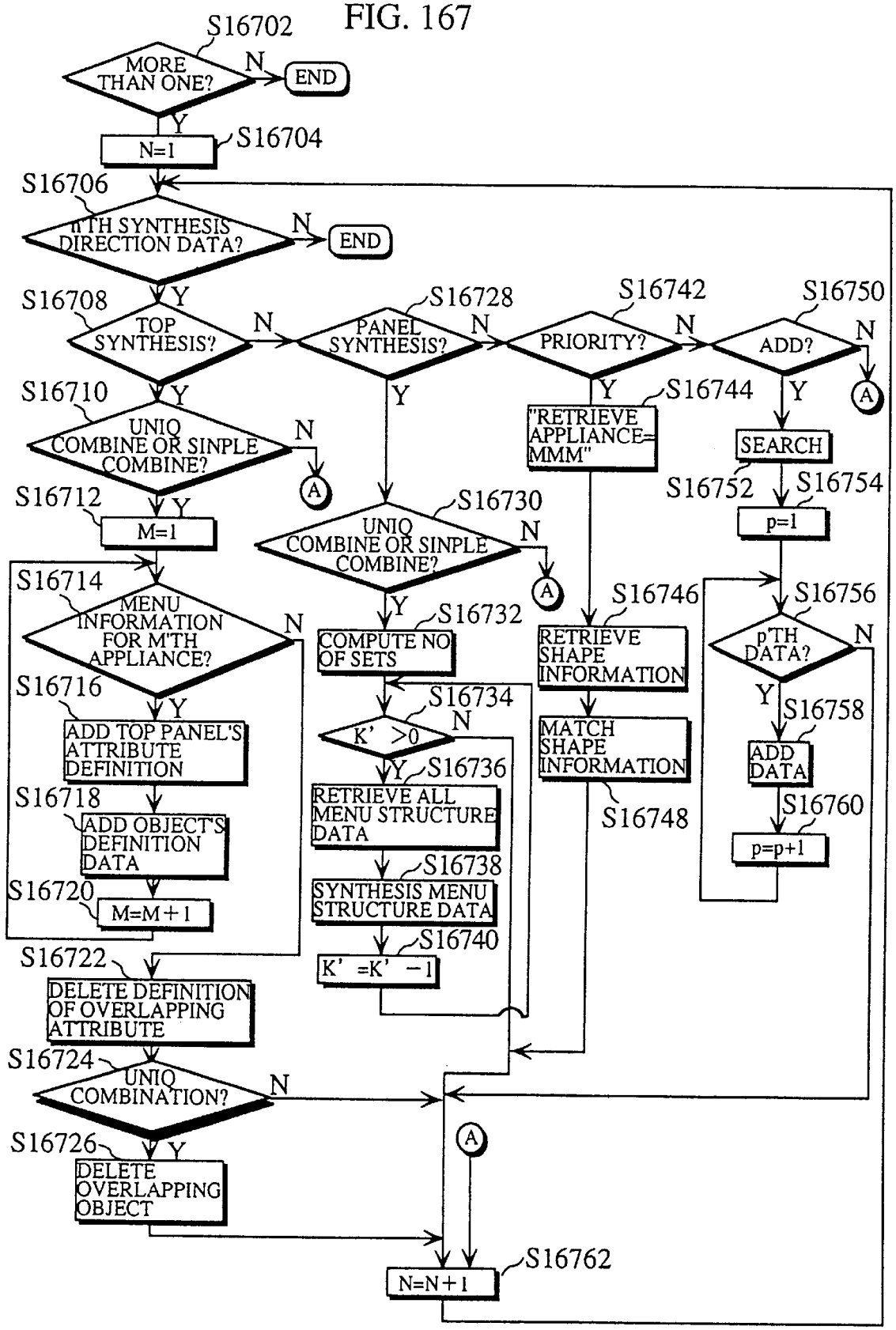
Figure 168:
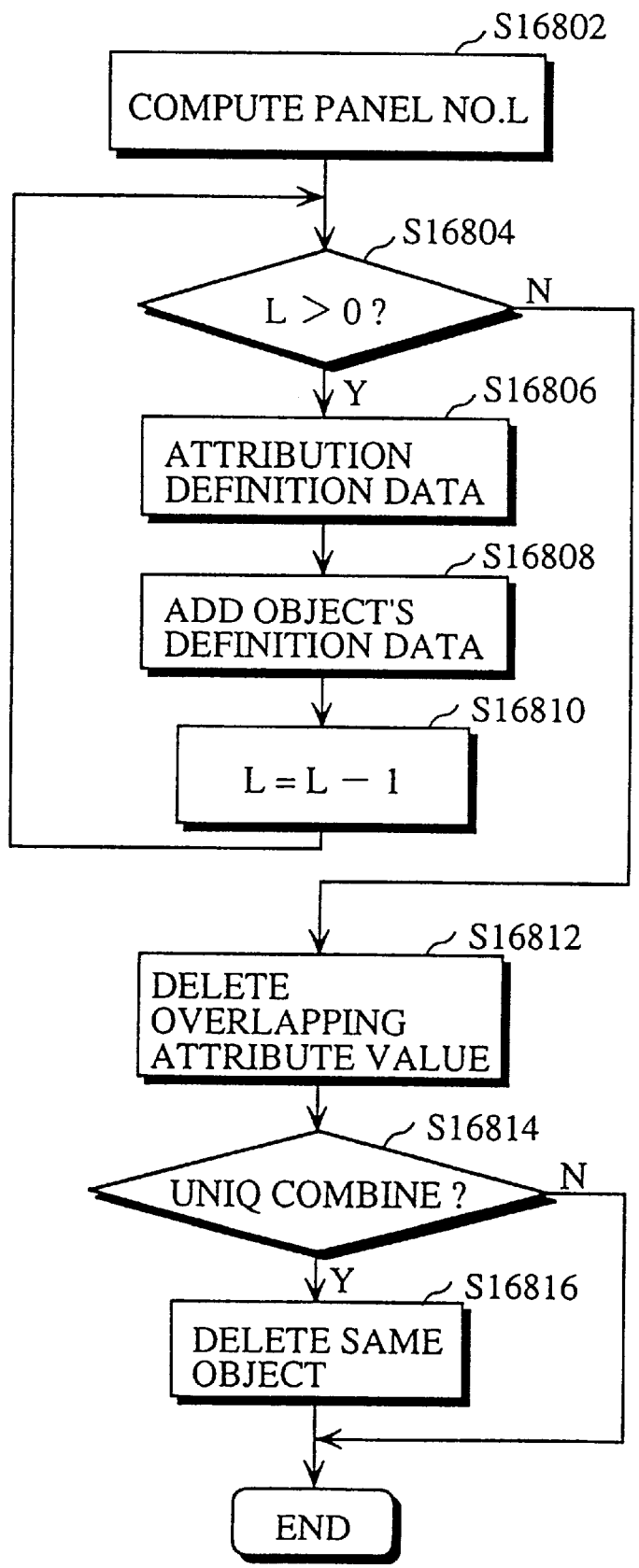

FIG. 130 is a view showing an example of subsidiary data in the eleventh embodiment;

FIG. 131 is a view showing an example of an adjustment panel display on a graphical display unit in the eleventh embodiment;

FIG. 132 is a view depicting a structure of a graphical interactive screen display unit in accordance with a twelfth embodiment of the present invention;

FIG. 133 is a view depicting a structure of a graphical interactive screen display unit in a graphical interactive screen display direction unit in accordance with a thirteenth embodiment of the present invention;

FIG. 134 is a view showing an example of a remote-controller-set-panel display on a graphical display unit in the thirteenth embodiment;

FIG. 135 is a view depicting a structure of a modified graphical interactive screen instruction display unit in the thirteenth embodiment;

FIG. 136 is a view showing a structure of a graphical interactive screen display unit in a graphical interactive screen display direction unit in accordance with a fourteenth embodiment of the present invention;

FIG. 137 is a view depicting a structure of a modified graphical interactive screen display unit in the fourteenth embodiment; and FIG. 138 is a view depicting the structure of a menu information synthesis apparatus in accordance with the fifteenth embodiment of the present invention;

FIG. 139 is another view depicting the structure of a menu information synthesis apparatus in the fifteenth embodiment;

FIG. 140 is a class definition explaining the content of menu structure data in a TV menu structure data storage element and VTR menu structure data storage element in the fifteenth embodiment;

FIG. 141 is a panel structure definition explaining the content of the menu structure data in the TV menu structure data storage element in the fifteenth embodiment;

FIG. 142 is a button structure definition explaining the content of the menu structure data in the TV menu structure data storage element in the fifteenth the embodiment;

FIG. 143 is a shape definition explaining the content of the menu structure data in the TV menu structure data storage element in the fifteenth embodiment;

FIG. 144 is an action definition explaining the content of the menu structure data in the TV menu structure data storage element in the fifteenth the embodiment;

FIG. 145 is a view showing the content of the element display data stored in a TV display element storage element in the fifteenth embodiment;

FIG. 146 is a view showing the content of synthesis direction data stored in a TV synthesis direction data storage element in the fifteenth embodiment;

FIG. 147 is a view showing a hierarchical correlation between the objects' classes in the fifteenth embodiment;

FIG. 148 is a panel structure definition explaining the content of the menu structure data in the VTR menu structure data storage element in the fifteenth embodiment;

FIG. 149 is a button structure definition explaining the content of the menu structure data in the VTR menu structure data storage element in the fifteenth the embodiment;

FIG. 150 is a shape definition explaining the content of the menu structure data in the VTR menu structure data storage element in the fifteenth the embodiment;

FIG. 151 is an action definition explaining the content of the menu structure data in the VTR menu structure data storage element in the fifteenth the embodiment;

FIG. 152 is a view showing the content of the element display data stored in a VTR display element storage element in the fifteenth embodiment;

FIG. 153 is a view showing the content of synthesis direction data stored in a VTR synthesis direction data storage element in the fifteenth embodiment;

FIG. 154 is a view showing the content of the menu structure data when top panels shown in FIGS. 141 and 151 are simply combined in the fifteenth embodiment;

FIG. 155 is a view showing the content of the menu structure data when the top panels are synthesized by SIMPLE COMBINE in the fifteenth embodiment;

FIG. 156 is a view showing the content of the menu structure data during a top-panel synthesis process by UNIQ COMBINE in the fifteenth embodiment;

FIG. 157 is a view showing the content of the menu structure data when the top panels are synthesized by UNIQ COMBINE in the fifteenth embodiment;

FIG. 158 is a view showing the menu structure data when set panels are simply combined in the fifteenth embodiment;

FIG. 159 is a view showing the content of the menu structure data when the set panels are synthesized by SIMPLE COMBINE in the fifteenth embodiment;

FIG. 160 is a view showing the content of the menu structure data when the set panels are synthesized by UNIQ combine in the fifteenth embodiment;

FIG. 161 is a view showing the content of post-synthesis shape data in the fifteenth embodiment;

FIG. 162 is a view showing an example of a display of the TV menu structure data in the fifteenth embodiment;

FIG. 163 is a view showing an example of a display of the VTR menu structure data in the fifteenth embodiment;

FIG. 164 is a view showing an example of a display of a top panel after synthesizing the TV menu information and VTR menu information in the fifteenth embodiment;

FIG. 165 is a view showing an example of a display of a set panel after synthesizing the TV menu information and VTR menu information in the fifteenth embodiment;

FIG. 166 is a flowchart detailing the operation related to the fifteenth embodiment;

FIG. 167 is another flowchart detailing the operation related to the fifteenth embodiment; and FIG. 168 is another flowchart detailing the operation related to the fifteenth embodiment.

DESCRIPTION OF THE PREFERRED EMBODIMENTS

Fifteen embodiments of the present invention will be explained while referring to the drawing.

FIRST EMBODIMENT

Figure 1:
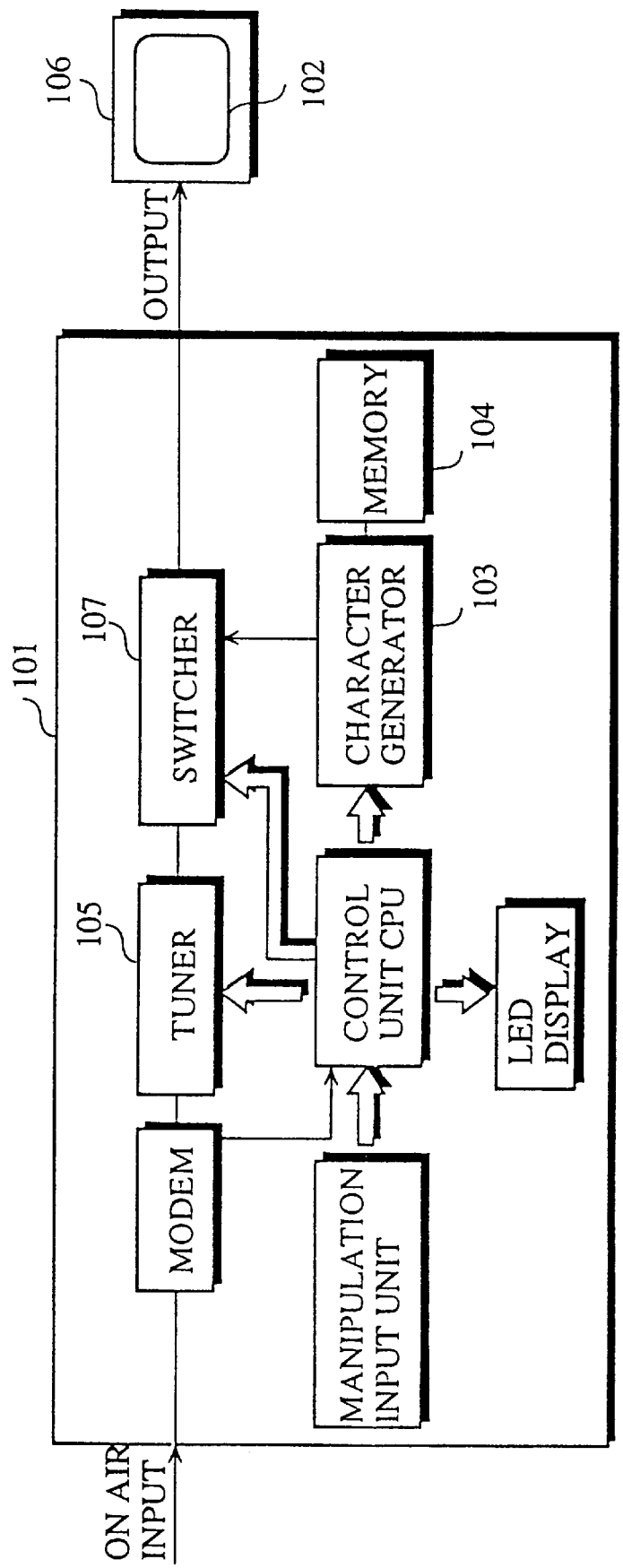
FIG. 1 is a view depicting a structure of a conventional program receiver apparatus.
Figure 2:
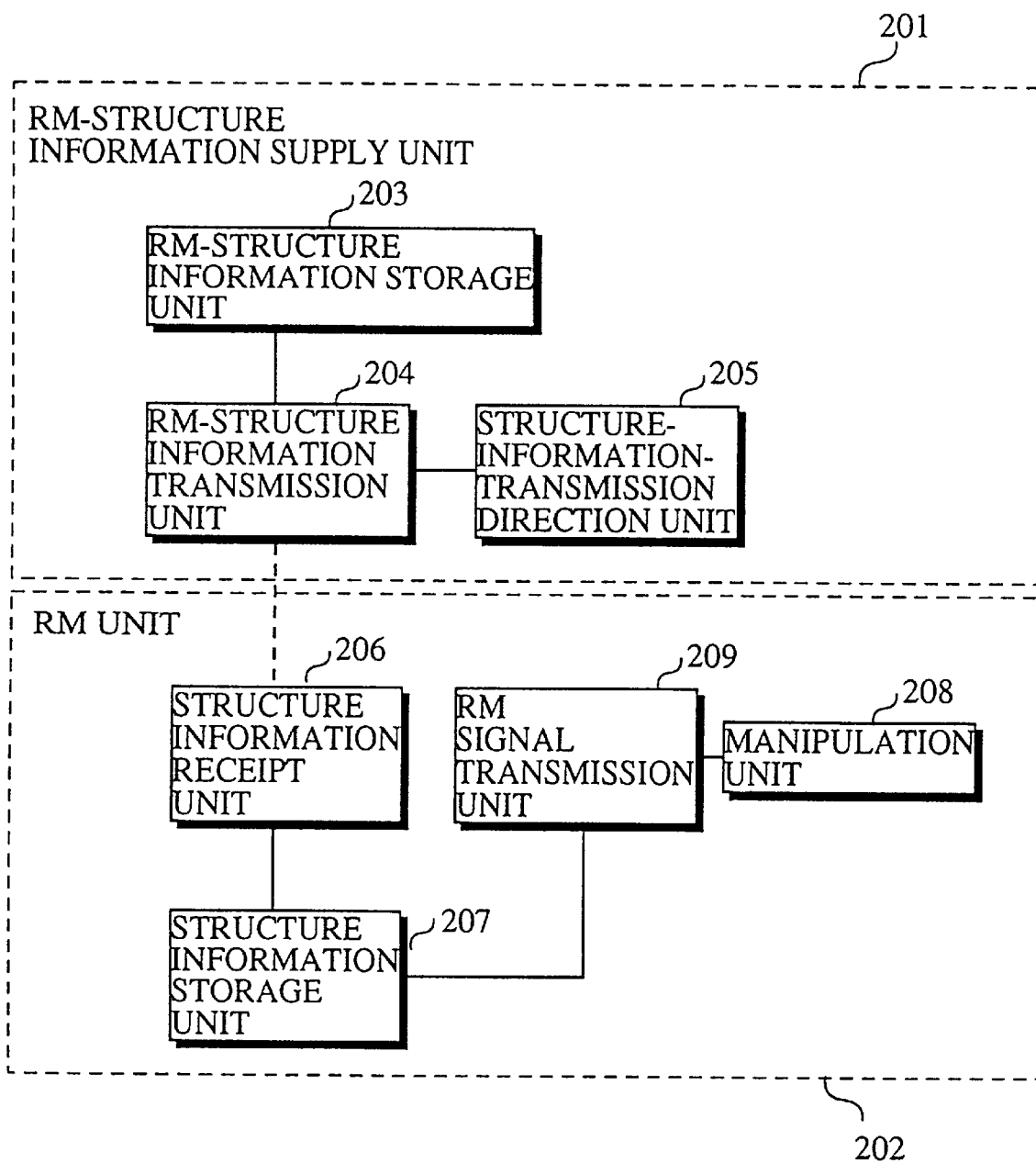
FIG. 2 is a view depicting a structure of a remote controller in accordance with a first embodiment of the present invention.

FIG. 2 is a view depicting a structure of a remote controller in accordance with the first embodiment. The remote controller includes a remote-control-structure (RM-structure) information supply unit 201 and a remote control (RM) unit 202. Note that appliances placed under the control of the remote controller (hereinafter referred to simply as the appliances) are not shown in the drawing, and for the explanation's convenience, let the appliances be various types of TVs made by a plurality of makers. The RM-structure information supply unit 201 includes a RM-structure information storage unit 203, a RM-structure information transmission unit 204, a structure-information-transmission direction unit 205. The RM unit 202 includes a structure information receipt unit 206, a structure information storage unit 207, a manipulation unit 208, and a RM signal transmission unit 209. Note that the remote controller referred in the first through fifth embodiments includes a signal (ultra-red-ray) transmitter manipulated by the user and a controller for controlling the appliances as per transmitted signals, and that the RM unit referred herein includes only the signal transmitter.

More precisely, the RM-structure information supply unit 201 holds the information necessary for the RM unit 202 to control the appliances, and transmits the information to the RM unit 202 via a transmission path, or namely the ultra red rays.

The RM unit 202 is manipulated by the user.

The RM-structure information storage unit 203 is a ROM (Read Only Memory) and stores RM-structure information, which is in effect control signals transmitted from the RM unit 202 to the appliances. In this embodiment, the control signals corresponding to a button group 301 (FIG. 3) on the RM unit 202 for each type of TVs are stored, so that the RM signal transmission unit 209 transmits an adequate control signal when a button is pushed. The RM-structure information transmission unit 204 selectively retrieves the RM-structure information from the RM-structure information storage unit 203 as per direction from the structure-information-transmission direction unit 205 to transmit the same to the RM unit 202.

The structure-information-transmission direction unit 205 directs the RM-structure information transmission unit 204 to transmit the RM-structure information from the RM-structure information storage unit 203.

The structure information receipt unit 206 receives the RM-structure information from the RM-structure information transmission unit 204 to have the structure information storage unit 207 store the same.

The structure information storage unit 207 stores the RM-structure information received by the structure information receipt unit 206.

The manipulation unit 208 is manipulated by the user to control the appliances.

The RM signal transmission unit 209 retrieves the control signals, or the RM-structure information, from the structure information storage unit 207 in accordance with manipulation signals from the manipulation unit 208.

Figure 3:
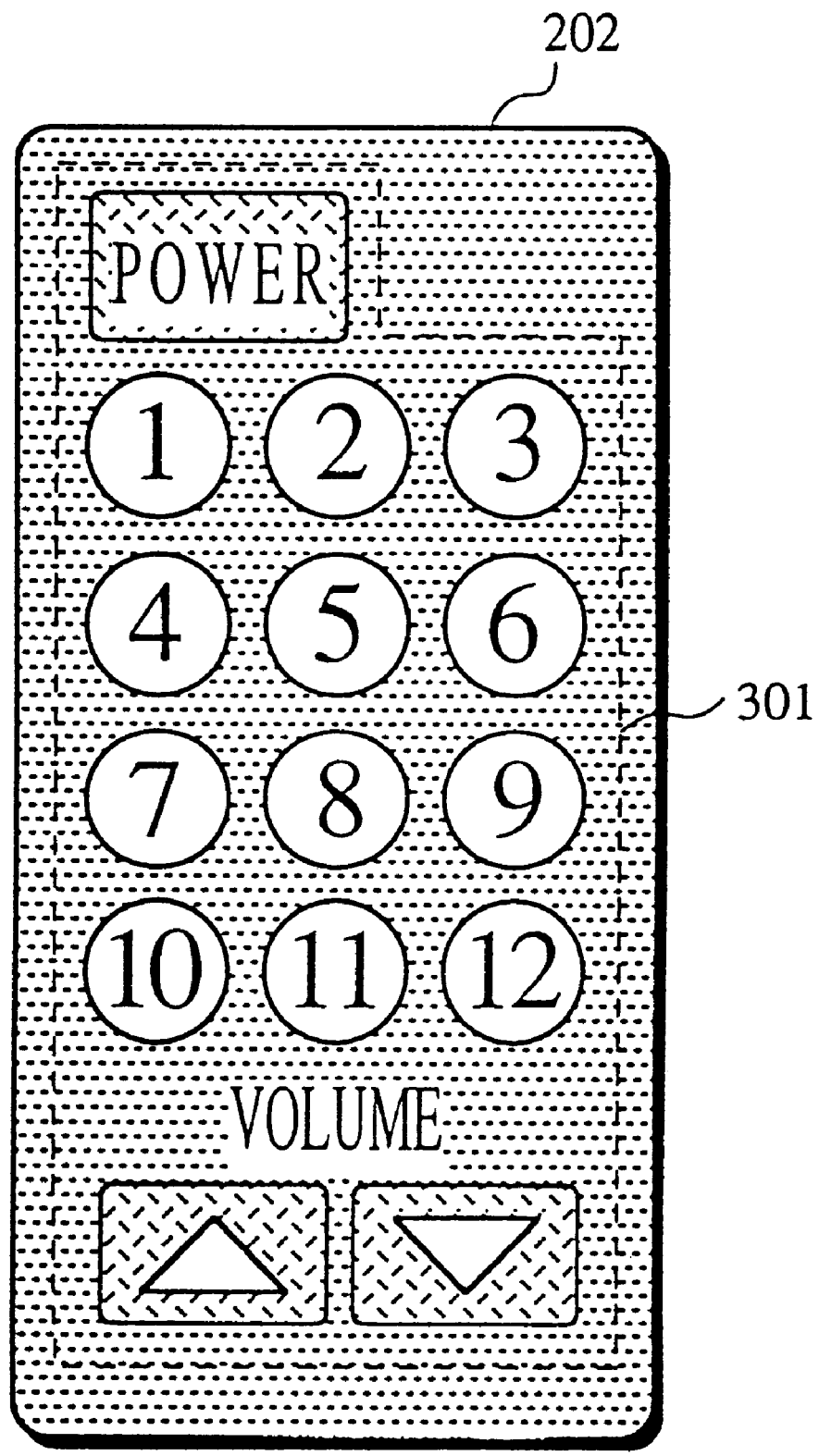
FIG. 3 is a front view of a remote controller unit in the remote controller.

FIG. 3 is a front view of the RM unit 202, which is enclosed in a case, so that the user can easily hold it in hand when manipulating the same. Placed on the front surface of the RM unit 202 is the button group 301 including a power ON/OFF button, channel buttons, and volume buttons; the button group 301 forms the manipulation unit 208.

Figure 4:
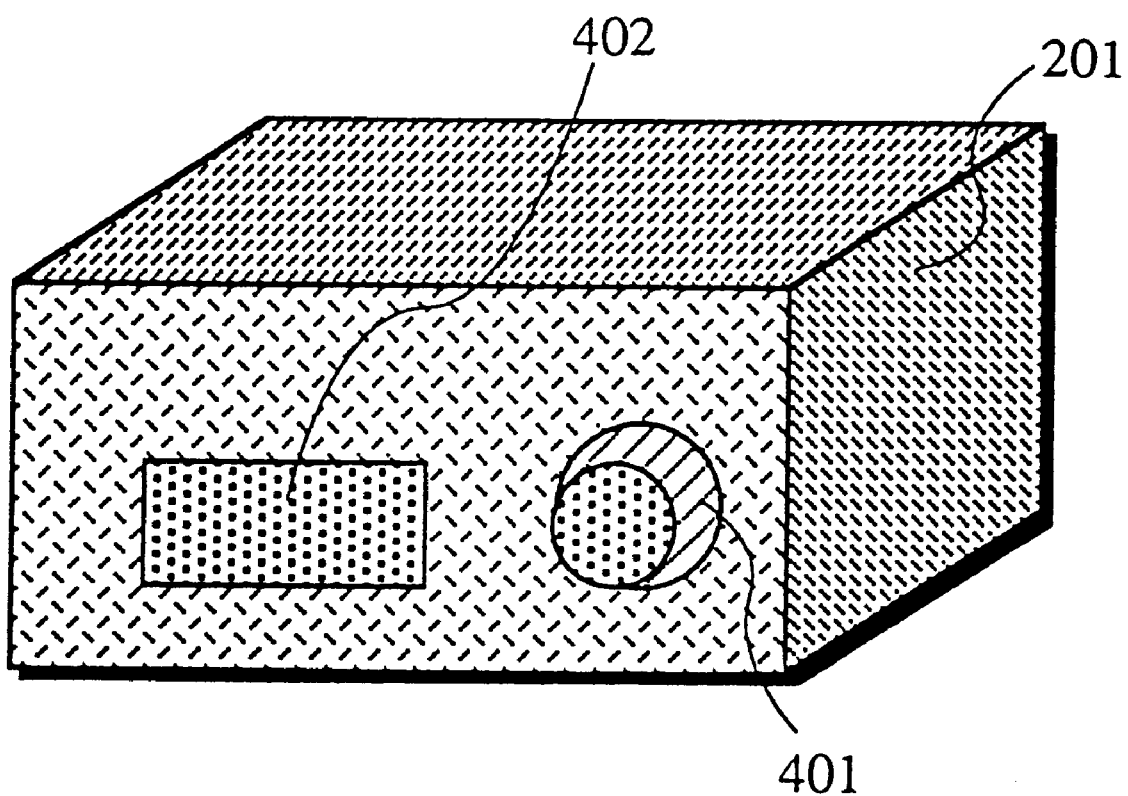
FIG. 4 is an outer perspective view of a remote controller structure information supply unit furnished for the remote controller.

FIG. 4 is an outer perspective view of the RM-structure information supply unit 201, which is enclosed in a box. Placed on the front surface of the RM-structure information supply unit 201 are a toggle 401 and an emitter 402. The toggle 401 is rotated to select the type of the appliances, to which the RM-structure information transmission unit 204 transmits the control signal from the RM-structure information storage unit 203, and it forms a part of the structure-information-transmission direction unit 205. The emitter 402 emits the ultra red rays as the control signals from the RM-structure information storage unit 203, and it forms a part of the RM-structure information transmission unit 204.

Figure 5:
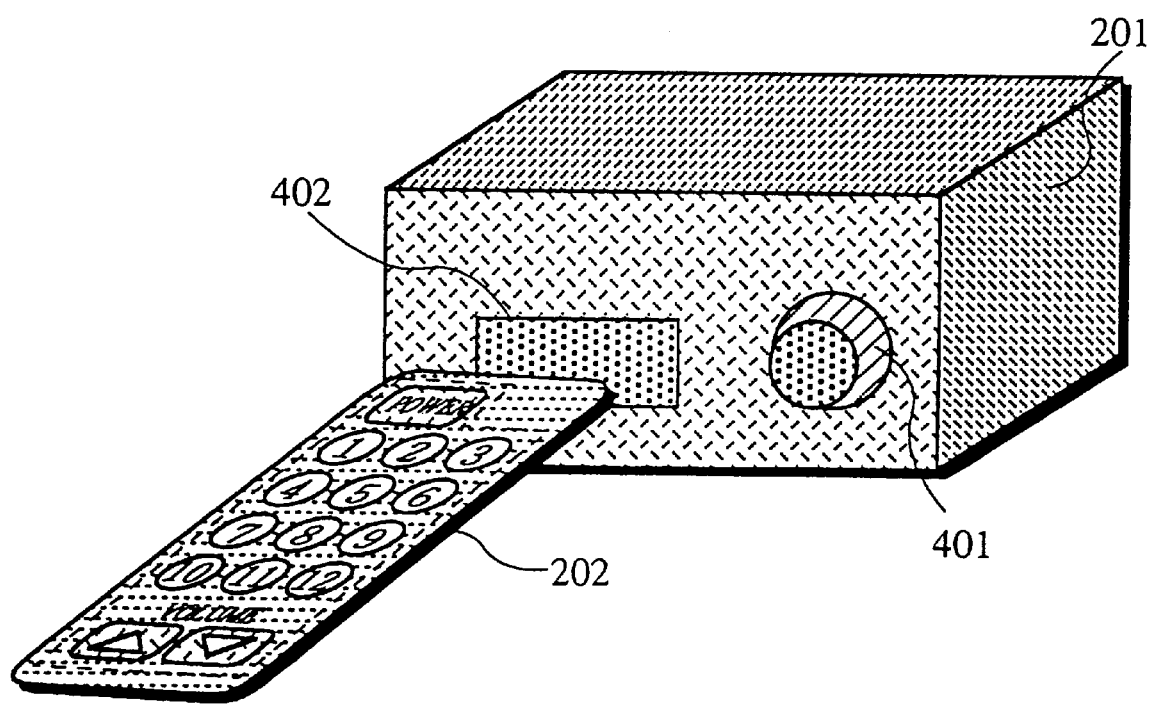
FIG. 5 is an outer perspective view of the remote controller unit and remote controller structure information supply unit furnished for the remote controller.

The RM-structure information is transmitted from the RM-structure information storage unit 203 to the RM unit 202 by rotating the toggle 401 while placing the RM unit 202 in an opposing position to the emitter 402 as shown in FIG. 5.

Figure 6:
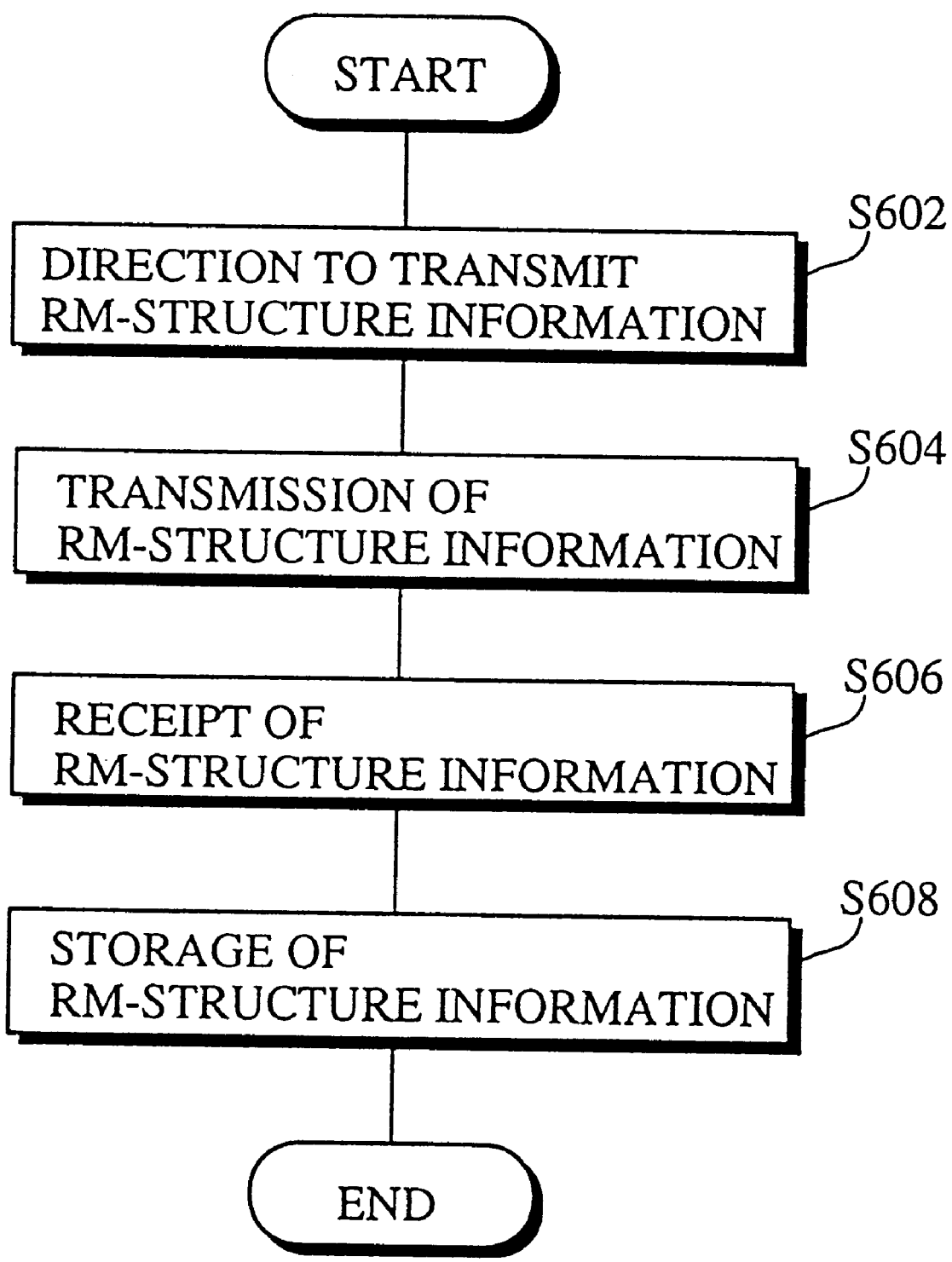
FIG. 6 is a flowchart detailing the operation of the remote controller in the first embodiment.

The operation related to this embodiment will be explained while referring to the flowchart in FIG. 6.

The user places the RM unit 202 in an opposing position to the emitter 402 of the RM-structure information supply unit 201, and rotates the toggle 401 of the RM-structure information supply unit 201. Then, the structure-information-transmission direction unit 205 directs the RM-structure information transmission unit 204 to transmit the control signal for the TV specified by the toggle 401 from the RM-structure information storage unit 202 (S602). Subsequently, the RM-structure information transmission unit 204 transmits the adequate control signal for the specified type of TV to the RM unit 202 (S604), and the structure information receipt unit 206 receives the control signal from the RM-structure information, transmission unit 204 (S606). Accordingly, the structure information storage unit 207 stores the control signal received by the structure information receipt unit 206 (S608). Having stored the control signal for the specified type of TV into the structure information storage unit 207, the RM unit 202 becomes able to control the specified type of TV.

According to the above structure, the structure information storage unit 207 does not have to store the control signals for all kinds of appliances in advance; it can obtain the adequate control signal for a specified type of appliance when necessary. Moreover, a new type of appliance can be placed under the control relatively easy.

In addition, a plurality of RM units 202 can be made for one RM-structure information supply unit 201, and each can receive the control signals for any desired appliances from an automatic information providing unit installed in the RM-structure information supply unit 201.

In this embodiment, the RM-structure information in the RM-structure information storage unit 203 are the control signals; however, it may be, for example, the information as to the appearance (color, design, etc.) or the button arrangement.

Although the appliances are the different types of TVs in this embodiment, they may be the VTRs or air conditioners. In this case, the RM-structure information storage unit 203 stores the control signals for these appliances, and the appearance of the RM unit 202 is modified accordingly.

Further, the RM-structure information storage unit 203, may store the control signals for a plurality of types of appliances in various kinds (TVs, VTRs, and air conditioners made by a plurality of makers).

The ultra red rays are used as the transmission path between the RM-structure information transmission unit 204 and structure information receipt unit 206; however, other transmission media such as radios or cables may be used as well.

The RM unit 202 may additionally include a lamp to indicate that it has stored the RM-structure information correctly. Further, the RM unit 202 may include a means to notify the user when the RM-structure information does not match with the button group 301 of the RM unit 202.

SECOND EMBODIMENT

Figure 7:
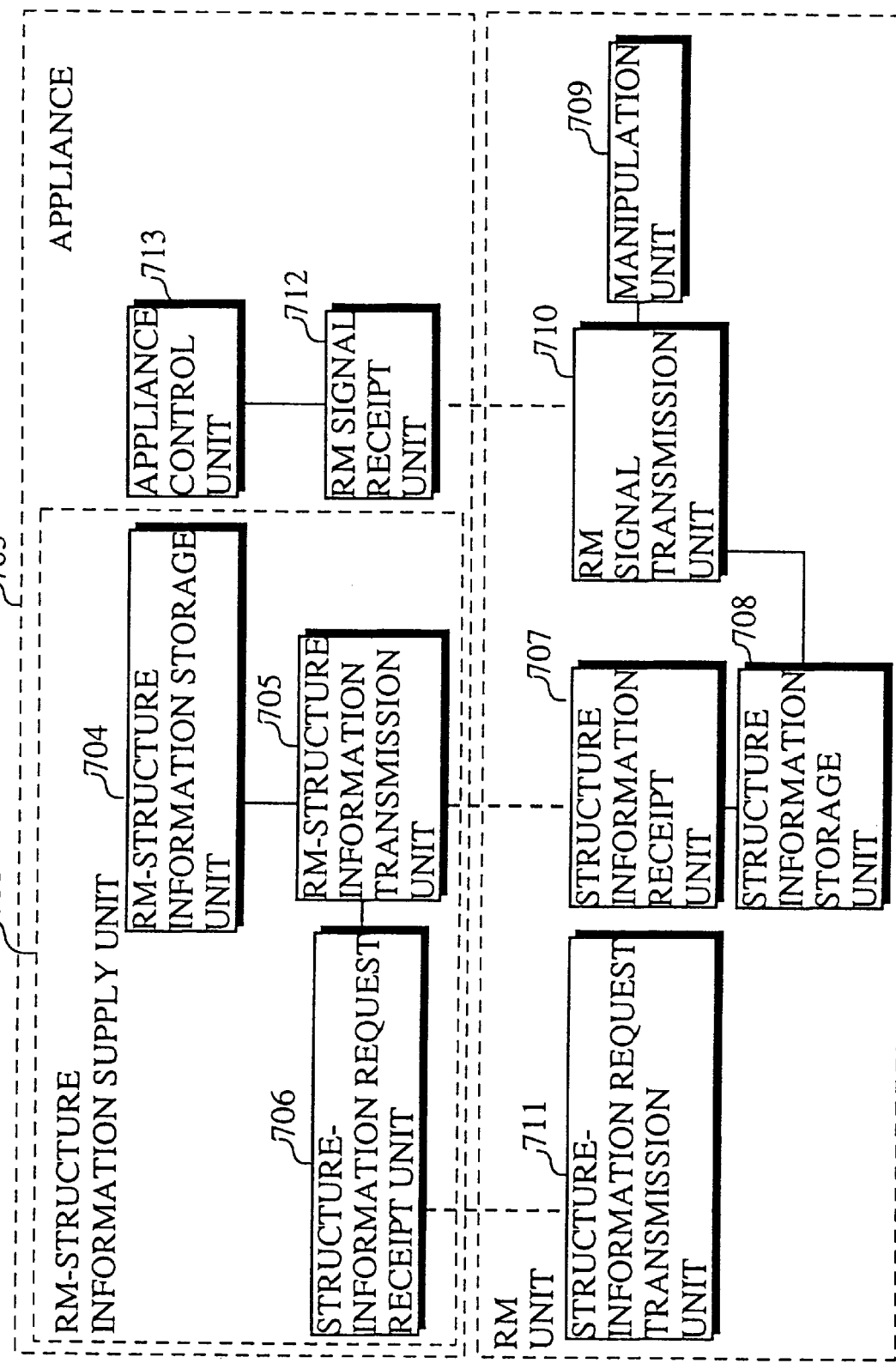
FIG. 7 is a view depicting a structure of a remote controller in accordance with the second embodiment of the present invention.

FIG. 7 is a view depicting the structure of a remote controller in accordance with the second embodiment of the present invention. The remote controller comprises a RM-structure information supply unit 701 and a RM unit 702. Note that the RM-structure information supply unit 701 is installed in an appliance 703.

The RM-structure information supply unit 701 includes a RM-structure information storage unit 704, a RM-structure information transmission unit 705, and a structure-information request receipt unit 706. The RM unit 702 includes a structure information receipt unit 707, a structure information storage unit 708, a manipulation unit 709, a RM signal transmission unit 710, and a structure-information request transmission unit 711.

The appliance 703 includes a RM signal receipt unit 712 and an appliance control unit 713.

More precisely, the RM-structure information supply unit 701 holds the information necessary for the RM unit 702 to control the appliance 703, and transmits the information to the RM unit 702 via a transmission path, or namely the ultra red rays. The RM unit 702 is manipulated by the user of the appliance 703. The appliance 703 is under the control of the RM unit 702.

The RM-structure information storage unit 704 stores RM-structure information, which is in effect the control signals transmitted from the RM unit 702 when controlling the appliance 703. In this embodiment, the control signals for all types of TVs are stored, so that the RM signal transmission unit 710 transmits an adequate control signal when a buttons of a button group 801 is pushed.

The RM-structure information transmission unit 705 transmits the RM-structure information to the RM unit 702 from the RM-structure information storage unit 704.

The structure-information request receipt unit 706 receives a RM-structure information request from the structure-information request transmission unit 711, and in response gives a direction to the RM-structure information transmission unit 705 to transmit the RM-structure information from the RM-structure information storage unit 704. The structure information receipt unit 707 receives the RM-structure information from the RM-structure information transmission unit 705. The structure information storage unit 708 stores the RM-structure information received by the structure information receipt unit 707. The manipulation unit 709 is manipulated by the user to control the appliance 703. The RM signal transmission unit 710 retrieves the control signal from the structure information storage unit 708 in accordance with a manipulation signal from the manipulation unit 709, and transmits the same to the appliance 703. The structure information request transmission unit 711 transmits a signal requesting the transmission of the RM-structure information necessary for the RM unit 702 to control the appliance 703. The RM signal receipt unit 712 receives the control signal from the RM signal transmission unit 710. The appliance control unit 713 activates the appliance 703 as per control signal received by the RM signal receipt unit 712.

Figure 8:
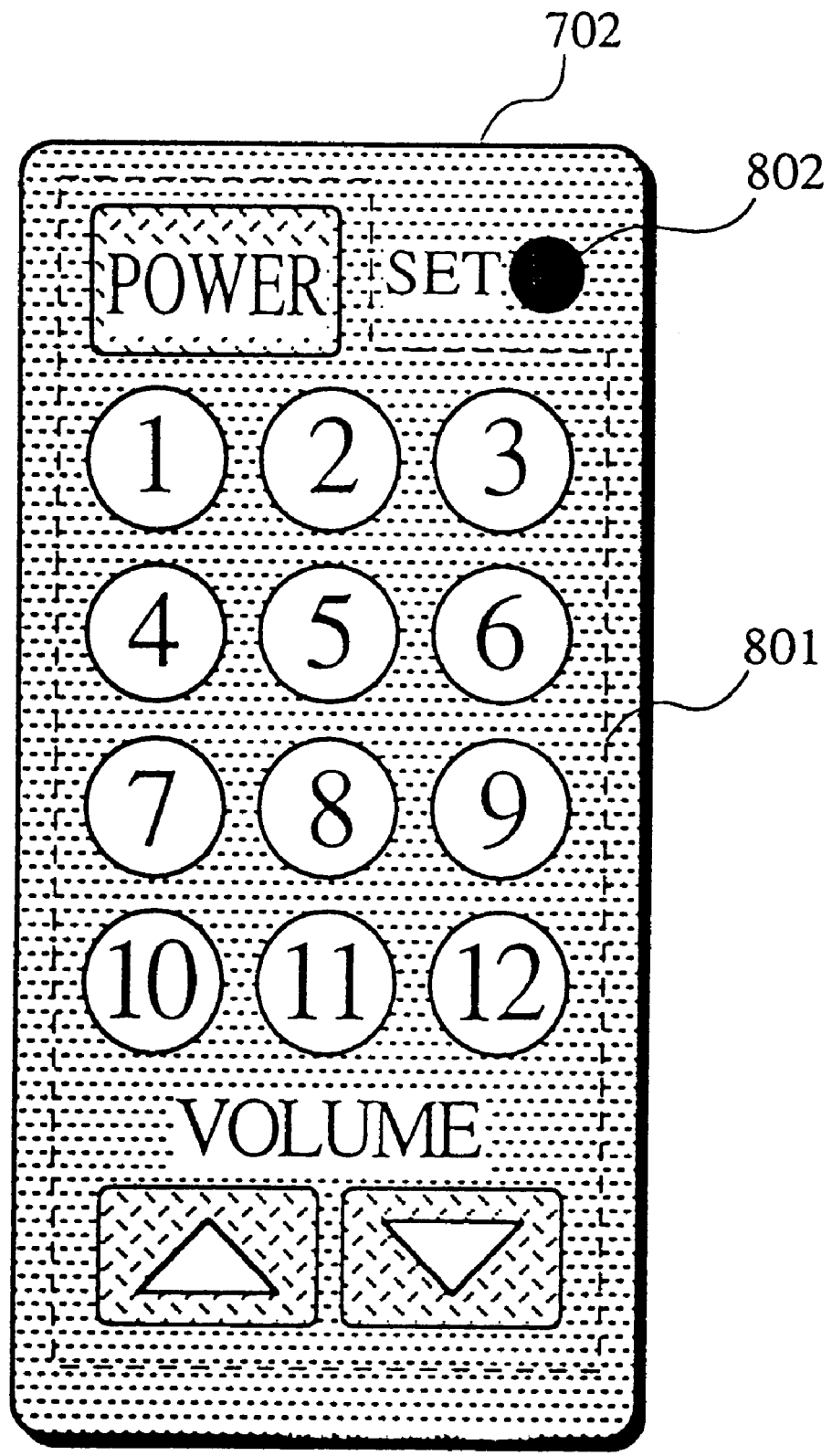
FIG. 8 is a front view of a remote controller unit in the remote controller in the second embodiment.

FIG. 8 is a front view of the RM unit 702, which is enclosed in a case, so that the user can hold it easily in hand when manipulating the same to control the appliance 703. Placed on the front surface of the RM unit 702 is the button group 801 and a set button 802. The former includes a plurality of the buttons to control the appliance 703 such as a power ON/OFF button, channel buttons, and volume buttons, and it forms a part of the manipulation unit 709. The latter is used to transmit a request to the RM-structure information supply unit 701 to transmit the control signal for the appliance 703 to the RM unit 702, and it forms a part of the structure-information request transmission unit 711.

Figure 9:
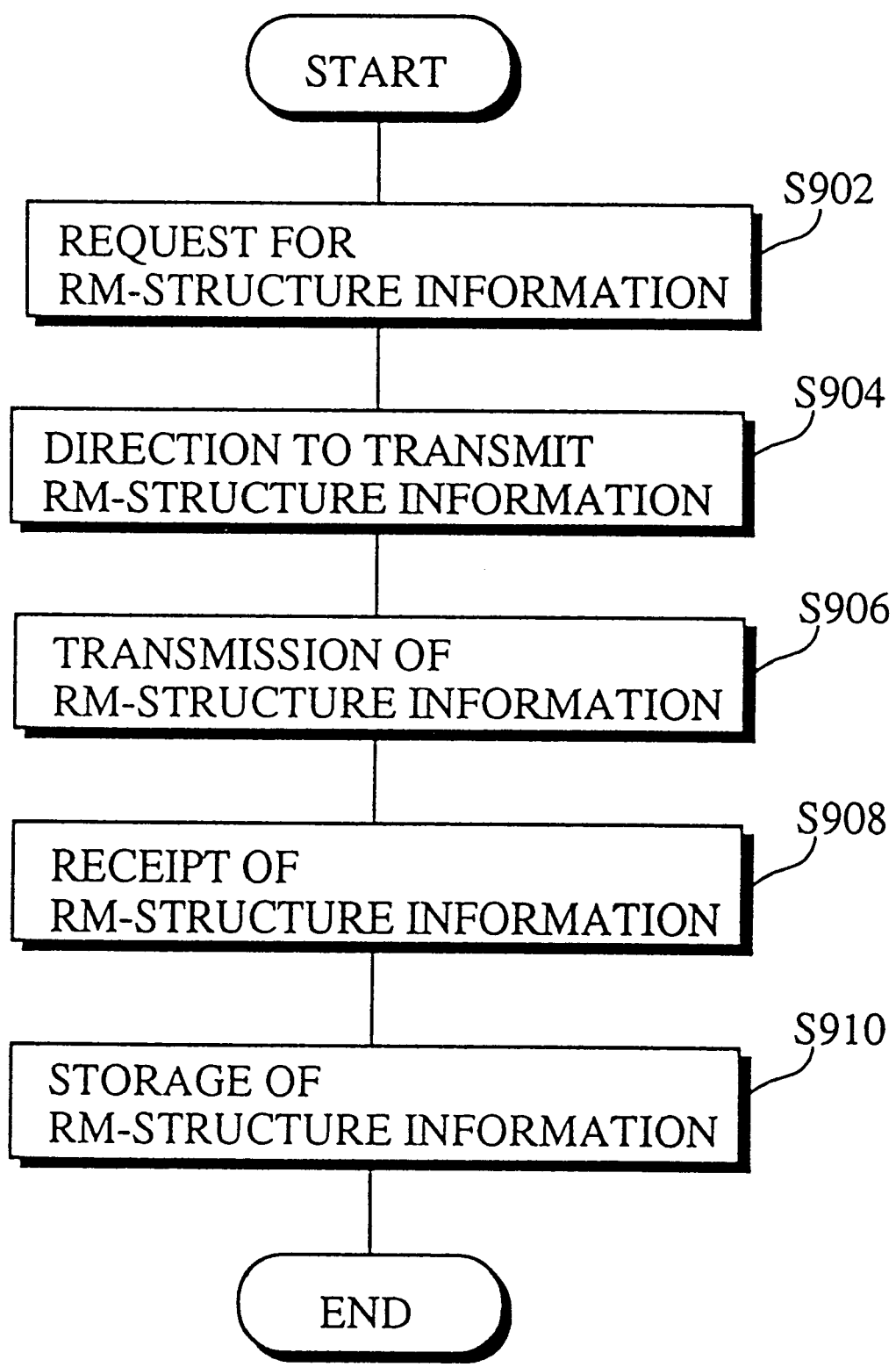
FIG. 9 is a flowchart detailing the operation of the remote controller in the second embodiment.
Figure 10:
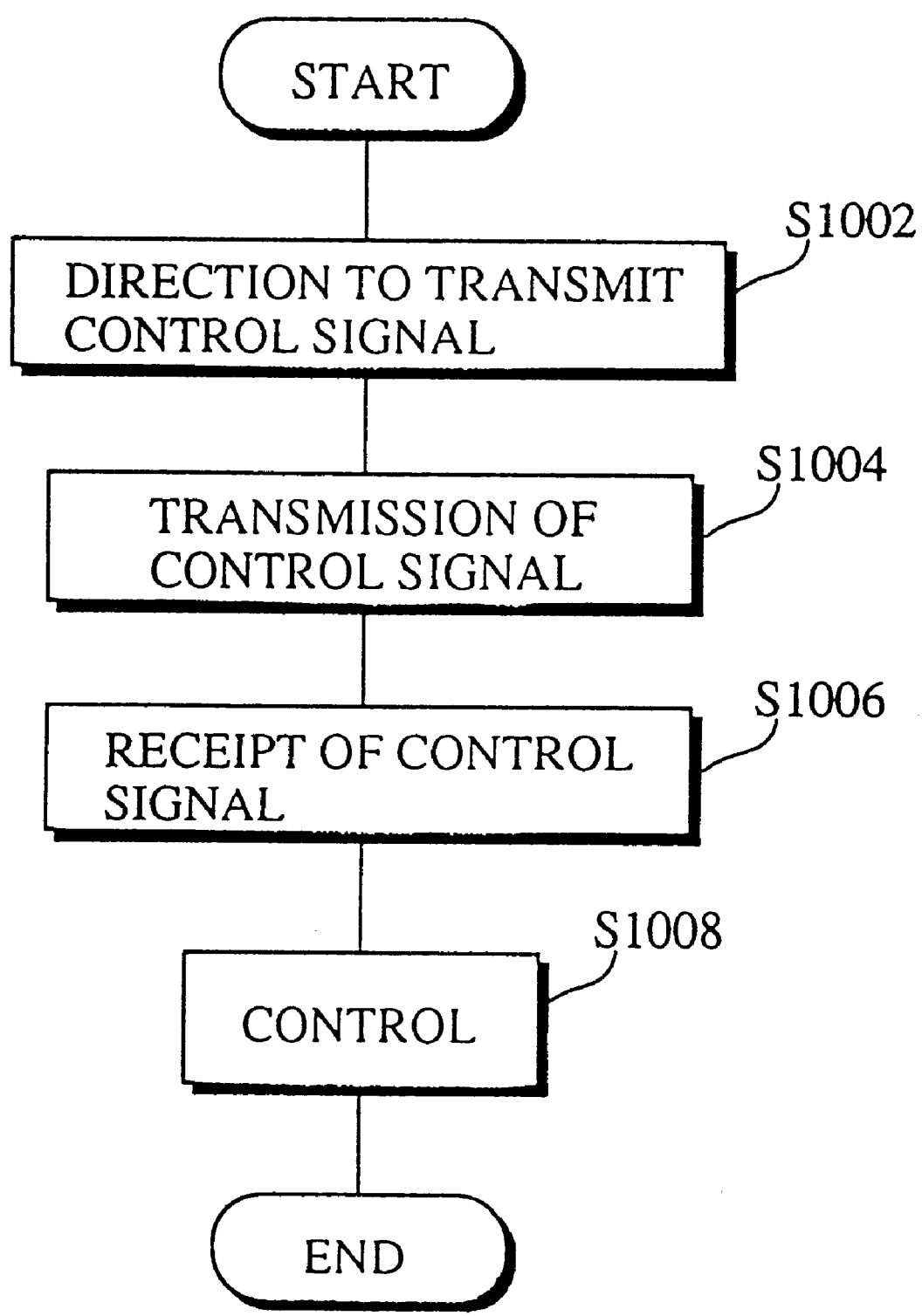
FIG. 10 is another flowchart detailing the operation of the remote controller in the second embodiment.

The operation related to this embodiment will be explained while referring to the flowcharts in FIGS. 9 and 10. The transmission paths in the form of the ultra red ray signals are secured between the structure-information request receipt unit 706 and structure-information request transmission unit 711, the RM-structure information transmission unit 705 and structure information receipt unit 707, and the RM signal. transmission unit 710 and RM signal receipt unit 712, respectively. More precisely, a ultra red ray signal transmitter is furnished in the RM unit 702 while a ultra red ray signal receiver is furnished in the appliance 703, and the transmission path is formed when these two units are placed in an opposing position.

To begin with, the user pushes the set button 802, then the structure-information request transmission unit 711 transmits a request to the RM-structure information supply unit 701 to transmit the control signal to the RM unit 702 (S902). Accordingly, the structure-information request receipt unit 706 receives the request from the structure-information request transmission unit 711, and gives a direction to the RM-structure information transmission unit 705 to transmit the control signal to the RM unit 702 from the RM-structure information storage unit 704 (S904). Subsequently, the RM-structure information transmission unit 705 transmits the control signal to the RM unit 702 from the RM-structure information storage unit 704 (S906), and the structure information receipt unit 707 receives the control signal from the RM-structure information transmission unit 705 (S908). Accordingly, the structure information storage unit 703 stores the control signal received by the structure information receipt unit 707 (S910). Having stored the control signal in the structure information storage unit 708 in this way, the RM unit 702 becomes able to control the appliance 703.

Further, the appliance 703 is controlled as follows. To begin with, the user pushes one of the buttons of the button group 801, then the manipulation unit 709 gives a direction to the RM signal transmission unit 710 to transmit the corresponding control signal (S1002). Accordingly, the RM signal transmission unit 710 transmits the control signal from the structure information storage unit 708 as per direction from the manipulation unit 709 to the appliance 703 (S1004), and the RM signal transmission unit 712 receives the control signal from the RM unit 702 (S1006). Then, the appliance control unit 713 activates and controls the appliance 703 as per control signal received by the RM signal reception unit 712 (S1008).

According to the above structure, the structure information storage unit 708 does not have to store the control signals for all the appliances in advance, and instead, receives the adequate control signal for the appliance 703 when necessary.

Unlike the first embodiment, the RM-structure information supply unit 701 is installed in the appliance 703, and thus the user neither has to specify the appliance nor direct the transmission of the RM-structure information, further facilitating the manipulation.

Although the appliances are various types of TVs made by a plurality makers in this embodiment, they may be the VTRs or air conditioners. In this case, the RM-structure information storage unit 704 stores the control signals for these appliances, and the appearance of the RM unit 702 is modified accordingly.

Further, the RM unit 702 may include a button group for controlling the TV and VTR, and the structure information storage unit 708 in the RM unit 702 may accordingly store the control signals for both the appliances.

The RM-structure information request is transmitted to the RM-structure information supply unit 701 by the pushing of the set button in the RM unit 702 by the user. However, signals may be transmitted at regular intervals from either the appliance 703 or RM unit 702, and the RM-structure information may be automatically transmitted upon detection of the signal.

Although ultra red ray signals are used as the transmission paths in this embodiment, other transmission media such as radios or cables are used as well. In particular, the RM-structure information may be transferred by means of a flexible disk between the RM-structure transmission unit 705 and structure information receipt unit 707 by installing flexible disk drives to the RM-structure information supply unit 701 and RM unit 702. Also, the RM unit 702 may additionally include a lamp to indicate that it has stored the RM-structure information correctly. Further, the RM unit 702 may include a means to notify the user when the RM-structure information does not match with the button group 801 of the RM unit 702.

THIRD EMBODIMENT

Figure 11:
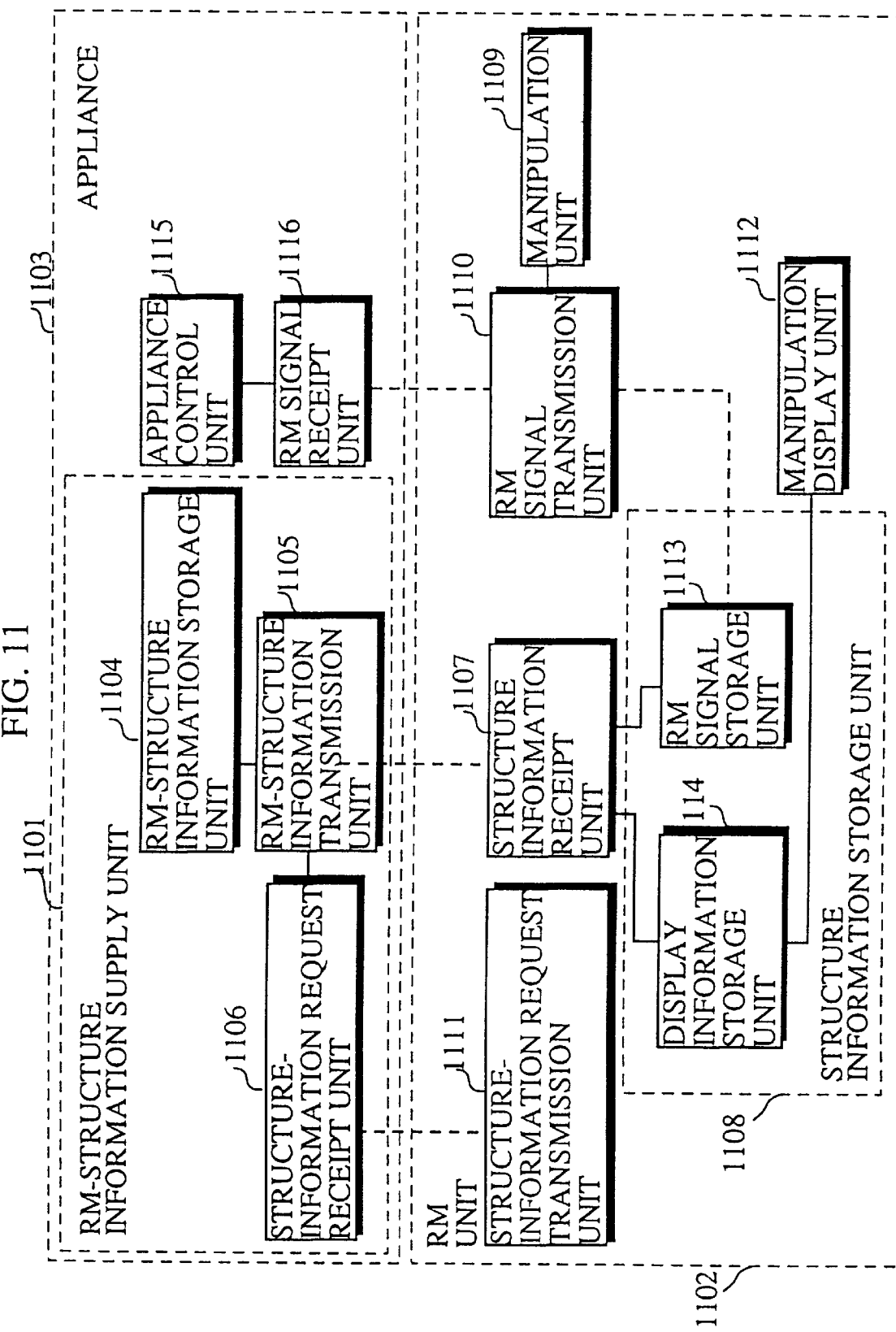
FIG. 11 is a view depicting a structure of a remote controller in accordance with a third embodiment of the present invention.

FIG. 11 is a view depicting the structure of a remote controller in accordance with the third embodiment of the present invention. The remote controller comprises a RM-structure information supply unit 1101 and a RM unit 1102; the RM-structure information supply unit 1101 is installed in an appliance 1103.

The RM-structure information supply unit 1101 includes a RM-structure information storage unit 1104, a RM-structure information transmission unit 1105, and a structure-information request receipt unit 1106. The RM 1102 includes a structure information receipt unit 1107, a structure information storage unit 1108, a manipulation unit 1109, a RM signal transmission unit 1110, a structure-information request transmission unit 1111, and a manipulation display unit 1112. The structure information storage unit 1108 includes a RM signal storage unit 1113 and a display information storage unit 1114. The appliance 1103 includes an appliance control unit 1115 and a RM signal receipt unit 1116.

The RM-structure information supply unit 1101 holds the information necessary for the RM unit 1102 to control the appliance 1103 and transmits the information to the RM unit 1102 via a transmission path. The RM unit 1102 is manipulated by the user of the appliance 1103. The appliance 1103 is under the control of the RM unit 1102. The RM-structure information storage unit 1104 stores RM-structure information, which is in effect a control signal transmitted from the RM unit 1102 in controlling the appliance 1103. The RM-structure information transmission unit 1105 transmits the RM-structure information to the RM unit 1102 from the RM-structure information storage unit 1104. The structure-information request receipt unit 1106 receives a RM-structure-information request from the structure-information request transmission unit 1111, and in response directs the RM-structure information transmission unit 1105 to transmit the RM-structure information from the RM-structure information storage unit 1104. The structure information receipt unit 1107 receives the RM-structure information from the RM-structure information transmission unit 1105. The structure information storage unit 1108 stores the RM-structure information received by the structure information receipt unit 1107. The manipulation unit 1109 is used to manipulate the user to control the appliance 1103. The RM signal transmission unit 1110 retrieves the control signal from the RM signal storage unit 1113 as per manipulation signal from the manipulation unit 1109, and transmits the same to the appliance 1103. The structure-information request transmission unit 1111 transmits a signal requesting the RM-structure information necessary for the RM unit 1102 to control the appliance 1103. The manipulation display unit 1112 displays figures such as soft buttons, or objects in a user interface screen. The soft buttons referred herein are not the physical buttons, but the buttons actively displayed on an LC (Liquid Crystal) display at the bottom of an LC touch panel 1201 by an application program, and serve as the physical buttons. The RM signal storage unit 1113 stores the control signal the RM unit 1102 transmits when controlling the appliance 1103. The display information storage unit 1114 stores the data the manipulation display unit 1112 displays. The appliance control unit 1115 activates and controls the appliance 1103 as per control signal received by the RM signal receipt unit 1116. The RM signal receipt unit 1116 receives the control signal transmitted from the RM signal transmission unit 1110.

Figure 12:
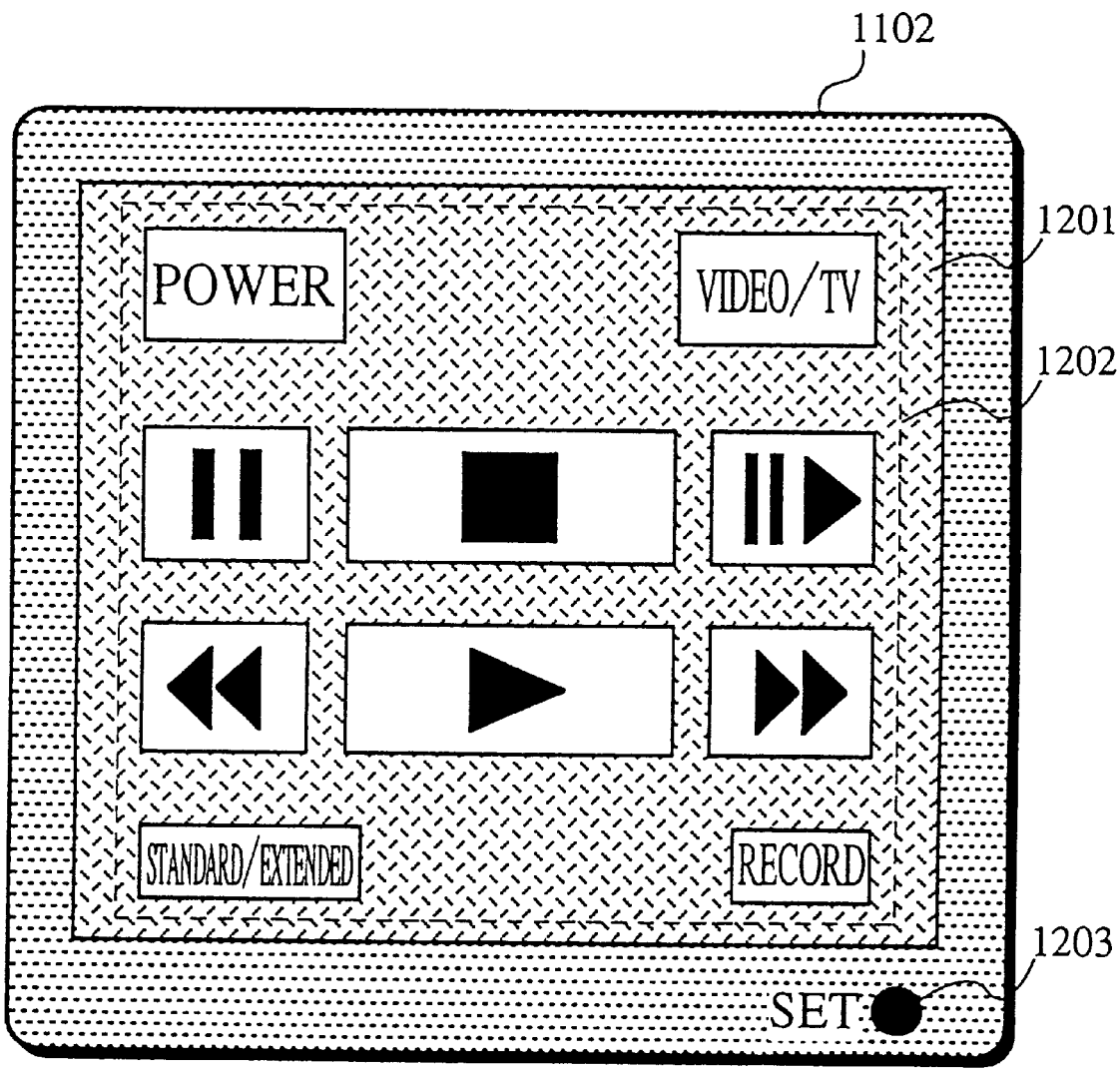
FIG. 12 is a front view of a remote controller unit in the remote controller in the third embodiment.
Figure 13:
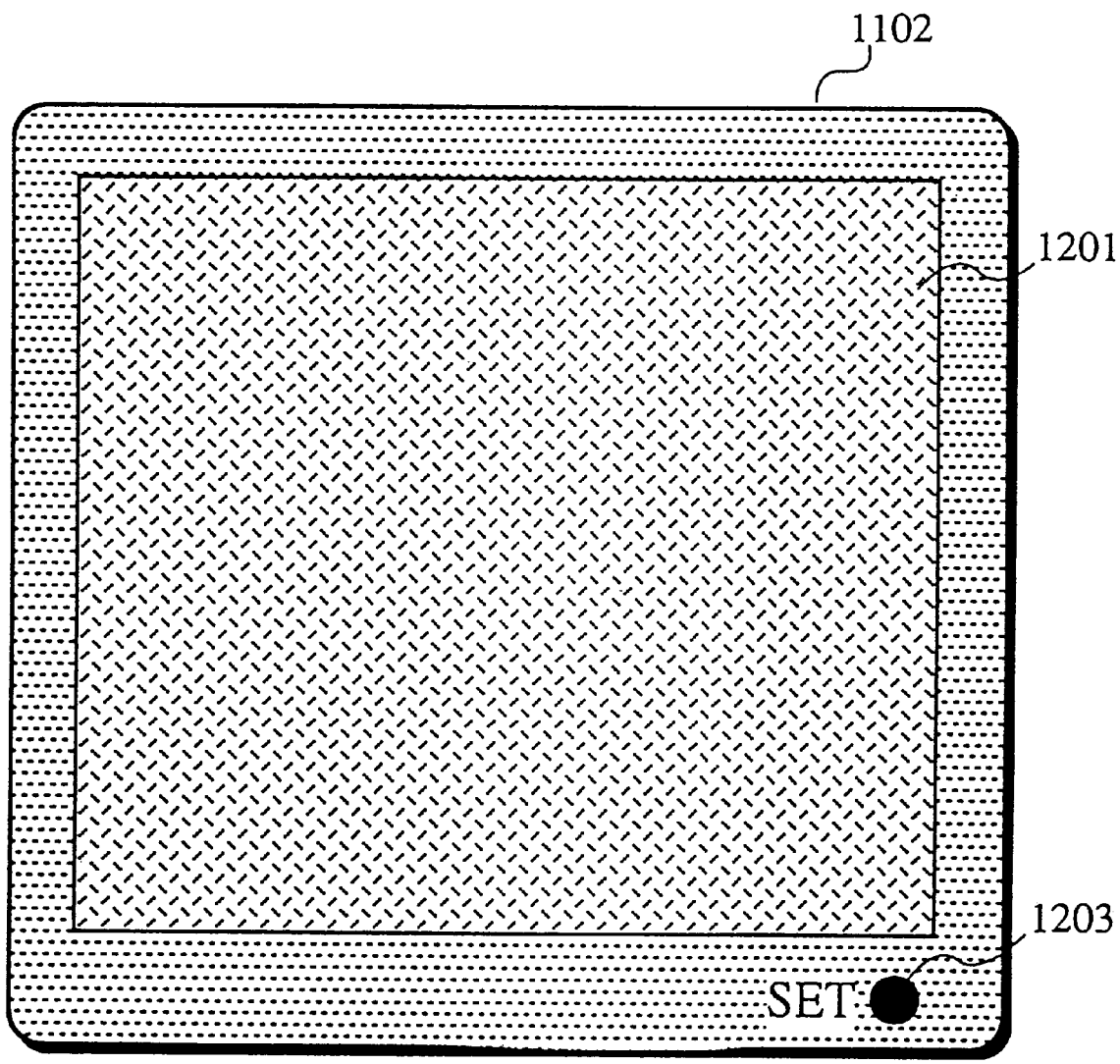
FIG. 13 is another front view of the remote controller unit in the remote controller in the third embodiment.
Figure 14:
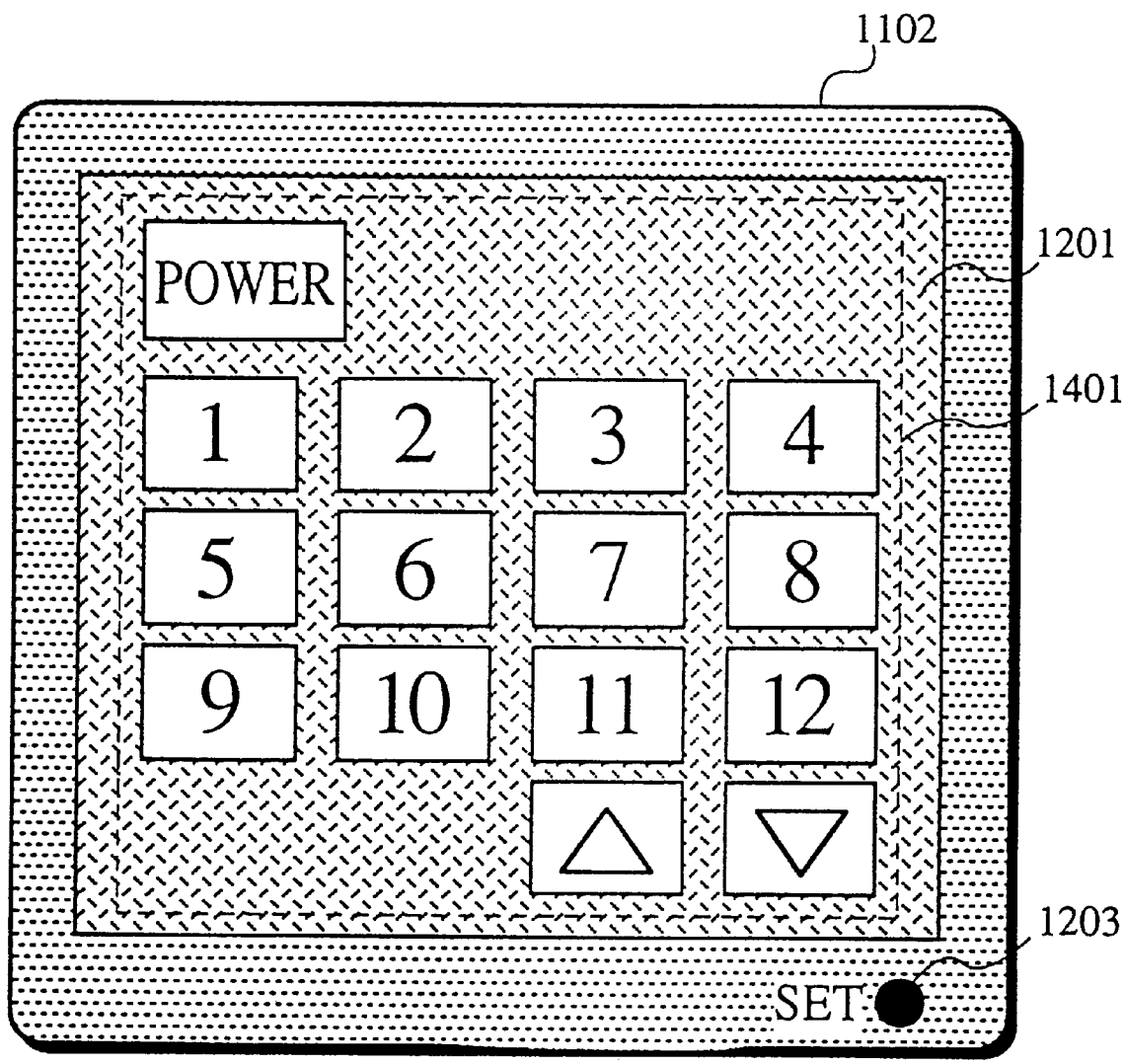
FIG. 14 is another front view of the remote controller unit in the remote controller in the third embodiment.

FIG. 12 is a front view of the RM unit 1102. The RM unit 1102 is inclosed in a case, and is manipulated by the user to control the appliance 1103. Placed on the front surface of the RM 1102 are the LC touch panel 1201 and a set button 1203 as shown in FIG. 13. The LC touch panel 1201 serves as both the LC display and the touch panel and displays a soft button group 1202 for controlling the appliance 1103 such as the TV or VTR. FIG. 12 shows the LC touch panel displaying the soft button group 1202 for controlling the VTR, while FIG. 14 shows the LC touch panel 1201 displaying a soft button group 1401 for controlling the TV. The touch panel of the LC touch panel 1201 forms a part of the manipulation unit 1109, and the display of the LC touch panel 1201 forms a part of the manipulation display 1112. The set button 1203 is used to transmit a request to the RM-structure information supply unit 1101 in the appliance 1103 to transmit the control signal for the appliance 1103 and the information related to the soft button group 1202 to be displayed on the LC touch panel 1201. The set button 1203 forms a part of the structure-information request transmission unit 1111. Note that the RM-structure information storage unit 1104 stores the information related to the soft button group 1202 in relation with the control signals the RM signal transmission unit 1110 transmits when a soft button of the soft button group 1202 is pushed.

Figure 15:
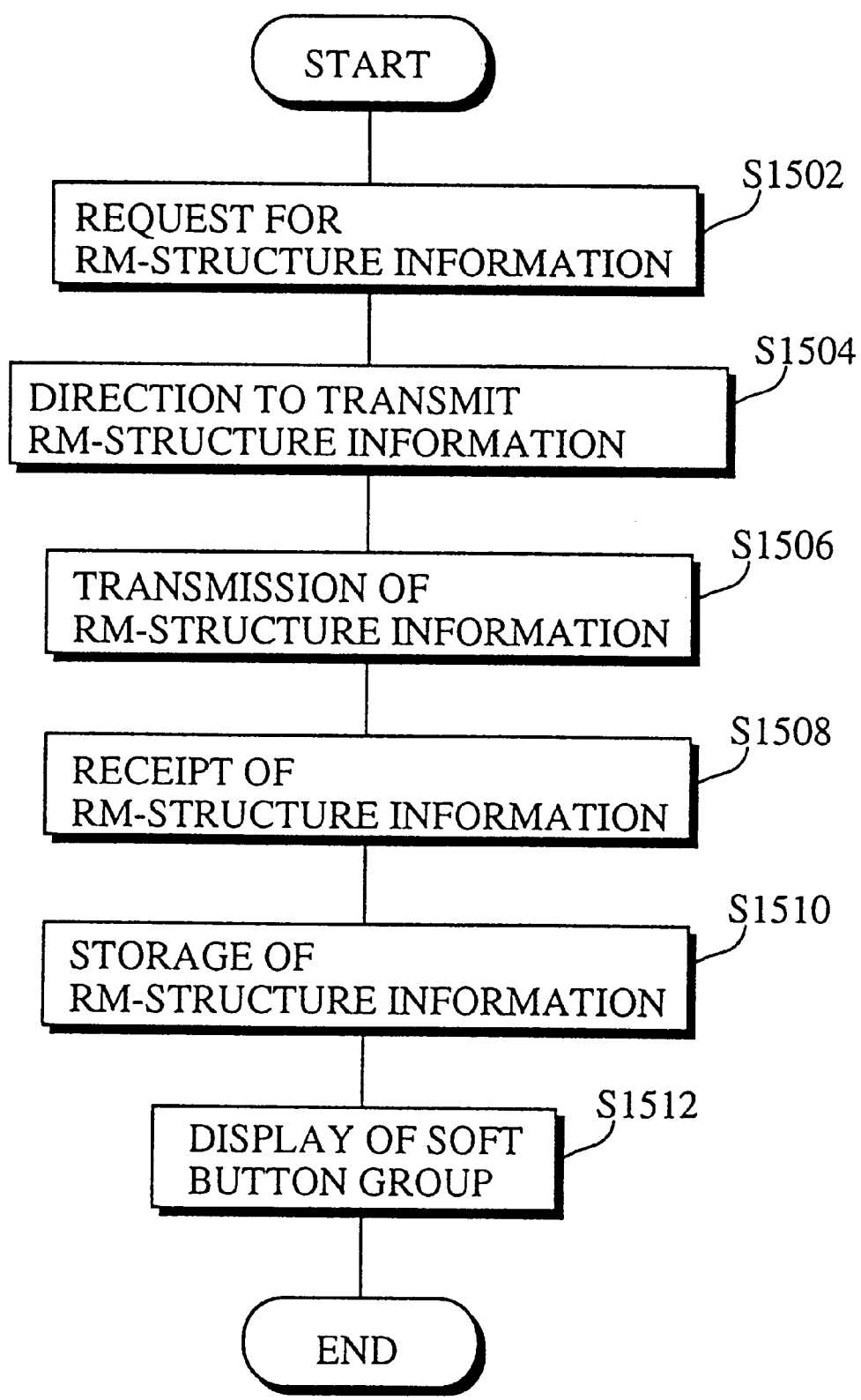
FIG. 15 is a flowchart detailing the operation of the remote controller in the third embodiment.
Figure 16:
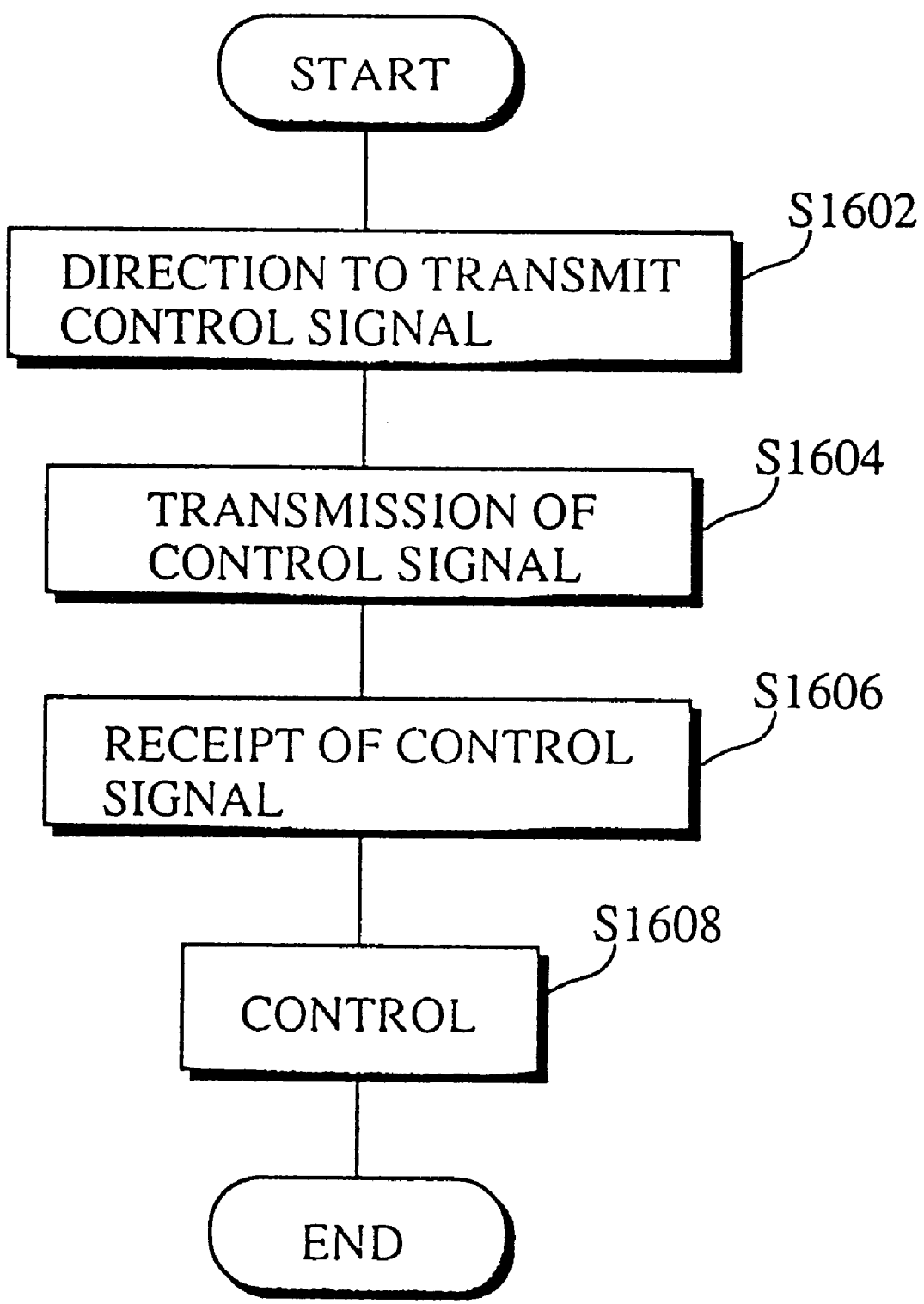
FIG. 16 is another flowchart detailing the operation of the remote controller in the third embodiment.

Next, the operation related to this embodiment will be explained while referring to the flowcharts in FIGS. 15 and 16.

Assume that the LC touch panel 1201 displays nothing as shown in FIG. 13. Then, when the user pushes the set button 1203, the structure-information request transmission unit 1111 transmits a request to the structure-information request receipt unit 1106 to transmit the RM-structure information to the RM unit 1102 (S1502). Upon receipt of the transmission request from the structure-information request transmission unit 1111, the structure-information request receipt unit 1106 directs the RM-structure information transmission unit 1105 to transmit the information related to the soft button group 1202 and control signal from the RM-structure information storage unit 1104 (S1504). Subsequently, the RM-structure information transmission unit 1105 transmits the information related to the soft button group 1202 and the control signal to the RM unit 1102 (S1506), and the structure information receipt unit 1107 receives the same (S1508). Accordingly, the RM signal storage unit 1113 stores the control signal while the display information storage unit 1114 stores the information related to the soft button group 1202 (S1510). Then, the manipulation display unit 1112 displays the soft button group 1202 as shown in FIG. 12 on the LC touch panel 1201 using the information stored in the display information storage unit 114 (S1512). In this way, the RM unit 1102 stores the control signal for the appliance 1103 into the RM signal storage unit 1113, and stores the information related to the soft button group 1202 in the display information storage unit 1114, and becomes able to control the appliance 1103. Note that each soft button of the soft button group 1202 on the LC touch panel 1201 corresponds to the individual control signals stored in the RM signal storage unit 1113.

Next, when the user selectively pushes a soft button of the soft button group 1202, the manipulation unit 1109 directs the RM signal transmission unit 1110 to transmit the control signal (S1602). Thus, the RM signal transmission unit 1110 transmits the control signal to the appliance 1103 from the RM signal storage unit 1113 as per direction from the manipulation unit 1109 (S1604), and the RM signal receipt unit 1116 receives the control signal from the RM unit 1102 (S1606). Accordingly, the appliance control unit 1115 controls and activates the appliance as per control received by the RM signal receipt unit 1116 (S1608).

If the appliance 1103 is the TV, the remote controller operates in the same manner as above; however, the LC touch panel 1201 displays the soft button group 1401 as shown in FIG. 14 for controlling the TV, and the control signals assigned to each soft button in the soft button group 1401 are stored in the RM unit 1102.

According to the above construction, the RM unit 1102 has to store neither the control signal for the appliance 1103 nor the user interface such as the control buttons in advance, and instead, it stores the adequate control signal and user interface screen for a desired appliance when necessary. When the conventional remote controller controls a plurality kinds of appliances including the TV, VTR, CD player, and tuner, it must include a plurality of buttons: channel buttons and volume buttons for the TV, playback button, stop button, and record button for the VTR, the play button, track selection button for the CD player, and the tuning button for the tuner, as well as the control signals for each button. The number of the buttons further increases when one kind of appliance includes a plurality of types. However, the remote controller in this embodiment neither has to include these buttons nor store the control signals in advance. Moreover, the remote control can place a new household appliance under the control easily.

Figure 17:
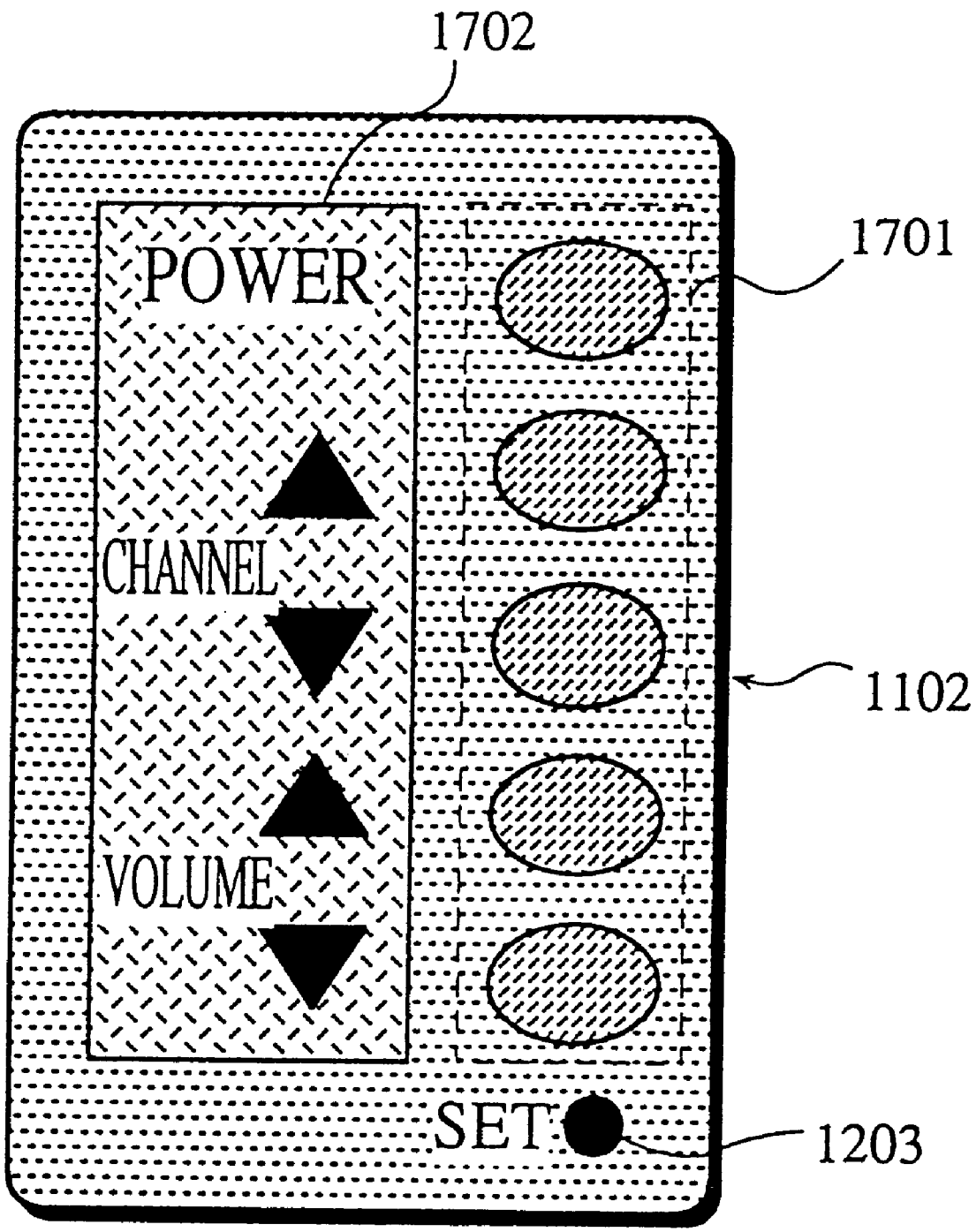
FIG. 17 is a front view of a modified remote controller unit in the third embodiment.

In this embodiment, the soft button group 1202 is displayed on the LC touch panel 1201. However, as shown in FIG. 17, a physical button group and the LC display unit may be combined to display the functions of each button on an LC display 1702.

The RM-structure information supply unit 1101 or RM unit 1102 may include a means for specifying attribute of the RM-structure such as "normal", "child", "elder". Thus, if "elder" is specified, larger soft buttons will appear on the LC touch panel 1201 compared with those appearing upon specifying "normal", and if "child" is specified, the soft buttons will appear in a simpler way on the LC touch panel 1201.

Also, the size or position of the objects to be manipulated may be customized by the user with the RM remote controller 1102.

FOURTH EMBODIMENT

Figure 18:
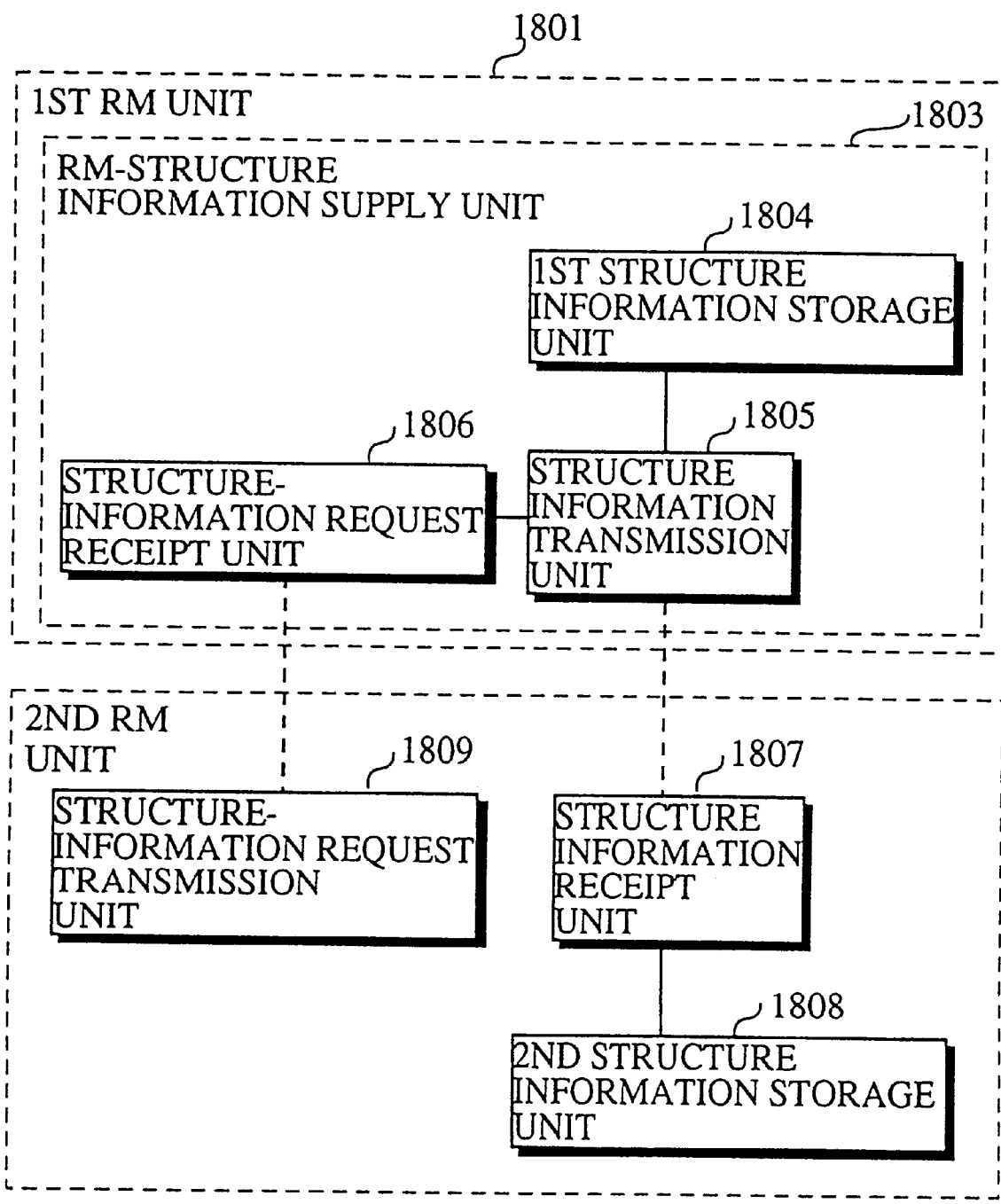
FIG. 18 is a view depicting a structure of a remote controller in accordance with a fourth embodiment.

FIG. 18 is a view depicting the structure of a remote controller in accordance with the fourth embodiment of the present invention. The remote controller comprises a RM-structure information supply unit 1803 and a second RM unit 1802. The RM-structure information supply unit 1803 is enclosed in a first RM unit 1801, and the appliances are not shown in the drawing.

The RM-structure information supply unit 1803 includes a first structure information storage unit 1804, a structure information transmission unit 1805, and a structure-information request receipt unit 1806. The second RM unit 1802 includes a structure information receipt unit 1807, a second structure information storage unit 1808, and a structure-information request transmission unit 1809.

The first RM unit 1801 controls predetermined appliances, and the second RM unit 1802 is manipulated by the user to control the appliances. The RM-structure information supply unit 1803 holds the information necessary for the second RM unit 1802 to control the appliances and transmits the same to the second RM unit 1802 via a transmission path, or namely ultra red rays. The first structure information storage unit 1804 stores RM-structure information. The RM-structure information referred herein includes the information related to each object to be manipulated such as buttons furnished with the first RM unit 1801, and the control signals assigned for each object that the second RM unit 1802 transmits when the object is manipulated. The structure information transmission unit 1805 transmits the RM-structure information to the second RM unit 1802 from the first structure information storage unit 1804. The structure-information request receipt unit 1806 receives a structure information request from the structure-information request transmission unit 1809, and in response gives a direction to the structure information transmission unit 1805 to transmit the content of the first structure information storage unit 1804 to the second RM unit 1802. The structure information receipt unit 1807 receives the RM-structure information from the structure information transmission unit 1805. The second structure information storage unit 1808 stores the RM-structure information received by the structure information receipt unit 1807. Note that a manipulation means, a RM signal transmission means, and manipulation display means in the second RM unit 1802 are not shown in the drawing.

Figure 19:
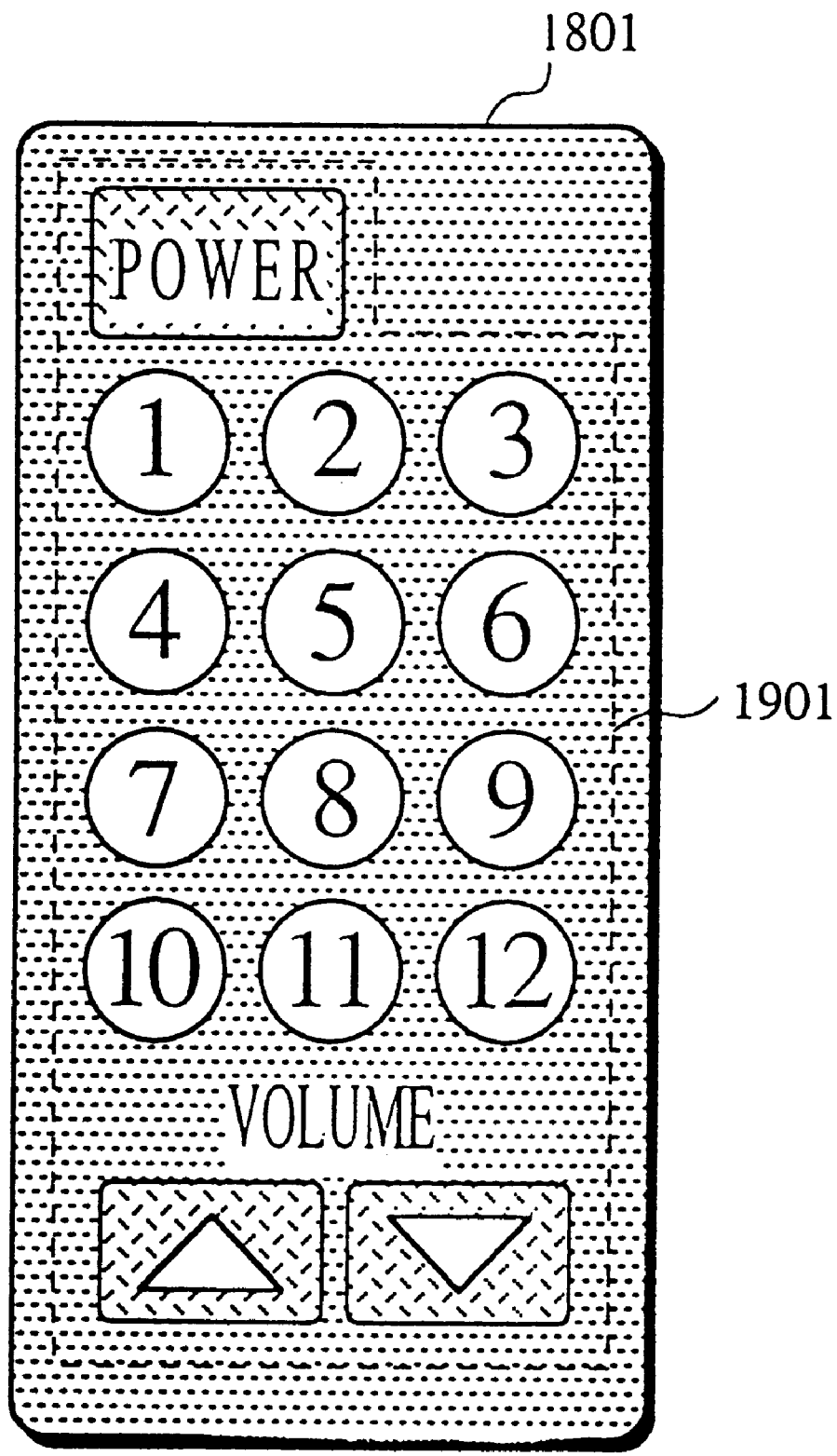
FIG. 19 is a front view of a first remote controller unit in the remote controller in the fourth embodiment.

FIG. 19 is a front view of the first RM unit 1801. Placed on the front surface of the first RM unit 1801 is a button group 1901. The button group 1901 is used to control the TV as an example of the appliance, and it includes a power button, channel buttons, and volume buttons.

Figure 20:
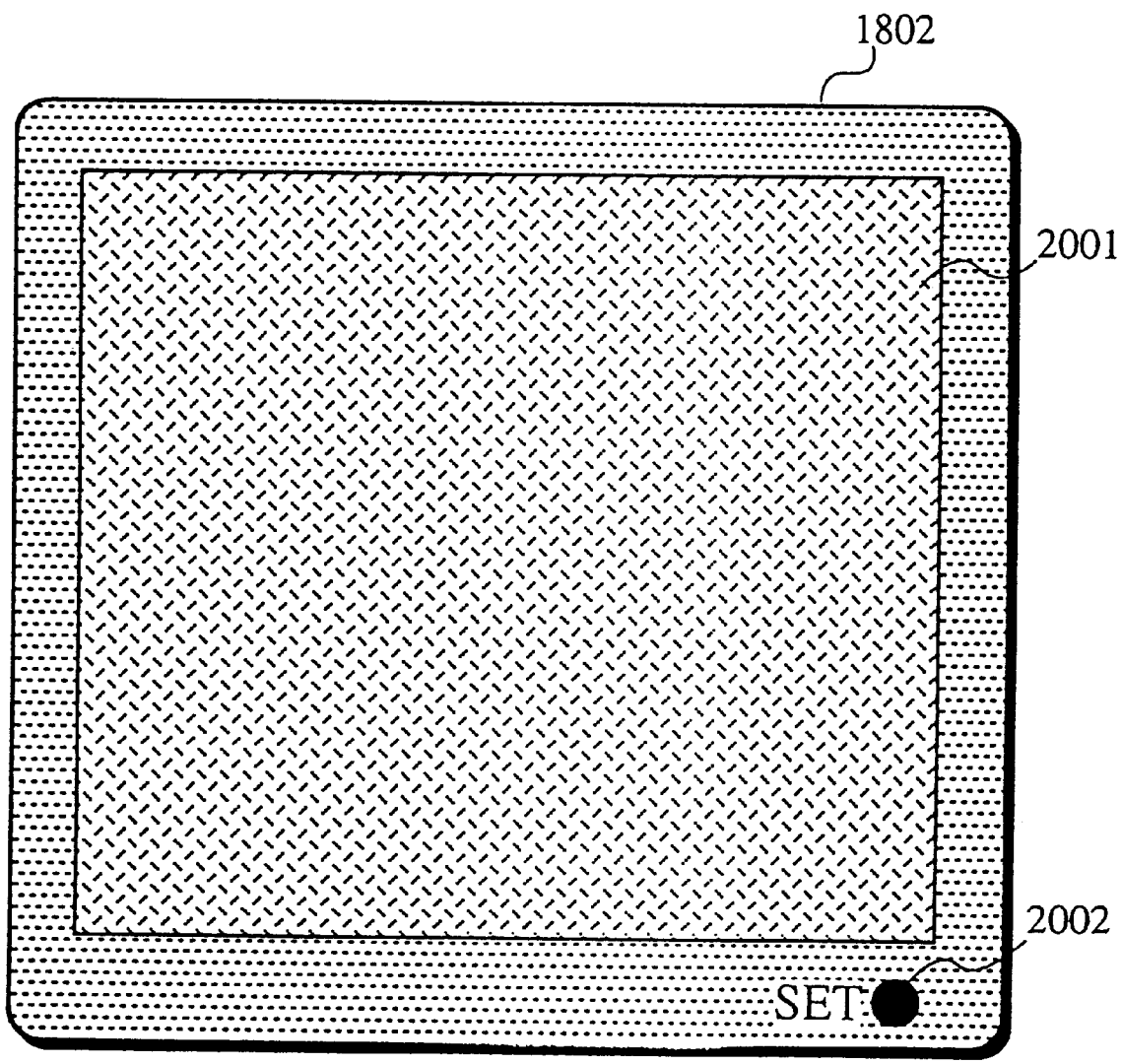
FIG. 20 is a front view of a second remote controller unit in the remote controller in the fourth embodiment.

FIG. 20 is a front view of the second RM unit 1802. Place on the front surface of the second RM unit 1802 are an LC touch panel 2001 and a set button 2002. The LC touch panel 2001 serves as an output unit (LC display) and also as an input unit (touch panel). The set button 2002 is used to transmit a request to the first RM unit 1801 to transmit the control signal and the information related to the soft button group 1901 to be displayed on the LC touch panel 2001 to the second RM unit 1802. The set button 2002 forms a part of the structure-information request transmission unit 1809.

Figure 21:
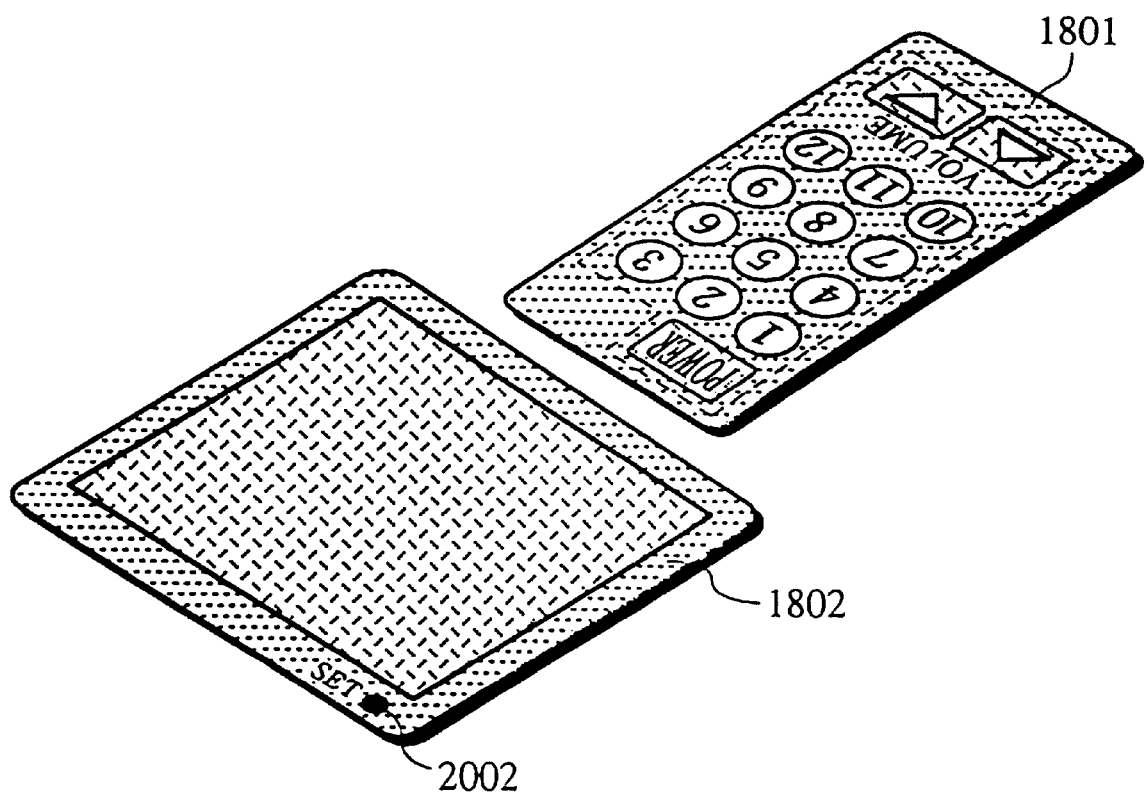
FIG. 21 is an outer perspective view of the first and second remote controller units in the remote controller in the fourth embodiment.
Figure 22:
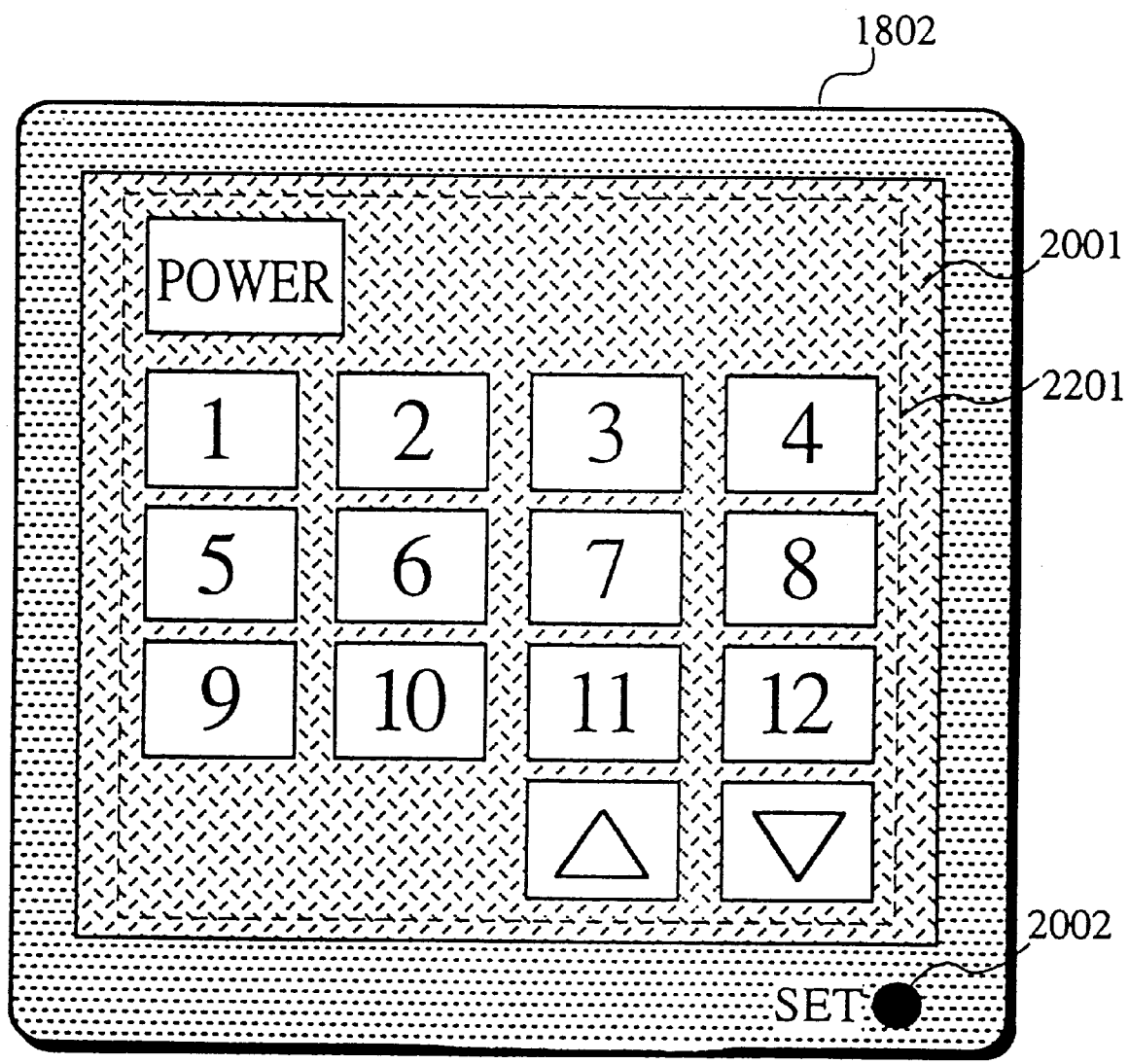
FIG. 22 is another front view of the second remote controller unit in the remote controller in the fourth embodiment.

A soft button group 2201 as shown in FIG. 22 will be displayed on the LC touch panel 2001 by placing the first RM unit 1801 in an opposing position to the second RM unit 1802 and pushing the set button 2002 as shown in FIG. 21.

Figure 23:
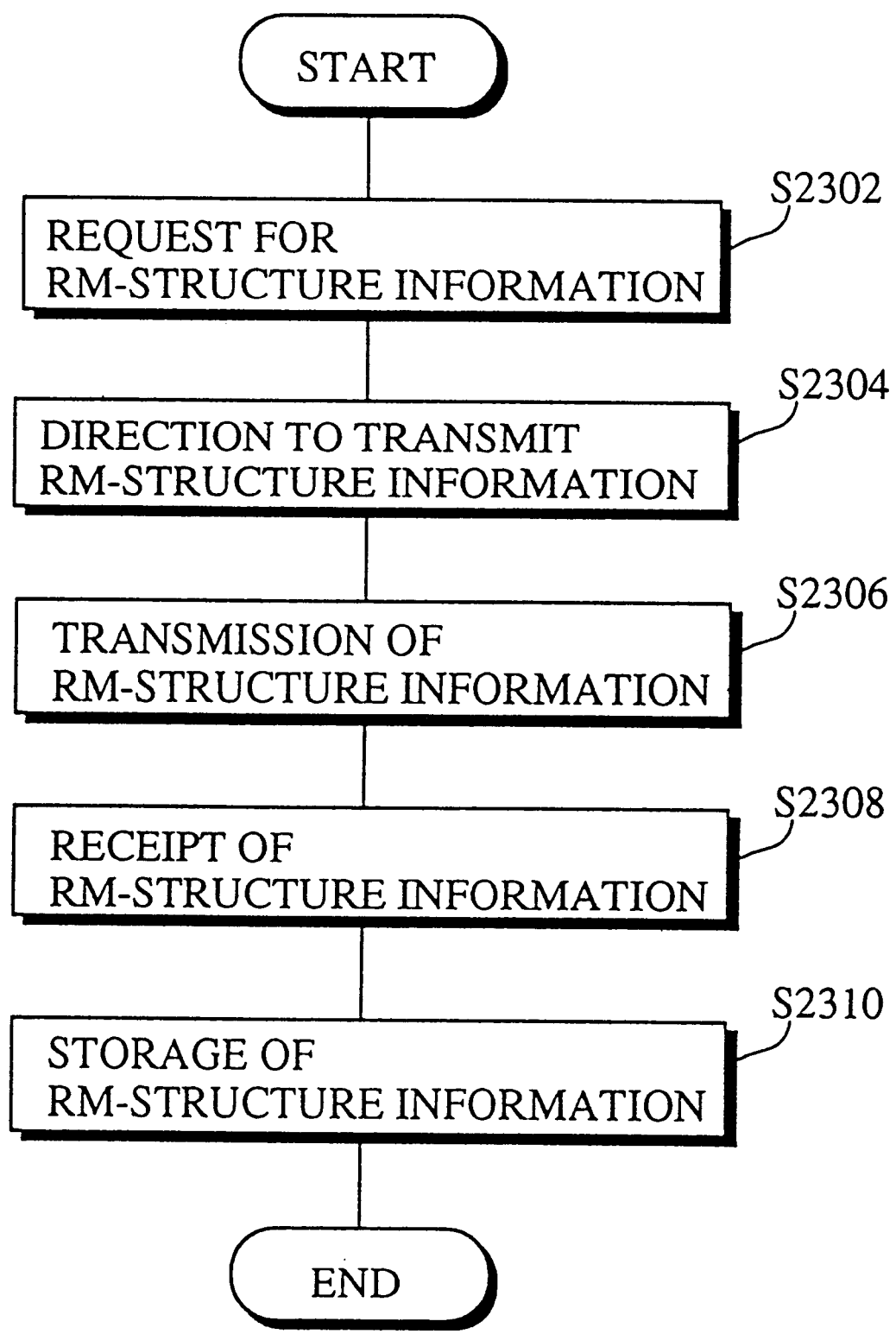
FIG. 23 is a flowchart detailing the operation of the remote controller in the fourth embodiment.

Next, the operation related to this embodiment will be explained while referring to the flowchart in FIG. 23.

When the user pushes the set button 2002 while placing the first RM unit 1801 in an opposing position to the second RM unit 1802, the RM-structure request transmission unit 1809 transmits a request to the first RM unit 1801 to transmit the control signal and the information related to the soft button group 2201 to be displayed on the LC touch panel 2001 to the second RM unit 1802 (S2302). Upon receipt of the transmission request, the structure-information request receipt unit 1806 gives a direction to the structure information transmission unit 1805 to transmit the control signal and the information related to the soft button group 2201 from the structure information storage unit 1804 (S2304). Accordingly, the structure information transmission unit 1805 retrieves the control signal and the information related to the soft button group 2201 from the first structure information storage unit 1804 and transmits the same to the second RM unit 1802 (S2306). Then, the structure information receipt unit 1807 receives the control signal and the information related to the soft button group 2201 from the structure information transmission unit 1805 (S2308). Accordingly, the second structure information storage unit 1808 stores the control signal and information related to the soft button group 2201 received by the structure information receipt unit 1807 (S2310). In this way, the second RM unit 1802 obtains all the functions the first RM unit 1801 has, and the soft button group 2201 as shown in FIG. 22 is displayed on the LC touch panel 2001.

According to the above structure, the second RM unit 1802 can actively retain the same functions as the first RM unit 1801. For this reason, the second RM unit 1802 does not have to include a plurality of buttons for all the available functions like a conventional self-learning remote controller, which can be customized in a desired manner. Further, the second RM unit 1802 does not have to store the control signals assigned for each button.

In this embodiment, the RM-structure information is transmitted from the first structure information storage unit 1804 when the structure-information request receipt unit 1806 in the first RM unit 1801 receives the transmission request from the structure-information request transmission unit 1809 in the second RM unit 1802. However, a structure-information-transmission direction unit may be installed instead of the structure-information request transmission unit 1809 and structure-information request receipt unit 1806, and a structure-information-receipt direction unit may be installed in the second RM unit 1802, so that the structure information transmission unit 1805 and structure information receipt unit 1807 may be activated as per direction from these units. The directions are transmitted by the pushing of a corresponding button on the first RM unit 1801 and the second RM unit 1802.

FIFTH EMBODIMENT

Figure 24:
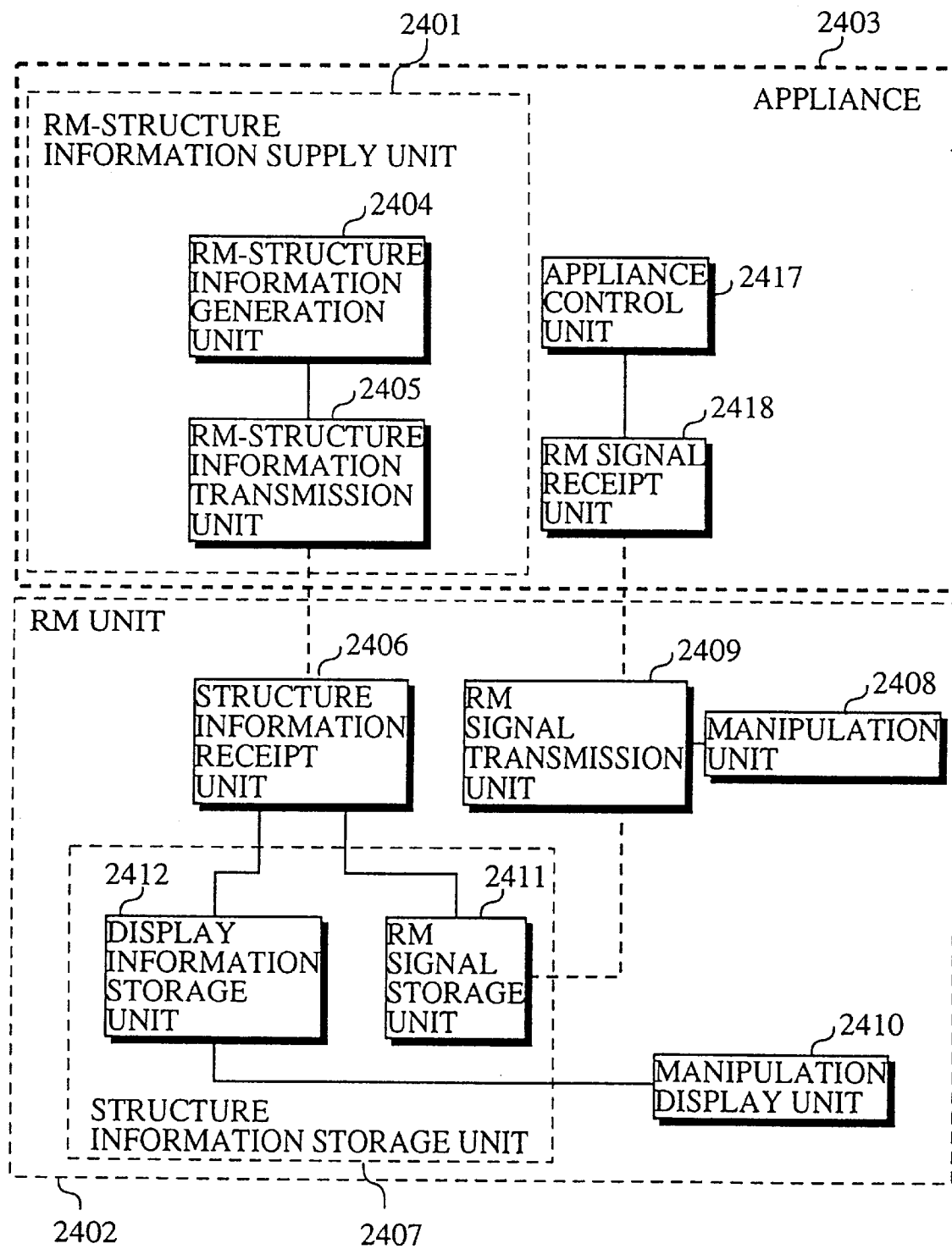
FIG. 24 is a view depicting a structure of a remote controller in accordance with a fifth embodiment of the present invention.

FIG. 24 is a view depicting the structure of a remote controller in accordance with the fifth embodiment of the present invention. The remote controller comprises a RM-structure information supply unit 2401 and a RM unit 2402; the RM-structure information supply unit 2401 is installed in an appliance 2403.

The RM-structure information supply unit 2401 includes a RM-structure information generation unit 2404, a RM-structure information transmission unit 2405. The RM unit 2402 includes a structure information receipt unit 2406, a structure information storage unit 2407, a manipulation unit 2408, a RM signal transmission unit 2409, and a manipulation display unit 2410. The structure information storage unit 2407 includes a RM signal storage unit 2411 and a display information storage unit 2412. The appliance 2403 includes an appliance control unit 2417 and a RM signal receipt unit 2418.

The RM-structure information supply unit 2401 holds the information necessary for the RM unit 2402 to control the appliance 2403, and transmits the same to the RM unit 2402 via a transmission path, or namely ultra red rays. The RM unit 2402 is manipulated by the user, and the appliance 2403 is controlled by the RM unit 2402.

Figure 25:
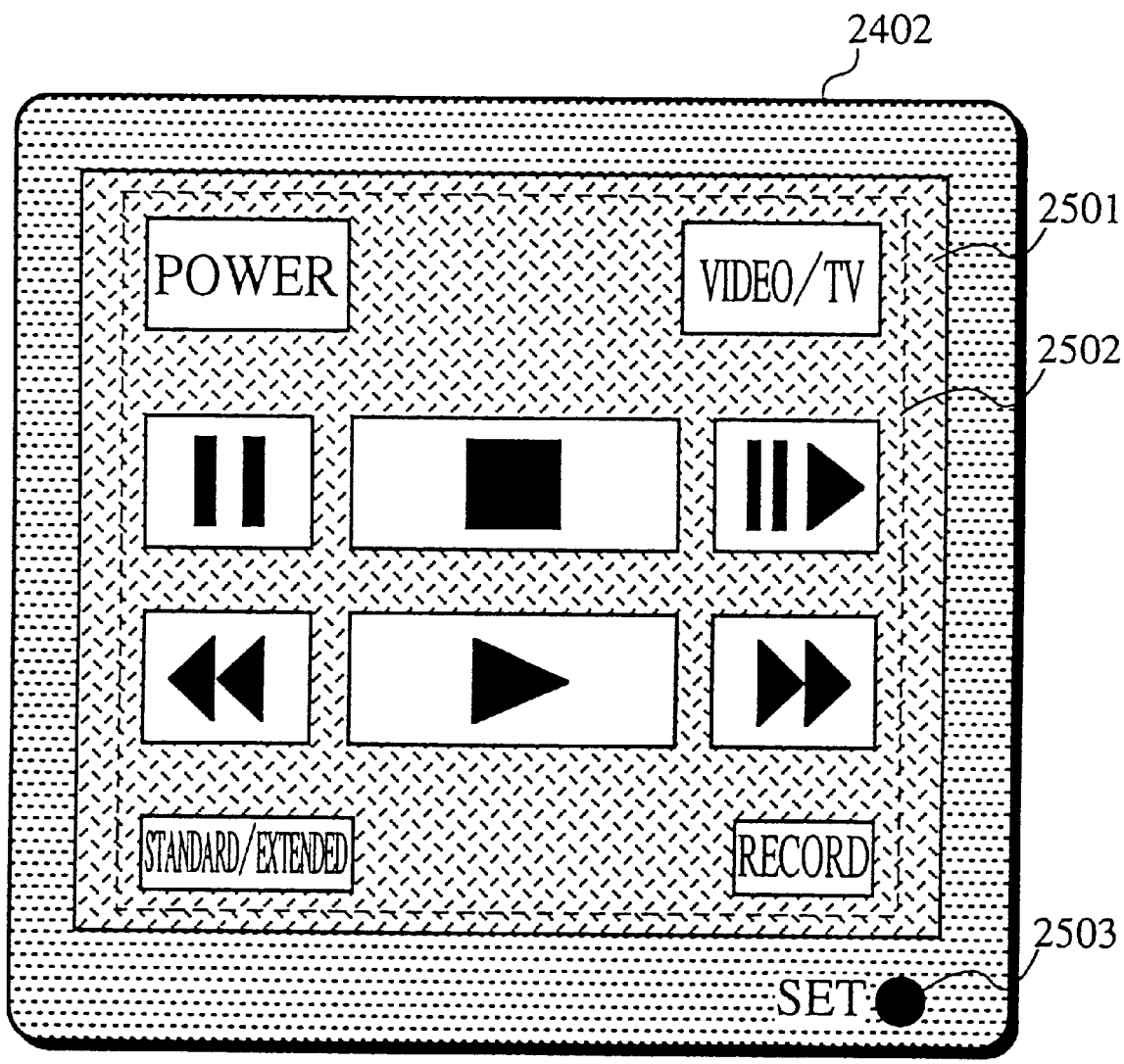
FIG. 25 is a front view of a remote controller unit in the remote controller in the fifth embodiment.
Figure 26:
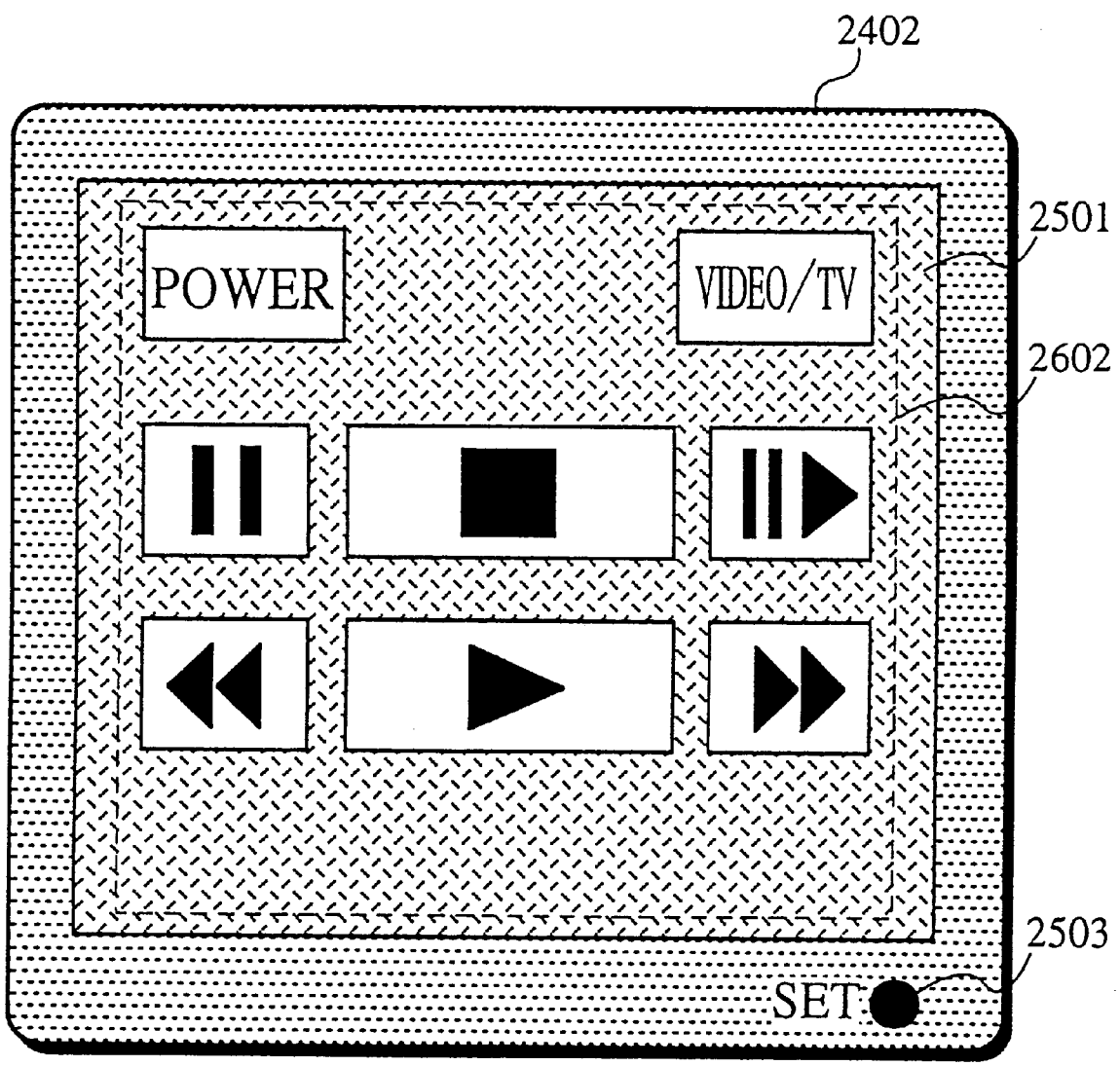
FIG. 26 is another front view of the remote controller unit in the remote controller in the fifth embodiment.

The RM-structure information generation unit 2404 generates the RM-structure information depending on the state of the appliance 2403; the RM-structure information referred herein is objects to be manipulated such as buttons on the RM unit 2402 and the control signals assigned to each button. The RM-structure information generation unit 2404 receives the information of the action state of the appliance 2403 (herein VTR) from the appliance control unit 2417. Assume that a recordable video tape is loaded in the VTR, then the RM-structure information generation unit 2404 generates the RM-structure information to display a soft button group 2502 as shown in FIG. 25 on the LC touch panel 2501 of the RM unit 2402. If the loaded video tape is not recordable with the record protect tab being set, a notice of impossible recording is transmitted from the appliance control unit 2417. In this case the record button and a standard/extended play button are eliminated and the RM-structure information is generated to display a soft button group 2602 as shown in FIG. 26.

The RM-structure information transmission unit 2405 transmits the RM-structure information generated by the RM-structure information generation unit 2404, and the structure information receipt unit 2406 receives the RM-structure information from the RM-structure information transmission unit 2405. The structure information storage unit 2407 stores the RM-structure information received by the RM-structure information receipt unit 2406. The manipulation unit 2408 is manipulated by the user to control the appliance 2403. The RM signal transmission unit 2409 retrieves the control signals from the RM signal storage unit 2411 as per manipulation signal from the manipulation unit 2408, and transmits the same to the appliance 2403. The manipulation display unit 2410 displays objects (figures) for the user interface such as soft buttons. The RM signal storage unit 2411 stores the control signal the RM unit 2402 transmits when controlling the appliance 2403. The display information storage unit 2412 stores the information which will be displayed by the manipulation display unit 2410 in controlling the appliance 2403. The appliance control unit 2417 activates and controls the appliance 2403 as per control signal received by the RM signal receipt unit 2418. The RM signal receipt unit 2418 receives the control signal from the RM signal transmission unit 2409.

Figure 27:
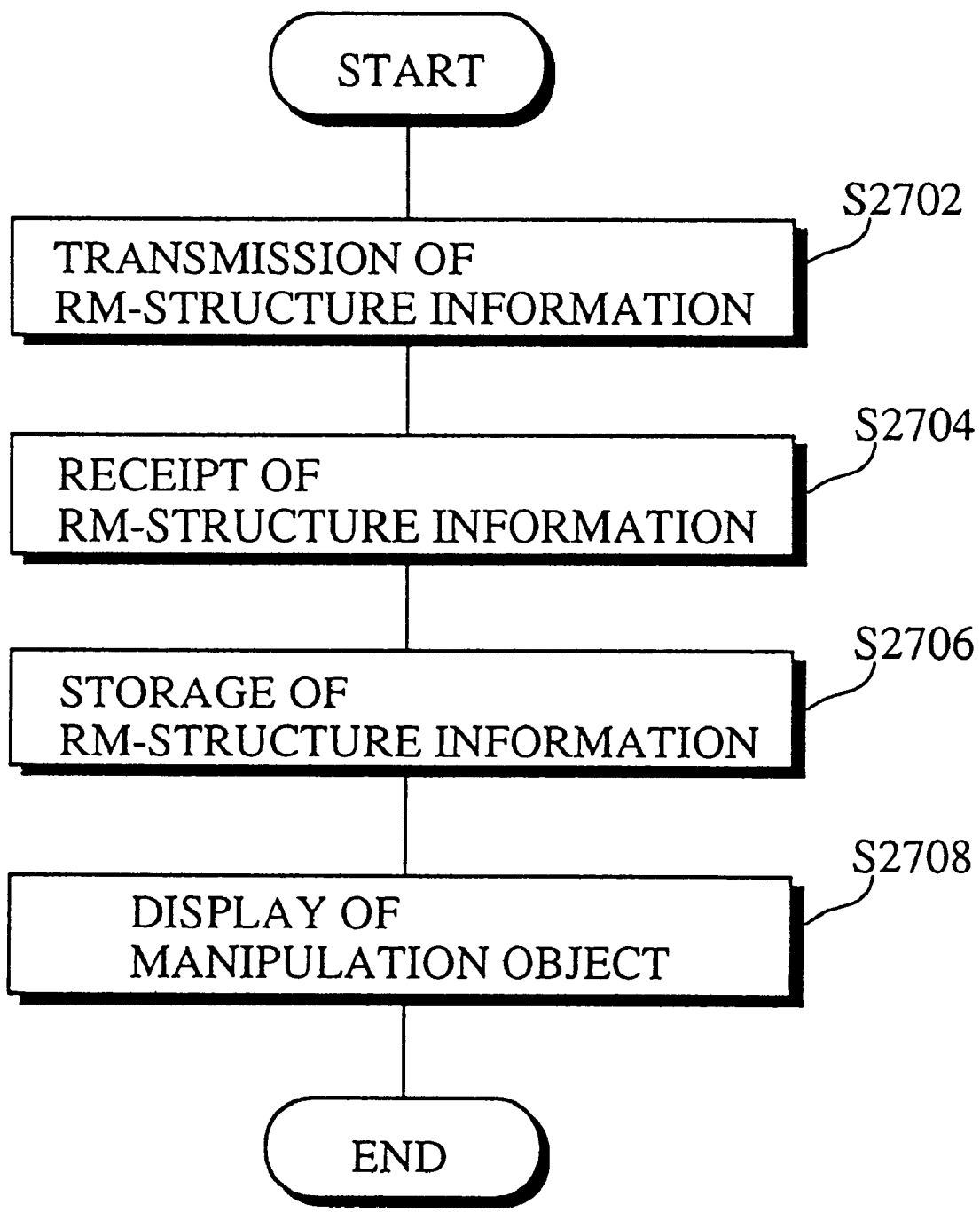
FIG. 27 is a flowchart detailing the operation of the remote controller in the fifth embodiment.

Next, the operation related to this embodiment will be explained while referring to the flowchart in FIG. 27.

Assume that the RM 2402 appears as shown in FIG. 25 based on the control signal and information related to the soft button group 2502 from the RM structure information generation unit 2404, which is identical with the RM unit 1102 shown in FIG. 12. If the recordable video tape is removed from the appliance 2403 (VTR), and a non-recordable video tape is loaded, the RM-structure information generation unit 2404 generates the RM-structure information that enables manipulations other than the record function. The RM structure information transmission unit 2405 transmits the RM-structure information thus generated by the RM-structure information generation unit 2404 to the RM unit 2402 (S2702). When the structure information receipt unit 2406 receives the RM-structure information from the RM-structure information transmission unit 2405 (S2704), the RM signal storage unit 2411 and the display information storage unit 2412 in the structure information storage unit 2407 store the RM structure information (S2706). Accordingly, the manipulation display unit 2410 displays the soft button group 2502 in accordance with the information in the display information storage unit 2412 (S2708). Up to this point, the RM unit 2402 appears as shown in FIG. 26, deleting the record button and standard/extended play button.

Figure 28:
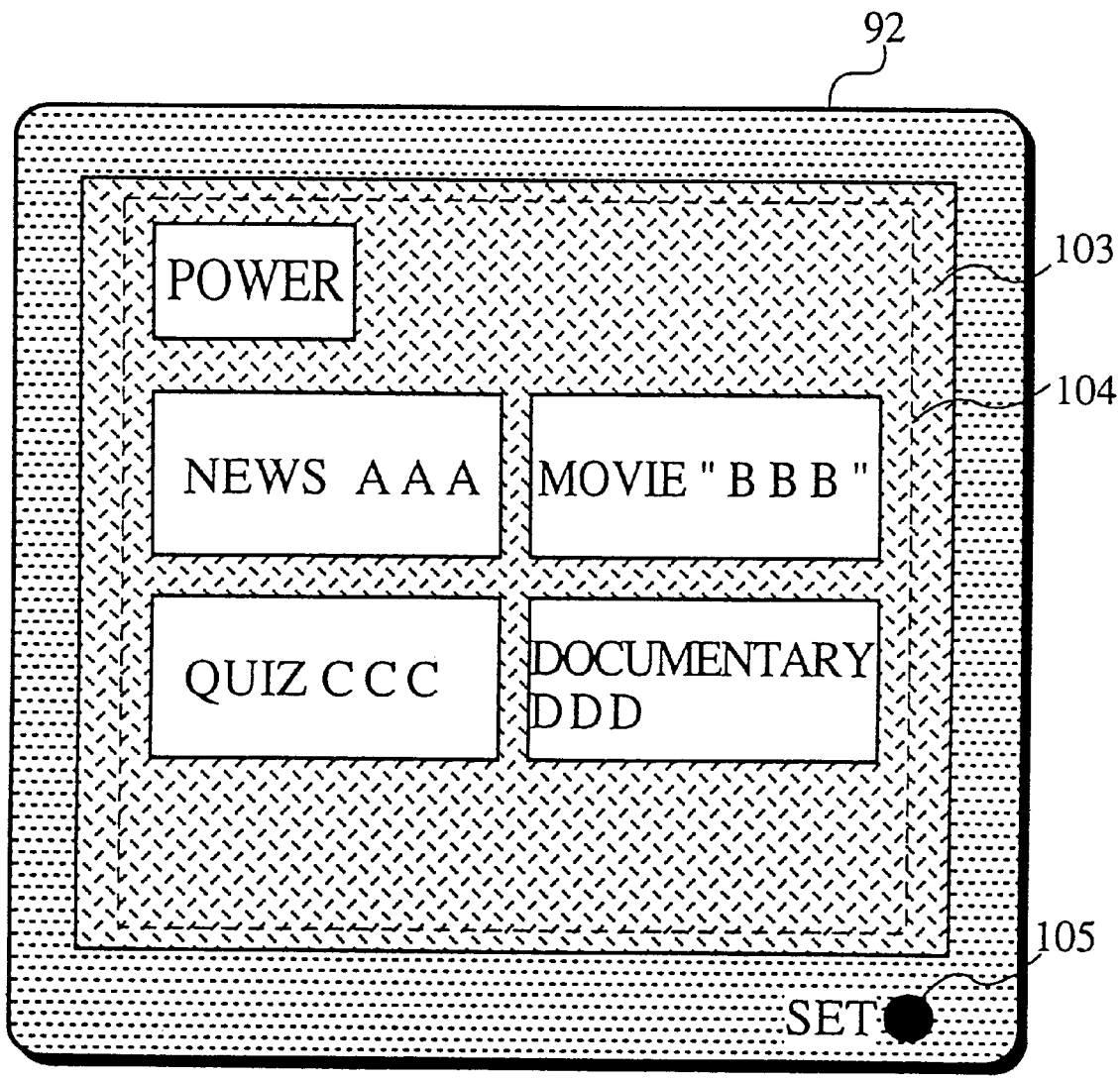
FIG. 28 is another front view of the remote controller unit in the remote controller in the fifth embodiment.

If a video tape written with program titles is loaded, the RM-structure information generation unit 2404 generates the soft buttons for the title of each program and a control signal group and transmits the same to the RM unit 2402. The control signal group includes the control signals for fast-forwarding or rewinding the video tape to play a desired program. As a result, the RM unit 2402 appears as shown in FIG. 28, and the user only pushes a soft button exhibiting the title to play the desired program.

Figure 29:
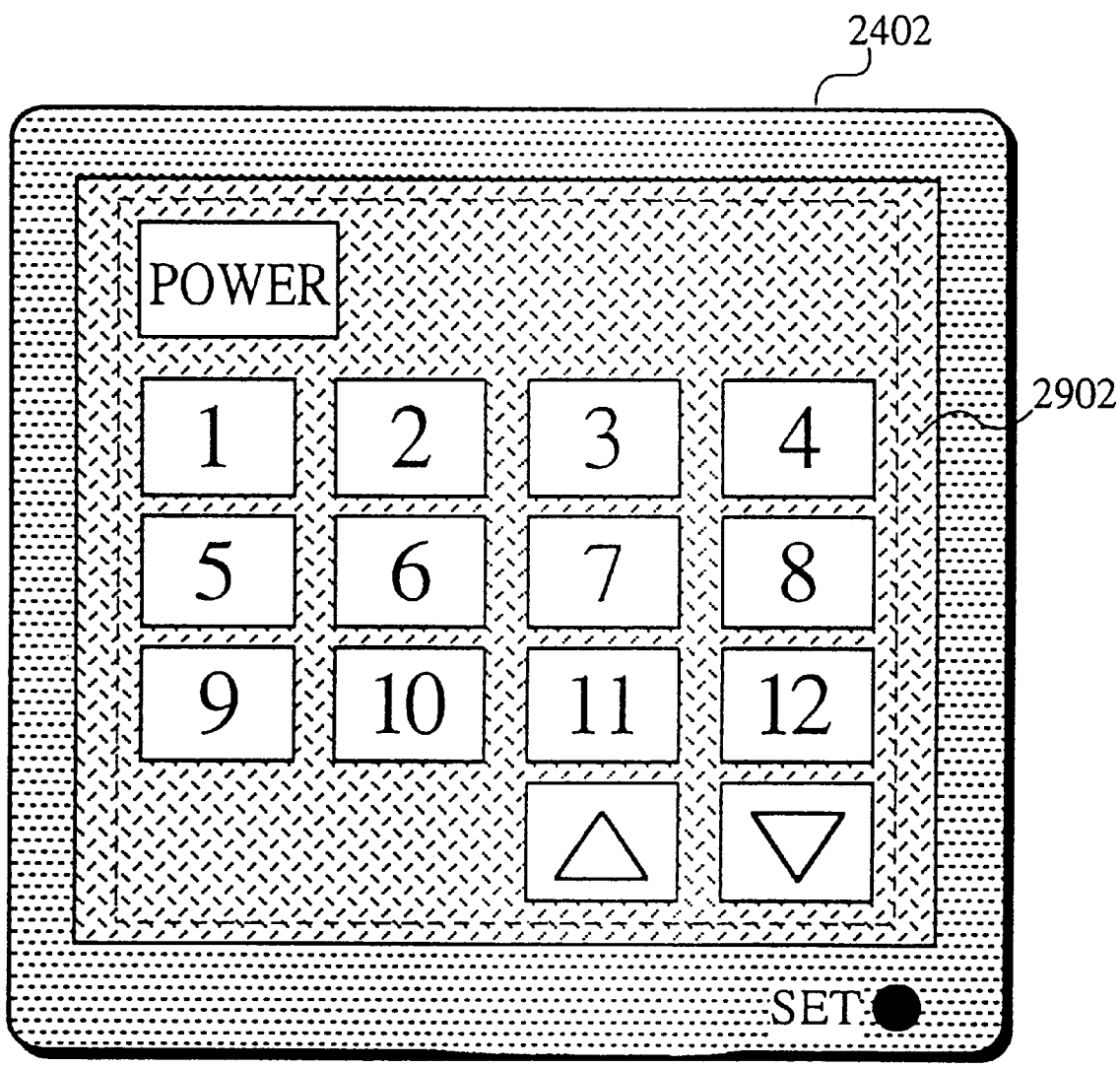
FIG. 29 is another front view of the remote controller unit in the remote controller in the fifth embodiment.
Figure 30:
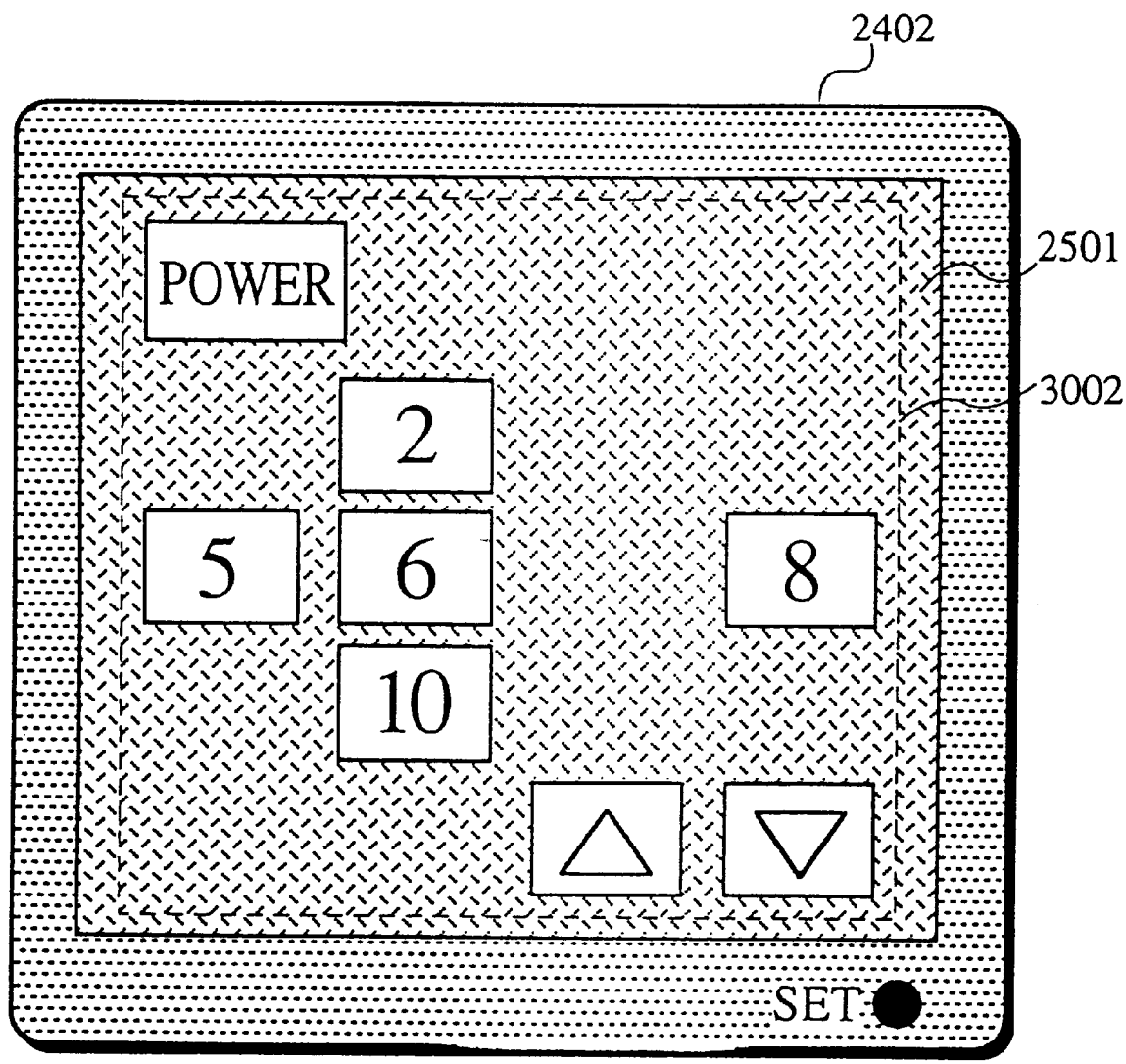
FIG. 30 is another front view of the remote controller unit in the remote controller in the fifth embodiment.
Figure 31:
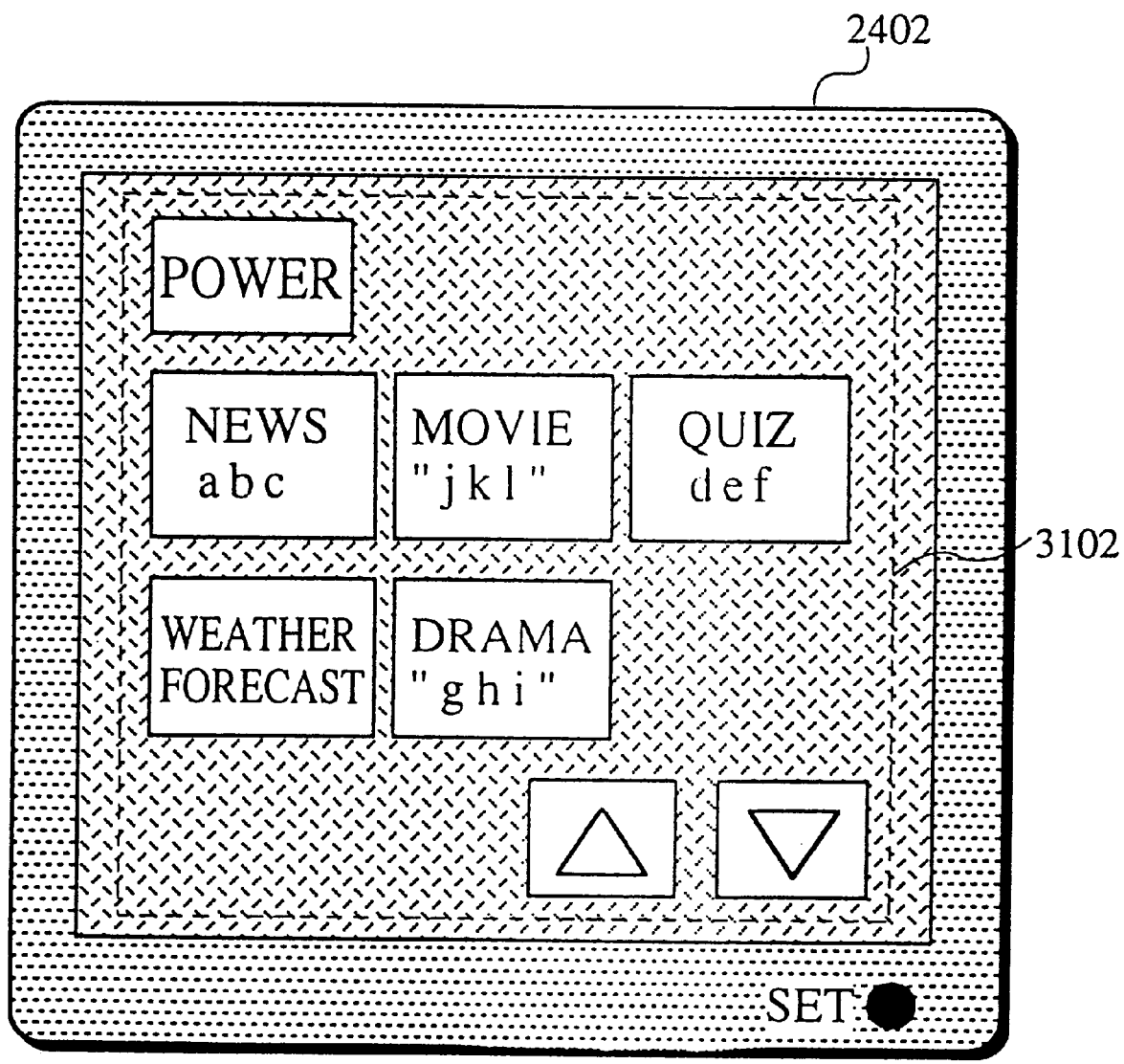
FIG. 31 is another front view of the remote controller unit in the remote controller in the fifth embodiment.

If the appliance 2403 is the TV, and all the channels 1 through 12 are available, the RM unit 2402 displays the twelve channels as shown in FIG. 29. When some channels are not available around the midnight, only the available channels are displayed as shown in FIG. 30. If the title of the program are also broadcasted, it is possible to display the title instead of the channel number as shown in FIG. 31.

In this way, the user can manipulate the remote controller which suits most adequately to the current states of the appliance. In addition, not only the LC touch panel 2501 in the RM unit 2402 can be downsized, but also the control signals and the information related to the soft button groups 2502, 2602, 2902, 3002, and 3102 are stored in a more compact memory.

In this embodiment, the RM-structure information generation unit 2404 generates the RM-structure information for individual states of the appliance 2403, and the RM-structure information transmission unit 2405 transmits the same to the RM unit 2402. However, the RM-structure information generation unit 2404 may generate the information related to the RM-structure information to be deleted or added according to the changes in the states, and transmit the same to the RM unit 2402. This reduces the amount of information transmission between the RM-structure information supply unit 2401 and RM unit 2402.

SIXTH EMBODIMENT

FIG. 32 is a view depicting the structure of a menu synthesis apparatus in accordance with the sixth embodiment of the present invention. The menu synthesis apparatus comprises a TV 3201 and a VTR 3202 connected to each other by a cable 3203, and both the TV 3201 and VTR 3202 are controlled by a remote controller 3218.

The TV 3201 includes a first menu storage unit 3204, a synthesis rule storage unit 3205, a menu synthesis unit 3206, a menu receipt unit 3207, a menu display unit 3208, an appliance control signal transmission unit 3209, a TV's signal-receipt unit 3210, a TV action unit 3211, and a RM signal receipt unit 3212. The TV 3201 is connected to a menu display unit 3213.

The VTR 3202 includes a second menu storage unit 3214, a menu transmission unit 3215, a VTR's signal-receipt unit 3216, and a VTR action unit 3217.

The first menu storage unit 3204 stores menu information as shown in FIGS. 33A and 33B. The menu information referred herein is composed of control information for the TV 3201 and information changing the screen of the control information.

Figure 34:
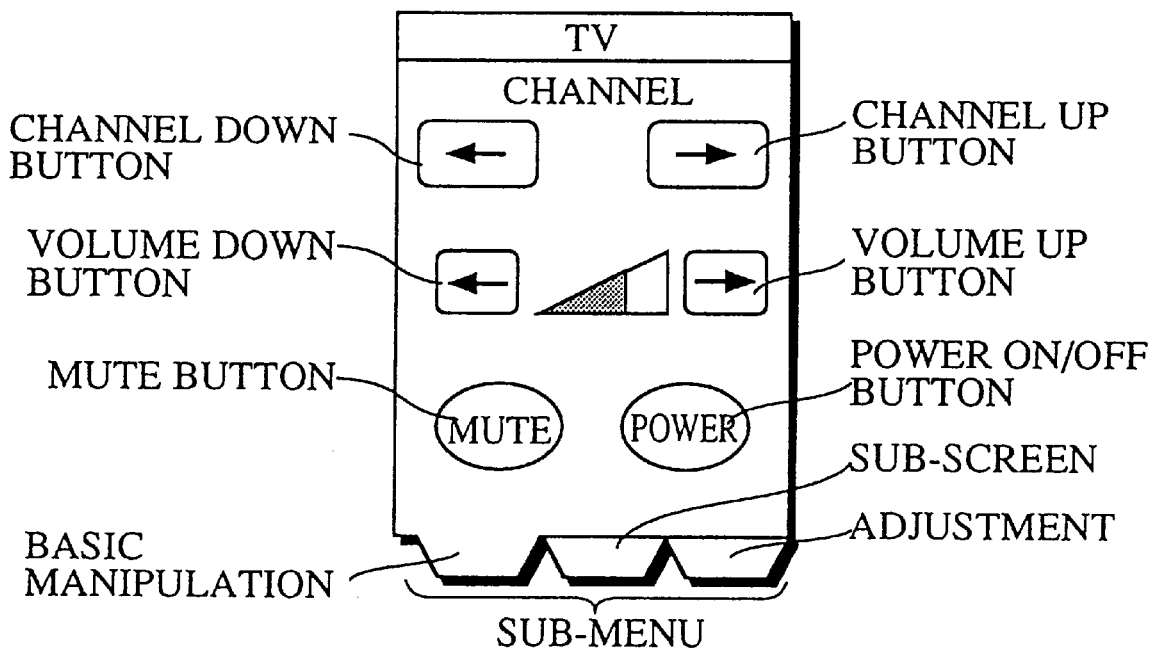
FIG. 34 is an example of a menu display on TV in the sixth embodiment.

In FIG. 33A, TV is defined as the menu value of the tag (parenthesized with < >) in the highest position, and the menu "TV" includes three sub-menus: "basic manipulation", "sub-screen", and "adjustment". The elements composing each sub-menu are defined as <PANEL>. For example, "basic manipulation panel" consists of six buttons such as channel-up and channel-down buttons, and appears on the display 3213 as shown in FIG. 34.

Defined in FIG. 33B are the kinds of buttons displayed for each panel and event signals transmitted when the buttons are pushed. The event signals referred herein are the signals that activate a program managing the changes of the control over the appliance and the menu display.

The synthesis rule storage unit 3205 stores rules to synthesize a plurality of menu information, an example of which is shown in FIG. 35.

The synthesis rules include the rules for the menu structure and the rules for shape selection and action. The rules for the shape selection are referred to when selecting one shape for the various shaped buttons in a plurality of menus, The rules related to the action are referred to when the control is switched from one appliance to another. For example, when the record action is directed, the control is shifted to the VTR 3202 from the TV 3201 before effecting the record action. The menu synthesis unit 3206 receives a second menu information from the menu receipt unit 3207 and stores the same into an unillustrated self-installed buffer, and retrieves the first menu information and synthesis rule from the first menu-storage unit 3204 and the synthesis rule storage unit 3205 respectively to synthesize the first and second menu information in accordance with the synthesis rule, and converts the resulting information menu into display elements, or bit map data, transmitting the same to the menu display unit 3208.

For example, when the synthesis rule as shown in FIG. 35 is retrieved, whether 3501 is "true" or "false" is checked, and in case of "true", whether if 3502 is "true" or "false" is further checked. In case of "true", the process (1) is carried out; otherwise, 3503 is carried out. When 3501 is "false", whether 3505 in 3504 is "true" or "false" is further checked. In case of "true", the process (2) is carried out; otherwise, 3506 is carried out.

Upon receipt of the second menu information shown in FIG. 36 (the second menu information will be described more in detail below), the menu synthesis unit 3206 retrieves the first menu information shown in FIGS. 33A and 33B, and carries out the process (1), and generates the synthesized menu information shown in FIGS. 37A, 37B, and 37C. Note that the synthesis rule shown in FIG. 35 is a part of the synthesis rules and only regulates the synthesis of the highest-position information sandwiched by <MENU> and </MENU>.

The menu receipt unit 3207 receives the second menu information from the menu transmission unit 3215 and transmits the same to the menu synthesis unit 3206.

The menu display unit 3208 receives the display elements in the form of the bit map data from the menu synthesis unit 3206 and displays the same on the display 3213.

Figure 38:
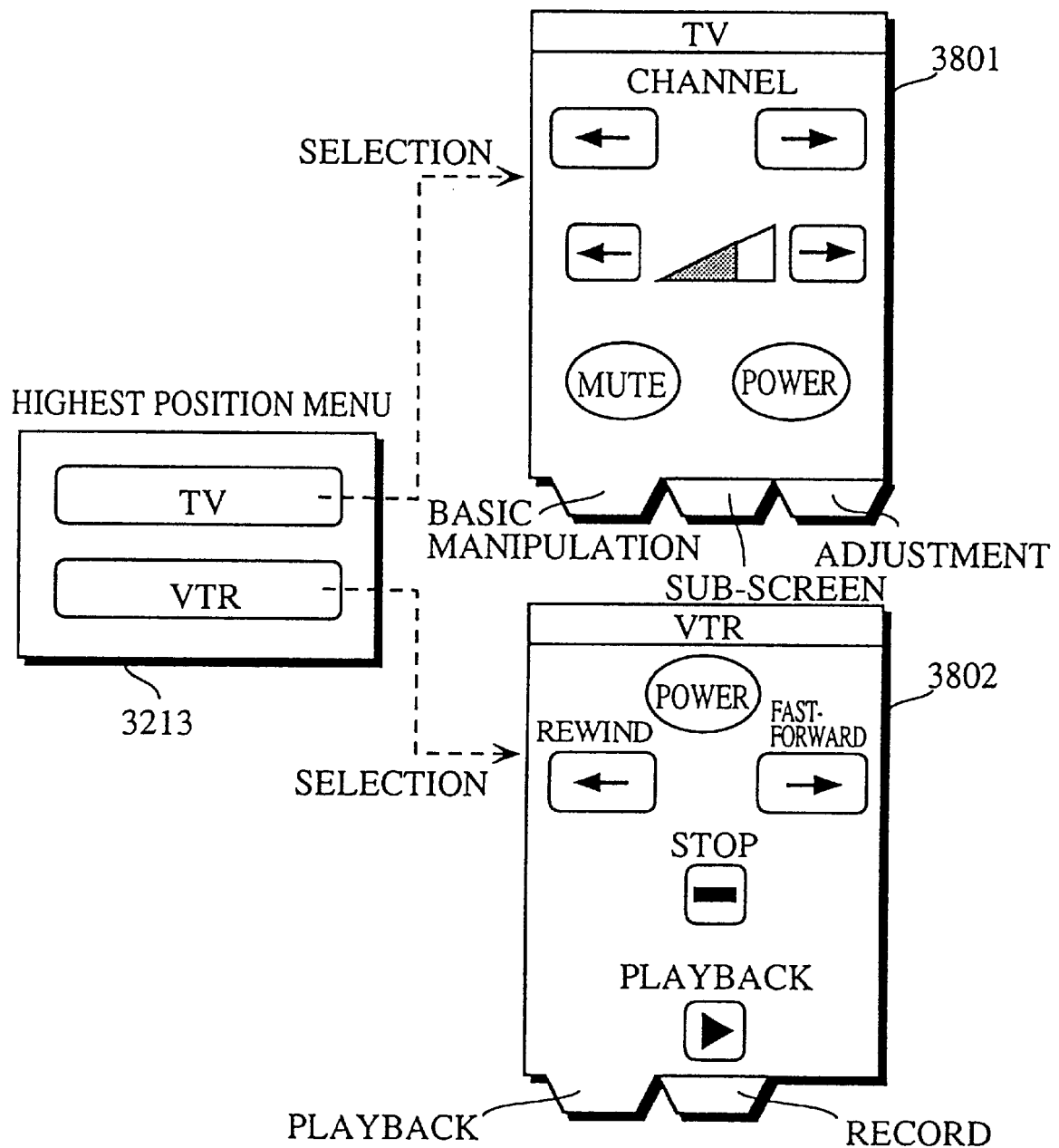
FIG. 38 is a view showing an example of a synthesized menu display in the sixth embodiment.

For example, the synthesized menu information in FIGS. 37A, 37B, and 37C appears on the display 3213 as shown in FIG. 38. Thus, when the user selects the TV unit 3201 using the remote controller 3218, a basic manipulation panel 3801 appears on the display 3213, and a video playback panel 3802 appears on the display 3213 when the user selects the VTR 3202.

The appliance control signal transmission unit 3209 receives the RM signal from the RM signal receipt unit 3212, and then converts the same into appliance control signal. In case of the appliance control signal for the TV 3201, the appliance control signal is transmitted to the TV action unit 3211 by means of the TV's signal receipt unit 3210. In case of the appliance control signal for changing the menu screen, the appliance control signal is transmitted to the menu synthesis unit 3206. In case of the appliance control signal for the VTR 3202, the appliance control signal is transmitted to the VTR's signal receipt unit 3210.

The TV's signal receipt unit 3210 transmits the appliance control signal from the appliance control signal transmission unit 3209 to the TV action unit 3211.

The TV action unit 3211 controls the TV 3201 as per appliance control signal from the TV's signal receipt unit 3210.

The RM signal receipt unit 3212 receives the RM signal from the remote control unit 3218 to transmit the same to the appliance control signal transmission unit 3209.

Figure 39:
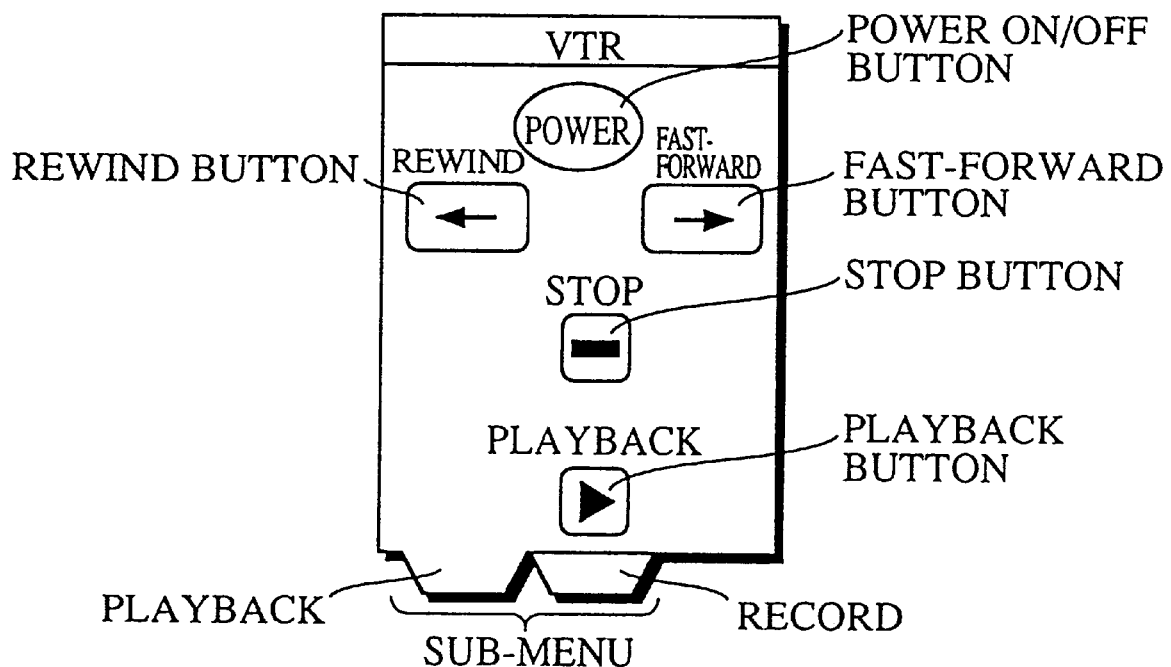
FIG. 39 is a view showing an example of a video menu in the sixth embodiment.

The second menu storage unit 3214 stores the control information for the VTR 3202 and the second menu information. The second menu information referred herein is the information used to change the screen based on the control information, and example of which is shown in FIG. 36. In the drawing, VTR is defined as the highest-position menu value. The "playback panel" indicated by the sub-menu of the second menu in FIG. 36 appears on the display 3213 as shown in FIG. 39.

Figure 42:
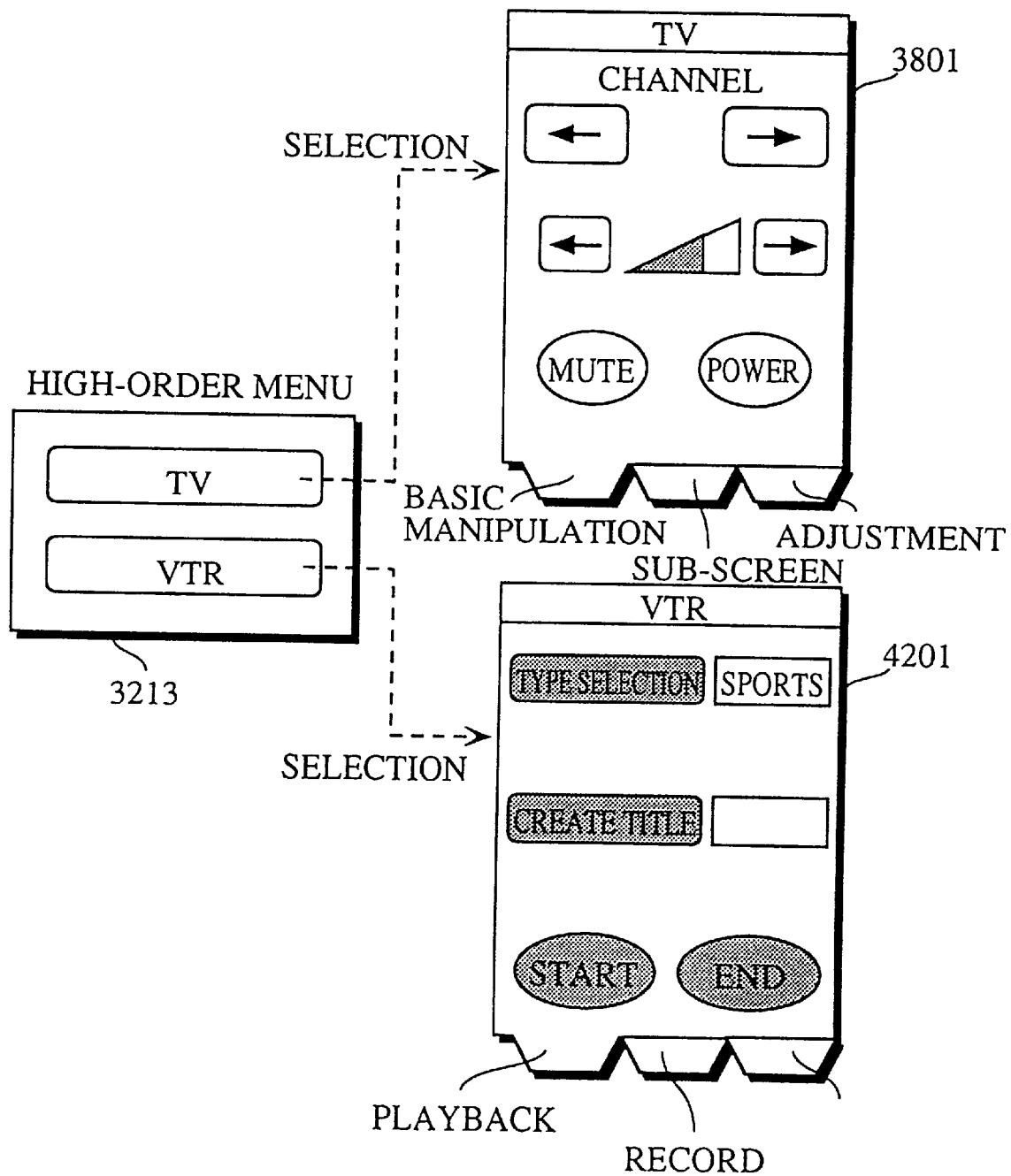
FIG. 42 is a view showing another example of a synthesized menu display in the sixth embodiment.

Assume that the menu information for generating the table of contents is additionally stored in the second menu storage unit 3214 as the second menu information, and that the menu synthesis unit 3206 holds the menu information shown in FIGS. 37A, 37B, and 37C. Then, the menu synthesis unit 3206 synthesizes the additional menu information and the already-synthesized menu information, and the resulting menu information appears as FIGS. 41A, 41B, and 41C. Note that the menu synthesis unit 3206 carries out the process (2) of the synthesis rule in FIG. 35. As a result, the display 3213 shows updated menu information as shown in FIG. 42. Thus, by selecting VTR, and further selecting "make table of contents" (sub-menu) using the remote controller 3218, a table-of-content creation menu 4201 appears on the display 3213.

The menu transmission unit 3215 detects the connection between the TV 3201 and menu receipt unit 3207 via the cable 3203, and in response retrieves the second menu information from the second menu storage unit 3214 to transmit the same to the menu receipt unit 3207.

The VTR's signal receipt unit 3216 receives the appliance control signal from the appliance control signal Transmission unit 3209, and transmits the same to the VTR action unit 3217.

The VTR action unit 3217 controls the VTR 3202 as per appliance control signal from the VTR's signal receipt unit 3216.

The remote controller 3218 transmits the RM signal to the TV 3201.

Figure 43A:
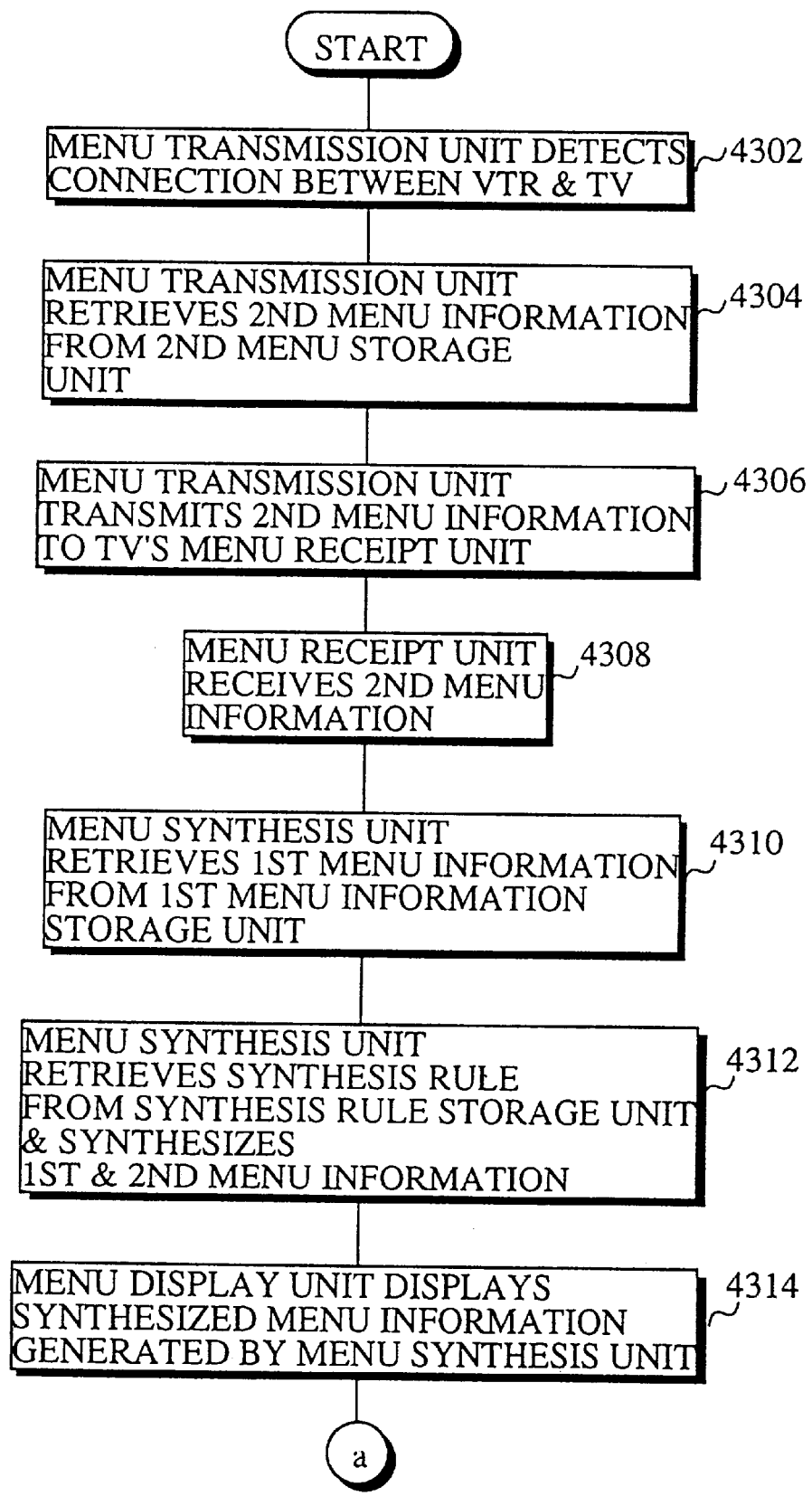
FIGS. 43A and 43B are flowcharts detailing the operation of the menu synthesis apparatus in the sixth embodiment.
Figure 43B:
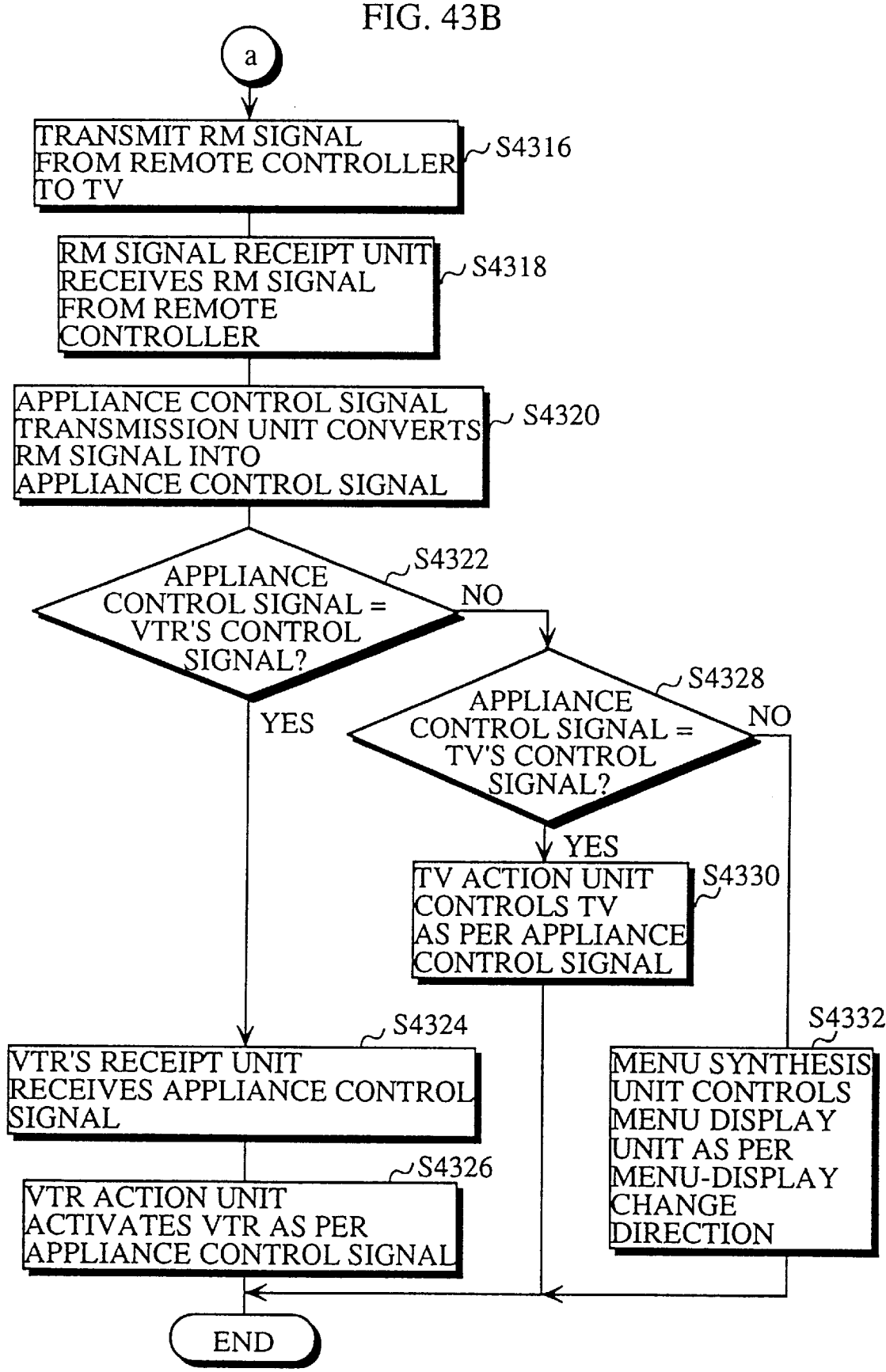

Next, the operation related to this embodiment will be explained while referring to the flowcharts in FIGS. 43A and 43B.

When the menu transmission unit 3215 in the VTR 3202 detects the connection between the VTR 3202 and TV 3201 (S4302), it retrieves the second menu information from the second menu information storage unit 3214 (S4304), and transmits the same to the TV'S menu receipt unit 3207 in the TV 3201 (S4306). Upon receipt of the second menu information from the menu transmission unit 3215, the TV's menu receipt unit 3207 transmits the same to the menu synthesis unit 3206 (S4308).

Accordingly, the menu synthesis unit 3206 retrieves the first menu information from the first menu storage unit 3204 (S4310), and further retrieves the synthesis rule from the menu synthesis rule 3206 to synthesize the first and second menu information under the synthesis rule (S4312). The menu display information 3208 displays the resulting synthesized menu information on the display 3213 (S4314).

As the remote controller 3218 transmits the RM signal to the TV 3201 (S4316), the RM signal receipt unit 3212 receives the RM signal (S4318). Then, the appliance control signal transmission unit 3209 converts the received RM signal into the appliance control signal (S4320).

Further, the appliance control signal transmission unit 3209 judges whether the appliance control signal is the control signal to active the VTR 3202 (S4322). If so, the appliance control signal transmission unit 3209 transmits the same to the VTR's signal receipt unit 3216, and the VTR's signal receipt unit 3216 receives the same (S4324). Accordingly, the VTR action unit 3217 controls the VTR 3202 as per appliance control signal (S4326).

If the appliance control signal is not the control signal to activate the VTR 3202 in S4322, then the appliance control signal transmission unit 3209 judges whether the appliance control signal is the control signal to activate the TV 3201

(S4328). If so, the appliance control signal transmission unit 3209 transmits the same to the TV action unit 3211, which controls the TV 3201 as per appliance control signal (S4330). If the appliance control signal is not the control signal for the TV 3201 either, the appliance control signal transmission unit 3209 transmits the control signal for directing the change of the menu display to the menu synthesis unit 3206, which accordingly controls the menu display unit 3208 (S4332).

As has been stated, when the TV and VTR are connected to each other, it has become possible to manipulate both appliances using a single user interface that has synthesized the user interfaces for the TV and VTR.

The TV and VTR are used as the appliances in this embodiment. However, the appliances may be the audio apparatus, air conditioner, electric fan, washers, or microwave oven, and these appliances may be controlled by a single user interface as well.

SEVENTH EMBODIMENT

Figure 44:
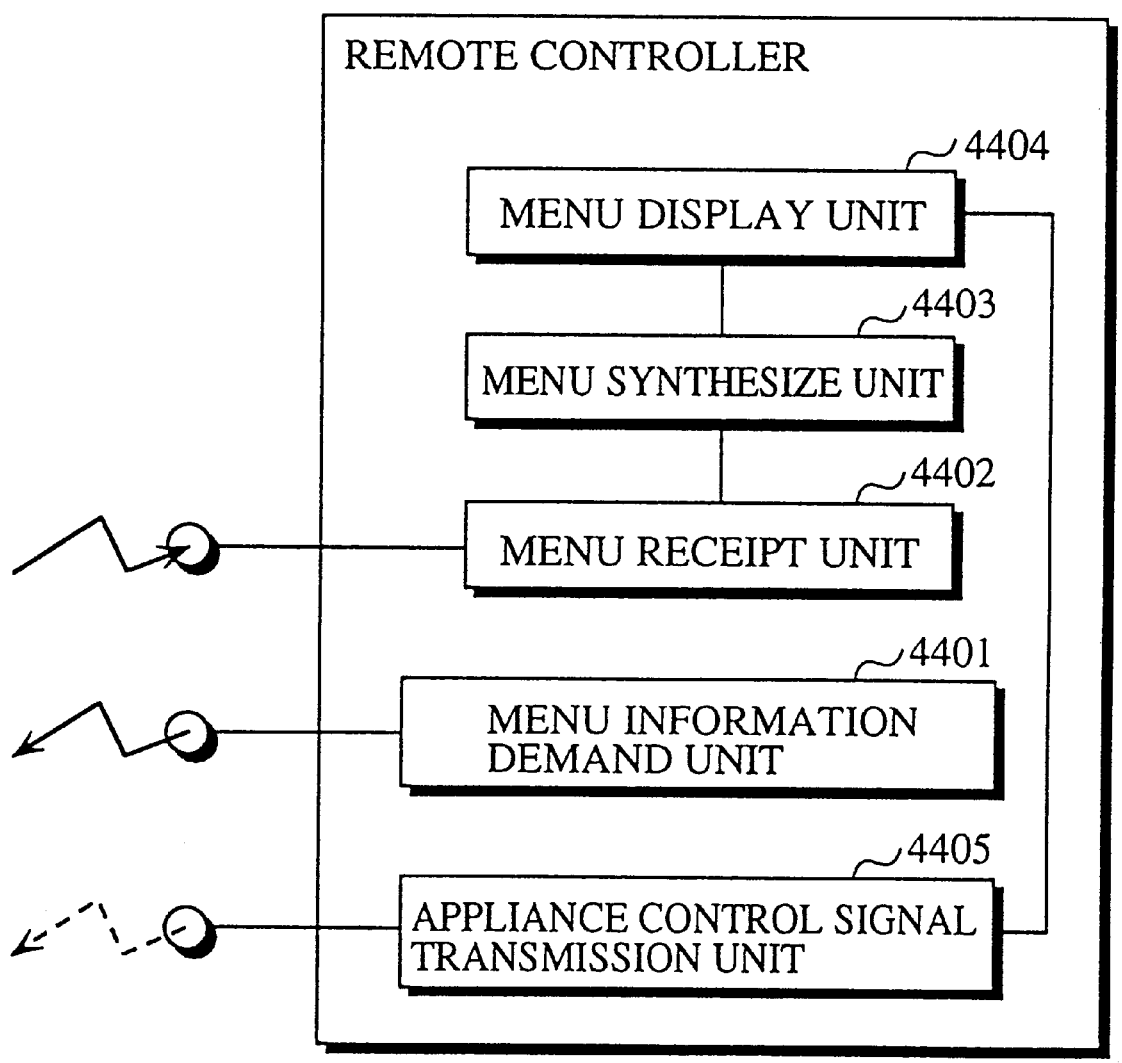
FIG. 44 is a view showing a structure of a remote controller in accordance with a seventh embodiment of the present invention.

FIG. 44 is a view depicting the structure of a remote controller in accordance with the seventh embodiment of the present invention. The remote controller employs the menu synthesis apparatus of the sixth embodiment, and comprises a menu information demand unit 4401, a menu receipt unit 402, a menu synthesis unit 4403, a menu display unit 4404, and an appliance control signal transmission unit 4405.

The menu information demand unit 4401 transmits a signal, or namely ultra red rays, that demands the transmission of the menu information when the remote controller is placed in an opposing position to the external appliances (not shown), such as the TV, VTR, and air conditioner.

When the external appliances receives the demand signal, they transmit the menu information to the remote controller. For example, the TV transmits the menu information shown in FIGS. 33A and 33B, and the VTR and air conditioner transmit the menu information shown in FIGS. 36 and 45, respectively.

The menu receipt unit 4402 receives the menu information from the external appliances and transmits the same to the menu synthesis unit 4403.

The menu synthesis unit 4403 includes the synthesis rule storage unit 3205 of the six embodiment, and stores the synthesis rule shown in FIG. 35. Upon receipt of the menu information from a plurality of the external appliances by way of the menu receipt unit 4402, the menu synthesis unit 4403 synthesizes the plurality of the menu information as per synthesis rule. When the menu information is for the TV, VTR, and air conditioner, then the resulting synthesized menu information are shown in FIGS. 46A, 46B, and 46C, respectively. The synthesized menu information is converted into the bit map data and transmitted to the menu display unit 4404.

Figure 47:
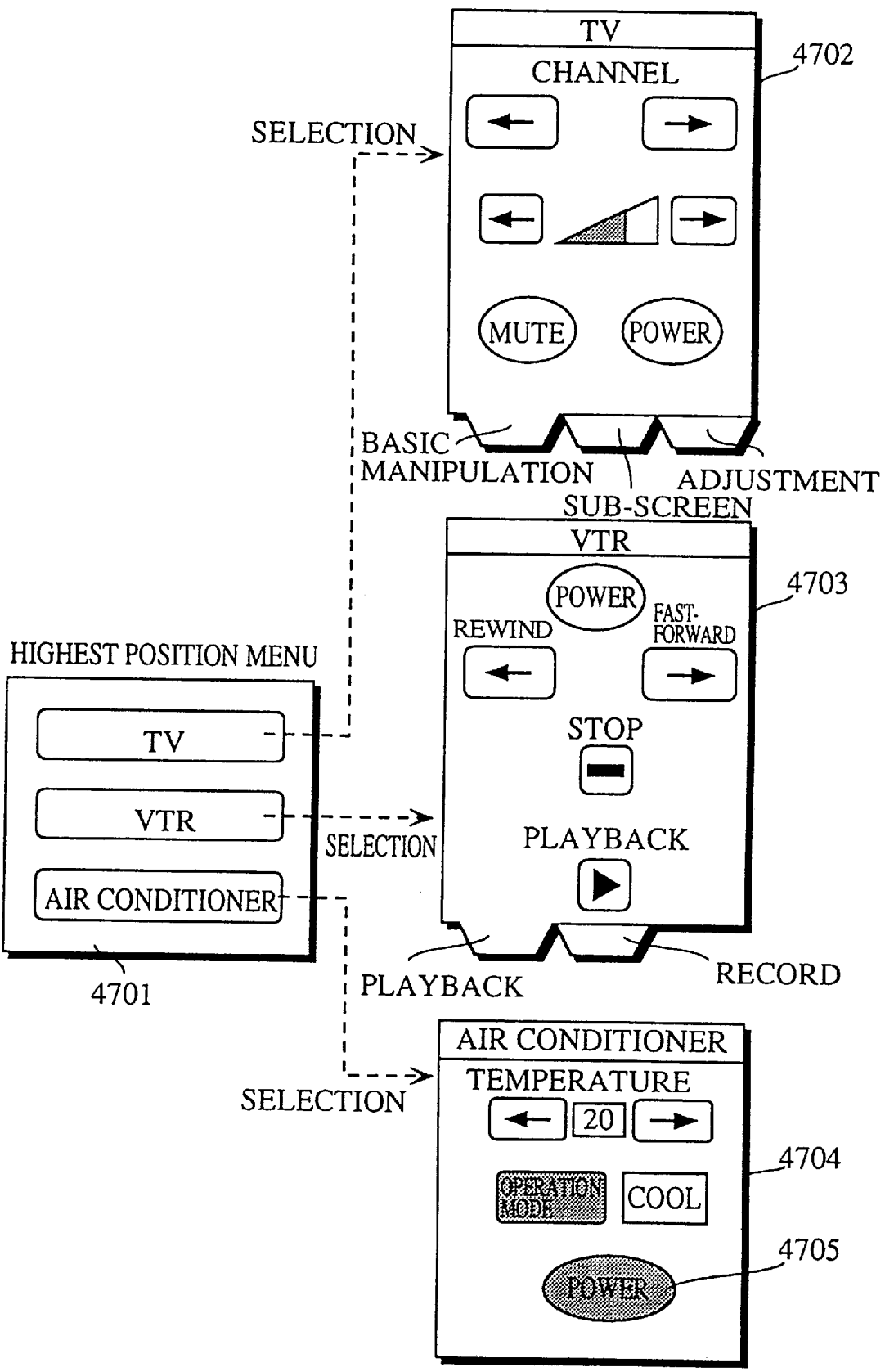
FIG. 47 is a view showing an example of a synthesized menu display.

The menu display unit 4404 comprises an LC panel and a touch panel; the latter is layered on the former. The menu display unit 4404 displays the menu information from the menu synthesis unit 4403 as the highest-position menu 4701 shown in FIG. 47. If the user selects "TV" in the highest-position, then the menu display unit 4404 displays a basic manipulation panel 4702 for the TV; if the user selects "VTR", then it displays a playback panel 4703, and if the user selects "air conditioner", then it displays a set panel 4704. When the user pushes a power button 4705 while the set panel 4704 is being displayed, the manipulation signal for the air conditioner's power is transmitted to the appliance control signal transmission unit 4405.

The appliance control signal transmission unit 4405 receives the manipulation signal from the menu display unit 4404, and transmits the same to the external appliances. When the manipulation signal is the one to manipulate the air conditioner's power, then the appliance control signal transmission unit 4405 transmits the control signal of the power to the air conditioner, so that the power button is switched from ON to OFF or vise versa.

Figure 48:
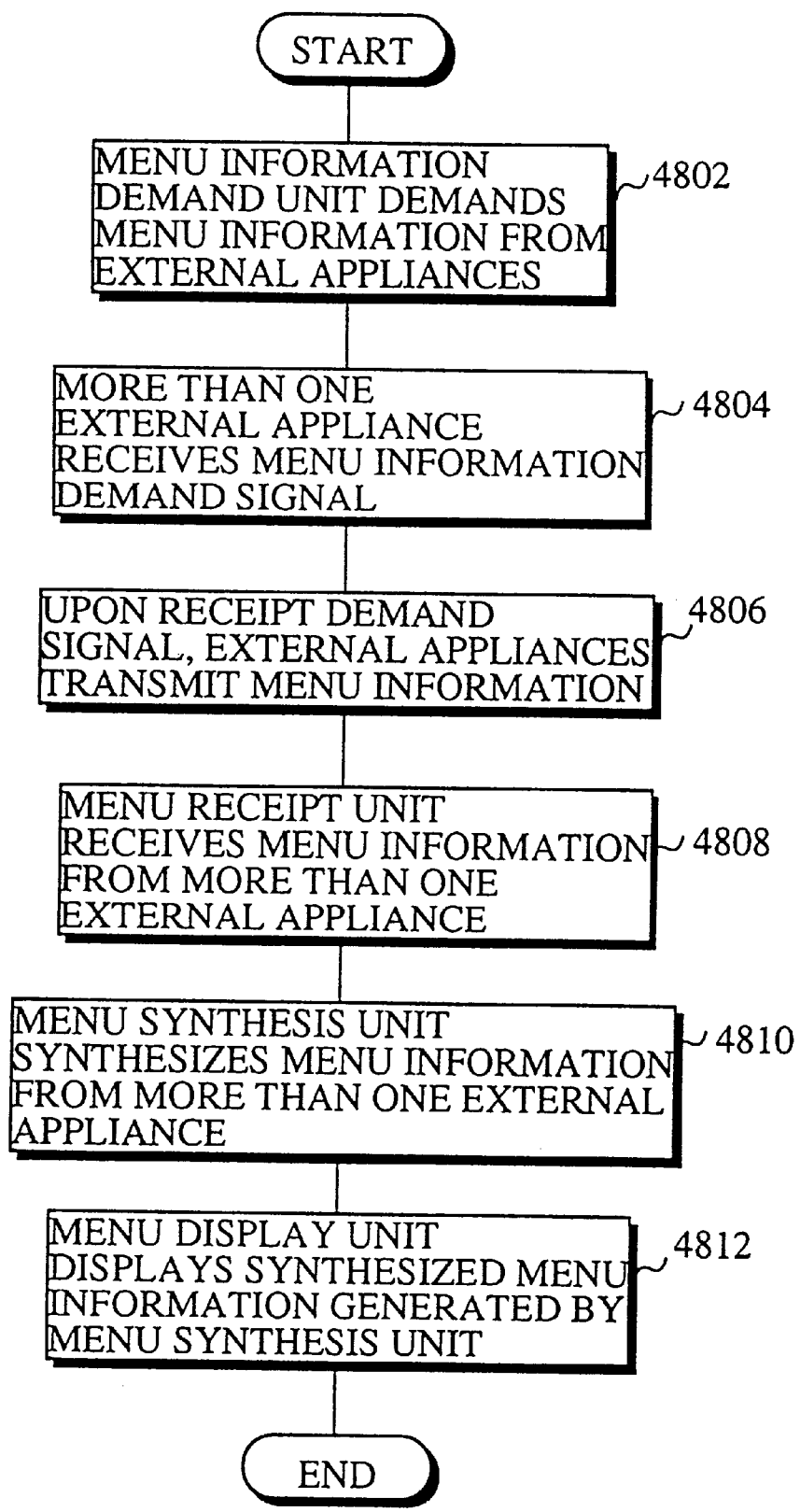
FIG. 48 is a flowchart detailing the operation of the remote controller in the seventh embodiment.

Next, the operation related to this embodiment will be explained while referring to the flowchart in FIG. 48.

The menu information demand unit 4401 demands the transmission of the menu information from the external appliances (S4802), and more than one external appliance receives the demand signal (S4804). Accordingly, the external appliances transmit the menu information in response to the demand signal (S4806), which is received by the menu receipt unit 4402 (S4808). Then, the menu synthesis unit 4403 synthesizes the menu information from more than one external appliance (S4810), and the menu display unit 4404 displays the resulting synthesized menu information (S4812).

In this embodiment, the demand signal is transmitted from the menu information demand unit 4401 when the remote controller is placed in an opposing position to the external appliances. However, the demand signal may be transmitted only to the available external appliances with their respective switches being turned on, or only to the external appliances installed within the same room where the remote controller is placed, in other words, within the reach of the RM signal.

As has been explained, the manipulation menus for a plurality of appliances can be actively synthesized into a signal user interface, thus serving as the remote controller.

Figure 49:
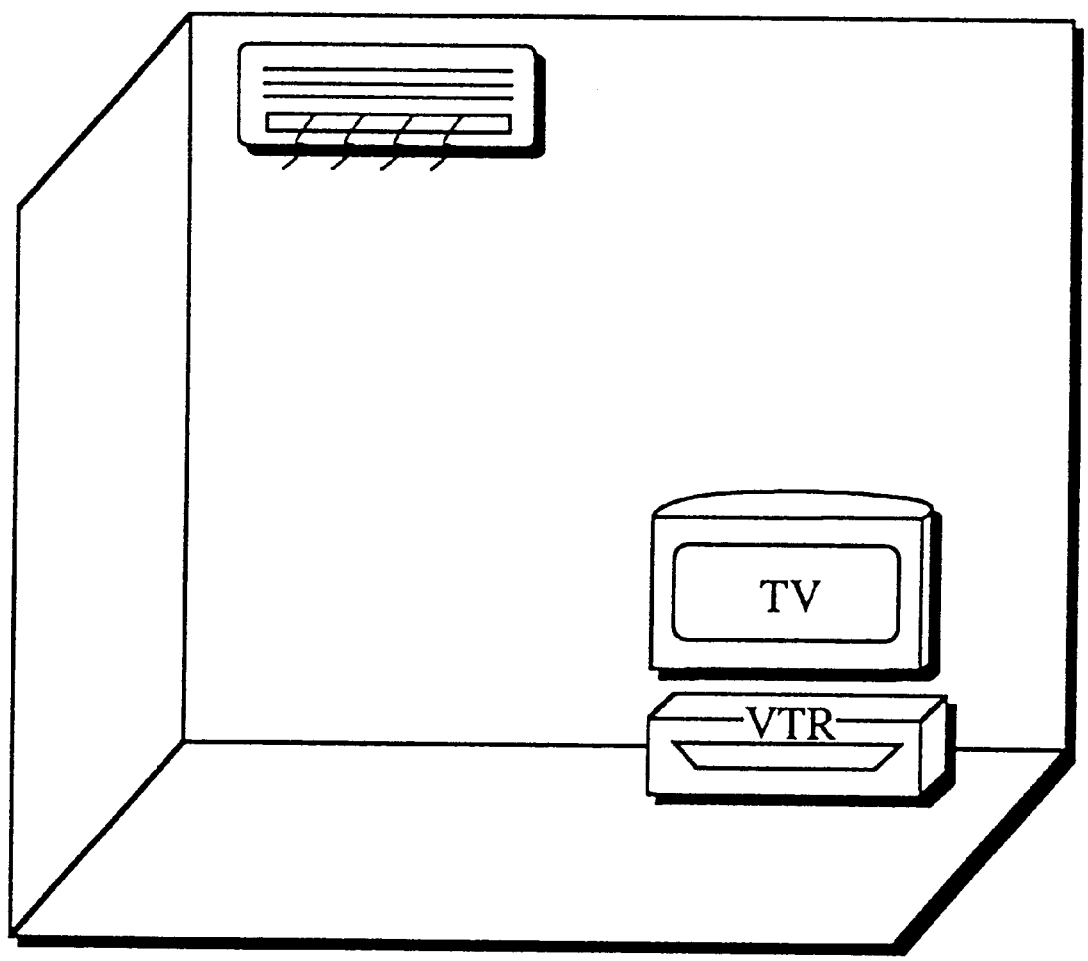
FIG. 49 is a view showing an example of a display in the seventh embodiment.

Although the types of the controllable appliances are displayed on the menu display unit 4404 as the highest-position menu, the remote controller may detect the location of the individual appliances and displays the layout thereof within a room as shown in FIG. 49 as the highest-position menu. In this case, a sensor for detecting the location of each appliance is additionally furnished, and each appliance transmits a signal indicating their respective locations. The sensor receives the signals from the external appliances and detects the location of each external appliance. Then, the menu synthesis unit 4403 retrieves the data related to the location of each appliance and displays the same by the menu display unit 4404.

EIGHTH EMBODIMENT

Figure 50:
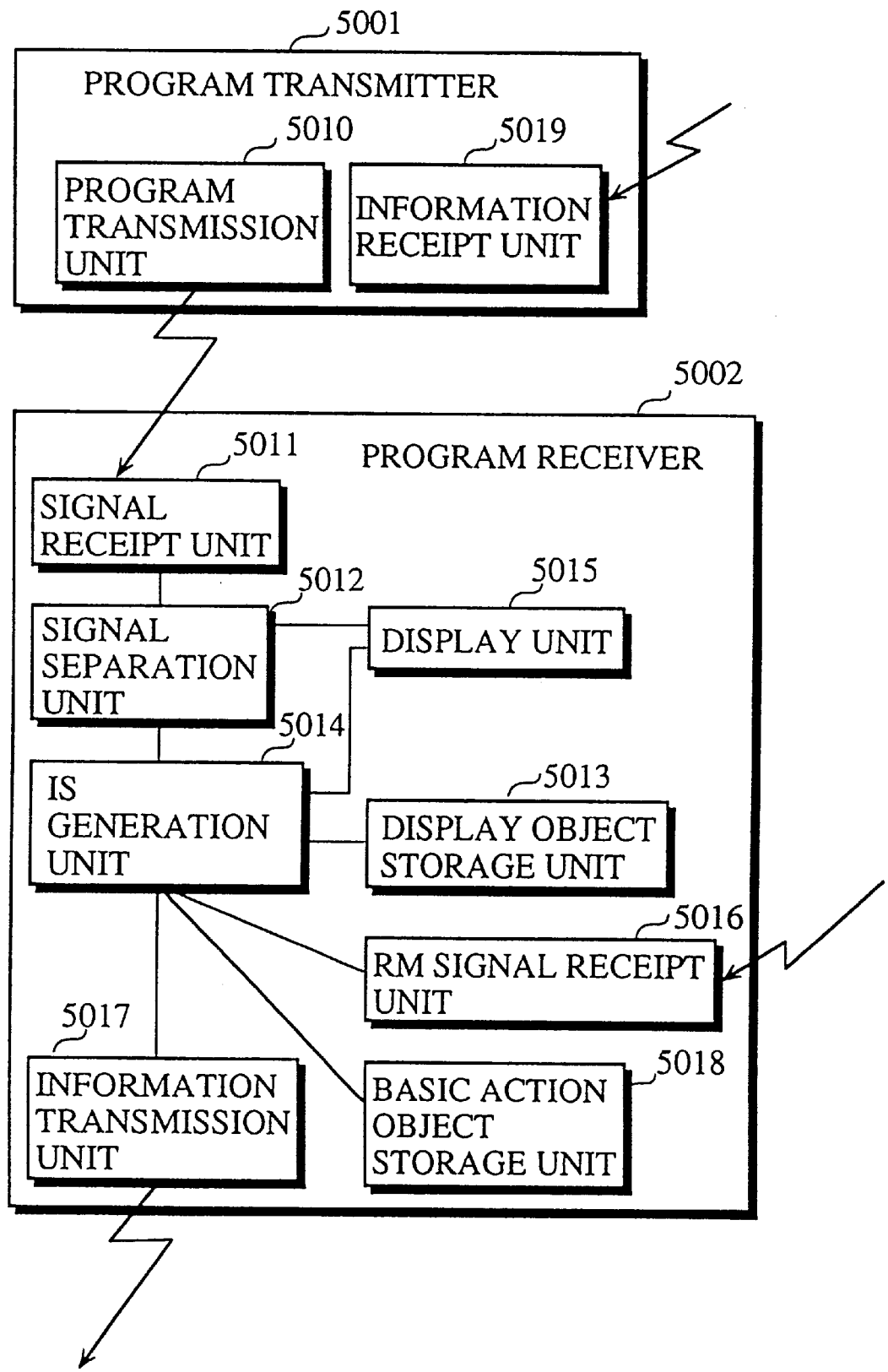
FIG. 50 is a view depicting a structure of a program transmitter and a program receiver in accordance with an eighth embodiment of the present invention.

FIG. 50 is a view depicting the structure of a program receiver and a program transmitter in accordance with the eighth embodiment of the present invention.

A program transmitter 5001 includes a program transmission unit 5010 and a information receipt unit 5019.

The program transmission unit 5010 multiplexes an information supply program and the data specifying the structure of interactive screen (hereinafter referred as to the IS structure specification data) and transmits the resulting multiplex data. The data are multiplexed by, for example, a method multiplexing image and text information in the text broadcast system, or a method for transmitting the signal and video separately via a sound B mode in the satellite broadcast. The journal published by Image Electronic Meeting, Volume 12, No. 4 (1983), pp. 318–326 describes the former method in detail.

The program receiver 5002 includes a signal receipt unit 5011, a signal separation unit 5012, a display object storage unit 5013, an interactive screen (IS) generation unit 5014, a display unit 5015, a RM signal receipt unit 5016, an information transmission unit 5017, and a basic action object storage unit 5018.

The signal receipt unit 5011 receives either the multiplex signal of the information supply program and IS structure specification data or the information supply program signal from the program transmission unit 5010 of the program transmitter 5001, and transmits the same to the signal separation unit 5012.

The signal separation unit 5012 judges whether the signal from the signal receipt unit 5011 is a multiplex signal or not. In case of the multiplex signal, the signal separation unit 5012 separates the received signal into two signals; the information supply program signal and IS structure specification data signal. The former is transmitted to the display unit 5015 and the latter to the IS generation unit 5014. In case of non-multiplex signal, the signal separation unit 5012 passes the received signal to the display unit 5015. If the multiplex signal does not include the IS structure specification data signal as is with the text broadcast, the signal separation unit 5012 passes the received signal to the display unit 5015.

The display object storage unit 5013 stores file names in relation with the bit map data; the file names are used to discriminate the objects, or the basic elements composing the interactive screen, and the bit map data represent the shape of each object.

Figure 51:
FIG. 51 is a view explaining a panel shape 1 in the eighth embodiment.

The file name "panel shape 1" represents the frame of a rectangle 5101 shown in FIG. 51. The rectangle 5101 appears as the window on the display unit 5015.

Figure 52:
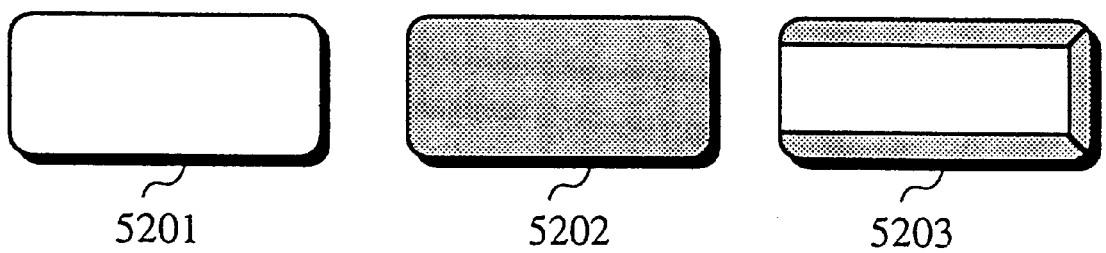
FIG. 52 is a view explaining box shapes 1, 2, and 3 in the eighth embodiment.

The file names "box shape 1", "box shape 2", and "box shape 3" represent the FIGS. 5201, 5202, 5203 shown in FIG. 52, respectively.

Two of the FIGS. 5201 through 5203 fit in the rectangle 5101 horizontally, and three of them fit therein vertically. The FIG. 5202 representing "box shape 2" is shadowed in the drawing; however, the FIG. 5201 representing "box shape 1" may be high-lighted on the display unit 5015. The FIG. 5203 representing "box shape 3" is shadowed at the three sides, but the FIG. 5201 representing "box shape 1" is displayed in 3D (three-dimension) on the display unit 5015.

The file names "button shape 1", "button shape 2", and "button shape 3" correspond to the FIGS. 5301, 5302, and 5303 shown in FIG. 53, respectively. The FIGS. 5301, 5302, and 5303 fit in the rectangle 5101 vertically. The FIG. 5301 representing "button shape 1" is shadowed. However, the FIG. 5301 representing "button shape 2" may be high-lighted on the display unit 5015. Likewise, the FIG. 5303 representing "button shape 3" is shadowed at the three sides, but the FIG. 5301 is displayed in 3D on the display unit 5015.

The IS generation unit 5014 includes a first receipt unit and a second receipt unit: the first receipt unit receives the IS structure specification data signal from the signal separation unit 5012; the second receipt unit receives the signal from the RM signal receipt unit 5016. Further, the IS generation unit 5014 includes a process unit for interpreting the signals received by the first and second receipt units for further processing, and a storage unit, as well as a display control unit for having the display unit 5015 display the interactive screen image.

The IS structure specification data received by the first receipt unit comprise following definitions:

1) a class definition including class attribute information
2) a panel definition including panel information
3) a box definition including box information
4) a button definition including button information
5) action definition including action information
6) a display candidate definition including display candidate information
7) a shape definition including shape information.

The class attribute information shown in FIG. 54, are the information that defines attribute for each class (group) of the objects forming the interactive screen. For example, the attribute of the object belonging to a specific class is defined by "<!ELEMENT . . . >".

For example, "<!ELEMENT BOX(CHARACTER_STRING & SHAPE . . . & STATE_CANDIDATE>" defines that the object belonging to the "box" class has the attribute, "character string", "shape", . . . "state candidate". Similarly, the object belonging to the "button" class has the attribute, "character string", "shape", "action", "selection state", and "focus state"; the object belonging to the "panel" class has the attribute, "shape".

The panel information is the information that defines the objects belonging to the panel class as shown in FIG. 55. The panel information includes panel attribute information defining the attribute of the panel, the name of the box specifying the objects belonging to the box class within the panel, the name of the button specifying the objects belonging to the button class within the panel, and position information specifying the abstract position of the objects specified by the box or the button name.

"<PANEL SHAPE=PANEL_SHAPE>QUIZ 1" defines an object <QUIZ> belonging to the panel class. "SHAPE=PANEL_SHAPE" means that the object has "panel shape" as its shape attribute. Objects between "<PANEL . . . >" and "</PANEL>" are the objects belonging to the "quiz 1 panel". That is to say, there exist the objects, or "America box", "France box", "England box", "Germany box", and "transmission box", in the "quiz 1 panel". In addition, "<v>", "</v>", "<h>", "</h>" define the position of the objects. If the objects are sandwiched by "<v>" and "</v>", they are placed vertically, and if sandwiched by "<h>" and "</h>", then horizontally. Thus, the two objects, "America box" and "France box", are placed horizontally.

The box information are the information that defines the objects belonging to the box class as shown in FIG. 56.

In "<BOX . . . >XXX", ". . . " defines the attribute of the object XXX in the box. For example, followings are the attribute of the object in "America box":

the character string to be displayed is "America"

the shape is "box shape"

the action is "America box action"

the selected state at the initialization is "OFF"

the focus is "ON" at the initialization the state candidate is "ON_OFF candidate".

"The selection state is 'ON'" means that the object is selected, and "the focus is 'ON'" means that the object is subject to manipulation, and thus displayed by being high-lighted or shadowed.

The button information is the information that defines the objects belonging to the button class as shown in FIG. 57.

Like the box objects, ". . . " in "<BUTTON . . . XXX" defines the attribute of the object XXX in the button. For example, followings are the attribute of the object in the "transmission button":

the character string to be displayed is "transmission"

the shape is "button shape"

the action is "transmission button action"

the focus is "OFF" at the initialization.

The action information is the information that defines the action of the objects belonging to the box class and button class as shown in FIG. 58.

In "<ACTION>YYY", YYY represents the action name. In "<EVENT>AAA", AAA represents the event name, and in "<COMMAND>BBB, BBB represents the command name executed when the event specified by the preceding event name occurs. In "<ARGUMENT>CCC, CCC represents the argument delivered to the command specified by the preceding command name. For example, in the "America box action", when an event "right" is transmitted, a command "shift focus" is executed. Also, in executing the "shift focus", an argument "France box" is delivered. In short, when the event "right" is transmitted to the "America box", the focus is shifted to the "France box", and the "France box" has become the subject of manipulation.

The display candidate information is the information that defines a plurality of value candidates as shown in FIG. 59.

In "<CANDIDATE DATA>AAA", AAA represents the candidate data name, and indicating that it has the value sandwiched between "<CANDIDATE_DATA>AAA" and "</CANDIDATE_DATA>" as the candidate value. For example, "<CANDIDATE_DATA>ON_OFF_CANDIDATE" defines the candidate value of "ON_OFF candidate": the "ON_OFF candidate" includes the candidate values of "ON"and "OFF".

The shape information is the information that defines the shape data as shown in FIG. 60.

The data defined between "<SHAPE>" and </SHAPE> are the definition of the shape data, and the shape data vary according to the conditions given by the definition of "<CONDITION>". For example, the "box shape" appears as the "box shape 1" when "FOCUS_STATE=OFF & SELECTION_STATE=OFF" is given, while appearing as the "box shape 2" when "FOCUS_STATE=ON & SELECTION_STATE=OFF" is given, and as the "box shape 3" when "FOCUS=ON" is given.

The first receipt unit in the IS generation unit 5014 receives the IS structure specification data signal and transmits the same to the process unit.

The process unit decodes the IS structure specification data signal and has the storage unit store the same. Further it retrieves the panel information (FIG. 55) from the stored IS structure specification data, and judges whether it is the panel attribute information, box name, button name, or start position information, or end position information per unit (per line in FIG. 55).

In case of the panel attribute information, the process unit obtains the attribute value of the panel "panel shape", and retrieves the shape information (FIG. 60) from the storage unit using the "panel shape". Then, it turns out that the "panel shape" is "panel shape 1", and the process unit obtains the bit map data for the "panel shape 1" (FIG. 51) from the display object storage unit 5013, transmitting the same to the display control unit.

In case of the box name, the process unit stores the box name in a panel information buffer in the storage unit, and retrieves the corresponding box information (FIG. 56) from the storage unit. Further, the process unit obtains the attribute values for the "focus state" and "shape" from the box information, and retrieves the shape information (FIG. 60) from the storage unit to obtain the attribute value of the shape "box shape". The process unit obtains one of the "box shape 1", "box shape 2", and "box shape 3", which is in compliance with the condition of the "box shape", as the file name, and the obtains adequate bit map data for the file name from the display object storage unit 5013. Also, the process unit extracts the attribute value of the "character string" from the box information to synthesize the same with the bit map data to generate the box figure, transmitting the same to the display control unit.

Figure 61A:
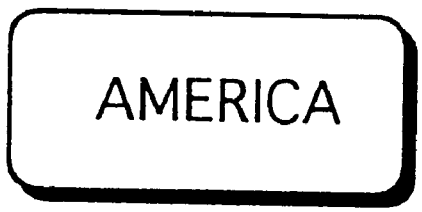
FIGS. 61A through 61C are views explaining display examples of an object (box) in the eighth embodiment.
Figure 61B:
Figure 61C:
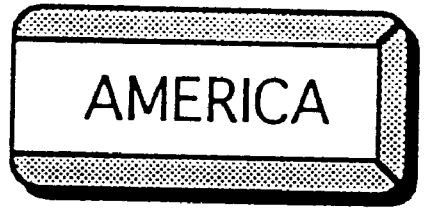

For example, if the attribute value of the "character string" is "America", then the object in the "America box" appears as shown in FIGS. 61A, 61B, and 61C under the conditions "FOCUS_STATE=OFF & SELECTION_STATE=OFF", "FOCUS_STATE=ON & SELECTION_STATE=OFF", and "SELECTION_STATE=ON", respectively.

In case of the button name, the process unit stores the button name in the panel information buffer in the storage unit, and retrieves the corresponding button information (FIG. 57) from the storage unit. The process unit further obtains the attribute value of the "focus state" in the button information to retrieve the shape information (FIG. 60) from the storage unit, obtaining the attribute value of the "shape" and "button shape". Further, the process unit obtains one of the "button shape 1", "button shape 2", and "button shape 3", which is compliance with the condition of the "button shape", as the file name, and retrieves the bit map data corresponding to the file name from the display object storage unit 5013. The process unit extracts the attribute value "transmission" of the "character string" in the button information to synthesize the same with the bit map data to generate the button figure, transmitting the same to the display control unit.

Figure 62A:
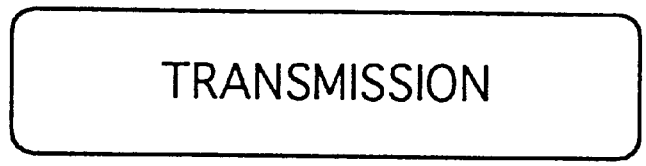
FIGS. 62A and 62B are views explaining display examples of an object (button) in the eighth embodiment.
Figure 62B:
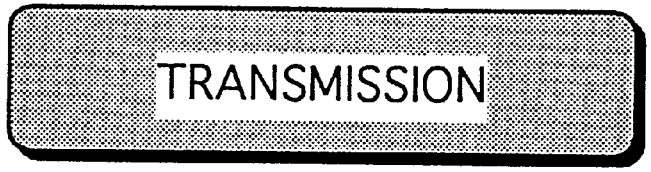

For example, if the attribute value of the "character string" is the "transmission", then the object in the "transmission button" appears as shown in FIGS. 62A and 62B when the condition is "FOCUS_STATE=OFF" and "FOCUS_STATE=ON", respectively.

In case of the start position information, the process unit stores the start position information "<v> or "<h>" in the panel information buffer.

In case of the end position information, the process unit checks whether the end position information "</v>" or "</h>" is consistent with the start position information previously stored in the panel information buffer. When the start position and end position information are inconsistent, or the IS structure specification data are not the end position information, the process unit transmits an error message to the display control unit.

When the end position information is in consistent with the start position information, the process unit retrieves the object names sandwiched between the position information in the panel information buffer in the first-in-first-out order, and places the same virtually as per position information, transmitting the same to the display control unit. While at the same time, the process unit generates a name for a set of the objects, and deletes the names of the virtually placed objects and the position data from the panel buffer and stores the set name instead.

The process unit checks whether the processing for one panel information is completed or not, and transmits a notice of display to the display control unit when the processing is completed.

The process unit in the IS generation unit 5014 receives an event signal from the second receipt unit, and in response changes the interactive screen as per user's instruction. Upon receipt of the event signal, the process unit retrieves the box information (FIG. 56) or button information (FIG. 57) from the storage unit, and extracts the object subject to manipulation (the object exhibiting "FOCUS_STATE=

ON") and its action name. Then, the process unit retrieves the action information (FIG. 58) from the storage unit based on the retrieved action name to retrieve the command name and argument for the received event name. Further, the process unit retrieves the content of the basic action corresponding to the command name from the basic action object storage unit 5018, and accordingly rewrites the box information (FIG. 56) or button information (FIG. 57) in the storage unit, and changes the interactive screen, transmitting the notice of display to the display control unit. If the command name is "attribute value transmission", the process unit retrieves the attribute value of the selection state candidates of each box specified by the "argument", and transmits the same to the information transmission unit 5017.

Figure 63:
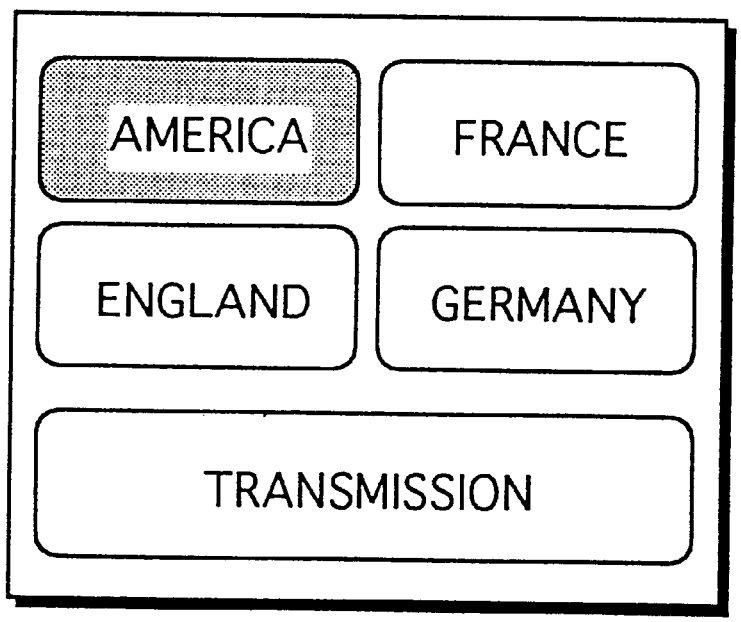
FIG. 63 is a view explaining an example of an interactive screen in the eighth embodiment.

The display control unit receives the bit map data of the panel shape, box figure, button figure, and virtually placed objects as well as display notice from the process unit, and has the display unit 5015 display the interactive screen on the window. FIG. 63 is an example of the interactive screen.

Also, the display control unit receives the display notice for the interactive screen changed as per user's instruction, and has the display unit 5015 display the changed interactive screen.

The storage unit includes the panel information buffer and stores the IS structure specification data from the process unit; the panel information includes data related to the objects therein and the data related to the placement thereof.

Figure 64:
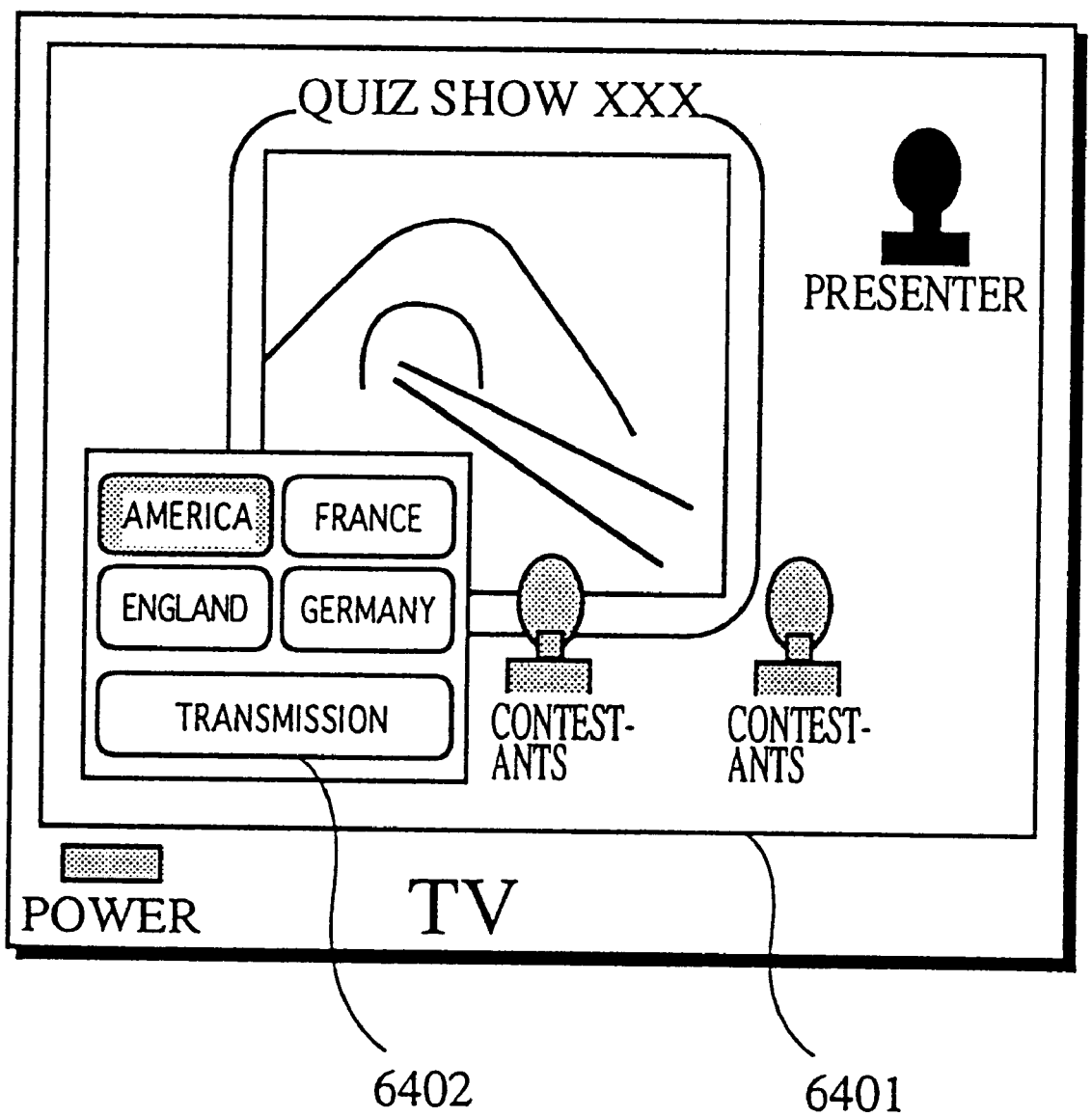
FIG. 64 is a view explaining another example of the interactive screen in the eighth embodiment.

The display unit 5015 includes a screen (CRT), and a control unit for having the screen display the information supply program as per information supply program signal from the signal separation unit 5012. As shown in FIG. 64, the display unit 5015 displays the interactive screen under the control of the IS generation unit 5014 by establishing a window 6402 in a screen 6401.

Figure 65:
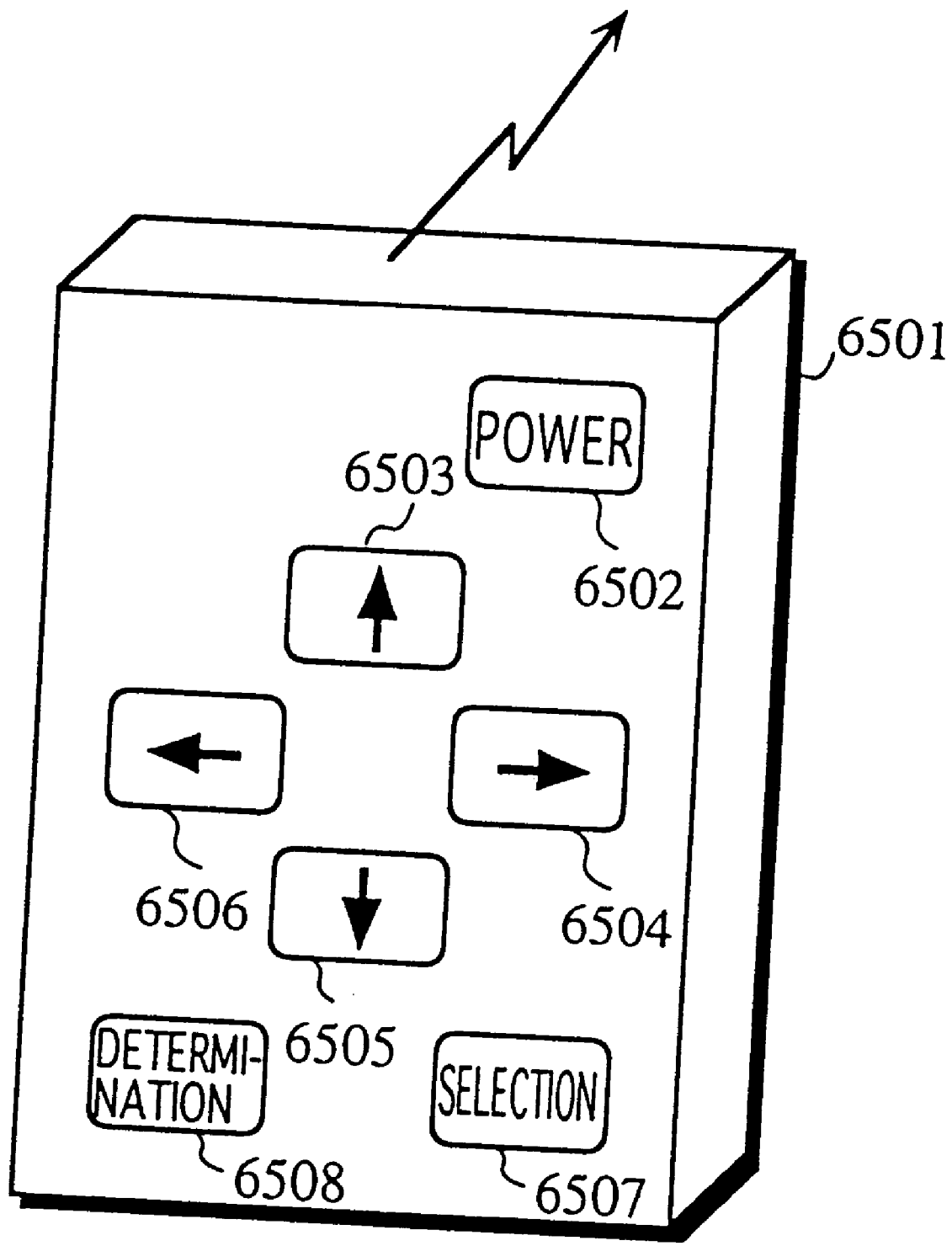
FIG. 65 is a view explaining a remote controller in the eighth embodiment.

The interactive screen in FIG. 63 is changed as shown in FIGS. 66 through 69 as the user pushes the "→" (right), "↓" (down)", "selection", "↓" (down) buttons successively on a remote controller 6501 shown in FIG. 65.

The RM signal receipt unit 5016 receives the signal from the user by means of the remote controller 6501, and transmits the same to the IS generation unit 5014.

The remote controller 6501 includes a power button 6502, an up button 6503 "↑", a right button 6504 "→" a down button "↓", a left button 6506 "←", a "selection" button 6507, and a "determination" button 6508. When the user pushes the power button 6502 once, the RM signal receipt unit 5016 becomes ready, and when he pushes the power button 6502 again, the switch is turned off. When the user pushes the "up" button 6503, an "up" event signal is transmitted to the RM signal receipt unit 5016. Likewise, when the user pushes the "right" button 6504, a "right" event signal is transmitted to the RM signal receipt unit 5016; when the user pushes the "down" button 6505, "left" button 6506, "selection" button 6507, and "determination" button 6508, a "down" event signal, a "left" event signal, a "selection" event signal, and a "determination" event signal are transmitted to the RM signal receipt unit 5016, respectively.

The information transmission unit 5017 transmits interactive screen (IS) data (each attribute value for the selection state candidate) transmitted from the IS generation unit 5014 to the information receipt unit 5019 of the program transmitter 5001.

The basic action object storage unit 5018 stores the following basic actions specified the "command": "shift focus", "switch state", and "transmit attribute value". The "shift focus" basic action means to switch the focus of the object subject to manipulation from "ON" to "OFF", and to switch the focus of the object specified by the "argument" from "OFF" to "ON". The "switch state" basic action means to switch the selection state of the object subject to manipulation from "OFF" to "ON". The "transmit attribute value" basic operation means to retrieve all the attribute values "ON" or "OFF" of the selection state candidates of the object specified by the argument.

The operation related to this embodiment will be explained while referring to the flowcharts in FIGS. 70 through 75.

The program receiver 5002 receives the information supply program signal from the program transmitter 5001 (S7002). The signal separation unit 5012 checks whether the received signal is a multiplex signal or not (S7004), and in case of a multiplex signal, it separates the received signal into the information supply program signal and IS structure specification data signal (S7006). The process unit checks whether the received signal is the information supply program signal or not (S7008). If it is not the information supply program signal, the process unit checks whether there is the IS structure specification data signal or not (S7010). If the IS structure specification data signal exists, the signal separation unit 5012 transmits the same to the IS generation unit 5014 (S7012).

The IS generation unit 5014 generates the interactive screen using the objects stored in the display object storage unit 5013 based on the IS structure specification data signal (S7014).

If the signal is not the multiplex signal in S7004 and judged as to be the information supply program signal in S7008, then the signal separation unit 5012 transmits the information supply program signal to the display unit 5015 when there exists the IS structure specification data signal in S7010 (S7016). The display unit 5015 thus generates the screen for the information supply program (S7018).

The interactive screen generated in S7014 appears together with the information supply program on the window 6402 of the display unit 5015 (S7020).

If the program receiver 5002 stops the signal reception (S7022), the display unit 5015 terminates the display operation; otherwise it return to S7002.

Next, S7014, where the interactive screen is generated by the IS generation unit 5014, will be described more in detail.

The process unit in the IS generation unit 5014 retrieves the panel information in the IS structure specification data from the storage unit (S7102), and retrieves one unit of information from the panel information (panel attribute information, box name, button name, start position information, and end position information). Then, the process unit judges whether all the data related to the panel information are processed or not, and if not (S7106), the process unit further checks whether the retrieved panel information per unit is the panel attribute information or not (S7108). In case of the panel attribute information, the process unit retrieves the "shape" attribute value from the panel attribute information (S7110); otherwise it proceeds to S7116. Subsequently, the process unit retrieves the shape information (file name) that matches with the "shape" attribute value retrieved in S7110 , obtaining the shape data specified by the shape information (S7112). The shape data are the bit map data herein (S7114). Then, the process unit returns to S7104 and proceeds to S7108, and checks whether the retrieved information per unit is the box name or not (S7116). In case of the box name, the process unit proceeds to S7202; otherwise it further checks whether the retrieved information per unit is the button name or not (S7118). In case of the button name, the process unit proceeds to S7302; otherwise, it further checks whether the retrieved information per unit is the start position information or not (S7120). In case of the start position information, it stores the same in the panel information buffer of the storage unit (S7122); otherwise, it further checks whether the retrieved information per unit is the end position information or not (S7124). In case of the end position information, the process unit checks whether the end position information is in consistent with the most recently stored start position information in the panel information buffer (S7126). If there is consistency, the process unit proceeds to S7402. If the retrieved data is not the end position information in S7124, or there is no consistency in S7126, then the process unit transmits the error message representing "incorrect definition for panel information" to the display control unit (S7128), and ends the generation of the interactive screen.

The process unit additionally stores the box name in the panel information buffer, and retrieves the box information corresponding to the box name (S7204), further obtaining the "focus state" attribute value and the "selection state" attribute value of the box information. Then, the process unit retrieves the "shape" attribute value form the box information (S7208), and retrieves the shape information (file name) that matches with the "shape" attribute value (S7210), obtaining the bit map data corresponding to the file name from the display object storage unit 5013 (S7212). Subsequently, the process unit retrieves the "character string" attribute value from the box information (S7214), and synthesizes the same with the bit map data obtained in S7212 to generate the display information for the box figure (S7216), returning to S7104.

The process unit additionally stores the button name in the panel information buffer in S7302, and retrieves the button information matching with the button name (S7304). The process unit retrieves the "focus state" attribute value from the button information (S7306) to further retrieve the attribute value of the "shape" from the button information (S7308). Accordingly, the process unit obtains the shape information (file name) matching with the attribute value of the "shape" (S7310), obtaining the bit map data corresponding to the file name from the display object storage unit 5013 (S7312). Then, the process unit retrieves the attribute value of the "character string" in the button information (S7314), and synthesizes the same with the bit map data retrieved in S7312 to generate the display information for the button figure (S7316), returning to S7104.

Subsequently, the process unit successively retrieves the object names stored following to the most recently stored start position information in the panel information buffer (S7402), and virtually places one or more object either horizontally or vertically as per position information (coordinate values) in the position data retrieved in S7126 (S7404). Further, the process unit attaches a name for a set of the objects retrieved in S7402 (S7406), and deletes the start position information retrieved in S7126 and the objects names in S7402 (S7408), and stores the set name in the panel information buffer instead (S7410), returning to S7104.

In this embodiment, the operation related to the generation of one interactive screen was explained, and it is well assumed that the operation detailed by the flowcharts S71 through S74 are repeated as many times as necessary to process all the IS structure specification data transmitted to the IS generation unit 5014.

The initial interactive screen as shown in FIG. 63 is generated by the IS generation unit 5014 in the above manner.

Figure 75:
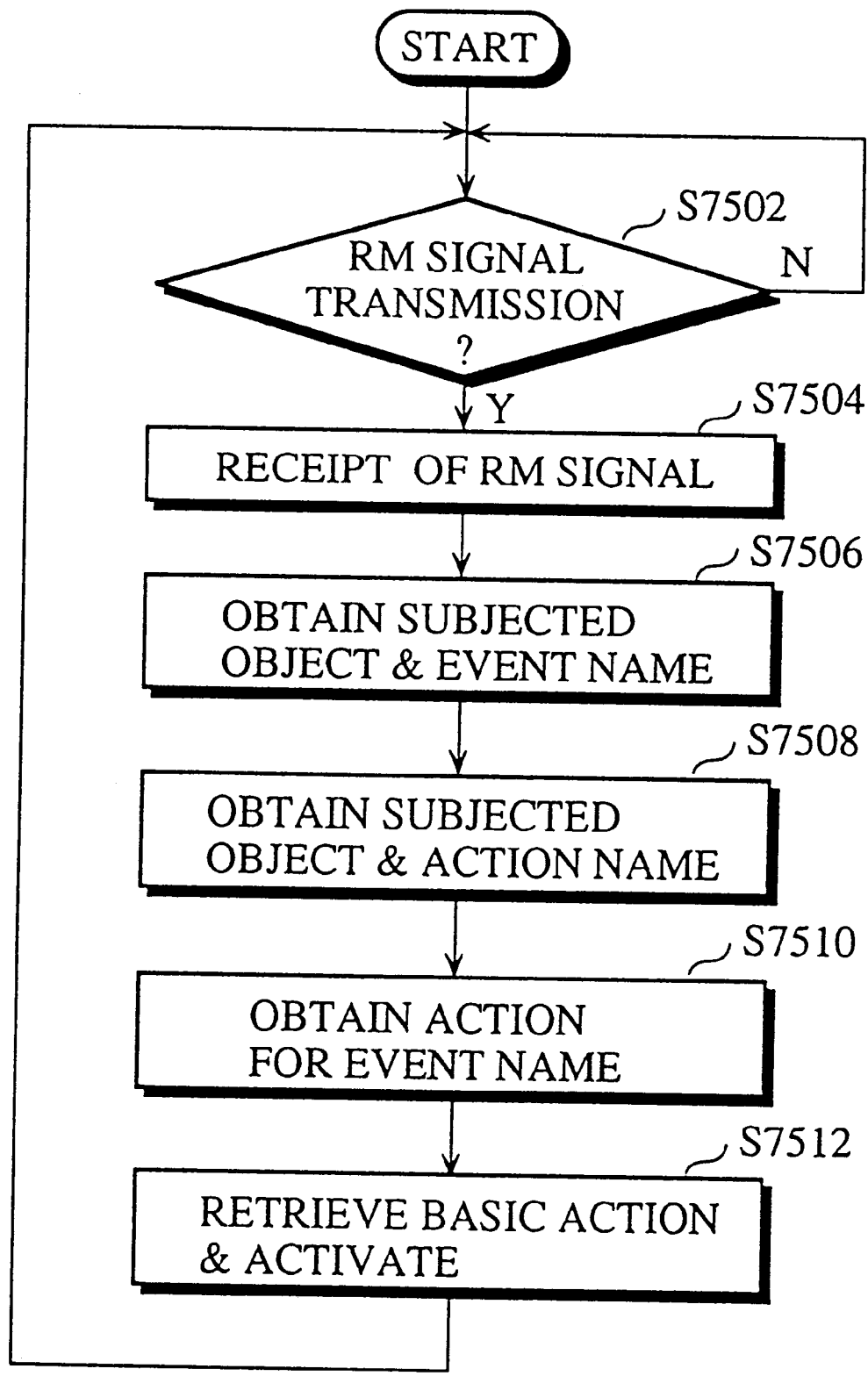
FIG. 75 is a flowchart detailing an interactive operation using the interactive screen in the eighth embodiment.

Next, in the following, the explanation will be given using the flowchart in FIG. 75 for a case where the user transmits a RM signal to the remote controller 6501 (FIG. 65) to the program receiver 5002 while referring to the screen 6401 (FIG. 64). Note that the operation ends when the user pushes the "power" button 6502 of the remote controller 6501.

To begin with, the user pushes the "power" button 6502 of the remote controller 6501, then the RM signal receipt unit 5016 waits for the transmission of the RM signal (S7502). Given these circumstances, a quiz, "This is the scenery in Berlin, the capital of a country in Europe. Now, name the country?" is transmitted from the program transmitter 5001 to the program receiver 5002. Then, the user pushes the "right" button 6504 on the remote controller 6501, so that the "right" event signal is transmitted from the remote controller 6501 to the program receiver 5002. Upon transmission of the RM signal (S7502), the RM signal receipt unit 5016 receives the "right" event signal, and transmits the same to the IS generation unit 5014 (S7504).

Figure 66:
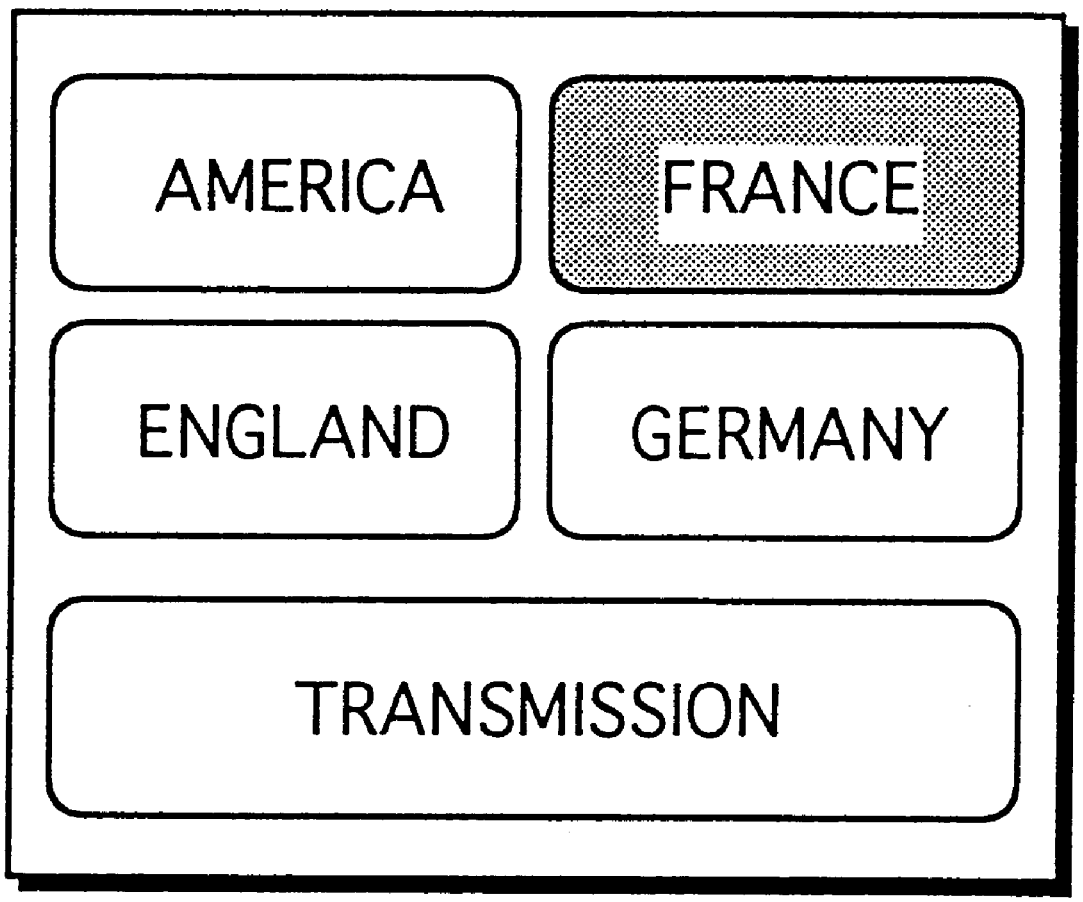
FIG. 66 is a view explaining how the interactive screen is switched in the eighth embodiment.

The second receipt unit of the IS generation unit 5014 receives the "right" event signal, and transmits the same to the process unit. Accordingly, the process unit retrieves the box information (FIG. 56) from the storage unit, and further retrieves the "America box" whose initial focus state is "ON" (S7506) to obtain the action information (FIG. 58) for the "America box" from the storage unit (S7508). The process unit retrieves the attribute "shift focus" of the "command" corresponding to the "right" event signal from the action information of the "America box" and the attribute of the "argument", and "France box" (S7510). The process unit retrieves the procedure for the "shift focus" from the basic action object storage unit 5018. The basic action object storage unit 5018 stores the data to switch the focus state of the subjected object from "ON" to "OFF" in the "shift focus", and switches the focus state of the object specified by the "argument" from "OFF" to "ON". Thus, the process unit rewrites the box information (FIG. 56) in the storage unit to switch the focus state of the "America box" from "ON" to "OFF", while switching the focus state of the "France box" from "OFF" to "ON", and retrieves the content in the display object storage unit 5013 as per shape information (FIG. 60), changing the interactive screen as shown in FIG. 66 (S7512).

Figure 67:
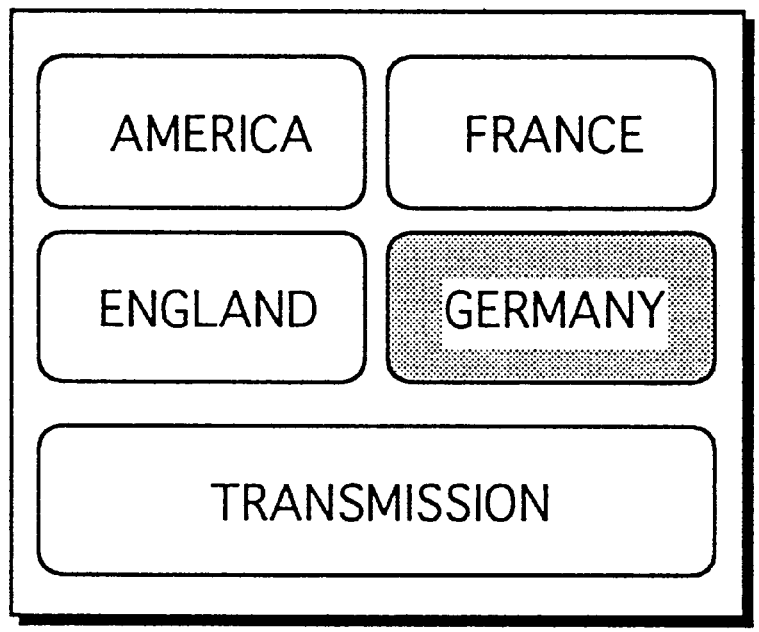
FIG. 67 is another view explaining how the interactive screen is switched in the eighth embodiment.

Subsequently the process unit returns to S7502, and waits for the RM signal from the user. When the user pushes the "down" button 6505 on the remote controller 6501, the "down" event signal is transmitted from the remote controller 6501 to the RM signal receipt unit 5016 (S7504). The process unit receives the "down" event signal and recognizes that the subjected object is the "France box" from the content in the storage unit (S7506), and obtains the action information (FIG. 58) of the "France box" (S7508). Then, the process unit retrieves the attribute "shift focus" of the "command" corresponding to the "down" event signal and the attribute "German box" of the "argument" from the action information of the "France box" (S7510). Then, the process unit rewrites the box information (FIG. 56) in the storage unit, so that it retrieves the procedure for the "shift focus" from the basic action object storage unit 5018, and switches the focus state of the "France box" from "ON" to "OFF", while switching the focus sate of the "German box" from "OFF" to "ON". The process unit retrieves the content in the display object storage unit 5013 as per shape information (FIG. 60), and changes the interactive screen as shown in FIG. 67 (S7512).

Figure 68:
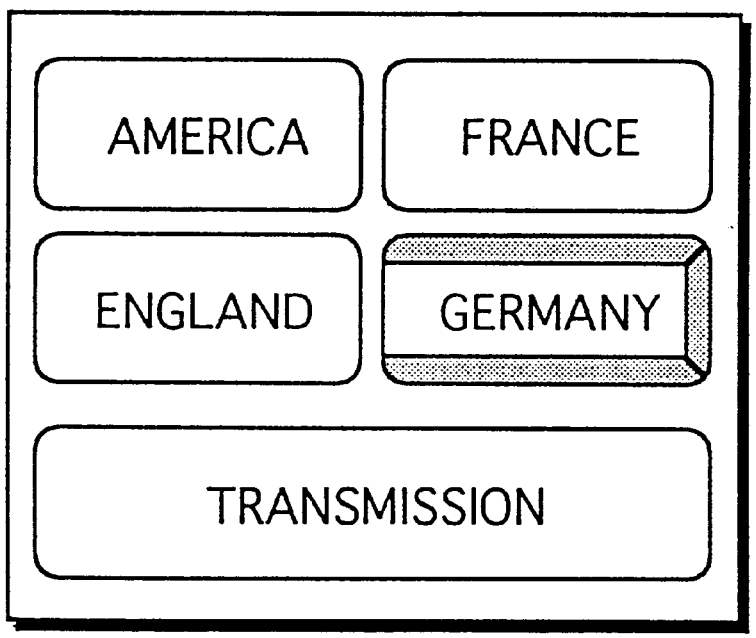
FIG. 68 is another view explaining how the interactive screen is switched in the eighth embodiment.

The user pushes the "selection" button 6507 on the remote controller 6501 to select "Germany" as the answer of the quiz, then, the RM signal receipt unit 5016 receives the "selection" event signal (S7504). The process unit recognizes that the subjected object is the "Germany box" from the focus state (S7506), and obtains the action information of the "Germany box" (FIG. 58) (S7508). The process unit retrieves the attribute "switch state" of the "command" corresponding to the "selection" event signal from the action information of the "Germany box" (S7510). Then, the process unit retrieves the procedure related to the "switch state" from the basic action object storage unit 5018 to rewrite the box information (FIG. 56), so that the "selection state" of the "Germany box" is switched to "ON". While at the same time, the process unit switches the value of the state candidate to "ON", changing the interactive screen as shown in FIG. 68 (S7512).

Figure 69:
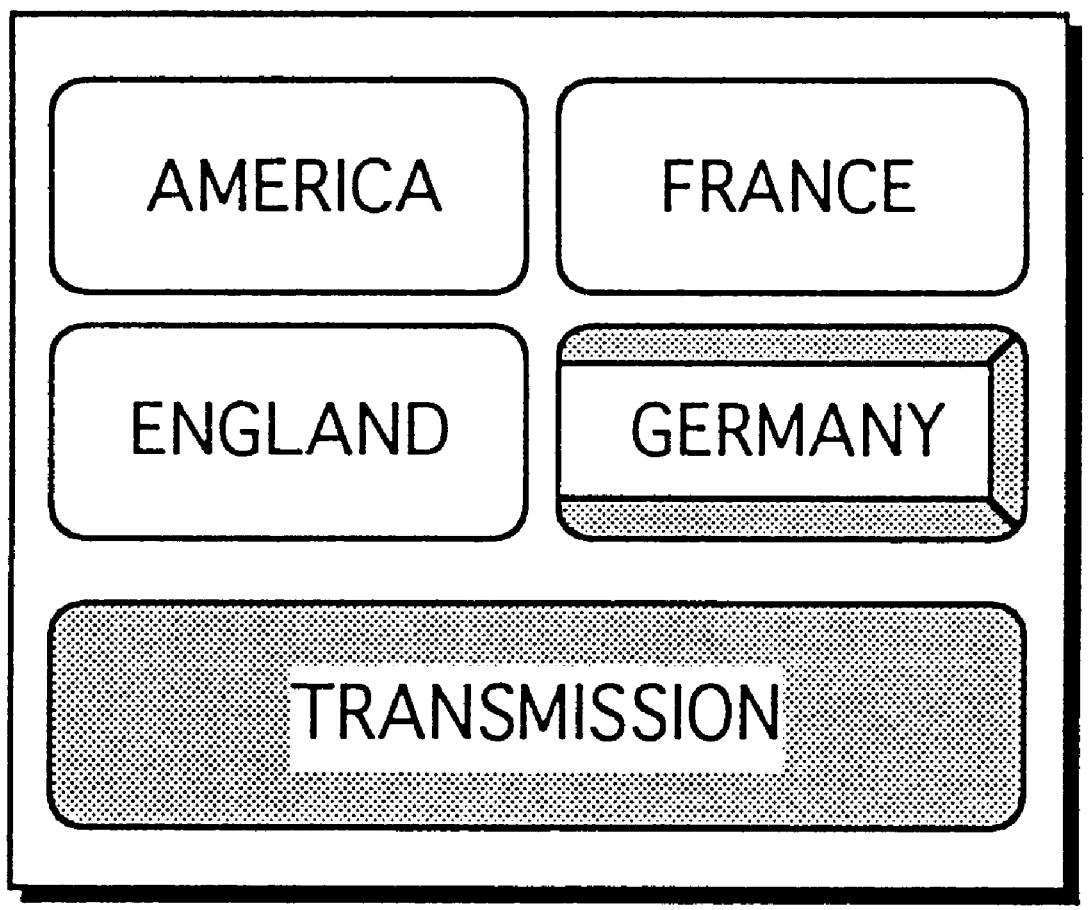
FIG. 69 is another view explaining how the interactive screen is switched in the eighth embodiment.
Figure 70:
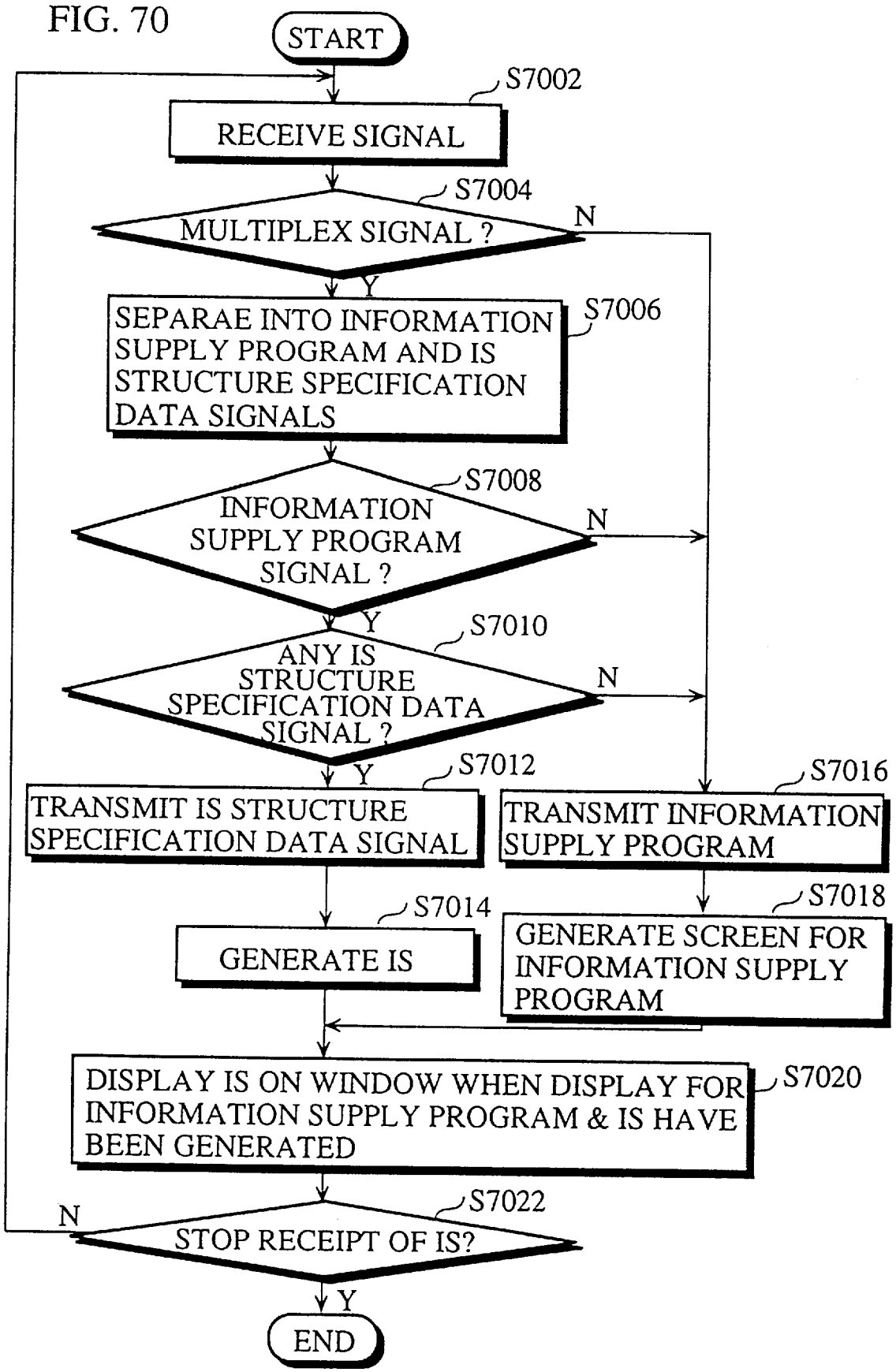
FIG. 70 is a flowchart detailing the operation of the program transmitter and program receiver in the eighth embodiment.
Figure 71:
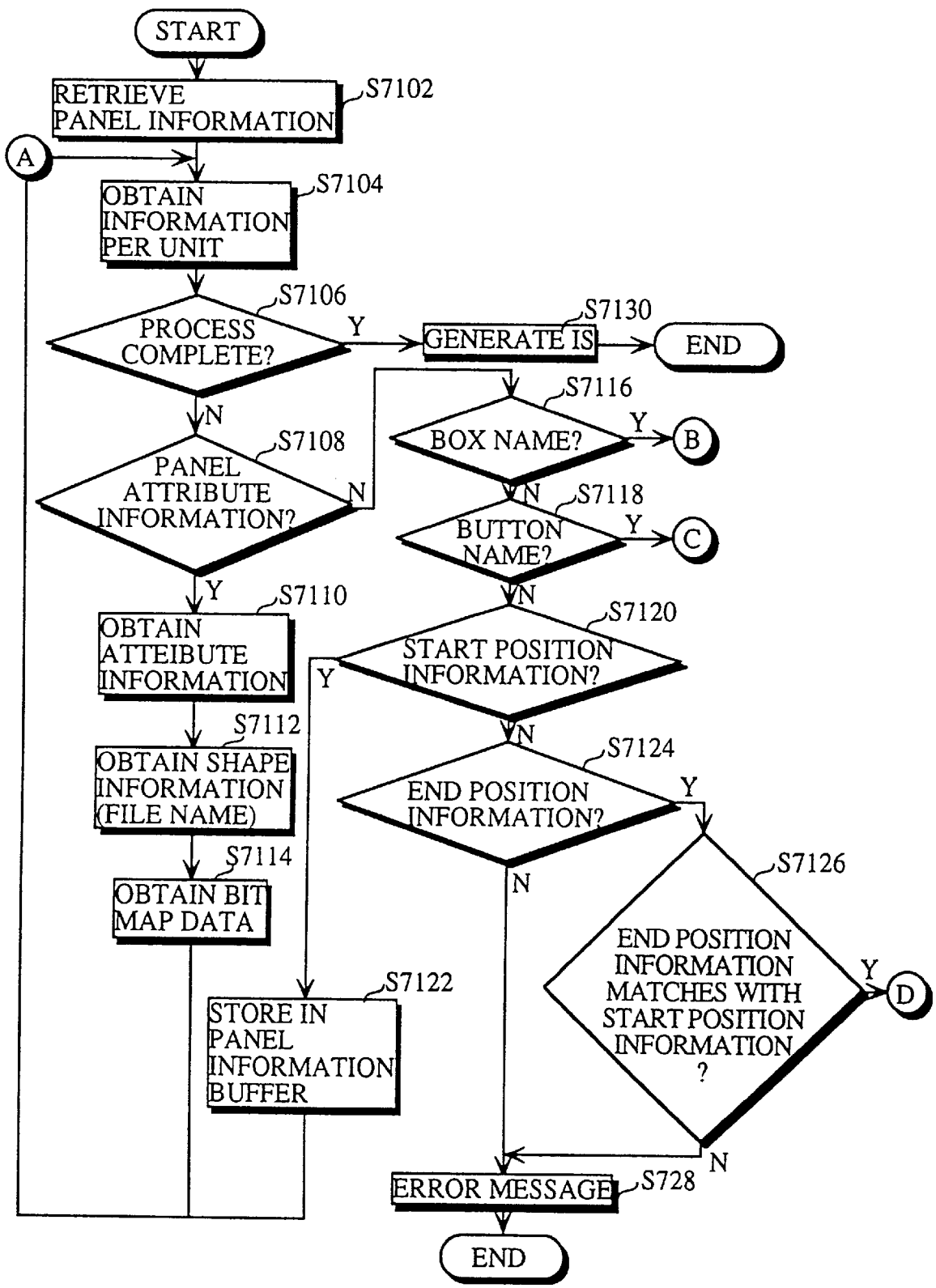
FIG. 71 is a flowchart detailing how the interactive screen is generated in the eighth embodiment.
Figure 72:
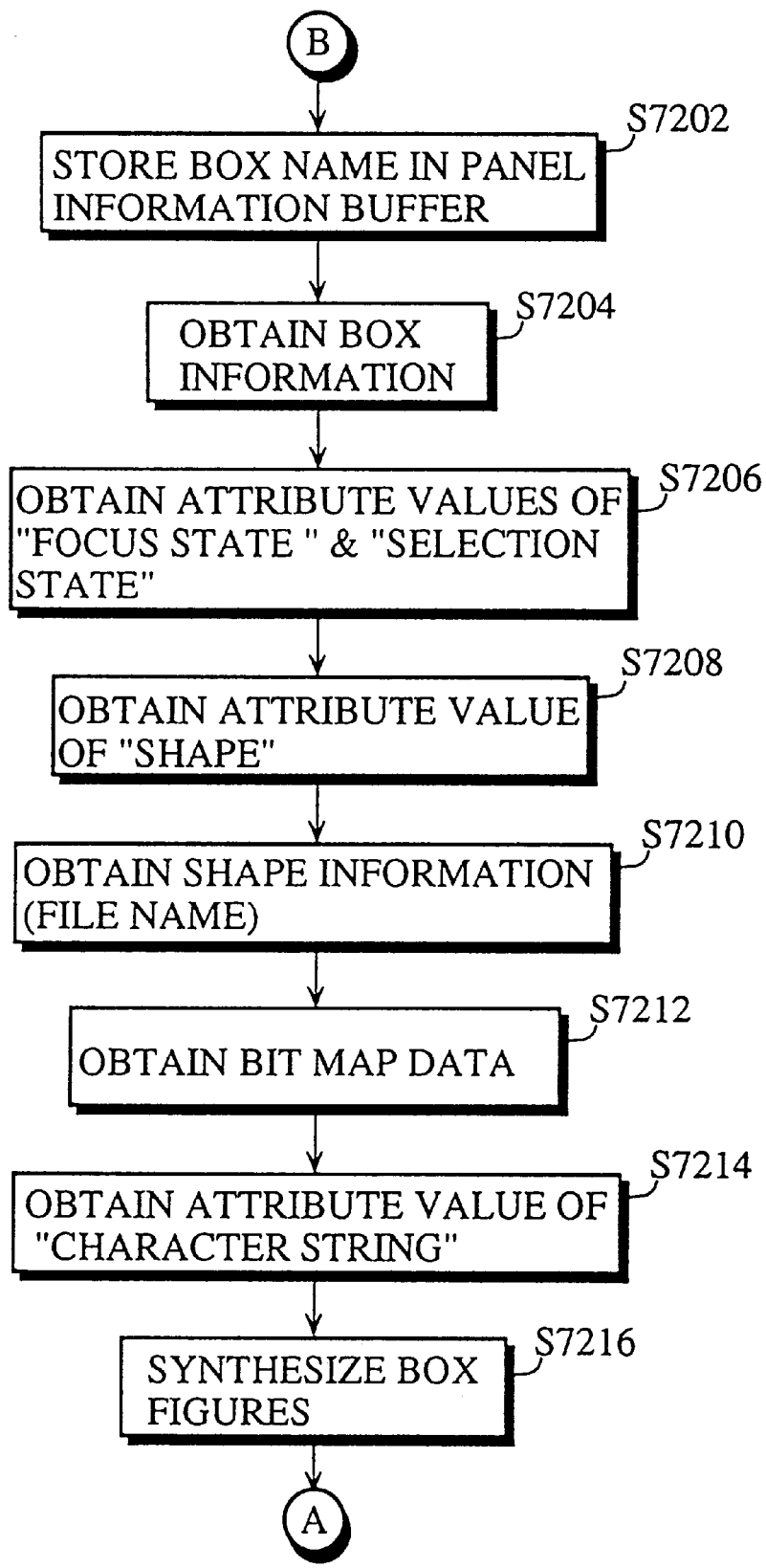
FIG. 72 is another flowchart detailing how the interactive screen is generated in the eight embodiment.
Figure 73:
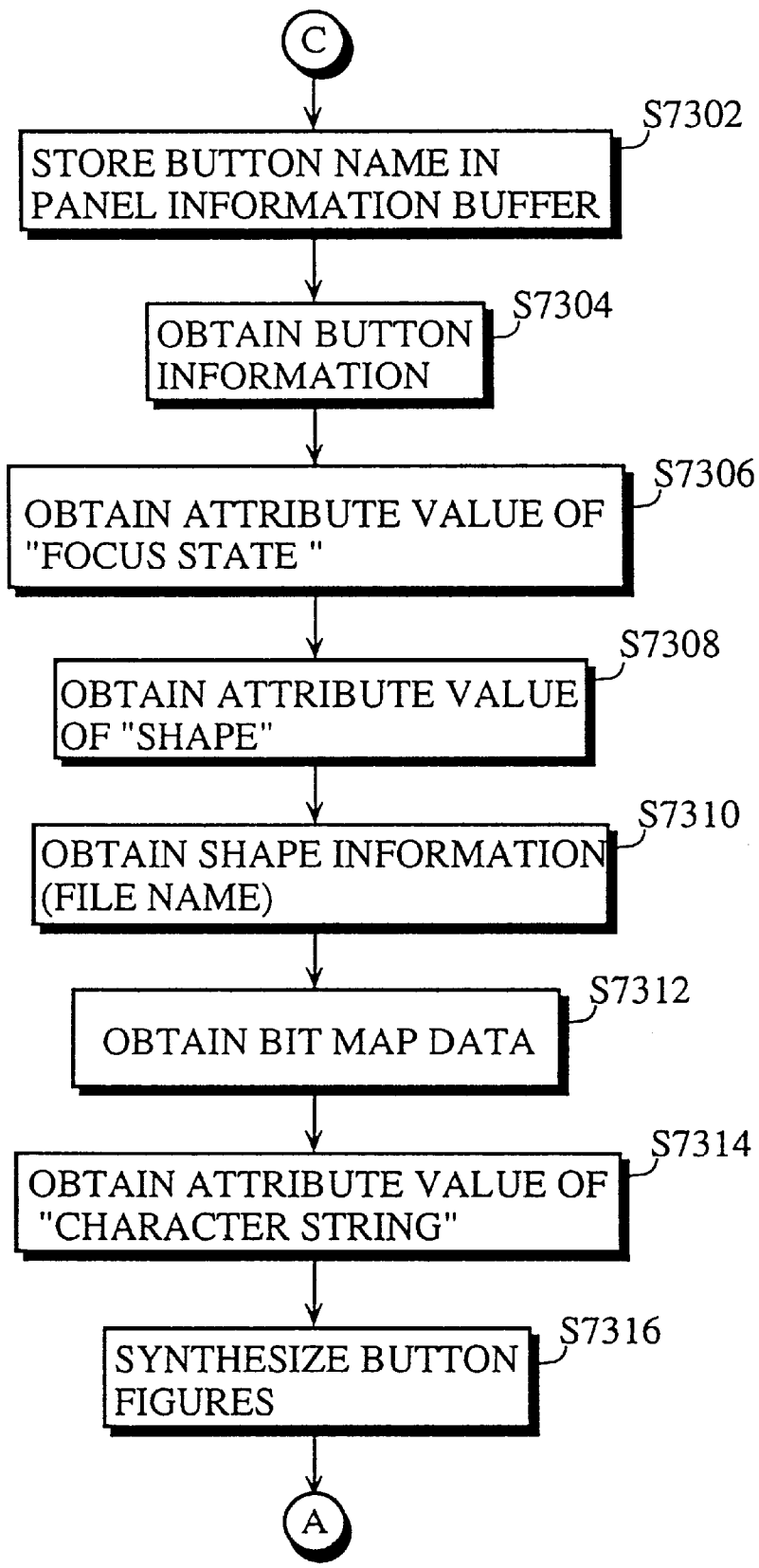
FIG. 73 is another flowchart detailing how the interactive screen is generated in the eight embodiment.
Figure 74:
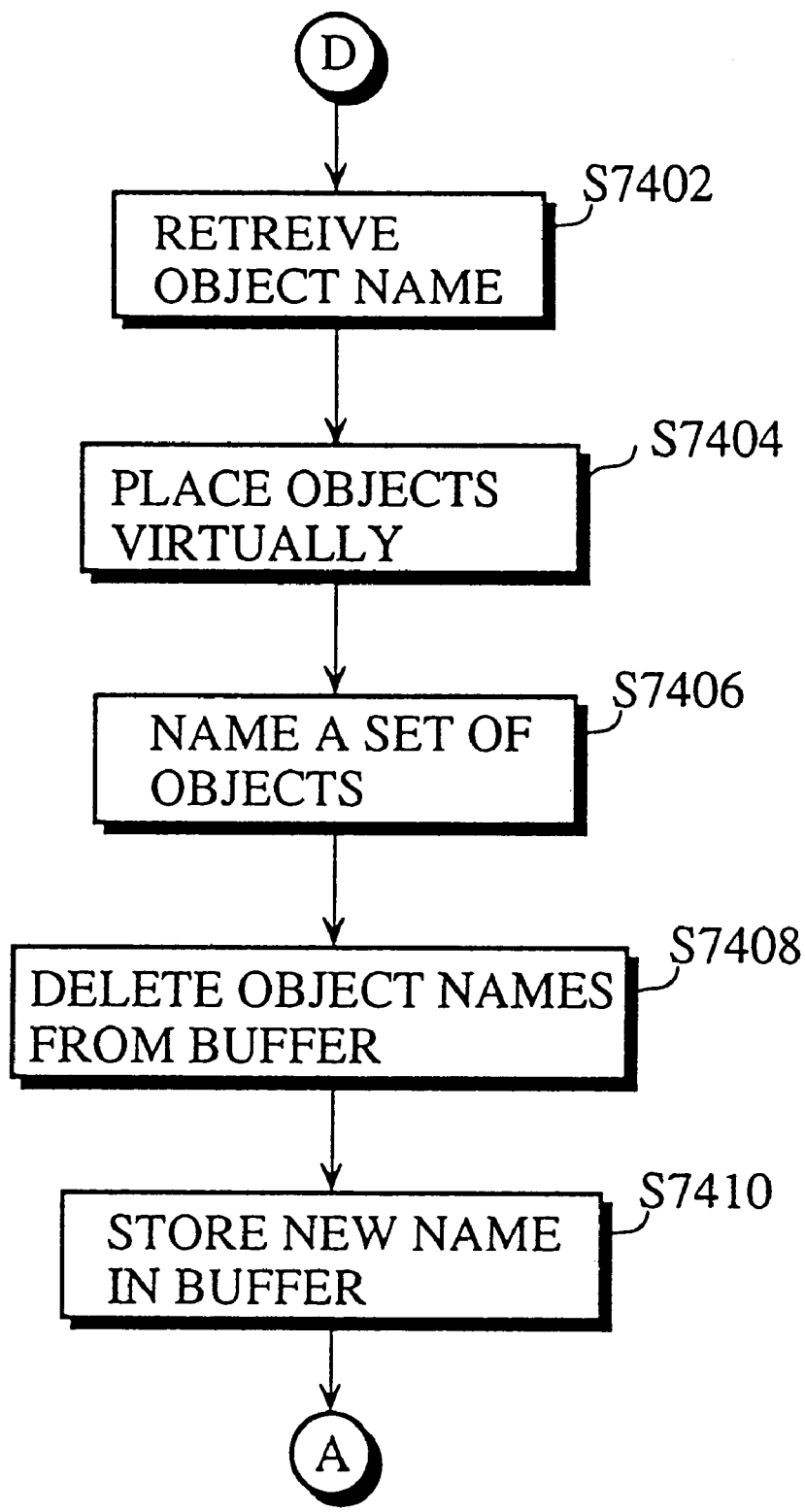
FIG. 74 is another flowchart detailing how the interactive screen is generated in the eight embodiment.

Then, the user pushes the "down" button 6505 on the remote controller 6501 to shift the focus to the "transmission button", and transmits the "down" event signal to the program receiver 5002. Subsequently, S7502 through S7512 are repeated, and the interactive screen as shown in FIG. 69 is generated.

Next, the user pushes the "determination" button 6508 on the remote controller 6501 to transmit the answer of the quiz "Germany" to the program transmitter 5001. Then, the RM signal receipt unit 5016 receives the "determination" event signal (S7504), and the process unit of the IS generation unit 5014 retrieves the same and recognizes that the subjected object is the "transmission button" (S7506).

The process unit retrieves the "transmission button action" from the action information (FIG. 58) (S7508), and further retrieves the procedure of the attribute of the command corresponding to the "determination" event signal, or the "transmit attribute value" from the basic action object storage unit 5018 (S7510). The process unit retrieves the attribute values ("ON" or "OFF" specified by the state candidates) of the attribute of the "argument" specified by the event "determination" of the "transmission button action": "America box", "France box", "England box", and "Germany box", and transmits the same to the information transmission unit 5017 (S7512).

The information transmission unit 5017 retrieves the values of the state candidates and the box names retrieved by the process unit in S7512, and transmits the same to the information receipt unit 5019 of the program transmitter 5001. In this embodiment, following information is transmitted: "America box.OFF", "France box.OFF", "England box.OFF", and "Germany box.ON". Thus, the data exhibiting "the answer is Germany" is transmitted, and the program transmitter 5001 specifies the users with the correct answer, or counts the number of such users.

As has been stated, the process unit interprets the IS structure specification data from the program transmitter 5001, and generates the interactive screen by synthesizing the same with the basic display elements stored in the display object storage unit 5013. Thus, the interactive screen can be changed by synthesizing the interactive screen data with the actions stored in the basic action storage unit 5018, and the resulting interactive screen data can be transmitted to the program transmitter 5001.

NINTH EMBODIMENT

Figure 76:
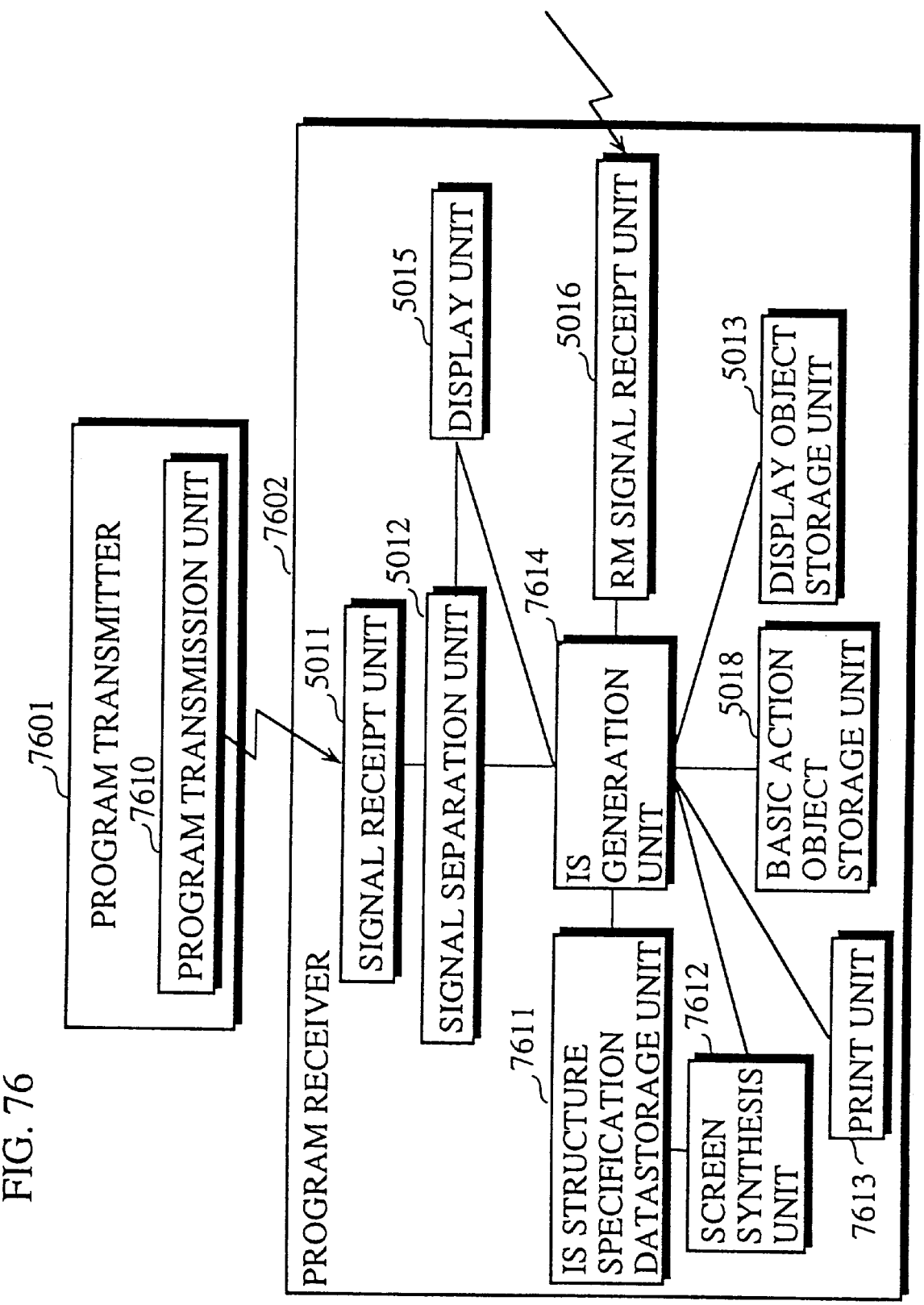
FIG. 76 is a view showing a structure of a program transmitter and a program receiver in accordance with a ninth embodiment of the present invention.

FIG. 76 is view depicting the structure of a program receiver and a program transmitter in accordance with the ninth embodiment.

A program transmitter 7601 includes a program transmission unit 7610 for transmitting the IS structure specification data by multiplexing the same.

A program receiver 7602 includes a signal receipt unit 5011, a signal separation unit 5012, a display object storage unit 5013, a display unit 5015, a RM signal receipt unit 5016, a basic action object storage unit 5018, an IS structure specification data storage unit 7611, a screen synthesis unit 7612, a print unit 7613, and an IS generation unit 7614. Like components are labeled with like reference numerals with respect to the eighth embodiment, and the description of these components is not repeated.

The IS structure specification data storage unit 7611 stores first IS structure specification data excluding a synthesis direction generated by the signal separation unit 5012.

The screen synthesis unit 7612 includes a counter that attaches a n'th number to a synthesis process unit, synthesis storage unit, and a synthesis command. The synthesis process unit receives second IS structure specification data including the synthesis direction from the IS generation unit 7614, and stores the same in the synthesis storage unit. Also, the screen synthesis unit 7612 retrieves the first IS structure specification data from the IS structure specification data storage unit 7611; the first IS structure specification data correspond to the data subject to synthesis included in the second IS structure specification data. The screen synthesis unit 7612 synthesizes the first and second IS structure specification data, and transmits the resulting synthesized IS structure specification data to the IS generation unit 7614. When there exist no first IS structure specification data, the second IS structure specification data are transmitted to the IS generation unit 7614 as the synthesized IS structure specification data.

Assume that the IS structure specification data unit 7611 stores the first IS structure specification data as was explained in the eighth embodiment using FIGS. 54 through 60 and the screen synthesis unit 7612 receives the first IS structure specification data shown in FIGS. 77 through 88. Then, the synthesis process unit has the synthesis storage unit store the second IS structure specification data: the synthesis process unit retrieves the synthesis command per unit sandwiched between "<SYNTHESIS_DIRECTION>" and "</SYNTHESIS_DIRECTION>", while resetting the counter to zero. When there exists no synthesis command, the generation of the IS structure specification data is terminated. The synthesis process unit further checks whether the retrieved synthesis command is "add command" or "display command".

In case of the "add command", the synthesis process unit checks whether the subjected information is the object information, action information, shape information or display candidate information using the information sandwiched by "<SYNTHESIS_COMMAND>ADD" and "</SYNTHESIS_COMMAND>".

The synthesis process unit retrieves the object information shown in FIG. 77 from the synthesis storage unit. The object data includes an object identifier "quiz1", and its attribute value "timeout=60 sec". The synthesis process unit retrieves the object information (panel information in FIG. 55) corresponding to the object identifier in the IS structure specification data storage unit 7611, and synthesizes the same with the attribute value "timeout=60 sec" in the "add command" in the second IS structure specification data, generating new panel information as shown in FIG. 81. Accordingly, the synthesis process unit transmits the new panel information to the IS generation unit 7614, and increments the counter by one.

Then, the synthesis process unit retrieves the synthesis command. The retrieved action information comprises, as shown in FIG. 78, the action identifier "America box action", event "help", execution command "open panel" for the event, and the argument of the execution command "help panel". The synthesis process unit retrieves the action information ("America box action" in FIG. 58) corresponding to the "American box action" specified by the action identifier from the IS structure specification data storage unit 7611. Since there exists no event "help" for the attribute value of the "America box action", the synthesis process unit synthesizes the event, execution command and argument, generating the new action information "America box action" as shown in FIG. 82. Accordingly, the synthesis process unit transmits the same to the IS generation unit 7614 and increments the counter by one.

Assume that the IS structure specification data storage unit 7611 stores the "America box action", and there exists the definition of the event "help". Then, the synthesis process unit generates the synthesized information by adding "<COMMAND>" "open panel" and "<ARGUMENT>" "help panel" to "<COMMAND> "display guidance" of the first IS structure specification data, and the resulting IS specification structure data are shown in FIG. 84.

The synthesis process unit retrieves the synthesis command from the shape information shown in FIG. 79. The shape information includes a shape identifier "button shape", a selection of the shape information identified by the shape identifier "selection state=ON", and a figure in compliance with the condition "button shape 3". The synthesis process unit retrieves the shape information ("button shape" in FIG. 60) corresponding to the "button shape" specified by the shape identifier from the IS structure specification data storage unit 7611, and checks whether there exists the condition "selection state=ON" in the condition of the button shape. Since there is no condition "selection state", the synthesis process unit adds the condition to the "button shape", generating the synthesized data as shown in FIG. 85. Accordingly, the synthesis process unit transmits the synthesized data to the IS generation unit 7614, and increments the counter by one.

The synthesis process unit retrieves the display candidate information shown in FIG. 80 from the synthesis storage unit. The display candidate information includes a display identifier "ON_OFF candidate", and more than one display candidate value "null". The synthesis process unit retrieves the display candidate information (FIG. 59) from the IS structure specification data storage unit 7611, and since there exists "ON_OFF candidate" corresponding to the display identifier, it adds the display candidate value "null", generating the synthesized data as shown in FIG. 86. Accordingly, the synthesis process unit transmits the synthesized display candidate information to the IS generation unit 7614, and increments the counter by one.

The synthesis process unit transmits the panel identifier and position information to the IS generation unit 7614 in case of the display command.

If the add command retrieved by the synthesize process unit is neither allowed to be processed nor the display command, then, the synthesis process unit transmits an error message to the IS generation unit 7614.

The synthesis process unit retrieves the display candidate information shown in FIG. 80 from the synthesis storage unit. The display candidate information comprise a display identifier "ON_OFF candidate" and more than one display candidate value "null". The synthesis process unit retrieves the display candidate information (FIG. 59) from the IS structure specification data storage unit 7611, and since there exists "ON_OFF candidate" corresponding to the display identifier, the synthesis process unit adds the display candidate value "null" to the retrieved display candidate information, generating new display candidate information as shown in FIG. 86. Accordingly, the synthesis process unit transmits the same to the IS generation unit, and increments the counter by one.

The synthesis process unit, in case of the display command, transmits the panel identifier and position information to the IS generation unit 7614. When the add command retrieved by the synthesis process unit is neither allowed to be processed nor the display command, then the synthesis process unit transmits an error message to the IS generation unit 7614.

The print unit 7613 receives a print direction from the IS generation unit 7614, and prints out the interactive screen currently displayed on the display unit 5015.

The IS generation unit 7614 includes a third receipt unit for receiving the data from the screen synthesis unit 7612 in addition to the structure of the IS generation unit 5014 of the eighth embodiment.

The process unit is designed to function as follows in addition to the function of the process unit of the eighth embodiment. The first receipt unit checks whether the IS structure specification data from the signal separation unit 5012 includes the synthesis information or not. When the synthesize information is excluded, the process unit has both the IS structure specification data storage unit 7611 and storage unit store the IS structure specification data as the first IS structure specification data; otherwise, it transmits the same to the screen synthesis unit 7612 as the second IS structure specification data. Upon receipt of the error message from the third receipt unit, the process unit directs the display control unit to display "error message" indicating inadequate synthesis command.

Also, the process unit receives the event signal from the RM signal receipt unit 5016 by way of the second receipt unit, then it transmits a print direction to the print unit 7613 when the basic action object storage unit 5018 does not store the basic action corresponding to the command name.

The third receipt unit receives the synthesized IS structure specification data from the screen synthesis unit 7612, and rewrites the IS structure specification data in the storage unit. The third receipt unit also notifies the error to the process unit upon receipt of the error message from the screen synthesis unit 7612.

Next, an example of the first IS structure specification data from the signal separation unit 5012 will be explained using FIGS. 87 through 92.

FIG. 87 defines the attribute of the class shown in FIG. 54 in the eighth embodiment. Here, "<!ELEMENT TEXT (CHARACTER_STRING)>" defines that the object belonging to the "text" class has the attribute "character string".

FIG. 88 defines the attribute of the objects belonging to the panel class composing the interactive screen, and the objects of the panel. Here, "user panel 1" includes "address 1", "telephone no. 1", "hot spring 1", and "print button", and the "shape attribute" is "panel shape".

FIG. 89 defines the objects belonging to the text class. For example, the object of "address 1" displays the character string "Shirahama-cho, Wakayama Pref.", and the object of the "telephone no. 1" displays the character string "059352-1-201"; the object of the "hot spring 1" displays the character string "Shirahama Hot Spring".

FIG. 90 defines the objects belonging to the button class. The "print button" object displays the character string "print", its shape is defined as the "button shape", the action is defined as the "print button action", and the focus state at the initialization is "ON".

FIG. 91 shows the information that defines the action of the objects belonging to the button class. "Print button action" defines that the "print" command is executed when the "determination" event is transmitted. In executing the "print", the arguments "address 1", "telephone no. 1", and "hot spring 1" are supplied. If the subjected object is the "print button", then the "address 1", "telephone no. 1", "hot spring 1" are printed out when the "determination" event is transmitted.

Figures 92, 93:
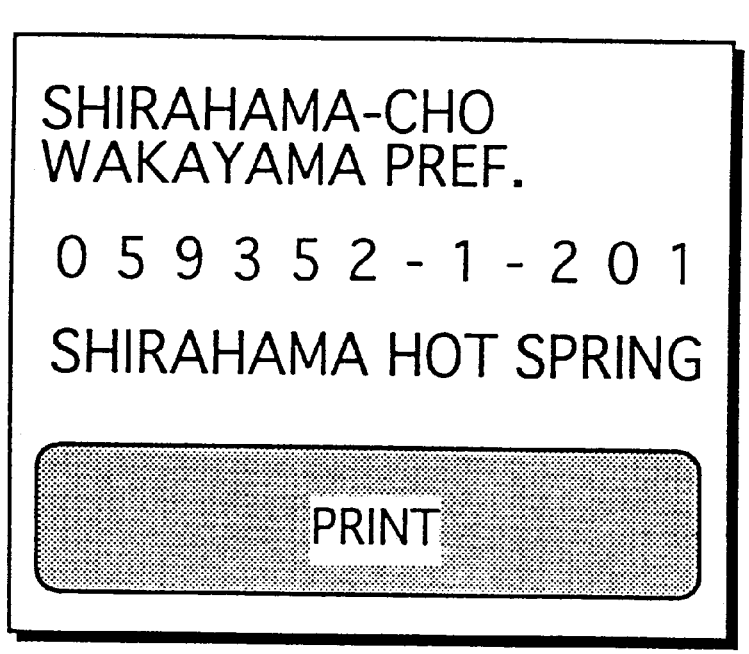
FIG. 92 is a view explaining the shape information in the ninth embodiment.
FIG. 93 is a view explaining an example of the interactive screen in the ninth embodiment.

FIG. 92 defines the shape information: the information sandwiched by "<SHAPE>" and "</SHAPE>" are the definition of the shape information, and the shape information varies depending on the definition of "<CONDITION>". More precisely, the "panel shape" always appears as the "panel shape 1", and the "button shape" appears as the "button shape 1" given the condition "focus state=OFF", while appearing as the "button shape 2" given the condition "focus state=ON".

As has been stated, by receiving the first IS structure specification data, the display unit 5015 displays the interactive screen as shown in FIG. 93 on the window 6402.

Further, the signal receipt unit 5011 receives the multiplex signal of the first IS structure specification data (FIGS. 95 through 99) including the second IS structure specification data (FIG. 94).

FIG. 94 shows the synthesis direction information. The synthesis direction includes a plurality of synthesis commands, and the synthesis command includes an add command and a display command.

The information sandwiched by "<SYNTHESIS_DIRECTION>" and "</SYNTHESIS_DIRECTION>" are the synthesis direction. "<SYNTHESIS_COMMAND>DISPLAY" means to synthesize the objects sandwiched by "<SYNTHESIS_COMMAND>DISPLAY" and "</SYNTHESIS_COMMAND>", and places the synthesized objects. Since two objects are sandwiched between "<v>" and "</v>", the two panel objects "user panel 1" and "user panel 2" are placed vertically.

"<SYNTHESIS_COMMAND>ADD" includes the information to be synthesized and the parameter indicating the synthesizing information, and it is the command to add the information sandwiched between the "<SYNTHESIS_COMMAND>ADD" AND "<SYNTHESIS_COMMAND>" to the first IS structure specification data. This means to add the parameters "<EVENT>DOWN<COMMAND>SHIFT_FOCUS>ARGUMENT>PRINT_BUTTON 2" to the "print button action" specified by "<ACTION>PRINT_BUTTON_ACTION" in the action information (FIG. 91) of the first IS structure specification data. By "<SYNTHESIS_COMMAND>", the action information shown in FIG. 100 is generated.

FIG. 95 defines the objects belonging to the panel class.

FIG. 96 defines the objects belonging to the text class.

FIG. 97 defines the objects belonging to the button class.

FIG. 98 is the data defining the action of the objects belonging to the button class.

FIG. 99 defines the shape information.

The synthesized IS structure specification data are generated by the screen synthesis unit 7612 and the display unit 5015 displays the interactive screen as shown in FIG. 101 on the window 6402.

When the user pushes the "down" button 6505 on the remote controller 6501, the interactive screen as shown in FIG. 102 appears on the window 6402.

Figure 104:
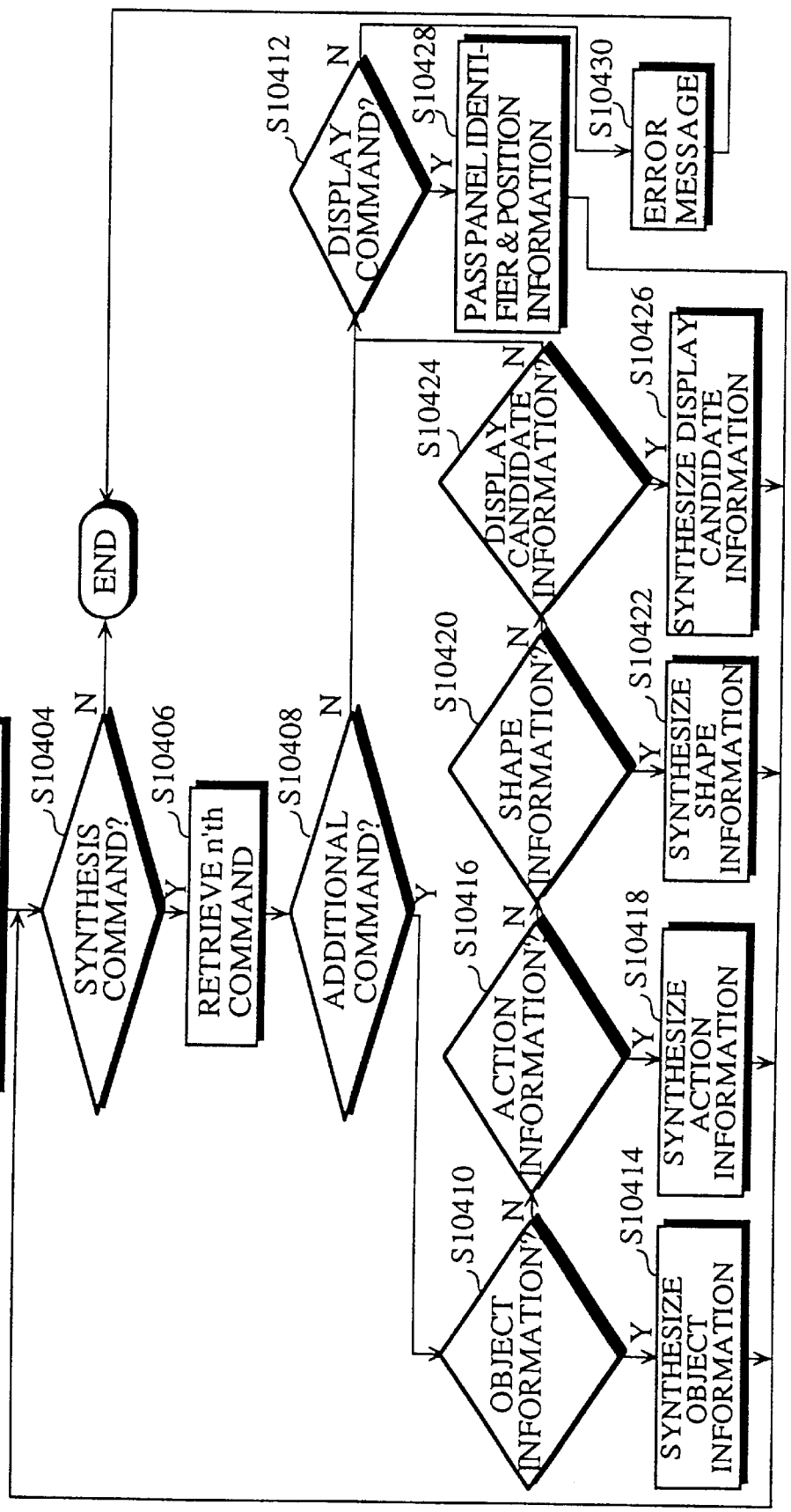
FIG. 104 is a flowchart detailing a synthesis operation for interactive screen structure specification data in the ninth embodiment.
Figure 105:
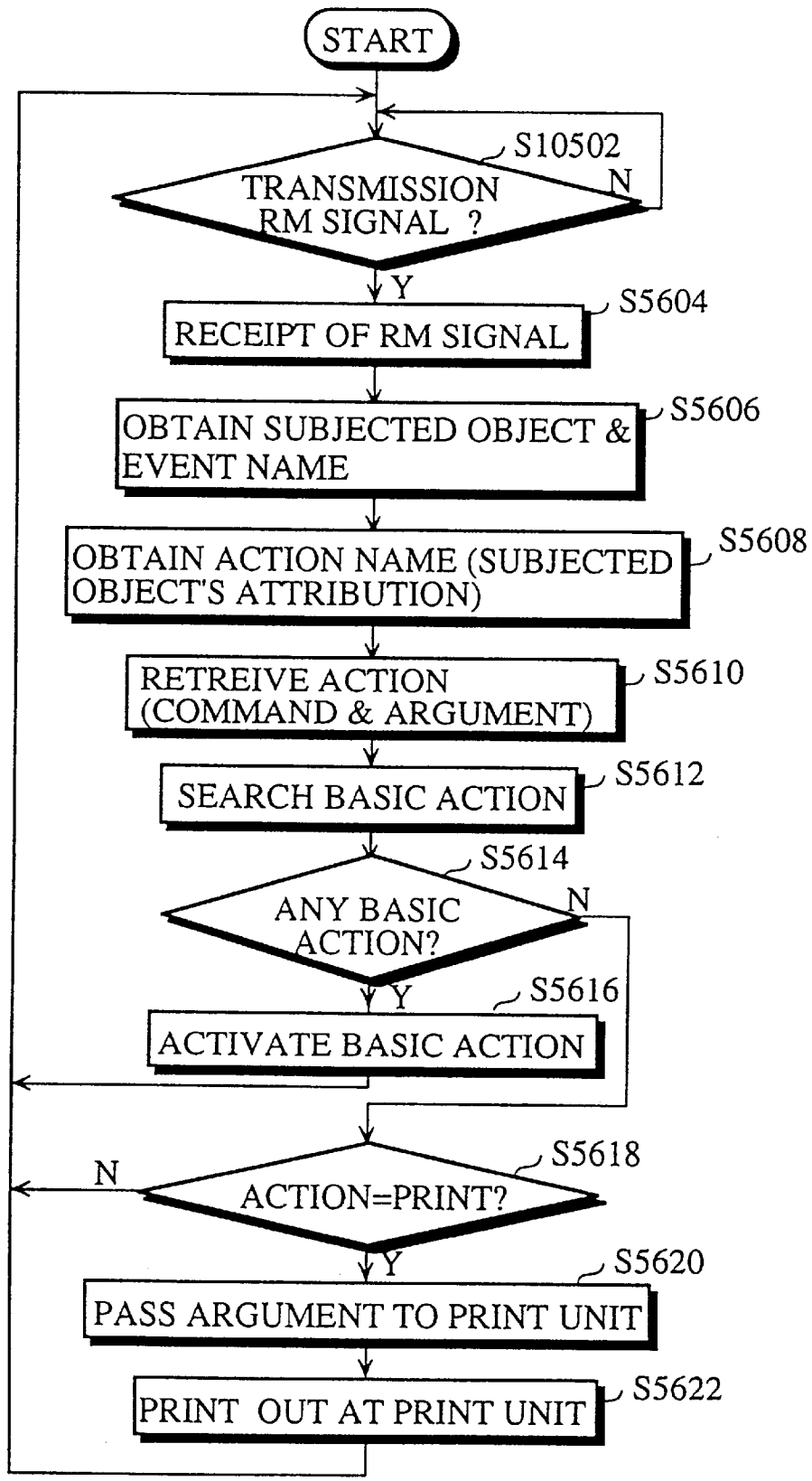
FIG. 105 is a flowchart detailing an interactive operation with the interactive screen in the ninth embodiment.

Next, the operation related to this embodiment will be explained while referring to the flowcharts in FIGS. 103 through 105.

Figure 103:
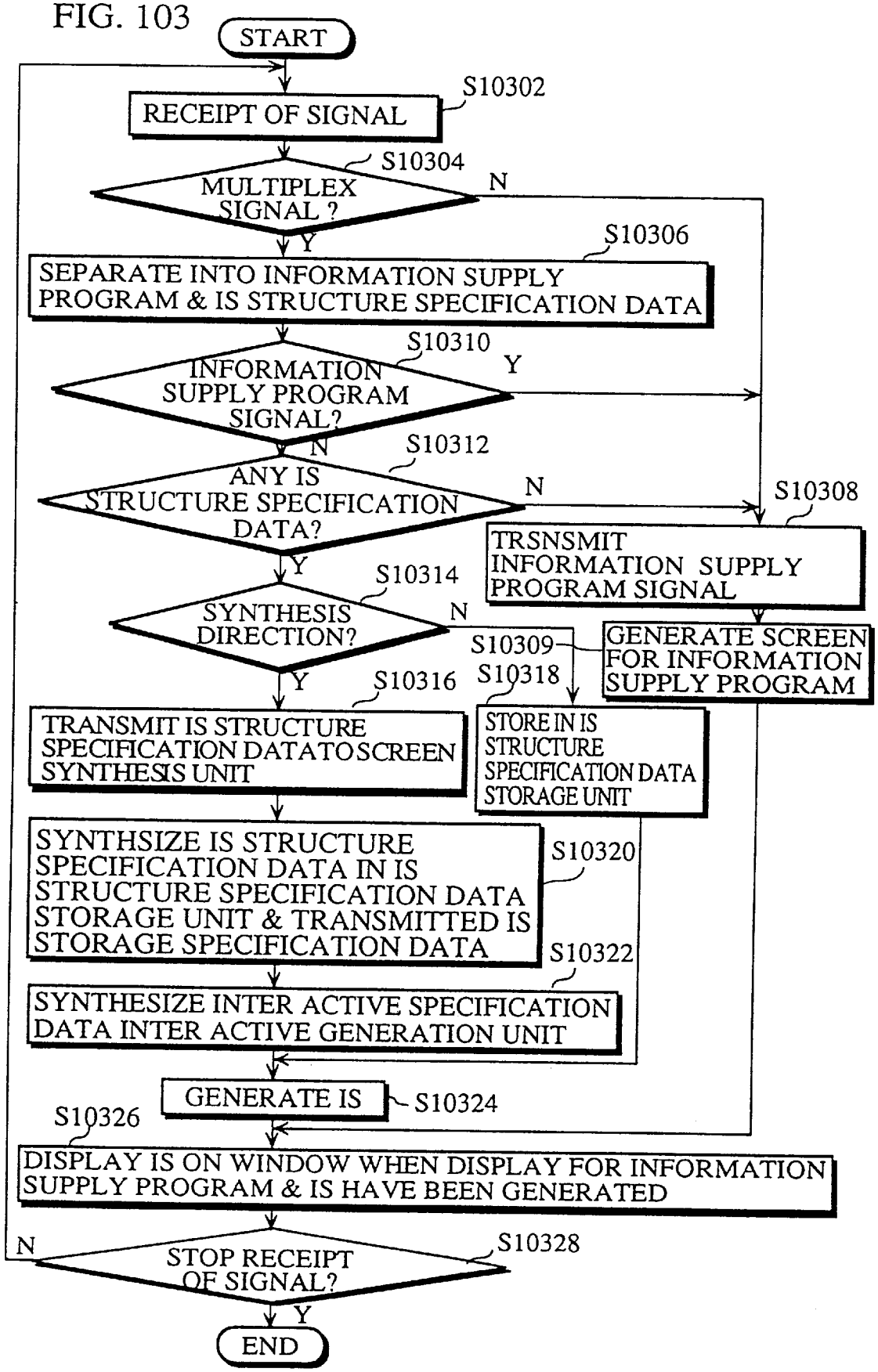
FIG. 103 is a flowchart detailing the program transmitter and program receiver in the ninth embodiment.

FIG. 103 is the main flow of the program receiver 7602.

The signal receipt unit 5011 receives the signal (S10302), and the signal separation unit 5012 checks whether the received signal is a multiplex signal or not (S10304). In case of the multiplex signal, the signal separation unit 5012 separates the signal into the information supply program signal and the IS structure specification data signal (S10306); otherwise, it transmits the signal to the display unit 5015 (S10308). Further, the signal separation unit 5012 checks whether the signal is the information supply program signal or not (S10310), and in case of the information supply program signal, it transmits the same to the display 5015 (S10308).

When the received signal is not the information supply program in S10310, the signal separation unit 5012 checks whether there exist the IS structure specification data (S10312). If there is no IS structure specification data, it proceeds to S10308 to generate the screen for the information supply program at the display unit 5015 (S10309); otherwise, it transmits the signal to the IS generation unit 7614, which checks whether the IS structure specification data include the synthesis direction or not (S10314). If the synthesis direction is included, the IS generation unit 7614 transmits the IS structure specification data including the synthesis direction to the screen synthesis unit 7612 as the second IS structure specification data (S103016). Otherwise, it has the IS structure specification data storage unit 7611 and the storage unit in the IS generation unit 7614 store the IS structure specification data excluding the synthesis direction as the first IS structure specification data (510318). The screen synthesis unit 7612 synthesizes the second IS structure specification data and the first IS structure specification data in the IS structure specification data storage unit 7611 per synthesis direction, generating new IS structure specification data (S10320).

The screen synthesis unit 7612 transmits the synthesized IS structure specification data to the IS generation unit 7614 (S10322).

The IS generation unit 7614 interprets the IS structure specification data, and synthesizes the same with the basic display elements in the display objects storage unit 5013 to generate the interactive screen (S10324).

The display unit 5015 displays the information supply program generated in S10309, and displays the interactive screen generated by the IS generation unit 7614 while the interactive screen is being generated in S10324 (S10326).

Further, the process unit checks whether the signal receipt should be stopped or not (S10328). If it should be stopped, the process unit ends the operation; otherwise, it returns to S10302.

Next, S10320 will be explained more in detail while referring to the flowchart in FIG. 104.

The screen synthesis unit 7612 retrieves the synthesis direction in the second IS structure specification data from the interactive screen generation unit 7614, and resets the counter to zero (n=0) (S10402), and checks whether there exists the n'th command or not (S10404). If there exists the n'th command, the screen synthesis unit 7612 retrieves the n'th synthesis command in the synthesis direction (S10406); otherwise, it ends the operation.

Having retrieved the synthesis command, the screen synthesis unit 7612 checks whether the synthesis command is the addition command or not (S10408). In case of the addition command, the screen synthesis, unit 7612 further checks whether the object information is subject to synthesis or not (S10410). If the synthesis command is not the addition command, the screen synthesis unit 7612 proceeds to S10412; otherwise, it synthesizes the object information while adding one to n (S10414), and returns to S10404. If the object information is not subject to synthesis, the screen synthesis unit 7612 checks whether the action information is subject to synthesis or not (S10416). If so, the screen synthesis unit 7612 synthesizes the action information while adding one to n (S10418) and returns to S10404. If the action information is not subject to synthesis, the screen synthesis unit 7612 checks whether the shape information is subject to synthesis or not (S10420). If so, the screen synthesis unit 7612 synthesizes the shape information while adding one to n (S10422), and returns to S10404; otherwise, it further checks whether the display candidate information is subject to synthesis or not (S10424). If so, the screen synthesis unit 7612 synthesizes the display candidate information while Adding one to n (S10426), and returns to S10424; otherwise, it checks whether the synthesis command is the display command or not (S10412). In case of the display command, the screen synthesis unit 7612 notifies the panel identifier and position information in the synthesis command to the IS generation unit 7614 while adding one to n (Sl0428), and returns to S10404. Otherwise, it displays "error message" indicating an inadequate synthesis command on the display unit 5015 and ends the operation.

Next, how the user manipulates the interactive screen in S10326 will be explained while referring to the flowchart in FIG. 105.

Two hot springs "Shirahama Hot Spring" and "Arima Hot Spring" are introduced in the program as shown in FIG. 101. Now, the object (focused "ON" object) accepting the signal from the remote controller 6501 is the "print button" object placed on the panel introducing "Shirahama Hot Spring", and the user pushes the down button 6505 on the remote controller 6501 if he wants the information be printed. Then, the "down" event signal is transmitted to the program receiver 7602 from the remote controller 6501.

The RM signal receipt unit 5016 waits for the RM signal from the remote controller 6501 (S10502), and receives the "down" event signal, transmitting the same to the IS generation unit 7614 (S10504).

The IS generation unit 7614 receives the "down" event signal, and accordingly retrieves the object with the "focus state=ON" from the storage unit, and recognizes that the "print button" is the object subject to manipulation, and thus retrieving the button information "<BUTTON CHARACTER_STRING=PRINT . . . ACTION=PRINT_ BUTTON_ACTION . . . >PRINT_BUTTON" defined as FIG. 90 (S10506). Then, the IS generation unit 7614 obtains the action name of the retrieved button (action information), "print button action (FIG. 91)(S10508). The IS generation unit 7614 retrieves "<EVENT>DOWN <COMMAND>SHIFT_FOCUS <ARGUMENT>PRINT_ BUTTON2" from the "down" event signal and the information defined by "print button action" (FIG. 100) (S10510).

The IS generation unit 7614 interprets the action composed of the commands and arguments, and retrieves the basic action from the basic action object storage unit 5018 (S10512, S10514), effecting the basic action. Thus, the focus is shifted to the "print button 2", and the interactive screen as shown in FIG. 102 appears (S10516), and the IS generation unit 7614 returns to S10502.

The user pushes the "determination" button 6508 on the remote controller 6501 to print out the information as to "Arima Hot Spring". Accordingly, the "determination" event signal is transmitted to the program receiver 7602 from the remote controller 6501 (S10502). The RM signal receipt unit 5016 receives the "determination" event signal, and transmits the same to the IS generation unit 7614 (S10504). Upon receipt of the "determination" event signal, the IS generation unit 7614 extracts the object with the "focus state=ON" from the storage unit, and recognizes that the "print button 2" is the object subject to manipulation, and thus retrieving the button information "<BUTTON CHARACTER_STRING=PRINT . . . ACTION=PRINT_ BUTTON2 . . . >PRINT_BUTTON 2" defined as FIG. 97 (S10506).

The IS generation unit 7614 retrieves the action information "print button action 2" from the storage unit using the action name "print button action 2" in the retrieved button information (S10508).

The IS generation unit 7614 retrieves "<EVENT>DETERMINATION<COMMAND>PRINT <ARGUMENT>ADDRESS 2<ARGUMENT>TELEPHONE NO. 2<ARGUMENT>HOT_SPRING 2" (FIG. 98) from the "determination" event signal (S10510).

The IS generation unit 7614 retrieves the basic action corresponding to the command name "print" from the basic action object storage unit 5018 (S10512). If there exists no such basic action (S10514), the IS generation unit 7614 checks whether the action is the "print" or not (S10518). If the action is not the "print", the IS generation unit 7614 returns to S10502; however, since the action is the "print" herein, it proceeds to S10520.

The IS generation unit 7614 delivers "Arima-cho, Hyogo Pref.", "07234-1-101", and "Arima Hot Spring", which are specified by the "argument" of "address 2", "telephone no. 2", and "hot spring 2", respectively, to the print unit 7613 (S10520).

The print unit 7613 prints out the received information (S10522), and returns to S10502. This action is repeated until the power 6502 of the remote controller 6501 is turned off.

As has been explained, a plurality of IS structure specification data are synthesized as per synthesis command from the program transmitter 7601, and by including the action specification information in the IS structure specification data, the user can manipulate the program receiver 7602 with the interactive screen.

In this embodiment, the display object storage unit 5013 stores three kinds of basic figures: panel, box and button. However, the display object storage unit may be a floppy disk or CD-ROM, so that the display may be changed for individual users.

Although the print unit 7613 is furnished, it may be replaced with a magnetic memory.

The generation of the interactive screen for the TV was explained in this embodiment. However, the interactive screen may be generated on the LC display with a radio using the text broadcast system by FM broadcast.

TENTH EMBODIMENT

Figure 106:
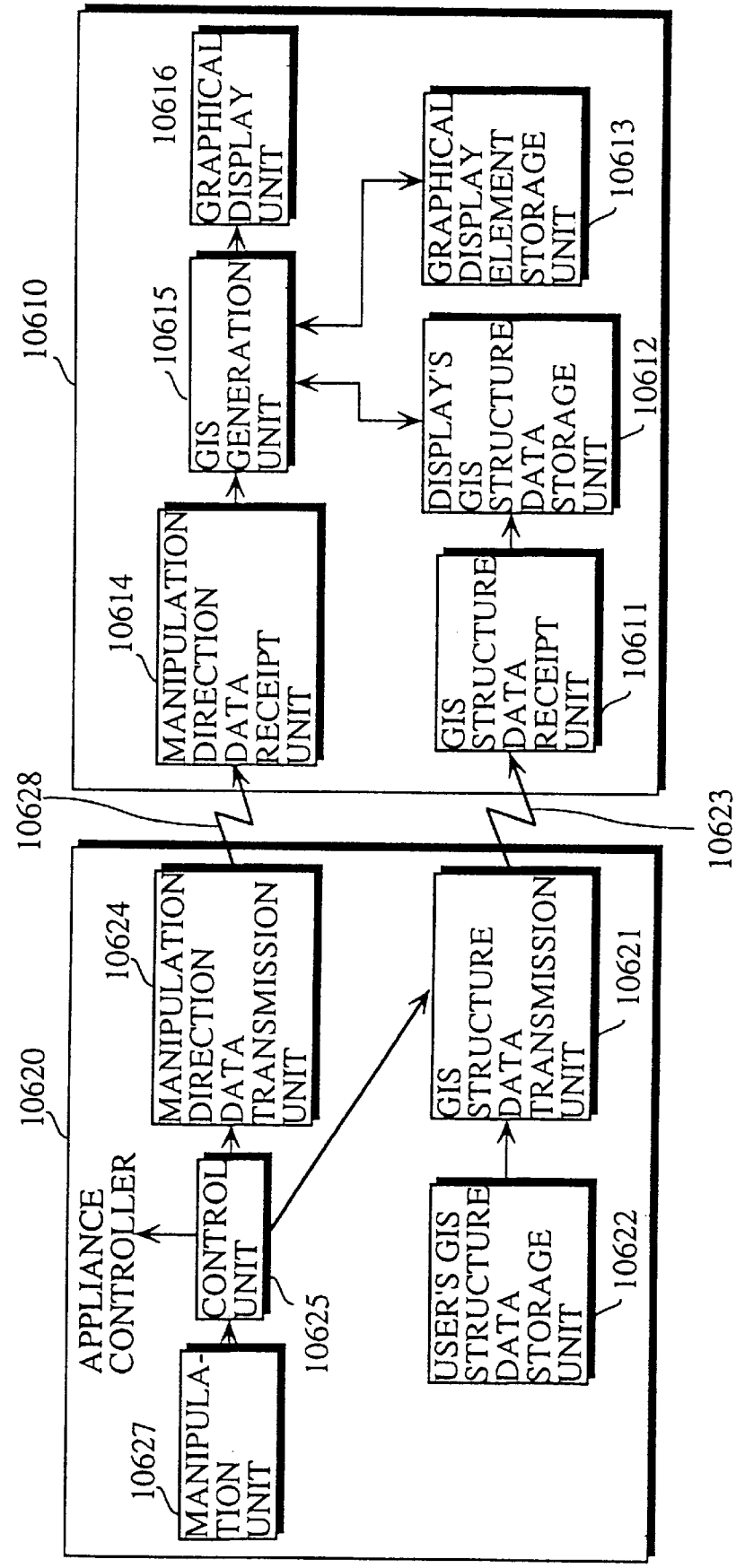
FIG. 106 is a view depicting a graphical interactive instruction display unit in accordance with a tenth embodiment of the present invention.

FIG. 106 is a view depicting the structure of a graphical interactive screen (GIS) display unit and an appliance that specifies the display of the graphical interactive screen unit in accordance with the tenth embodiment of the present invention.

An appliance, or a VTR 10620, comprises a GIS structure data transmission unit 10621, a user's GIS structure data storage unit 10622, a manipulation direction data transmission unit 10624, a control unit 10625, and a manipulation unit 10627.

A GIS display unit 10610 comprises a GIS structure data receipt unit 10611, a display's GIS structure data storage unit 10612, a graphical display element storage unit 10613, a manipulation direction data receipt unit 10614, a GIS generation unit 10615, and a graphical display unit 10616.

The GIS structure data transmission unit 10621 of the VTR 10620 and the GIS structure data receipt unit 10611 of the GIS display unit 10610 are connected via a transmission path 10623. Likewise, the manipulation direction data transmission unit 10624 and the manipulation direction data receipt unit 10614 are connected via a transmission path 10628. The transmission paths 10623 and 10628 are, for example, cables, ultra red rays, and connecter sockets.

The user's GIS structure data storage unit 10622 stores in advance the GIS structure data related to the setting of tuner in the VTR 10620, an example of which is shown in FIGS. 108 through 117. Note that one drawing is developed in FIGS. 109 through 112. The GIS structure data are written using the grammar of SGML (Standard Generalized Markup Language) arranged by the object oriented technology. The SGML is an international standard language for electronic books or documents stipulated by the ISO (International Standardization Organization). More detailed explanation of the SGML is given in "Introduction to SGML", Aski Shuppan.

Each display element is displayed as an object, and they are divided into a set of hierarchy groups. Entity class is the high-order class, and the first hierarchy includes the "panel", "button", and "box" classes while the second hierarchy includes the "set box" class.

Figure 107:
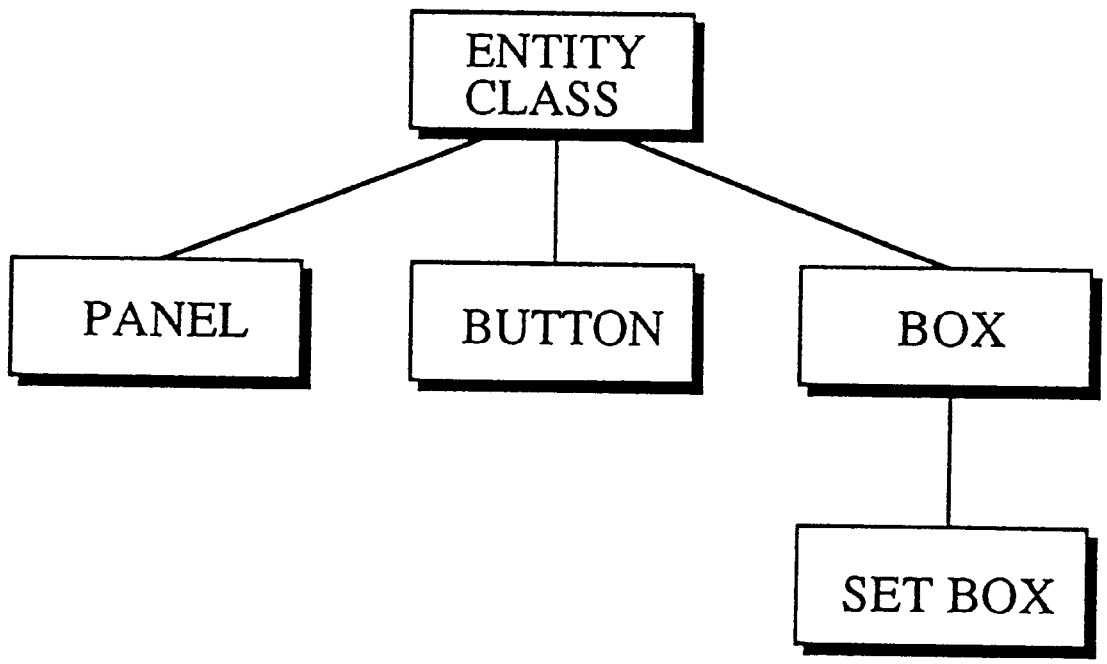
FIG. 107 is a view showing a hierarchical correlation within classes in the tenth embodiment.

FIG. 108 defines each class. In the "panel" class 10801, a parent class, the action, shape and focus state are defined. The attribute value of the parent class is the entity class; for there exists the entity class in the high-order hierarchy as shown in FIG. 107. The attribute value of the action is the "panel action". Thus, when the panel is the subject to manipulation, the "panel action" is executed when the "event" signal is transmitted. The action attribute is defined in FIGS. 109 through 112. The attribute value of the shape is "panel shape". The shape attribute is defined in FIG. 113. The attribute value of the focus state is "ON", which means it is the object subject to manipulation when the "event" signal is transmitted.

In the "button" class 10802, the attribute of the parent class, action, shape, character string, focus state and set box is defined. The initial attribute value of the "character string" shown in FIG. 114 defines each "button". The attribute value of the "set box" defines the box forming a pair with the "button", and the value in the "button" class 10802 is empty.

The "box" 10803 defines the attribute of the parent class and shape.

The "set box" class 10804 defines the attribute of the parent class, display candidate, action and the set value. The attribute value of the "display candidate" is the "channel candidate". The candidate value to be set as the "channel candidate" is shown in FIG. 115, and the attribute value of the "set value" is shown in FIG. 116.

The value "1" is defined as the "set value" for the "set 1 box", while the value "2" is defined as the "set value" for the "set 2 box". Similarly, the value "BS11" is defined for the "set 15 box".

FIG. 117 shows the definitions of the object belonging to the panel class forming the graphical interactive screen.

"<PANEL ACTION=PANEL__ACTION SHAPE=PANEL__SHAPE>TUNER__SET__PANEL" defines the "tuner set panel" object shown in FIG. 113 as follows: it belongs to the panel class, and the attribute value of the "action" is the panel action shown in FIG. 109, and the attribute value of the "shape" is the panel shape shown in FIG. 113. Note that the action and shape have been defined as the attribute of the panel class as shown in FIG. 108, it may be "<PANEL>TUNER__SET__PANEL" instead. Here, the objects in the panel Sandwiched by "<PANEL . . . >" and "</PANEL>" are defined.

Also, "<v>", "</v>", "<h>", "</h>" define the position of the objects. The objects sandwiched by "<v>" and "</v>" are placed vertically, while the objects sandwiched by "<h>" and "</h>" are placed horizontally. That is to say, the "set 1 button" defined in FIG. 114 and the "set 1 box" defined in FIG. 116 are placed horizontally as a pair. Similarly, a pair of the "set 15 button" and "set 15 box", . . . and a pair of the "set 2 button" and the "set 2 box" are placed horizontally. These pairs are placed vertically and in the end, the "end button" is placed.

The manipulation unit 10627 of the VTR 10620 includes a "tuner set" button, a "down" button, a "right" button, and a "determination" button, etc.

When the user pushes the "tuner set" button, the manipulation unit 10627 transmits a "tuner set" signal to the control unit 10625. Similarly, when the user pushes the "down" button and "determination" button, the manipulation unit 10627 transmits a "down" signal and a "determination signal", respectively.

The control unit 10625 receives the "tuner set" signal from the manipulation unit 10627, and initiates the control of the tuner setting, while sending a direction to the GIS structure data transmission unit 10621 to transmit the GIS structure data to the GIS display unit 10610, transmitting a "tuner set" event signal to the manipulation direction data transmission unit 10624. Upon receipt of the "down" signal from the manipulation unit 10627, the control unit 10625 initiates the tuner set action related to the pushing of the down button (changes "set n button" to "set (n+1) button", where n=1 through 14), while transmitting the "down" event signal to the manipulation direction data transmission unit 10624. Upon receipt of the "right" signal from the manipulation unit 10627, the control unit 10625 changes to the tuner set action related to the pushing of the right button (changes "channel n" to "channel (n+1)", where n=1 through 11, and channel 12 is changed to channel BS5, BS5 is changed to BS7, and BS7 is to BS11), while setting the "right" event signal to the manipulation direction data transmission unit 10624.

Upon receipt of the "determination" signal form the manipulation unit 10627, the control unit 10625 ends the tuner set action, and transmits the "determination" event signal to the manipulation direction data transmission unit 10624.

The GIS structure data transmission unit 10621 receives the transmission direction from the control unit 10625, and retrieves the GIS structure data (FIGS. 108 through 117) from the user's GIS structure data storage unit 10622 to transmit the same to the GIS structure data receipt unit 10611 of the GIS display unit 10610 via the transmission path 10623.

The manipulation direction data transmission unit 10624 receives the "tuner set" event signal from the control unit 10625, and in response transmits the same to the manipulation direction data receipt unit 10614 of the GIS display unit 101610 via the transmission path 10628. Upon receipt of the "down" event signal from the control unit 10625, the manipulation direction data transmission unit 10624 transmits the same to the manipulation direction data receipt unit 10614 via the transmission path 10268. Likewise, upon receipt of the "right" event signal and the "determination" signal from the control unit 10625, the manipulation direction data transmission unit 10624 transmits the same to the manipulation direction data receipt unit 10614 via the transmission path 10628.

The GIS structure data receipt unit 10611 of the GIS display unit 10610 receives the GIS structure data from the GIS structure data transmission unit 10621, and in response has the display's GIS structure data storage unit 10612 store the same.

The display's GIS structure data storage unit 10612 comprises such as RAM (Random Access Memory), and stores the GIS structure data (FIGS. 108 through 117).

The manipulation direction data receipt unit 10614 receives the manipulation direction data—"tuner set" event, "down" event, "right" event, "determination" event signals—from the manipulation direction data transmission unit 10624, and in response transmits the same to the GIS generation unit 10615.

The graphical display element storage unit 10613 stores the file name of each shape of the graphical display elements (panel, button, and box) and their respective bit map data.

The GIS generation unit 10615 includes a buffer to temporarily store the event signal from the manipulation direction data receipt unit 10614. The GIS generation unit 10615 retrieves the "tuner set" event signal from the buffer and finds out the "focus-on" object in the display's GIS structure data storage unit 10612 using the definition in FIG. 108. Here, the "panel" class is the "focus-on" object, and thus the GIS generation unit 10615 extracts the attribute of the "panel", finds out the action of the panel, or the "panel action", using the definitions shown in FIGS. 109 through 112, and further finding the "panel display" (FIG. 109), the "command" for the "tuner set" event. To execute the "command", the GIS generation unit 10615 retrieves the "tuner set panel" whose action's (FIG. 117) attribute value is the "panel action". The GIS generation unit 10615 finds the attribute value of the "shape" of the "tuner set panel", or the "panel shape A", using the definition of the "shape" attribute in FIG. 113, and retrieves the bit map data (11801 in FIG. 118) corresponding to the file name "panel shape A" from the graphical display element storage unit 10613.

Next, the GIS generation unit 10165 extracts the "set 1 button" "set 1 box", "set 2 button", "set 2 box", ..., "end button" to be placed on the panel: it retrieves the definitions of the "set 1 button" through "set 15 button" and "end button" in FIG. 114 and the definitions for the "set 1 box" through "set 15 box" in FIG. 116 from the display's GIS structure data storage unit 10162. Thus, the shape of the "set 1 button" is the "button shape B" given "focus state=ON", and the shape of the "set button 2" through the "end button" are the "button shape A" (FIG. 113); for they are not defined by the attribute value of the "focus state", and its default is "focus state=OFF (the definition of the "button" in FIG. 108 is inherited). Likewise, the shape of the "set 1 box" through the "set 15 box" is the "box shape 1" (FIG. 113).

Figure 119:
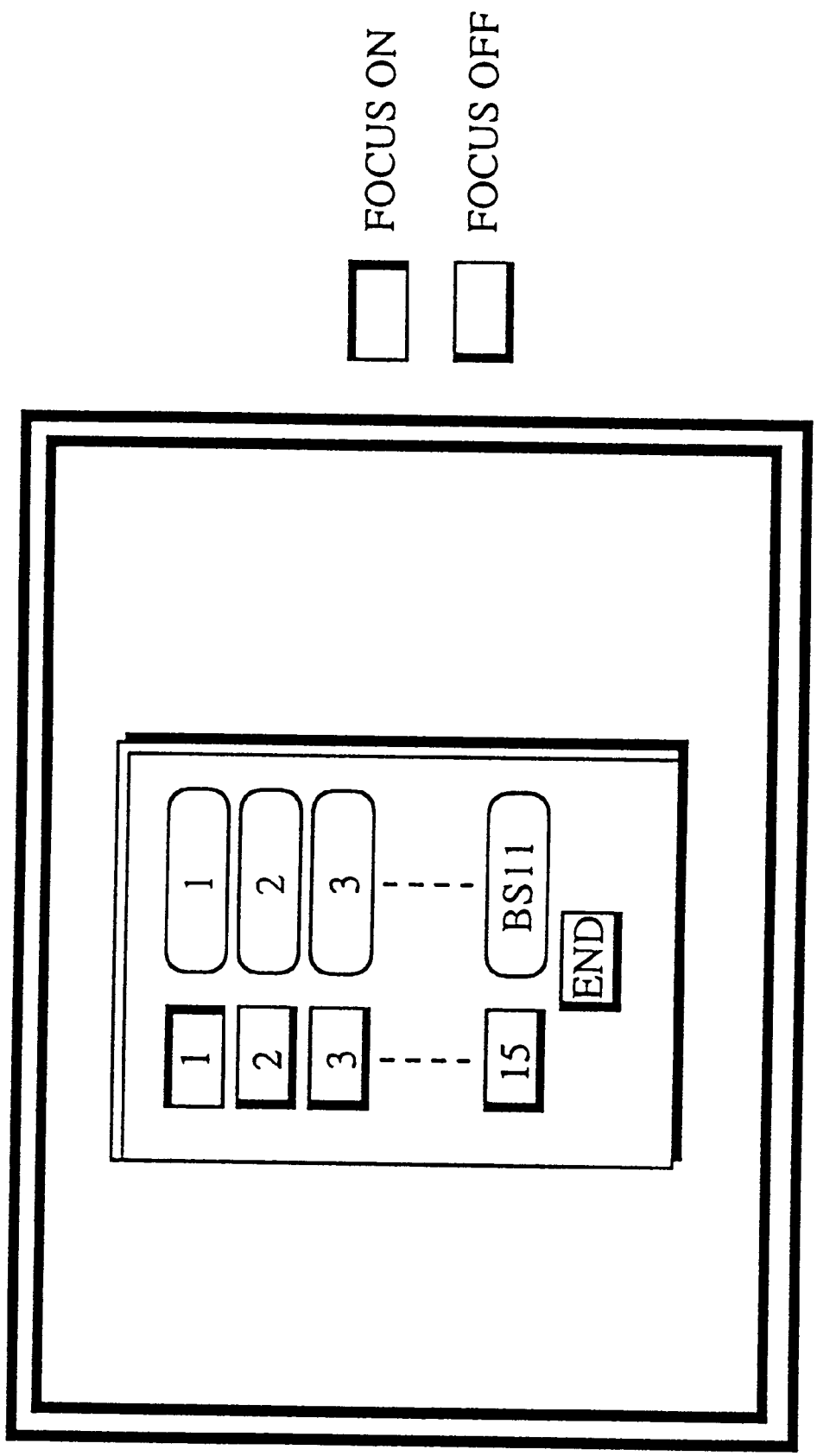

The "set 1 button" object is generated by synthesizing the bit map data (11803 in FIG. 118) for the file name "button shape B" in the graphical display element storage unit 10613, and the set value "1" of the attribute value of the character string shown in FIG. 114. The "set 1 box" is generated by synthesizing the bit map data (11804 in FIG. 118) for the "button shape A" and the set value "2". The "set 2 box" through "end button" are generated in the same manner, and in the end, the objects thus generated are placed as specified in FIG. 117, and displayed on the graphical display unit 10616 as shown in FIG. 119.

The GIS generation unit 10615 retrieves the "down" event signal form the buffer, and finds out the object with the "focus state=ON" in the display's GIS structure data storage unit 10612. Assume that the graphical interactive screen as shown in FIG. 119 is being displayed on the graphical display unit 10616, then the subjected object is the "set 1 button" (FIG. 114). As per the definition of the "set 1 button action" in FIG. 119, it is found that the command for the "down" event is "focus OFF", and the message is "focus ON", and the transmission destination is the "set 2 button". Accordingly, the GIS generation unit 10615 rewrites the set value of the "set 2 button" to "focus state=OFF", generating the internal event of the "focus state=ON" for the "set 2 button". Then, the GIS generation unit 10615 retrieves the internal event queue to additionally store the set value of the "set 2 button" (FIG. 114) to the "focus state=ON". Note that since there is no action definition for the "focus-on" object, which is the action attribute defined by the "set 2 button", the "set 2 button" is set as the "focus state=ON" using the definition of the "button" class to which the "set 2 button" belongs. Accordingly, the graphical display unit 10616 displays the graphical interactive screen shown as FIG. 120.

When the GIS generation unit 10615 retrieves the "right" event signal from the buffer, it finds out the object with the "focus state=ON" in the display's GIS structure data.

Figure 120:
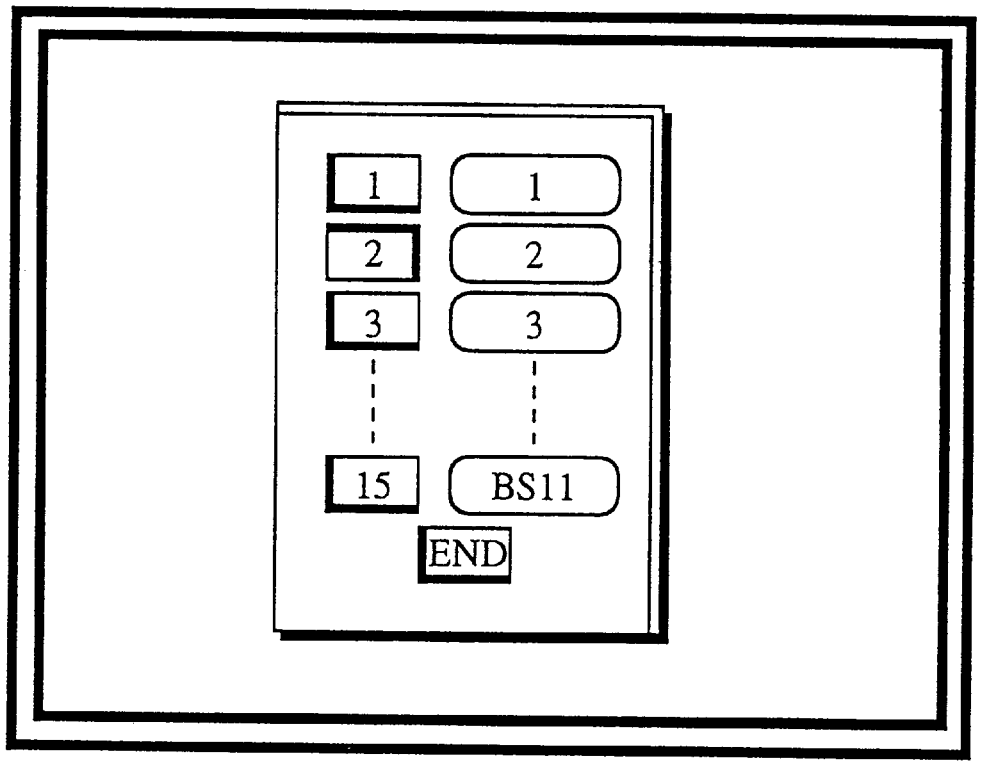
Figure 121:
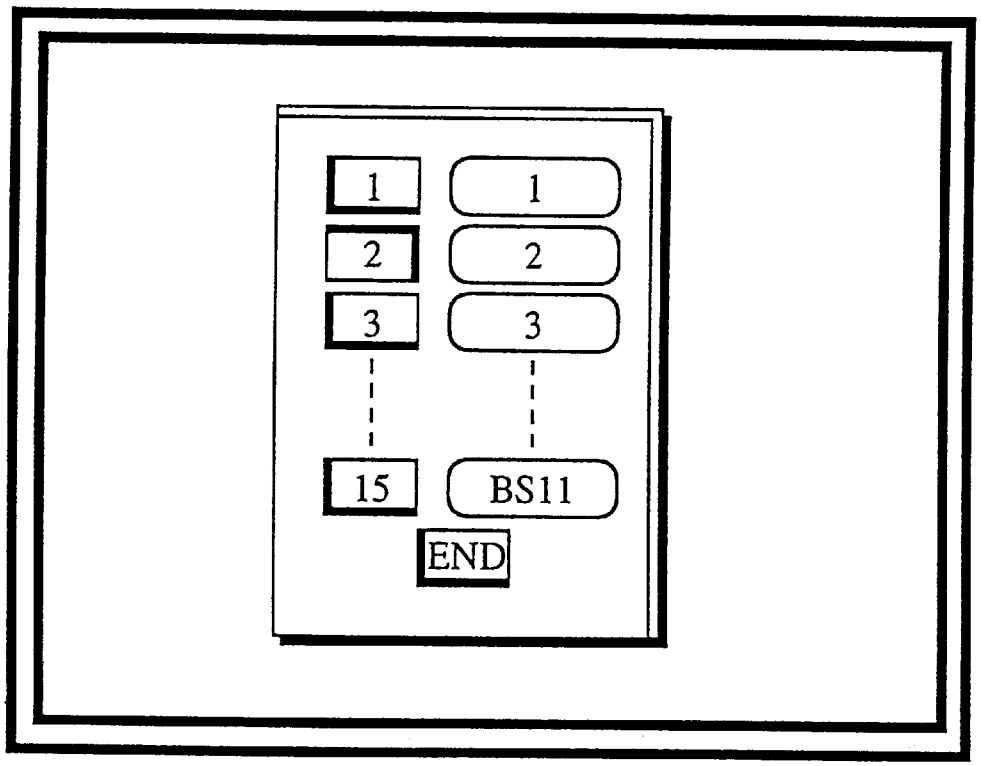

When the graphical display unit 10616 displays the graphical interactive screen as shown in FIG. 120, the "set 2 button" is "focus state=ON", hence becoming the subject of the manipulation. However, the "right" event is not defined by the definition of the "set 2 button action" (FIG. 109), thus the definition of the button action of the "button" class (FIG. 109) to which the "set 2 button" belongs is applied. The message for the "right" event is the "switch candidate in plus direction" and the transmission destination is "$set box". Here, the "$" mark in the transmission destination means the description following the mark, "set box", is the attribute name, and the subjected object is replaced with the "set box" represented by this attribute name. It is found that the attribute value of the "set box" is the "set 2 box" from the definition of the "set 2 button" in FIG. 114, and thus the internal event "switch candidate in plus direction" represented by the "message" occurs for the "set 2 box". Having retrieved the definition of the set box in FIG. 116, it is found that the command for the "switch candidate in plus direction" event is the "switch candidate", and the "argument" is "+". Because the definition of the "set box" (10804 in FIG. 10804) is defined as the "display candidate=channel candidate", the candidate value for the channel candidate in FIG. 115 is applied. Having switched the candidate with the "argument +", the candidate value of the current "set 2 box" exhibits "2" is switched to the next candidate value at the plus side exhibiting "3". Accordingly, the set value (FIG. 114) of the "set 2 box" in the display's GIS storage unit 10612 is rewritten from "2" to "3", and the graphical display unit 10616 displays the graphical interactive screen as shown in FIG. 121.

Figure 122:
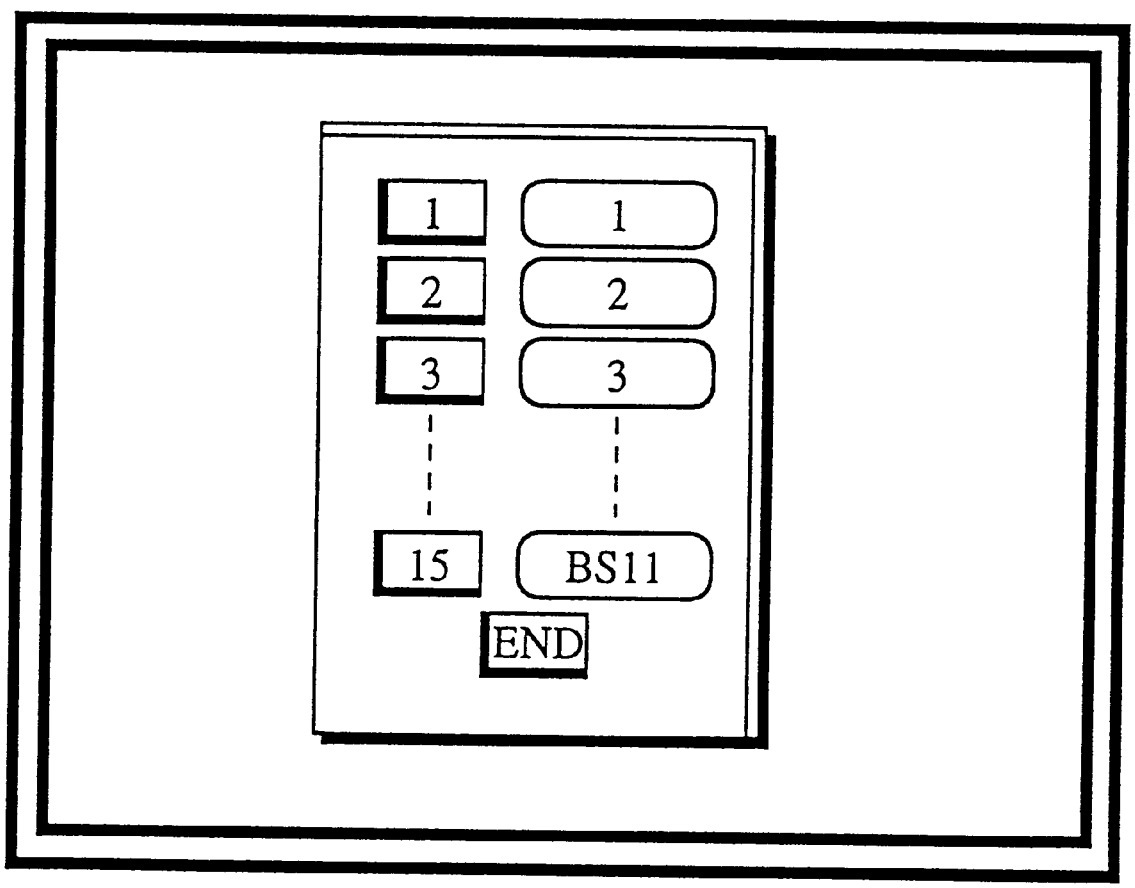

When the GIS generation unit 10615 retrieves the "determination" event from the buffer, it retrieves the "end button action" (FIG. 112) from the display's GIS structure data storage unit 10612 when the "end" button of the graphical interactive screen on the graphical display unit 10616 exhibits the "focus state=ON" as shown in FIG. 122. Since the "message" for the "determination" event is delete, the transmission destination is the "tuner set panel", and the GIS generation unit 10615 generates the internal event "delete", and retrieves the panel action as shown in FIG. 109. Further, the GIS generation unit 10615 retrieves the "delete" event from the internal event queue, and executes the corresponding command, "delete panel". Accordingly, the display of the graphical interactive screen on the graphical display unit 10616 ends.

The graphical display unit 10616 is, for example, an LC panel or CRT, and displays the graphical interactive screen under the control of the GIS generation unit 10615, and examples of the interactive screens are shown in FIG. 119 through 122.

Figure 123:
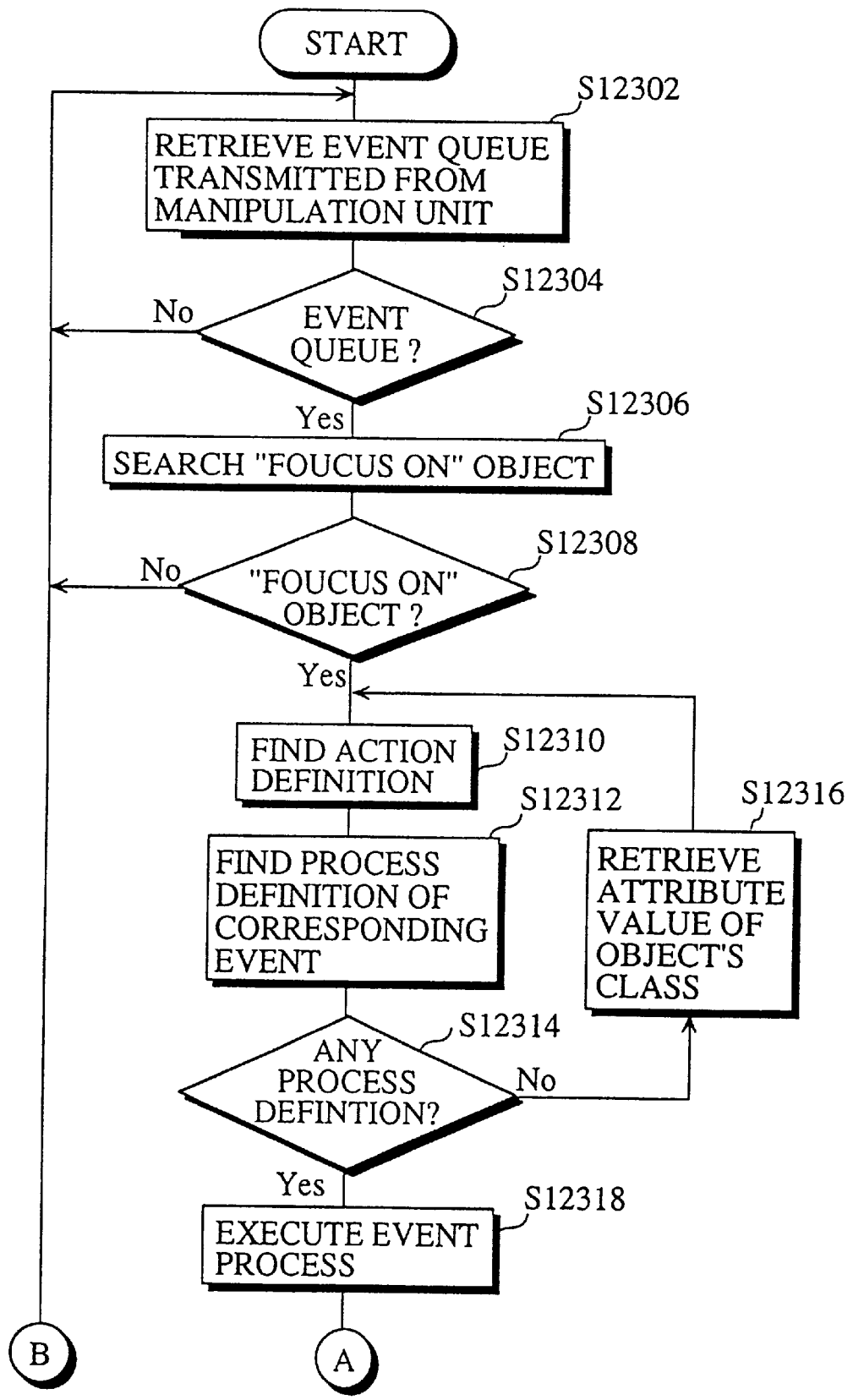
Figure 124:
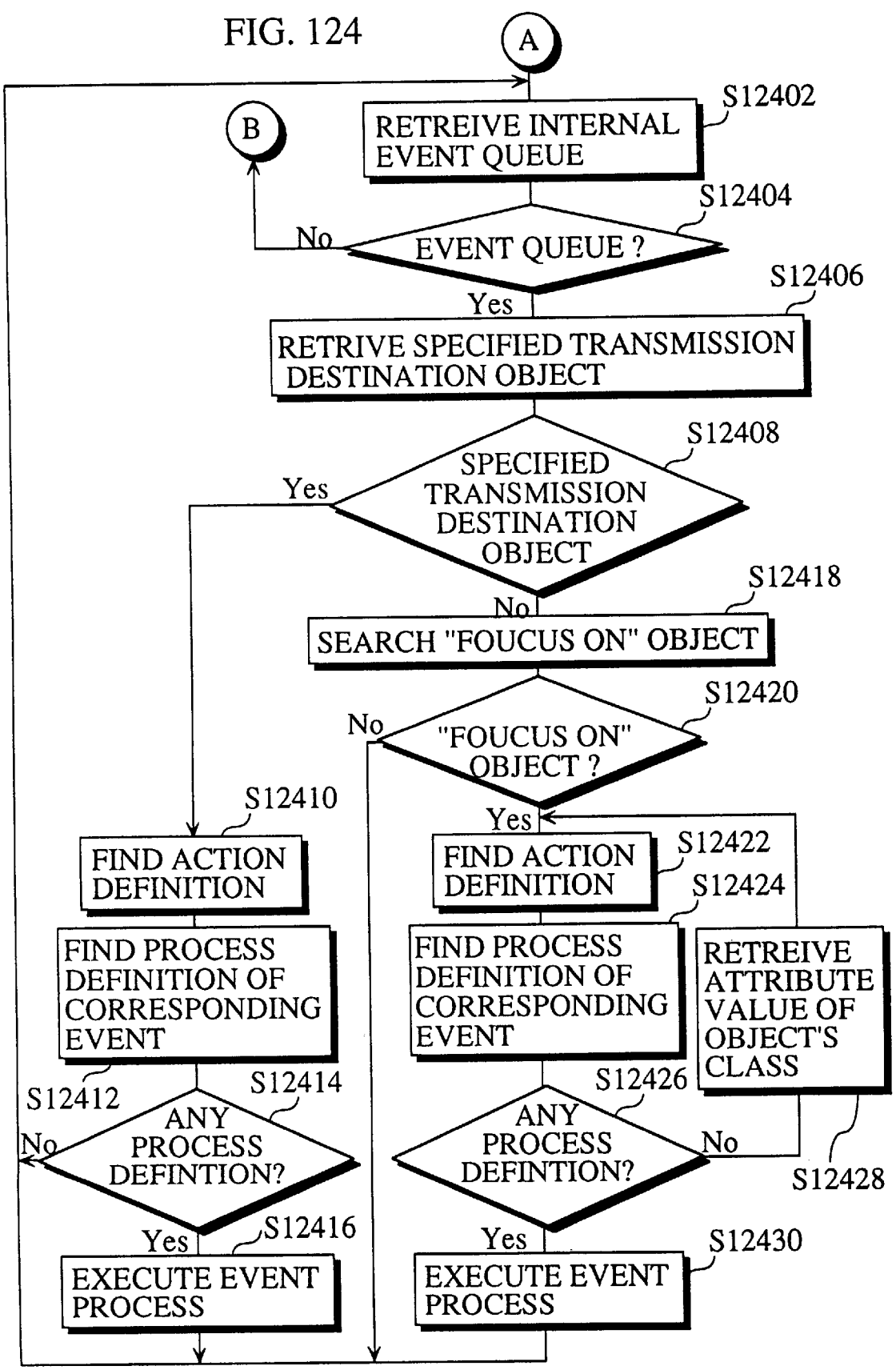

The operation related to this embodiment will be explained while referring to the flowcharts in FIGS. 123 and 124.

The GIS generation unit 10615 retrieves the event queue from the buffer sent from the manipulation unit 10625 (S12302), and in case of the event signal (S12304), it finds the "focus-on" object by retrieving the GIS structure data from the display's GIS structure data storage unit 10612 (S12306). In finding the "focus-on" object (S12308), the GIS generation unit 10615 finds the action definition from the object's action attribute (S12310); otherwise (S12308), it returns to S12302. Further, the GIS generation unit 10615 finds out the definition for the corresponding event process in the action definition (S12312). In finding the definition (S12314), it carries out the event process (S12318) and returns to S12402; otherwise (S12314), it retrieves the attribute value of the class to which the object belongs (S12316), and returns to S12310. If there is no definition for the class's attribute value, the GIS generation unit 10615 finds out the parent class reflectively, and returns to S12310. Note that the class attribute in the general object oriented technology is inherited during this process.

The GIS generation unit 10615 retrieves the internal event queue (S10402), and if there exists the internal event (S12404), it retrieves the object of the transmission destination of the event (S12406). When there exists no internal event, it returns to S12302 (S12404). When the object of the transmission destination is specified (S12408), it finds the action definition of the object (S12410), and further finds the process definition to the event in the action definition (S12412). If there exists no process definition, it returns to S12402; otherwise, it carries out the event (S12416), and returns to S12402 (S12414).

When the object of the transmission destination is not specified in S12408, then the GIS generation unit 10615 finds out the "focus-on" object (S12418). If there exists no "focus-on" object, it returns to S12402 (S12420); otherwise, it finds the action definition from the action attribute in the object (S12422), further finding the process definition for the event in the action definition (S12424). When finding the process definition (S12426), the GIS generation unit 10615 carries out the event process (S12430), and returns to S12402; otherwise, it retrieves the attribute value of the class to which the object belongs (S12428), and returns to S12422. If there exists no definition for the class's attribute vale, then it finds the parent class reflectively to return to S12422.

Although the manipulation unit 10627 is incorporated in the VTR 10502, a RM manipulation receipt unit may be additionally furnished with the VTR 10620, and the manipulation unit 10627 may be a remote controller. In this case, the transmission form the remote controller is received by the RM manipulation receipt unit, which transmits the same to the control unit 10625.

ELEVENTH EMBODIMENT

Figure 125:
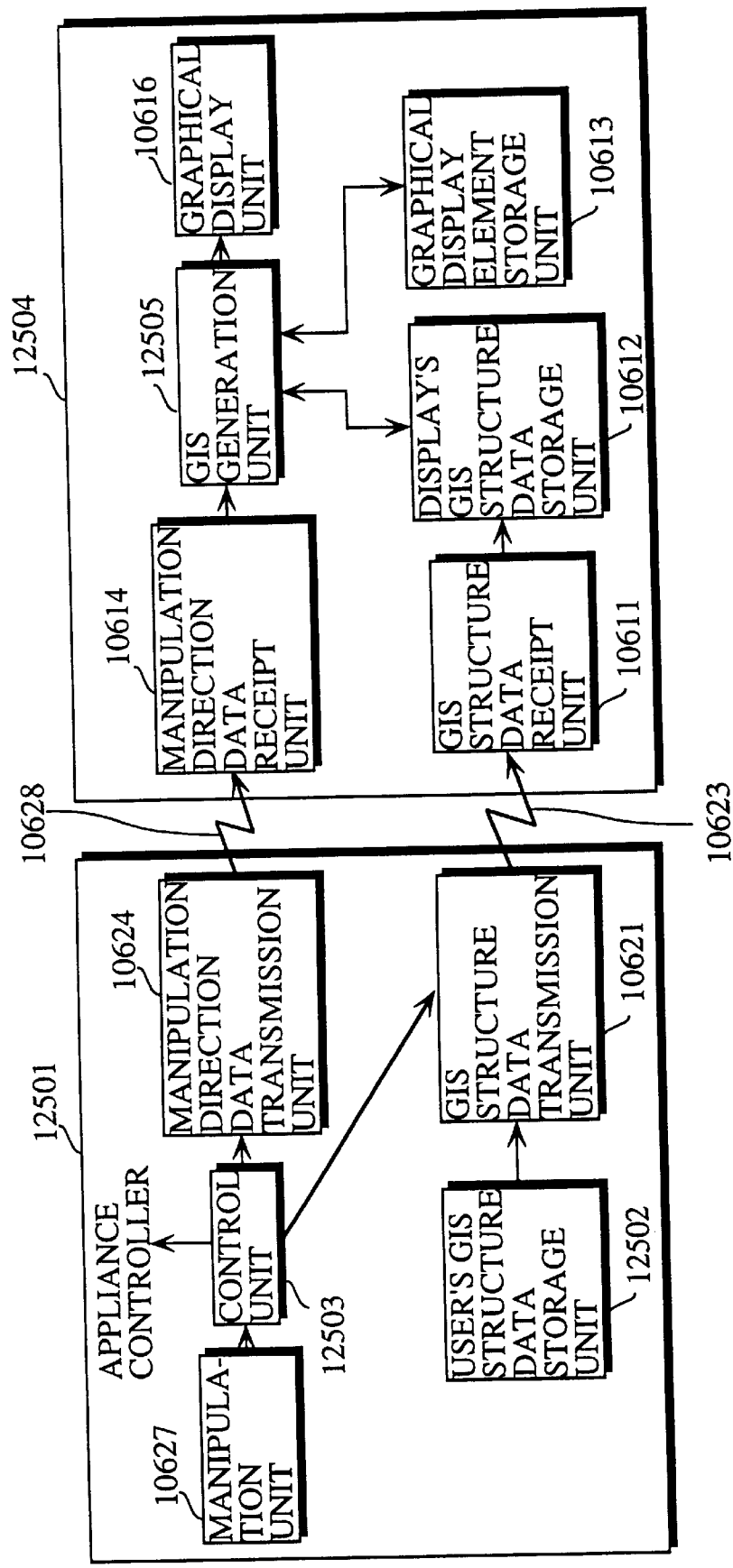

FIG. 125 is a view depicting a graphical interactive screen (GIS) display unit and an appliance that directs the interactive screen display in accordance with the eleventh embodiment. Hereinafter, like components are labeled with like reference numerals with respect to the tenth embodiment, and the description of these components is not repeated.

The selection manipulation for speech, video menu, and speech menu with a VTR 12501 will be explained as an example.

A user's GIS structure data storage unit 12502 stores in advance the class definition shown in FIG. 108 and shape definition in FIG. 109, which are explained in the tenth embodiment, and the IS structure data shown in FIG. 126 through 129. Note that one drawing is developed in FIGS. 126 through 129.

FIG. 126 defines that the attribute value of the action of the "adjustment panel", which is the object belonging to the panel class forming the graphical interactive screen, is the adjustment panel action (FIG. 128). Above the adjust panel, there exist "speech switch button" and "speech switch box" horizontally followed by "video menu button" and "video menu box", and the "sound menu button" and "sound menu box", and the "end button" at the end.

FIG. 127 defines the objects belonging to the button and box classes.

FIG. 128 shows the action definition of the adjustment panel or the like.

FIG. 129 defines the candidate values of the "speech switch box" in the "set box class", "video menu box", "switch display" attribute in the "speech menu box".

The control unit 12503 receives the "video speech selection" signal from the control unit 10627, and in response initiates the control of the video speech selection action, while sending a direction to the GIS structure data transmission unit 10621 to transmit the GIS structure data to the GIS display unit 12504.

The control unit 12503 examines the current content of the appliance action control, and transmits the GIS structure data shown in FIG. 130 as subsidiary data to the manipulation direction data transmission unit 10624 together with a "parameter adjustment event" signal.

The subsidiary data in FIG. 130 exhibits that the program is a bilingual broadcast. Thus, the subsidiary data become "display candidate=stereo" when the program is transmitted in stereo broadcast, while "display candidate=monaural" when the program is transmitted in monaural broadcast.

This corresponds to the "display candidate=""" in the definition of the "speech switch box" in the GIS structure data in FIG. 127, and since the attribute value is empty here, the attribute value of the display candidate is specified by the subsidiary data.

The manipulation direction data transmission unit 10624 receives the "parameter adjustment event" signal and subsidiary data from the control unit 12503, and in response transmits the same to the manipulation direction data receipt unit 10614 of the GIS display unit 12504 via the transmission path 10628.

The GIS generation unit 12505 receives the "parameter adjustment event" signal and subsidiary data from the manipulation direction data receipt unit 10614, and in response has the buffer store the same. When it retrieves the "parameter adjustment event" signal from the buffer, it examines the GIS structure data (FIGS. 108, 109, 126 through 129) in the GIS structure data storage unit 10612, and finds the "focus state=ON" object from the class definition (FIG. 108), carrying out the "display panel" command corresponding to the "parameter adjustment event" defined in FIG. 128. In executing the command, it retrieves the "bilingual" from the buffer, which is displayed as the "switch box" as the display candidate, and synthesizes the same with the bit map data of the box shape in the graphical display element storage unit 10613, generating the speech switch box. Accordingly, the graphical display unit 10616 displays the interactive screen as shown in FIG. 131 as the "adjustment panel".

The operation related to this embodiment is identical with that of the tenth embodiment except that the attribute value of the display candidate is transmitted as the subsidiary data without being stored in the display's GIS structure data storage unit 10612, and stored in the buffer in the GIS generation unit 12505. Thus, the further explanation is omitted.

TWELFTH EMBODIMENT

FIG. 132 is a view depicting a graphical interactive screen (GIS) display unit in accordance with the twelfth embodiment of the present invention. Hereinafter, like components are labeled with like reference numerals with respect to the tenth embodiment, and the description of these components is not repeated.

A GIS display unit 13201 includes a TV manipulation unit 13202, a TV control unit 13203, and a TV GIS structure data storage unit 13204 in addition to the structure of the GIS display unit 10610 in the tenth embodiment.

The TV manipulation unit 13202 accepts the channel manipulation of the user, and transmits the same to the TV control unit 13203.

The TV control unit 13203 receives the manipulation signal from the TV manipulation unit 13203, and in response carries out the action as a TV receiver while sending a direction to the GIS generation unit 106 to generate the graphical interactive screen.

The TV GIS structure data storage unit 13204 stores in advance the GIS structure data as the TV receiver's functions. The GIS structure data are almost identical with the objects shown in FIG. 108 through 117 in the tenth embodiment, and the explanation thereof is omitted.

The GIS generation unit 10615 receives the generation direction from the TV control unit 13203, and in response retrieves the data from the TV GIS structure data storage unit 13204, and generates the interactive screen by synthesizing the graphical display elements stored in the graphical display elements storage unit 10613 as per the retrieved data. Accordingly the graphical display unit 10616 displays the graphical interactive screen thus generated.

When the GIS generation unit 10615 receives the manipulation direction from the manipulation direction data receipt unit 10614, it generates the graphical interactive screen by synthesizing the graphical display elements in the graphical display element storage unit 10613 as per the GIS structure data in the displays GIS structure data storage unit 10612. Accordingly, the graphical display unit 10616 displays the graphical interactive screen thus generated.

In this embodiment, the graphical interactive screen display function is explained as one of the TV receiver functions, and since the operation related to this embodiment is almost identical with that of the tenth embodiment, the further explanation is omitted.

THIRTEENTH EMBODIMENT

FIG. 133 is a view depicting the structure of a graphical interactive screen (GIS) display direction unit in accordance with the thirteenth embodiment of the present invention. The GIS display direction unit comprises a RM unit 13301 and a GIS display unit 13101. The GIS display unit 13201 is identical with the GIS display unit 13201 of the twelfth embodiment, and thus the explanation is omitted. The RM unit 13301 corresponds to the appliance to direct the display of the graphical interactive screen in the tenth embodiment. The RM unit 13301 comprises a user's GIS structure data storage unit 13302, a GIS structure data transmission unit 13303, a manipulation unit 13304, a control unit 13305, and a manipulation direction data transmission unit (RM transmission) unit 13306.

The user's GIS structure data storage unit 13302 stores in advance the GIS structure data for specifying the type and kind of the VTR to be controlled. The GIS structure data are identical with the data shown in FIGS. 108 through 117 except that the candidate values of the display candidate attribute, and the explanation thereof is omitted.

The IS structure data transmission unit 13303 receives the transmission direction from the control unit 13305, and in response retrieves the GIS structure data from the user's GIS structure data storage unit 281 to transmit the same to the GIS structure data receipt unit 10611 via the transmission path 10623.

The manipulation unit 13304 includes the control buttons for the VTR besides the control buttons for TV receiver. When user pushes one of the buttons, a signal assigned to that button is transmitted to the control unit 13305.

The control unit 13305 initiates the RM set control action for the VTR when one of the VTR control buttons is pushed, while sending a transmission direction to the GIS structure data transmission unit 13303, generating the event signal according to the pushing of the button. The event signal thus generated is transmitted to the RM signal transmission unit 13306 for further transmission.

The RM transmission unit 13306 transmits the event signal generated by the control unit 13305 to the manipulation direction data receipt unit (RM receipt unit) 10614 via the transmission path 10628.

Since the operation related to this embodiment is almost identical with that of the tenth embodiment, and a brief explanation will be given. When the user pushes the button of the manipulation unit 13304 on the RM unit 13301, then the RM unit 13301 originally furnished for controlling the TV receiver can also control the VTR. FIG. 134 is an example of the graphical interactive screen shown in the graphical display unit 10616 of the GIS display unit 13201, which shows the VTR is made by the Matsushita Electric Industrial Company in 1989. Thus, the user pushes the down button of the manipulation unit 13304 twice, then the "end button" exhibits "focus on". Further, the user pushes the "determination button", then, "Matsushita" and "1989" are saved, enabling the RM unit 13301 to control this VTR.

In this embodiment, The user's GIS structure data, storage unit 13302 of the RM unit 13301 stores the GIS structure data for controlling the VTR. However, since it is always used with the TV receiver (GIS display unit 13201) as shown in FIG. 135, the GIS structure data storage unit 13503 may be additionally furnished in the graphical screen display unit 13201 to store the GIS structure data for controlling the VTR, and the user's GIS structure data storage unit 13302, GIS structure data transmission unit 13303, GIS structure data receipt unit 10611, and transmission path 10623 may be deleted. In this case, the GIS generation unit 10615 retrieves the GIS structure data for the VTR control from the GIS structure data storage unit 13501 upon receipt of the event signal by the manipulation direction data receipt unit 10614.

FOURTEENTH EMBODIMENT

FIG. 136 is a view depicting a GIS display direction unit in accordance with the fourteenth embodiment of the present invention.

The GIS display direction unit comprises a GIS display unit 10610, a VTR 13601, and a RM unit 13602 for the VTR 13601.

The GIS display unit 10610 is identical with the one in the tenth embodiment, and the explanation is omitted.

The VTR 13601 includes a RM receipt unit 13603, and a user's GIS structure data receipt unit 13604 in addition to the structure of the VTR 10620 of the tenth embodiment.

The RM unit 13602 is a remote controller of the VTR 13061, and comprises a RM's GIS structure data storage unit 13605, a RM's GIS structure data transmission unit 13606, a manipulation unit 13617, a control unit 13608, and a RM transmission unit 13609.

The RM's GIS structure data transmission unit 13616 and the user's GIS structure data receipt unit 13604 are connected by a transmission path 13610, while the RM transmission unit 13619 and RM receipt unit 13603 are connected to a transmission path 13611.

The RM unit 13602 is almost identical with its counterpart in the thirteenth embodiment, except that it does not include the TV receiver's function control. Since the RM unit 13602 is used exclusively for the VTR 13601, it can not: transmit any signal to the GIS display unit 10610.

The control unit 13608 receives the signal by pushing the button of the manipulation unit 13607 by the user, and in response initiates the RM set control action, while sending a transmission direction to the RM's GIS structure data transmission unit 13606 to transmit the GIS structure data in the RM's GIS structure data storage unit 13605 to the user's GIS structure data receipt unit 13604 of the VTR 13601, generating the event signal to transmit the same to the RM transmission unit 13609.

The user's GIS structure data transmission unit 13604 of the VTR 13601 receives the GIS structure data in the RM's GIS structure data storage unit 13605 of the RM unit 13602 from the RM's GIS structure data transmission unit 13616, and in response, transmits the same to the GIS display unit 10610 by means of the GIS structure data transmission unit 10621.

The RM receipt unit 13603 receives the event signal from the RM transmission unit 13609, and transmits the same to the GIS display unit 10610 by means of the user's direction data transmission unit 10624.

The operation related to this embodiment is identical with that to the tenth embodiment except that the GIS structure data and manipulation signal from the RM unit 13602 are transmitted to the GIS display unit 10610 by means of the VTR 13601, and the further explanation is omitted.

In this embodiment, the RM's GIS structure data storage unit 13605 of the RM unit 13602 stores the GIS structure data in advance. However, as shown in FIG. 137, a GIS structure data storage unit 13701 storing the RM's GIS structure data may be furnished in the VTR 13601, so that the control unit 13608 of the RM unit 13602 sends a transmission direction of the RM's GIS structure data to the VTR 13601 instead by sending the transmission direction to the RM's GIS structure data transmission unit 13606. Upon receipt of the transmission direction, the GIS generation unit 10615 retrieves the RM's GIS structure data from the RM's GIS structure data storage unit 13701, and transmits the same to the GIS display unit 10610. According to this construction, the RM's GIS structure data storage unit 13605, RM's GIS structure data transmission unit 13606 in the RM unit 13602, the user's GIS structure data receipt unit 13604 in the VTR 13601, and the transmission path 13610 can be omitted.

In the tenth through fourteenth embodiments, the VTR was used as an example of the appliance that directs the display of the graphical interactive screen. However, the appliance may be a movie player, air conditioner, audio apparatus, LD player, CD player, karaoke player, microwave oven, washing machine, facsimile, etc.

FIFTEENTH EMBODIMENT

FIGS. 138 and 139 are views depicting the structure of a menu information synthesis apparatus in accordance with the fifteenth embodiment of the present invention. The menu information synthesis apparatus comprises a remote controller 13801, a TV 13802 and a VTR 13803 which are controlled by RM signals transmitted from the remote controller 13801.

The TV 13802 includes a TV menu information storage unit 13821, a TV RM-signal receipt unit 13822, a TV control unit 13823, and a TV menu information transmission unit 13824.

The TV menu information storage unit 13821 stores TV menu information and is composed of a TV menu structure data storage element 13911, a TV display element data storage element 13912, and a TV synthesis direction data storage element 13913. The menu information referred herein includes menu structure data, display element data and synthesis direction data.

The TV menu structure data storage element 13912 stores the menu structure data as shown in FIGS. 140 and 141 the menu structure data are the data specifying the structure of a menu screen.

The TV display element data storage element 13912 stores the display element data. The display element data are shape data for objects such as buttons and panels that form the menu screen (hereinafter referred to as the menu objects). As shown in FIG. 145, the display element data include various shape data depending on the selection of the menu objects. For example, a button shape A14501 shows that a button is selected, and a button shape B14502 shows that a button is not selected. The shape data include bit map data and/or graph data, and the TV display element data storage element 13912 stores the image data in relation with their respective identifiers.

The TV synthesis direction data storage element 13913 stores synthesis direction data. The synthesis direction data are rules that regulate the synthesis of the menu structure data and display element data by combining a plurality of pieces of menu structure data and display element data. As shown in FIG. 146, the synthesis direction data include a rule "TOP synthesis" for synthesizing the menu structure data, and a rule "PRIORITY" for synthesizing the display element data.

Note that the menu structure data and synthesis direction data are written using the grammar of SGML arranged by the object oriented technology. Each menu object is described as an object and belongs to a class.

The class consists of an entity class, a panel class, a button class, and a page button class, and these classes have hierarchical correlation with each other as shown in FIG. 147.

Next, the menu structure data in the TV menu structure data storage element 13912 will be explained.

FIG. 140 provides a class definition. For example, the button class has shape, action, parent class attributes, and the default values of the shape and action are a button shape and a button action respectively and the parent class of the button class is the entity class. The class attribute values for the shape and action are inherited to the object by the "class inheritance" based on the object oriented technology. That is to say, if the attribute value of an object is defined by the object, the defined attribute value is valid, and if it is not defined by the object, the attribute value of a class; to which the object belongs becomes valid. If the attribute value is not defined in the object's class either, the attribute value of another class higher than the object's class becomes valid. If the attribute value is not defined in the higher class, then the attribute value of another class higher than the last mentioned class becomes valid. In this way, the attribute value is checked in the classes in a lower-to-higher sequence, and a firstly-found attribute value becomes valid for the subject object. The button shape is defined as shown in FIG. 143. When the selection state is ON, the button shape is the shape data named as a button shape A, while it is the shape data named as a button B when the selection state is OFF. The shape data of the button shape A14501 and button shape B14502 are stored in the TV display element data storage element 13912 as shown in FIG. 145. Note that "the selection state is ON" means that the button is pushed (selected), and "the selection state is OFF" means that the button is not pushed. Thus, a button appears as the button shape B14502 in general, and it appears as the button shape A14501 only when it is pushed.

The definition of the panel class is given in FIG. 140, and its default shape is the panel shape, and the default character string is a menu screen. The attribute value of the character string attribute is an index of a panel placed at the highest position.

FIG. 141 defines the panel object. The information sandwiched by <PANEL> and </PANEL> is the definition of the panel. For example, the set panel includes an image adjustment button, a speech adjustment button, a BS input level set button, a receiver channel set button, a previous page button, and a next page button. Also, <v>, </v>, <h>, and </h> are the information related to the position of the objects. If the objects are sandwiched by <v> and </v>, they are placed vertically, and if the objects are sandwiched by ,<h> and </h>, they are placed horizontally. Thus, on the set panel, the previous page button and next page button are placed horizontally, and the image adjustment button, speech adjustment button, BS input level set button, receiver channel set button, and the horizontally placed previous page button and next page button are placed vertically.

Next, the definition of the action will be explained while referring to FIG. 142.

For example, there is "ACTION=SET_BUTTON_ACTION" in the set button definition, and the set button action is defined in FIG. 143. The action definition controls the action (transmission message and the destination of the transmission) executed when a corresponding button is pushed. Thus, the set button action defines the action when the set button is pushed: a message "open panel" is transmitted to the "set panel". Thus, the "set panel" appears on the screen when the set button action is executed.

The TV synthesis direction data shown in FIG. 146, "SYNTHESIS_DIRECTION COMPUTATION=TOP_SYNTHESIS COMBINE_METHOD=UNIQ_COMBINE>" will be explained in the following.

The computation "COMPUTATION=TOP_SYNTHESIS" means to synthesize the menu structure data in the panels identified by an identifier "top panel" in the definition of the panel object shown in FIG. 141. The top panel is the panel placed at the highest position in the hierarchical structure, in other words, the panel appears first when the menu is displayed.

"COMBINE_METHOD=UNIQ_COMBINE" means to make the same objects such as buttons in the menu structure data of the top panels into one object when synthesizing the menu structure data.

</SYNTHESIS_DIRECTION> represents the end of one synthesis direction.

As has been stated, a menu screen of one hierarchical structure can be made when synthesizing a plurality of hierarchical menu screens by the TOP synthesis.

Next, "<SYNTHESIS_DIRECTION COMPUTATION=PANEL_SYNTHESIS COMBINE_METHOD=UNIQ_COMBINE>" will be explained.

"COMPUTATION=PANEL_SYNTHESIS" means to synthesize a plurality of panels having the same identifier.

"COMBINE_METHOD=UNIQ_COMBINE" defines a method to combine a plurality of panels. "UNIQ_COMBINE" means to allow only one object (button or the like) for one identifier within a plurality of panels to be synthesized. This eliminates overlapping objects which are assumed to have the same function.

Next, the synthesis data "<SYNTHESIS_DIRECTION COMPUTATION=PRIORITY>" will be explained.

"COMPUTATION=PRIORITY" means to give a priority to the menu structure data of TTT identified by "APPLIANCE=TTT" sandwiched by <SYNTHESIS_DIRECTION> and </SYNTHESIS_DIRECTION> over the menu structure data transmitted from the other appliances. In case of FIG. 146, the shape that the menu structure data for the TV 13802 includes is given priority to be used for the button shape and page button shape, making a straightforward synthesized menu screen.

The TV RM-signal receipt unit 13822 receives a transmission signal from the remote controller 13801, and transmits the same to the TV control unit 13823.

The TV control unit 13823 receives the signal from the TV RM signal receipt unit 13822, and checks whether the received signal is a menu-information transmission request signal or action control signal. In case of the former, the TV control unit 13822 gives a direction to the TV menu information transmission unit 13824 to transmit the menu information, and in case of the latter, it controls the action of the TV 13802 as per received signal.

The TV menu transmission unit 13824 receives the menu-information transmission direction from the TV control unit 13823, and in response retrieves the TV menu information from the TV menu information storage unit 13821 to send the same to the remote controller 13801.

The VTR 13803 includes a VTR menu information storage unit 13831, a VTR RM-signal receipt unit 18832, a VTR control unit 13833, and a VTR menu information transmission unit 13834.

The VTR menu information storage unit 13831 stores the menu information related to the VTR 13803 and it includes a VTR menu structure data storage element 13921, a VTR display element data storage element 13922, and a VTR synthesis direction data storage element 13923.

The VTR 13803 and TV 13802 are of the same structure except that the VTR menu information storage unit 13831 stores the menu information related to the VTR 13803, and only the menu information related to the VTR 13803 will be explained.

The VTR menu structure data storage element 13921 stores the menu structure data related to the VTR 13803 as shown in FIGS. 140, 148 through 151.

The VTR display element data storage element 13922 stores the display element data related to the VTR 13803 as shown in FIG. 152.

The VTR synthesis direction data storage element 13923 stores the synthesis direction data related to the VTR 13803 as shown in FIG. 153.

The synthesis direction data "COMPUTATION=PRIORITY" means to give a priority to the menu structure data sandwiched by <SYNTHESIS_DIRECTION> and </SYNTHESIS_DIRECTION> as; previously explained: the shape in the menu structure data related to the VTR 13803 is given priority for the panel shape.

"COMPUTATION=ADD" means to add additional information when synthesizing the menu structure data, and "MESSAGE_TRANSMISSION", or the value represented by "<SUBJECT>" is a unit of the additional information. The "MESSAGE_TRANSMISSION" information is composed of a transmission message and information as to the correspondence of the message.

"CORRESPONDENCE=VTR_CONTROL" specifies a subject to be added, or namely the "MESSAGE_TRANSMISSION" information In other words, when there exists "MESSAGE_TRANSMISSION" information that matches with the "CORRESPONDENCE<VTR_CONTROL>", the specified information is added at a specified position. "<ADD_DESTINATION>BEFORE" specifies the position of the additional information. In this embodiment, "CORRESPONDENCE=VTR_CONTROL" means to add the "additional information" as a pre-process for the "MESSAGE_TRANSMISSION" information that matches with the "<CORRESPONDENCE<VTR_CONTROL>". Note that there is "<ADD_DESTINATION>AFTER" as a definition of a post-process besides "<ADD_DESTINATION>BEFORE".

"<ADD_INFORMATION MESSAGE=VTR_SWITCH CORRESPONDENCE=TV_CONTROL>MESSAGE_TRANSMISSION" specifies the unit of the additional information and the content thereof. In this embodiment, it means to add the additional information related to "MESSAGE_TRANSMISSION", and the content is "<MESSAGE>VTR_SWITCH" and "<CORRESPONDENCE>TV_CONTROL". Thus, <SYNTHESIS_DIRECTION COMPUTATION=ADD> and the following mean to add the information of the message transmission of "<MESSAGE>VTR_SWITCH" and "<CORRESPONDENCE>TV_CONTROL" as the pre-process information when there exists the "MESSAGE_TRANSMISSION" information that matches with "<CORRESPONDENCE>VTR_CONTROL".

The remote controller 13801 includes an input acceptance unit 13811, a RM signal transmission unit 13812, a menu information receipt unit 13813, a menu information storage unit 13814, a display element data storage unit 13815, a menu information synthesis unit 13816, a menu information display control unit 13817, and a menu display unit 13818.

The input acceptance unit 13811 comprises a transparent or semi-transparent touch panel placed on the menu display unit 13818, and an input button furnished fixedly, and accepts a user's input manipulation. By the push of the input button, the input acceptance unit 13811 accepts the transmission request of the menu information related to the TV 13802 or VTR 13803, and notifies the same to the RM signal transmission unit 13812. Similarly, the input acceptance unit 13811 accepts the synthesis direction of the menu information by the push of the input button, and notifies the same to the menu information synthesis unit 13816. Also, the input acceptance unit 13811 accepts the manipulation to the touch panel (the push on the displayed menu objects on the menu display unit 13818); in case of a menu display change, it sends a change direction for the menu objects to the menu information display control unit 13817, and in case of an action direction to the TV 13802 or VTR 13803, it transmits a control signal assigned to the manipulated menu object to the RM signal transmission unit 13812.

The RM signal transmission unit 13812 receives the menu-information transmission request from the input acceptance unit: 13811, and in response transmits a RM signal requesting the menu-information transmission to the TV 13802 or VTR 13803. Also, when the RM signal transmission unit 13812 receives the control signal from the input acceptance unit 13811, it converts the control signal into the RM signal to transmit the same to the TV 13802 or VTR 13803.

The menu information receipt unit 13813 receives the menu information related to the TV 13802 and VTR 13803 from the TV menu information transmission unit 13824 and VTR menu information transmission unit 13834 respectively, and in response stores the same separately into the menu information storage unit 13814.

The menu information storage unit 13814 stores the menu information received by the menu information receipt unit 13813.

The display element data storage unit 13815 stores in advance the display element data that the remote controller 13801 has. The display element data referred herein are the default data used when the received menu information does not: include the display element data to synthesize a menu screen upon receipt of the menu information.

The menu information synthesis unit 13816 includes a retrieval.check unit, a synthesis direction count unit, a TOP synthesis unit, a panel synthesis unit, a PRIORITY unit, an ADD unit, and a temporarily storage unit.

The retrieval.check unit receives the synthesis; direction from the input acceptance unit 13811, and in response retrieves the menu information from the menu information storage unit 13814 to store the same in the temporarily storage unit, checking whether there exists the menu information for a plurality of appliances. If so, the retrieval.check unit gives a direction to set an initial value to the synthesis direction count unit; otherwise, it sends a notice of completion of synthesis to the menu information display control unit 13817. Further, the retrieval.check unit checks whether the menu information includes the synthesis direction data or not. If the menu information includes the synthesis direction data, the retrieval.check unit retrieves the N'th synthesis direction data specified by a counter in the synthesis direction count unit to check whether "XXX" in "COMPUTATION=XXX" in the retrieved synthesis direction data is the "TOP synthesis" computation, "panel synthesis" computation, "PRIORITY" computation, or "ADD" computation, or none of the aforementioned. In case of the "TOP synthesis" computation, the retrieval.check unit activates the TOP synthesis unit. Similarly, in case of the "panel synthesis" computation, "PRIORITY" computation, and "ADD" computation", it activates the panel synthesis unit, PRIORITY unit, and ADD unit, respectively. If "XXX" is not any of the aforementioned, it gives a direction to the counter of the synthesis direction count unit to increment by one.

The synthesis direction count unit counts the number of the synthesis direction data. When it receives the direction to set the initial value from the retrieval.check unit, it sets N=1 to the counter, and increments the counter by one each time it receives an increment direction from the retrieval.check unit, TOP synthesis unit, panel synthesis unit, PRIORITY synthesis unit or ADD unit.

The TOP synthesis unit is activated by the retrieval.check unit, and checks whether "YYY" in "COMBINE_METHOD=YYY" is either "UNIQ_COMBINE" or "SIMPLE_COMBINE", or neither. In case of either "UNIQ_COMBINE" or "SIMPLE_COMBINE", it sets a value "1" to an appliance counter M installed therein (M=1), and successively retrieves the menu structure data from the temporarily storage unit, while incrementing the appliance counter by one for each retrieval. The TOP synthesis unit retrieves the definition data of the panel identified by this "top panel" in the M'th appliance's menu structure data, and adds the attribute definition in the definition data of the retrieved top panel to the menu structure data in the temporarily storage unit as a definition item of the attribute of a synthesized panel. The attribute definition referred herein is "ααα=βββ. . . " in "<PANEL ααα=βββ. . . TOP_PANEL". It adds the objects sandwiched by "<PANEL>" and "</PANEL>" in this definition data of the panel identified by the "top panel" in the menu structure data of the M'th appliance as the objects sandwiched by "<PANEL>" and "</PANEL>" of the synthesized panel. If "YYY" is neither "UNIQ_COMBINE" nor "SIMPLE_COMBINE", it gives a increment direction to the counter of the synthesis direction count unit.

For example, the menu information storage unit 13814 stores the menu structure data of the TV 13802 as shown in FIG. 141, and the menu structure data of the VTR 13803 as shown in FIG. 148, then they are synthesized into the menu information (top panel) as shown in FIG. 154 the attribute definition of the VTR 13803 is simply added to the attribute definition of the TV 13802, and all the objects for the VTR 13803 are placed following to the lowest-position objects of the TV 13802.

When there are overlapping attribute definition items in the synthesized panel, the TOP synthesis unit gives a priority to the first-written definition item, and deletes the rest from the temporarily storage unit, completing "SIMPLE COMBINE".

Further, the TOP synthesis unit checks whether "YYY" is "UNIQ_COMBINE" or not. In case of "UNIQ_COMBINE", when there are overlapping objects between "<PANEL>" and "</PANEL>" in the synthesized panel, the TOP synthesis unit deletes the overlapping objects from the temporarily storage unit, and also arranges the position information "<v>" and "</v>" in accordance with its nature. If "YYY" is not "UNIQ_COMBINE", the TOP synthesis unit gives an increment direction to the counter of the synthesis count unit.

For example, the simply synthesized top panel as shown in FIG. 154, is changed to the one as shown in FIG. 155 by deleting the overlapping attribute definition "CHARACTER_STRING=VTR_MANIPULATION_MENU". Further, in FIG. 155, the overlapping objects "<BUTTON>SET_BUTTON" are deleted as shown in FIG. 156, and the position information, "<v> and </v>, is arranged as shown in FIG. 157. In this way, the top panels are synthesized into one panel.

The panel synthesis unit is activated by the retrieval.check unit, and checks whether "YYY" in "COMBINE_METHOD=YYY" is either "UNIQ_COMBINE" or "SIMPLE_COMBINE", or neither. In case of either "UNIQ_COMBINE" or "SIMPLE_COMBINE", the panel synthesis unit retrieves the menu structure data from the temporarily unit to compute the number of sets of the panels, each set having the same identifier in the menu structure data. In other words, there are three sets when the menu information related to the TV 13802 includes the panels identified by the identifiers "panel 11", "panel 12", and "panel 13", and the menu information related to the VTR 13802 includes the same, and there are no other overlapping panels identified by the same identifier. If "YYY" is neither "UNIQ_COMBINE" nor "SIMPLE_COMBINE", the panel synthesis unit gives an increment direction to the counter of the synthesis direction count unit. Assume that K represents the number of the sets, and a set-number counter K' is furnished in the panel synthesis unit, then the panel synthesis unit checks whether the value in the set-number counter K' is greater than zero, (K'>0, where initial K'=K). If so, it retrieves all the menu structure data related to a plurality of panels including the overlapping panel identifiers in the K'th set to compute the number (L) of the panels within the set, setting the same in a panel number counter. Otherwise, it gives an increment direction to the counter of the synthesis direction count unit. Further, the panel synthesis unit checks whether L>0. If so, it adds all the attribute definitions of the L'th panel information to the temporarily storage unit as the attribution definition items of the synthesized panel. The panel synthesis unit adds the objects defined between "<PANEL>" and "</PANEL> in the L'th panel information to the temporarily storage unit as the objects between "<PANEL>" and "</PANEL> in the synthesized panel, decrementing the panel number counter by one. Otherwise, when there are overlapping attribute definition items in the synthesized panel, the panel synthesis unit gives a priority to the first-written attribute definition and deletes the rest from the temporarily storage unit. Further, the panel synthesis unit checks whether "YYY" is "UNIQ_COMBINE" or not. In case of "UNIQ_COMBINE", the panel synthesis unit deletes the overlapping objects between the "<PANEL>" and "</PANEL>" in the synthesized panel and decrements K in the set number counter. For example, if the menu information storage unit 13814 stores the menu structure data (set panel) for the TV 13802 as shown in FIG. 141, and the menu structure data (set panel) for the VTR 13803 as shown in FIG. 148, they are simply synthesized as shown in FIG. 158. The objects defined in the same lower position are deleted as shown in FIG. 159, and further the position information, "<v>", "</v>", "<h>", and "</h>", is arranged as shown in FIG. 150.

The PRIORITY unit is activated by the retrieval.check unit, and retrieves an appliance attribute value "appliance MMM" from the synthesis direction data. The PRIORITY unit retrieves the shape information sandwiched by "<SYNTHESIS_DIRECTION>" and "</SYNTHESIS_DIRECTION>", and updates the content of the temporarily storage unit by rewriting the shape attribute of the appliances other than the appliance "MMM" to the shape attribute of the appliance "MMM" .

For example, in "PRIORITY" computation shown in FIG. 146, the attribute value defined for the TV 13802 is given priority to the button shape and page button shape over the other menu structure data (menu structure data of the VTR 13803). Similarly, in "PRIORITY" computation in FIG. 153, the attribute value defined for the VTR 13803 is given priority and used for the panel shape. In this way, as shown in FIG. 161, the post-synthesis shape data uses the button shape and page button of the menu structure data of the TV 13802 and the panel shape of the menu structure data of the VTR 13803.

The ADD unit is activated by the retrieval.check unit, and retrieves "SUBJECT BBB=CCC . . . >DDD" from the synthesis direction data in the temporarily storage unit, and searches for the information identified by "BBB=CCC . . . " in "DDD". If "BBB=CCC . . . " contains a plurality of conditions, it searches for the information that satisfies all the conditions and numbers them sequentially if there are plurality of them. The ADD unit sets a value "1" to an add number counter p (p=1). Also, the ADD unit checks whether there are the p'th retrieved data, and if so, it adds "FFF=GGG . . . " in "<ADDITIONAL INFORMATION FFF=GGG . . . >HHH" at a position identified by "EEE" in "<ADD DESTINATION>EEE" in the synthesis direction data to the p'th retrieval data as the menu structure data. The ADD unit increments the add number counter p by one. If there are no p'th retrieval data, the ADD unit gives an increment direction to the counter of the synthesis direction count unit.

For example, in "ADD" synthesis shown in FIG. 153, the action to switch the control to the VTR 13803 as a preprocess for the control action over the VTR 13803 is added. That is to say, the control is switched to the VTR 13803 first, and then the action of the VTR 13803 is controlled.

The temporarily storage unit stores the menu information under the control of the retrieval control unit, and adds, deletes and amends the content thereof under the control of the TOP synthesis unit, panel synthesis unit, PRIORITY unit and ADD unit.

The menu information display control unit 13817 controls the menu display unit 13818 to display a menu screen. The menu information display control unit 13817 receives a notice of completion of synthesis from the menu information synthesis unit 13816, and in response displays the synthesized top panel in the temporarily storage unit by means of the menu display unit 13818. The menu information display control unit 13817 receives a direction to change the display screen from the input acceptance unit 13811, and in response displays the synthesized menu information in the temporarily storage unit in the menu information synthesis storage unit 13816 as per change direction.

Assume that the menu information storage unit 13814 stores only the menu information for the TV 13802 as shown in FIGS. 140 through 145, then the menu information display control unit 13817 controls the menu display unit 13818 to display the menu screen, or a TV manipulation menu 16201 as shown in FIG. 162. When the set button 16202 is pushed as the menu object in the input acceptance unit 13811, it appears as the shadowed button shape A. The menu information display control unit 13817 receives the change direction from the input: acceptance unit 13811, and in response retrieves the menu structure data from the menu information synthesis unit, controlling the menu display unit 13818 to display a set panel 16203. The menu information display control unit 13817 adjusts the set panel 16203 into an adequate size to display the menu objects such as a button 16204 and a page button 16205.

When the menu information storage unit 13814 stores only the menu information for the VTR 13803 as shown in FIGS. 140, 148 through 151, then the menu information display control unit 13817 controls the menu display unit 13818 to display a VTR manipulation menu 16301 as shown in FIG. 163. Under these circumstances, the set panel 16303 is displayed when the set button 16302 on the VTR manipulation menu 16301 is pushed.

The menu display unit 13818 is composed of an LC display or the like, and displays the menu screen under the control of the menu information display control unit 13817.

The menu display 13818 displays the menu structure data (top panel) shown in FIG. 157 as a menu screen shown in FIG. 164 when the menu information for the TV 13801 and VTR 13802 is synthesized by the menu information synthesis unit 13816. Also, it displays the menu structure data (set panel) shown in FIG. 160 as the menu screen shown in FIG. 165.

Next, the operation related to this embodiment will be explained while referring to the flowcharts in FIGS. 166 through 168.

The remote controller 13801 transmits a signal to the TV 13802 (S16602), and the TV RM-signal receipt unit 13822 receives the signal from the remote controller 13801 (S16604), and transmits the same to the TV control unit 13823 (S16606). The TV control unit 13823 checks whether the signal from the RM signal receipt unit 13822 is a signal requesting the menu-information transmission or not (S16608). In case of the menu-information transmission request signal, the TV control unit 13823 gives a direction to transmit the TV menu information in the TV menu information storage unit 13821 to the TV menu transmission unit 13824 (S166610). Otherwise, it proceeds to S16618.

The TV menu information transmission unit 13824 retrieves the menu information to transmit the same to the remote controller 13801 (S16612), and the menu information receipt unit 13813 in the remote controller 13801 receives the TV menu information (S16614). The menu information receipt unit 13813 has the menu information storage unit 13814 store the TV menu information (S16616), and the TV control unit 13823 controls the action of the TV 13802 as per signal from the TV control unit 13823.

The remote controller 13801 and VTR 13803 operate in the same manner as above, and the explanation is omitted.

The retrieval.check unit in the menu synthesis unit 13816 checks whether the menu information storage unit 13814 stores the menu information for a plurality of appliances (S16702). If the menu information storage unit 13814 stores the menu information for a plurality of appliances, the retrieval.check unit gives a direction to set an initial value to the synthesis direction count unit, which accordingly sets N=1 (S16704). Otherwise, it ends the synthesis process.

The retrieval.check unit further checks whether there exist the N'th synthesis direction data in the synthesis direction data in the menu information storage unit 13814, and if there are the N'th synthesis direction data, it retrieves the same; otherwise it ends the synthesis process (S16706).

The retrieval.check unit interprets "XXX" in "COMPUTATION=XXX" in the retrieved synthesis direction data to check whether "XXX" is the "TOP synthesis" computation or not (S16708). In case of the "TOP synthesis" computation, the retrieval.check unit activates the TOP synthesis unit, which in turn checks whether "YYY" in "COMBINE_METHOD=YYY" is either "UNIQ COMBINE" or "SIMPLE_COMBINE" or neither (S16710). When "XXX" is not the "TOP synthesis" computation, the retrieval.check unit proceeds to S16728. If "YYY" is either "UNIQ_COMBINE" or "SIMPLE_COMBINE", the retrieval.check unit sets a value "1" to the appliance number counter (M=1). If "YYY" is neither "UNIQ_COMBINE" nor "SIMPLE_COMBINE", the retrieval.check unit proceeds to S16762. Subsequently, the retrieval.check unit checks whether there is the M'th appliance's menu (S16714), and retrieves the definition data of the panel identified by the "top panel" in the menu structure data of the M'th appliance, adding the attribute definition in the definition data of the retrieved top panel as the definition item of the attribute of the synthesized panel (S16716). When the menu information of the M'th appliance does not exist, the retrieval.check unit proceeds to S16722.

The retrieval.check unit adds the objects defined between "<PANEL>" and "</PANEL>" in the definition data of the panel identified by the "top panel" in the menu structure data of the M'th appliance as the objects sandwiched by "<PANEL>" and "</PANEL>" in the synthesized panel (S16718). Then, the retrieval.check unit increments the appliance number counter and returns to S16714 (S16720). If there are any overlapping attribute definition items in the synthesized panel, the retrieval.check unit gives a priority to the first-appearing definition item and deletes the rest (S16722).

The retrieval.check unit checks whether "YYY" is "UNIQ_COMBINE" or not (S16724), and in case of "UNIQ_COMBINE", it deletes the overlapping objects between the "<PANEL>" and "</PANEL>" in the synthesized panel. In other words, it interprets the objects as one object if they have the same identifier (S16726), and proceeds to S16762; otherwise it proceeds to S16762.

The retrieval.check unit checks whether the retrieved synthesis direction data are the "panel synthesis" computation or not, and in case of the "panel synthesis" computation, it activates the panel synthesis unit, which checks "YYY" in "COMBINE_METHOD=YYY" is either "UNIQ_COMBINE" or "SIMPLE_COMBINE" or neither (S16730). If "XXX" is not the "panel synthesis" computation, the retrieval.check unit proceeds to S16742. If "YYY" is either "UNIQ_COMBINE" or "SIMPLE_COMBINE", the retrieval.check unit computes the number K of the sets of the panels having the same identifiers in the menu information retrieved in S16702 (S16732), and checks if K>0 (S16734). If K>0, the retrieval.check unit retrieves all the menu structure data for a plurality of panels within the K'th panel having the same identifier (S16736) and synthesizes the same (S16736); otherwise, it proceeds to S16762. The menu-structure-data synthesis action will be explained below in S16802 and onwards. The retrieval.check unit decrements K (K=K−1) (S16740) and returns to S16734.

The retrieval.check unit checks whether the retrieved synthesis data are the "PRIORITY" computation or not (S16742), and in case of the "PRIORITY" computation, it activates the PRIORITY unit, which accordingly retrieves the appliance attribute value "appliance=MMM" from the synthesis direction data (S16744). The PRIORITY unit retrieves the shape information sandwiched by "<SYNTHESIS_DIRECTION> and "</SYNTHESIS_DIRECTION>" (S16746), and rewrites the shape data of the appliances other than the appliance "MMM" into the shape data of the appliance "MMM" (S16748) and proceeds to S16762.

The retrieval.check unit judges whether the retrieved synthesis direction data are the "ADD" computation or not (S16750), and in case of the "ADD" computation, it activates the ADD unit, which accordingly retrieves "SUBJECT BBB=CCC . . . >DDD" from the synthesis direction data to search for the information identified by "BBB=CCC . . . " in the menu structure data "DDD". If "BBB=CCC . . . " includes a plurality of conditions, the information that satisfies all the condition is retrieved (S16752). Subsequently, the retrieval.check unit sets a value "1" to the additional number counter (p=1) (S16754). The retrieval.check unit checks whether there are the p'th retrieved data in the "DDD" data received in S16752 (S16756). If there are the p'th retrieved data, the retrieval.check unit adds the data "FFF=GGG . . . " in "<ADD INFORMATION FFF=GGG . . . >HHH" at a position specified by "EEE" in "ADD_DESTINATION>EEE" (S16758). Subsequently, the retrieval.check unit increments the additional number counter p by one (S16760), and returns to S16756. If there are no p'th retrieved data, the retrieval.check unit gives an increment direction to the counter of the synthesis direction count unit (S16762), and returns to S16706.

The panel synthesis unit computes the number L of the panel having the same identifier (S16802), and checks whether L>0 (S16804). In case of L>0, the retrieval.check unit adds the attribute definition of the L'th panel as the attribute definition item of the panel to be synthesized (S16806). The retrieval.check unit adds the objects sandwiched by "<PANEL>" and "</PANEL>" in the L'th panel information as the objects sandwiched by "<PANEL>" and "</PANEL>" in the synthesized panel (S16808), and decrements L by one (L=L−1) (S16810), returning to S16804. If L is not greater than zero, and there are overlapping attribute definition items in the synthesized panel, the panel synthesis unit gives a priority to the first-appearing attribute definition item, and deletes the rest (S16812). The panel synthesis unit checks whether "YYY" is "UNIQ_COMBINE" or not (S16814), and in case of "UNIQ COMBINE", it deletes the overlapping objects sandwiched between "<PANEL> and </PANEL>" if any (S16816), returning to S16740. Otherwise, it returns to S16740.

Although the TOP synthesis unit writes the overlapping attribute definition from the second in the temporarily storage unit in S16722, the priority may be given to each appliance, so that the attribute definition of the appliance will be adopted in an order of priority.

Also, the top synthesis unit deletes the same object appearing at the second and subsequent S16726. However, the priority may be given to each appliance, so that the attribute definition of the appliance will be adopted in an order of priority.

Further, in S16746, the PRIORITY unit retrieves the shape information to match the menu structure data with the shape data of a specific appliance. However, other attribute definitions such as character color, action, position, panel's timeout (the attribute value of the time from the start to end of the panel display) to match these attribute definitions.

In this embodiment, the menu information for the TV 13801 and VTR 13802 are synthesized. However, the appliances are not limited to these two appliances: it may include an air conditioner or audio equipment, etc.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A synthesis apparatus including a plurality of appliances for synthesizing menu information withheld by each appliance, said menu information being hierarchical information enabling a user to control said appliances interactively, (1) one of said plurality of appliances including:

first menu storage means for storing first menu information, said first menu information being hierarchical information to be used to control said one appliance;

menu information receipt means for receiving the menu information from the other appliances;

menu information synthesis means for synthesizing the menu information received by said menu information receipt means and first menu information stored in said first menu information storage unit, resulting synthesized menu information being used as a menu-information selection menu at a highest position in a hierarchy; and menu display means for displaying the menu-information selection menu generated by said menu information synthesis means, (2) each of the other appliances including:

menu storage means for storing the menu information unique to each appliance, the menu information being hierarchical information to be used to control each appliance; and menu transmission means for transmitting the unique menu information in said menu storage means to said one appliance.

2. The synthesis apparatus of claim 1, wherein said one appliance further includes synthesis rule storage means for storing rules regulating menu-information synthesis by said menu information synthesis means, whereby said menu information synthesis means synthesizes the menu information from the other appliances and the first menu information in accordance with the synthesis rules.

3. The synthesis apparatus of claim 2, wherein said menu transmission means includes:

a menu information retrieval direction unit for detecting a connection with said one appliance and for giving a direction to retrieve the menu information;

a menu information retrieval unit for retrieving the menu information from said menu storage means upon receipt of the direction from said menu information retrieval direction unit; and a menu transmission unit for transmitting the menu information retrieved by said menu information retrieval unit to said menu information receipt means.

4. The synthesis apparatus of claim 3, wherein said menu information synthesis means further includes:

a menu information temporarily storage unit for temporarily storing the menu information received by said menu information receipt means;

a first menu information retrieval unit for retrieving the first menu information from said first menu storage means;

a synthesis rule retrieval unit for retrieving the synthesis rules from said synthesis rule storage means, said synthesis rules including a synthesis rule for a hierarchial structure, a selection rule for a displayed shape, a synthesis rule for a panel object, and a synthesis rule for control of said appliances; and a hierarchial structure synthesis unit for synthesizing the menu information stored in said menu information temporarily storage unit and the first menu information retrieved by said first menu information retrieval unit in accordance with the hierarchical synthesis rule retrieved by said synthesis rule retrieval unit.

5. The synthesis apparatus of claim 4, wherein said menu information synthesis means includes:

a menu selection acceptance unit for accepting a selection of an appliance subject to control manipulation using the menu-information selection menu displayed by said menu display means;

a menu information retrieval unit for retrieving the menu information of the appliance accepted by said menu selection acceptance unit from said hierarchical structure synthesis unit; and a menu switch control unit for changing a display on said menu display means in accordance with the menu information retrieved by said menu information retrieval unit.

6. A synthesis method for synthesizing a plurality of pieces of hierarchical menu information used for interactively setting operations, the synthesis method comprising:

a first menu storage step for previously storing first hierarchical menu information used for interactively setting operations in a first storage area;

a second menu storage step for previously storing second hierarchical menu information used for interactively setting operations in a second storage area;

a synthesis rule storage step for previously storing synthesis rules regulating synthesis of the plurality of pieces of hierarchical menu information in a third storage area;

a menu information synthesis step for synthesizing the first hierarchical menu information and the second hierarchical menu information to generate a menu in accordance with the synthesis rules; and a menu display step for displaying the menu generated in said menu information synthesis step.

7. The synthesis method of claim 6, wherein in said menu information synthesis step, any pieces of a highest hierarchical menu information among the plurality of pieces of hierarchical menu information are synthesized to generate the menu.

8. The synthesis method of claim 7, wherein said menu information synthesis step includes:

a first menu information retrieval sub-step for retrieving the first menu information from said first menu storage area;

a synthesis rule retrieval sub-step for retrieving the synthesis rules from said third storage area, the synthesis rules including a synthesis rule for a hierarchical structure, a selection rule for a displayed shape, and a synthesis rule for a panel object; and a hierarchical structure synthesis sub-step for synthesizing the second menu information stored in said second storage area and the first menu information retrieved in said first menu information a retrieval sub-step in accordance with the synthesis rule for the hierarchical structure retrieved in said synthesis rule retrieval sub-step to create menu information corresponding to the hierarchical structure.

* * * * *